United States Patent
Komiya et al.

(10) Patent No.: US 6,744,931 B2
(45) Date of Patent: Jun. 1, 2004

(54) IMAGE PROCESSING APPARATUS

(75) Inventors: Yasuhiro Komiya, Hino (JP); Tatsuo Nagasaki, Yokohama (JP); Koutatsu Oura, Chofu (JP); Takeshi Mori, Machida (JP); Ryoichi Sawaki, Hachioji (JP); Yoichi Iba, Hachioji (JP); Toshiyuki Ebihara, Hino (JP); Hideo Tomabechi, Higashiyamato (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/740,492

(22) Filed: Dec. 19, 2000

(65) Prior Publication Data

US 2003/0113034 A1 Jun. 19, 2003

Related U.S. Application Data

(62) Division of application No. 08/969,937, filed on Nov. 28, 1997, now Pat. No. 6,205,259, which is a continuation of application No. 08/045,038, filed on Apr. 8, 1993, now abandoned.

(30) Foreign Application Priority Data

| Apr. 9, 1992 | (JP) | 4-89090 |
| Apr. 9, 1992 | (JP) | 4-89092 |
| Apr. 14, 1992 | (JP) | 4-94473 |
| Sep. 8, 1992 | (JP) | 4-239803 |
| Sep. 14, 1992 | (JP) | 4-244933 |
| Sep. 16, 1992 | (JP) | 4-246646 |
| Mar. 3, 1993 | (JP) | 5-42402 |
| Mar. 23, 1993 | (JP) | 5-63978 |

(51) Int. Cl.$^7$ .............. G06K 9/36; G06T 3/00

(52) U.S. Cl. .............. 382/284; 382/294; 345/629

(58) Field of Search .............. 382/284, 294; 345/629, 630; 348/36, 37; 352/69, 70, 71; 396/20

(56) References Cited

U.S. PATENT DOCUMENTS

| 3,905,045 A | 9/1975 | Nickel |
| 4,220,967 A | * 9/1980 | Ichida et al. ............. 348/169 |

(List continued on next page.)

FOREIGN PATENT DOCUMENTS

| JP | 57-131188 | 8/1982 |
| JP | 62-195984 | 8/1987 |

(List continued on next page.)

OTHER PUBLICATIONS

Parallel Distributed Processing, David E. Rumelhart et al., vol. 1, pp. 319–362, Chapter 8; The MIT Press, Cambridge, Massachusetts, 1986.

*Primary Examiner*—Jon Chang
(74) *Attorney, Agent, or Firm*—Frishauf, Holtz, Goodman & Chick, P.C.

(57) ABSTRACT

Disclosed herein is an image processing apparatus, in which an object image focused by a lens is split into a plurality of images by means of a light splitting section. These images are converted into image data items by a plurality of imaging devices which are arranged with their imaging area overlapping in part. The image data items are stored temporarily in an image storing section. A displacement detecting section detects displacement coefficients (rotation angle R and parallel displacement S) from the image signals representing the mutual overlap region of two images which are to be combined and which are represented by two image data items read from the image storing section. The position of any specified pixel of the image displayed is identified by the pixel signal generated by the corresponding pixel of any imaging device. An interpolation section performs interpolation on the pixel values of the imaging device, thereby correcting the values of the other pixels of the image displayed and ultimately generating interpolated image signals. The interpolated image signals are combined with the image signals produced by the imaging device, whereby a display section displays a high-resolution image.

7 Claims, 86 Drawing Sheets

U.S. PATENT DOCUMENTS

| | | |
|---|---|---|
| 4,754,492 A | 6/1988 | Malvar |
| 4,876,732 A | 10/1989 | Miyagawa et al. |
| 4,951,136 A | 8/1990 | Drescher et al. |
| 4,992,781 A | 2/1991 | Iwasaki et al. |
| 4,994,914 A | 2/1991 | Wiseman et al. |
| 5,022,085 A | 6/1991 | Cok |
| 5,054,100 A | 10/1991 | Tai |
| 5,140,647 A * | 8/1992 | Ise et al. .................. 382/284 |
| 5,187,754 A | 2/1993 | Currin et al. |
| 5,274,453 A | 12/1993 | Maeda |
| 5,315,390 A | 5/1994 | Windrem |
| 5,321,798 A * | 6/1994 | Burman et al. ............ 345/630 |
| 5,469,274 A * | 11/1995 | Iwasaki et al. ............ 345/648 |
| 5,566,251 A * | 10/1996 | Hanna et al. ............. 382/284 |
| 5,686,960 A * | 11/1997 | Sussman et al. ........... 382/284 |

FOREIGN PATENT DOCUMENTS

| | | |
|---|---|---|
| JP | 62-247692 | 10/1987 |
| JP | 64-34073 | 2/1989 |
| JP | 01-251962 | 10/1989 |
| JP | 2-178646 A | 7/1990 |
| JP | 3-108962 | 5/1991 |
| JP | 4-269793 | 9/1992 |
| JP | 4-347979 A | 12/1992 |
| JP | 5-30520 | 2/1993 |
| JP | 5-328205 A | 12/1993 |
| JP | 6-178327 | 6/1994 |

* cited by examiner

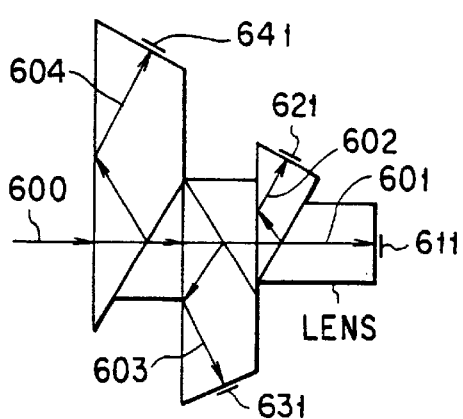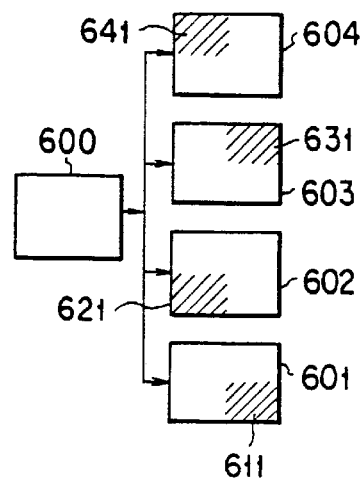
PRIOR ART
F I G. 1
PRIOR ART
F I G. 2
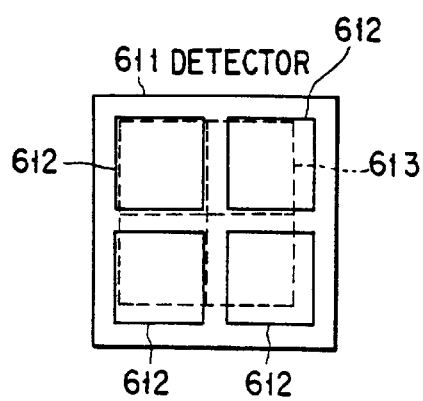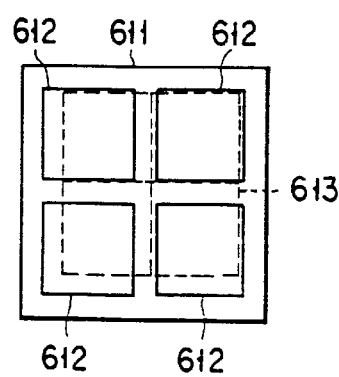
PRIOR ART
F I G. 3A
PRIOR ART
F I G. 3B
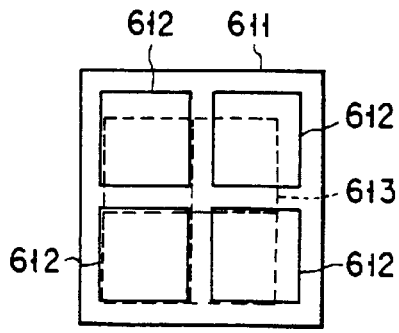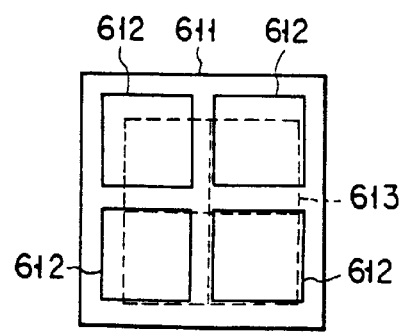
PRIOR ART
F I G. 3C
PRIOR ART
F I G. 3D

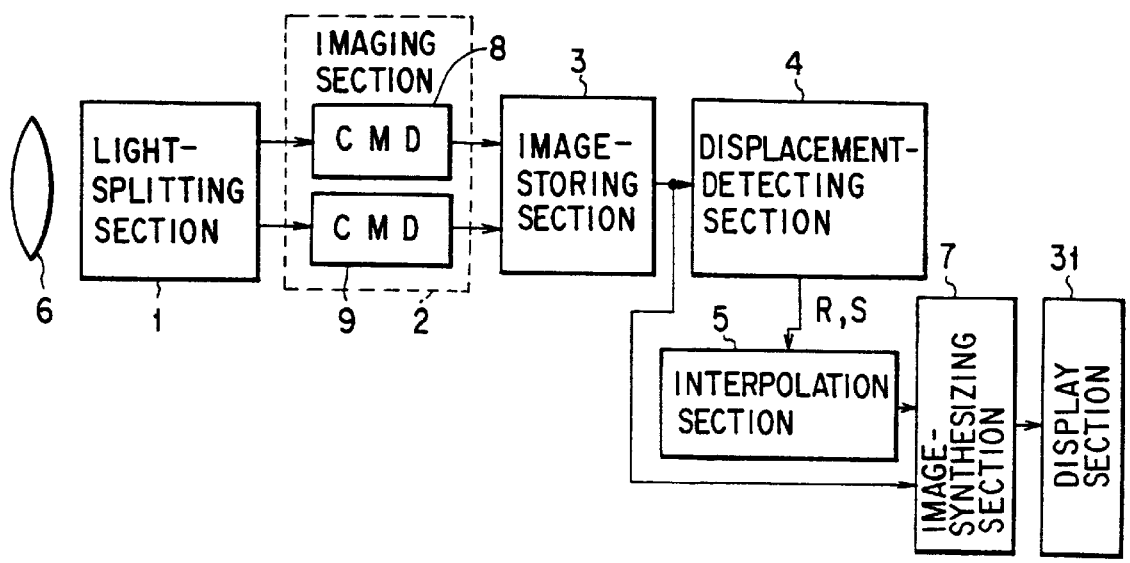
F I G. 4A
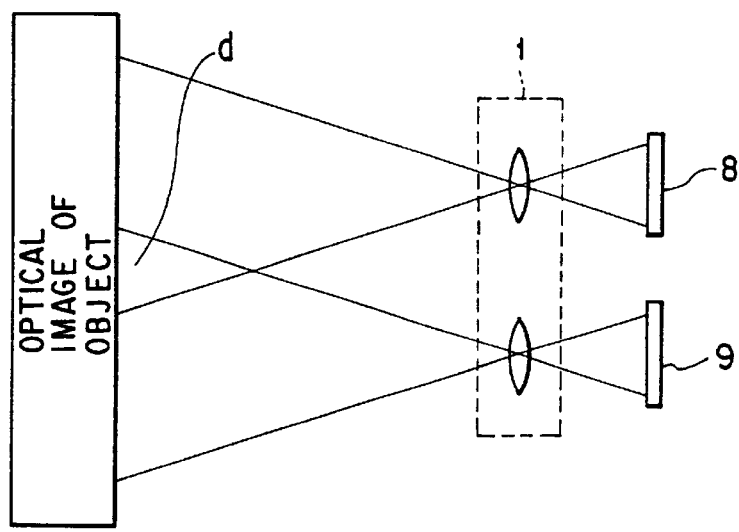
F I G. 4B

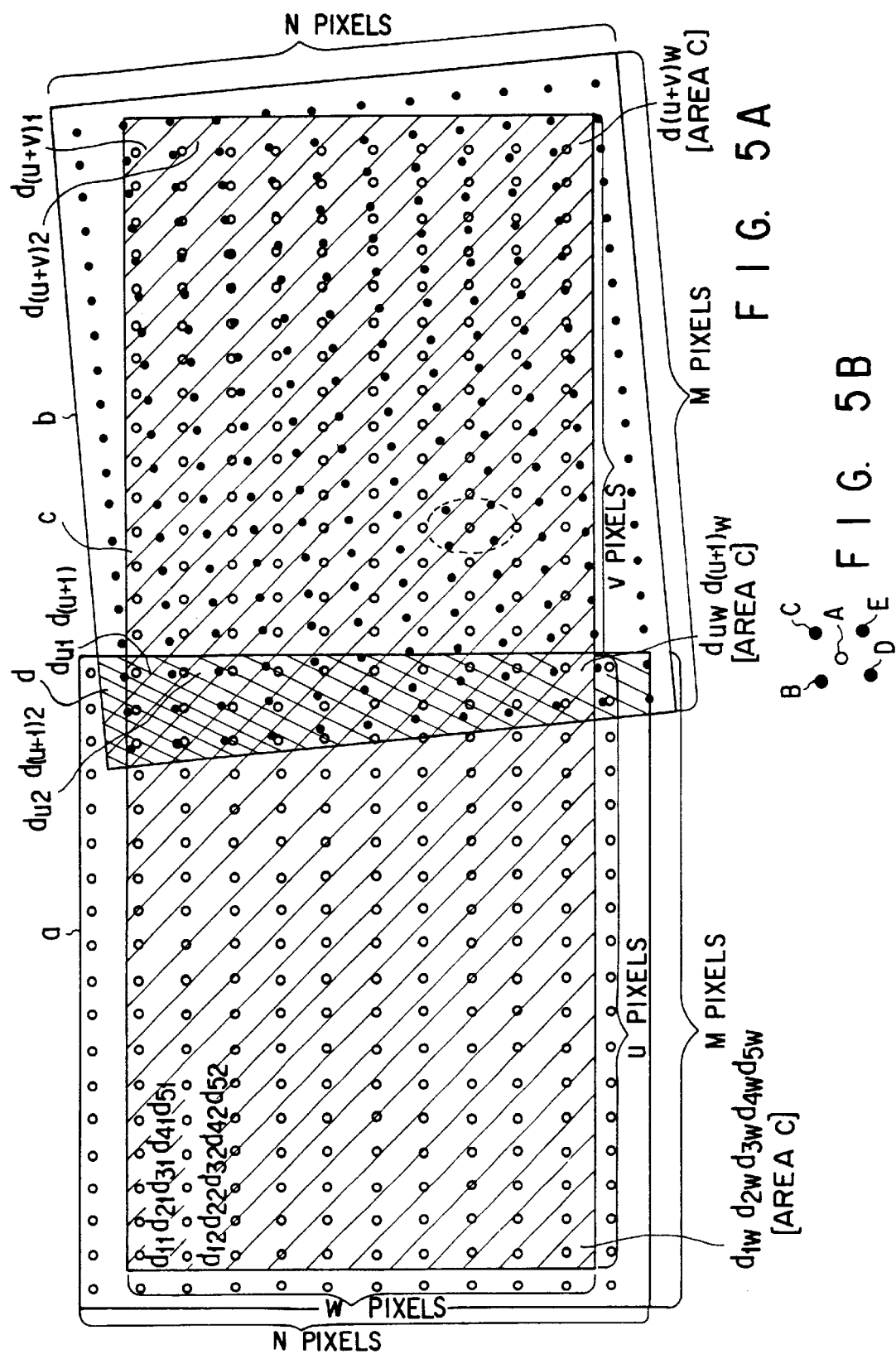

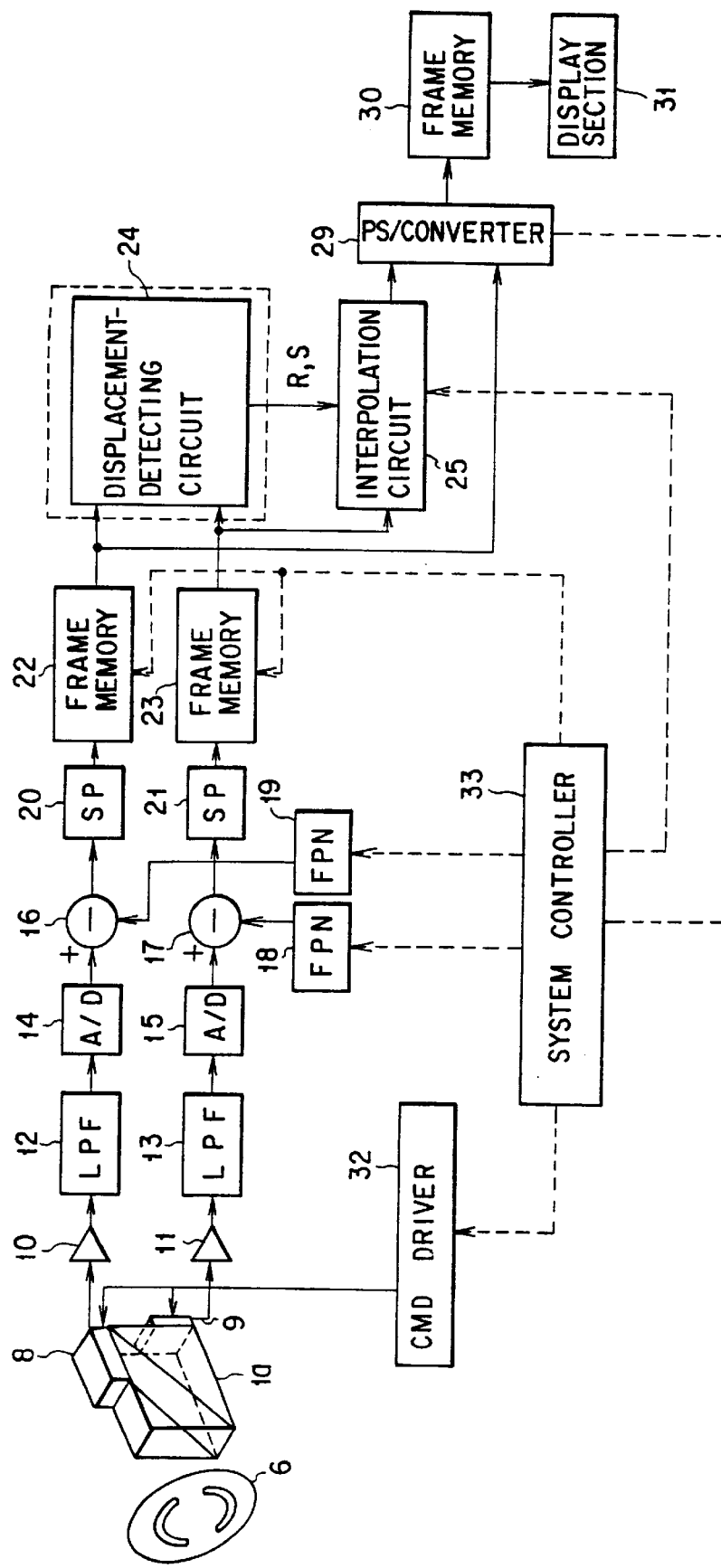
F I G. 6

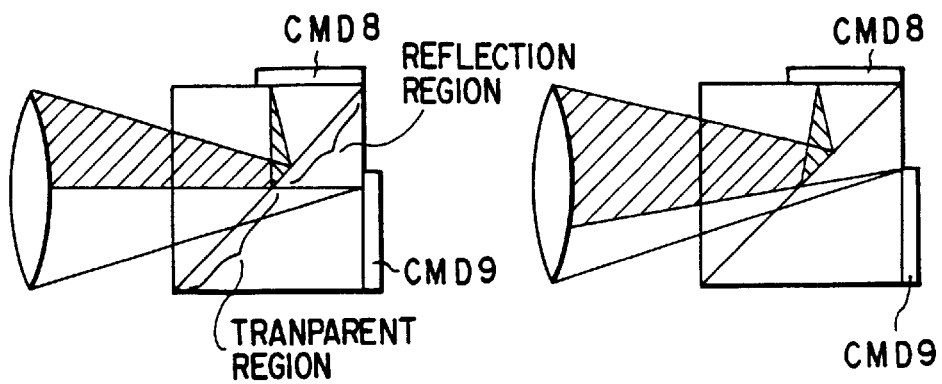
F I G. 14A  F I G. 14B
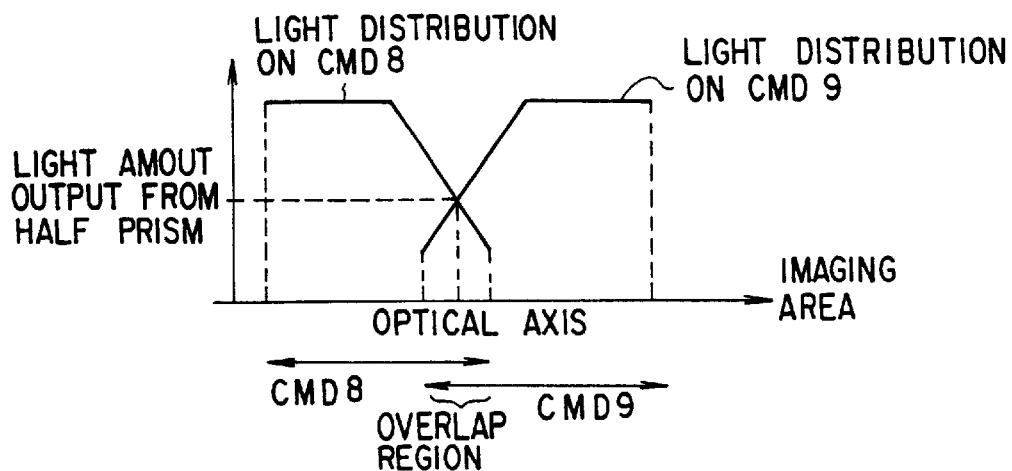
F I G. 15
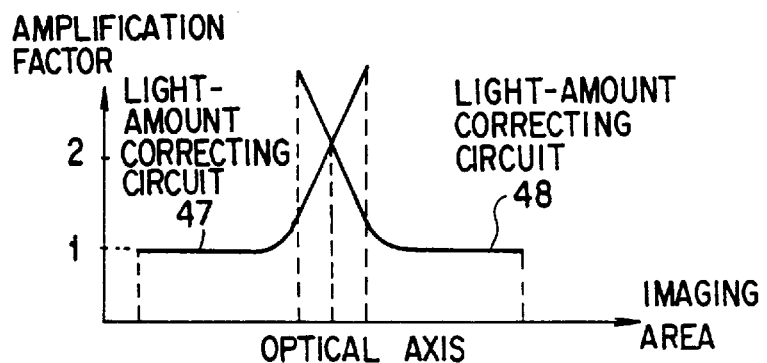
F I G. 16

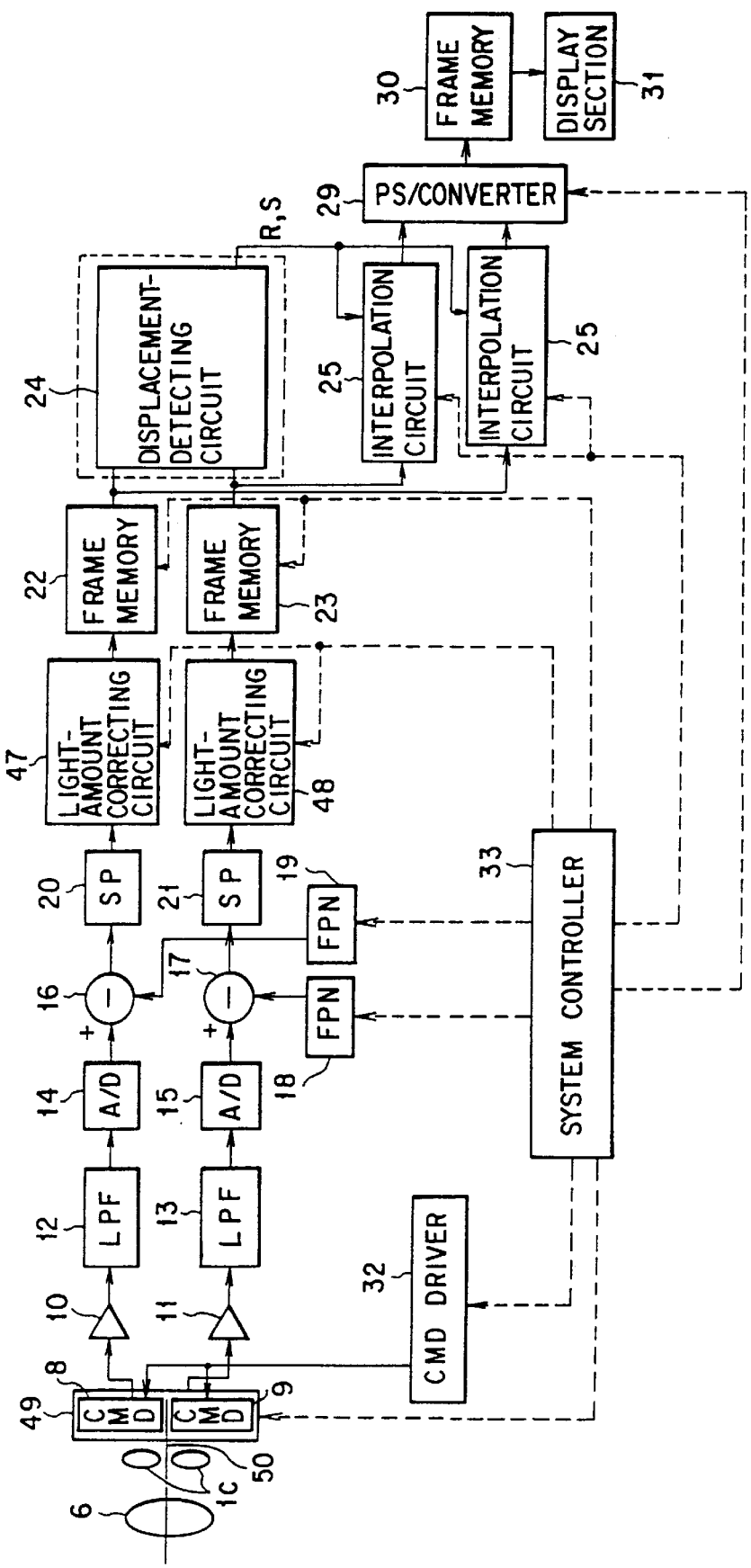
F I G. 20

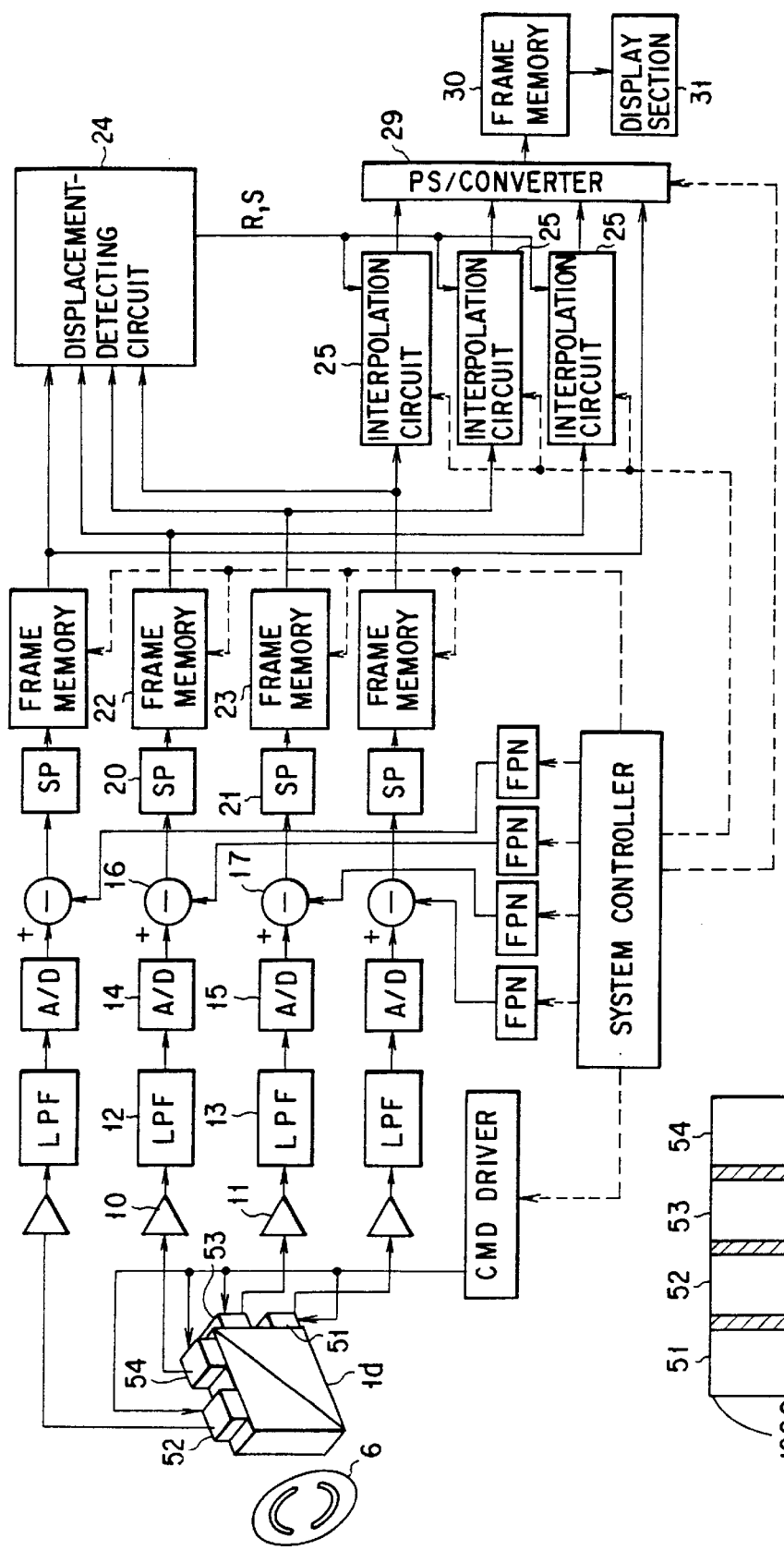
F I G. 22A
F I G. 22B

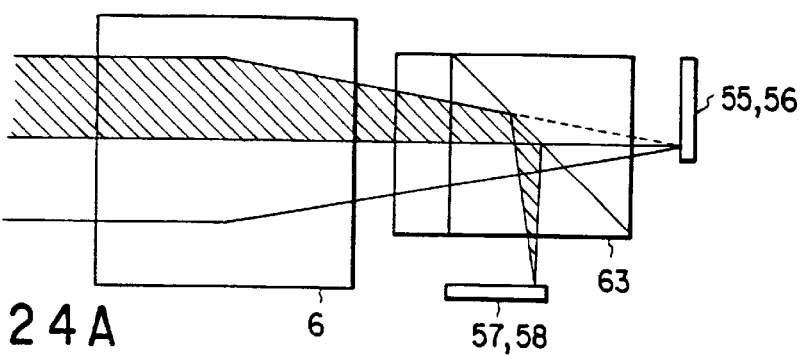
F I G. 24A
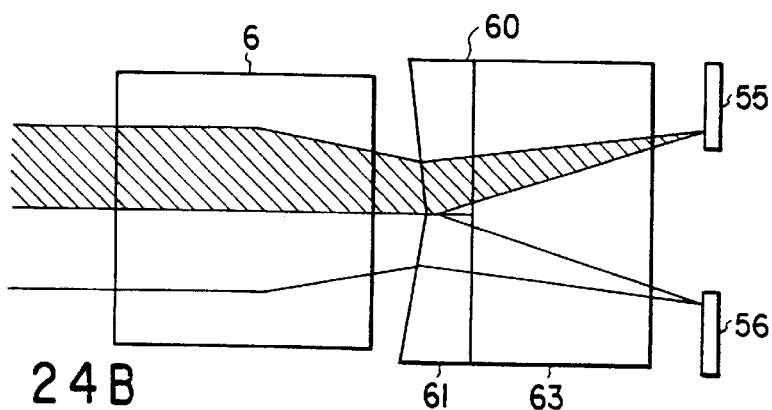
F I G. 24B
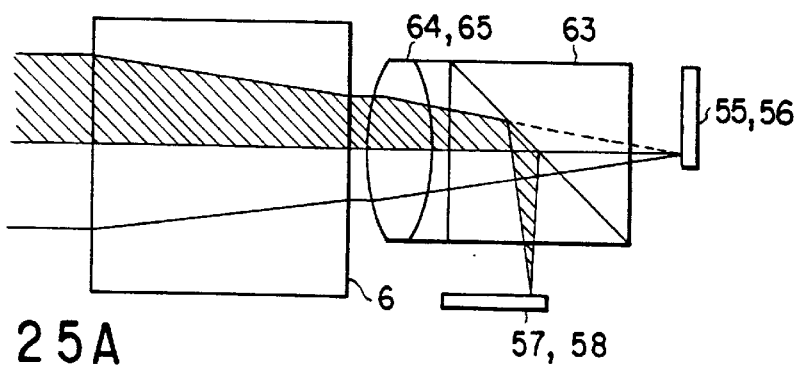
F I G. 25A
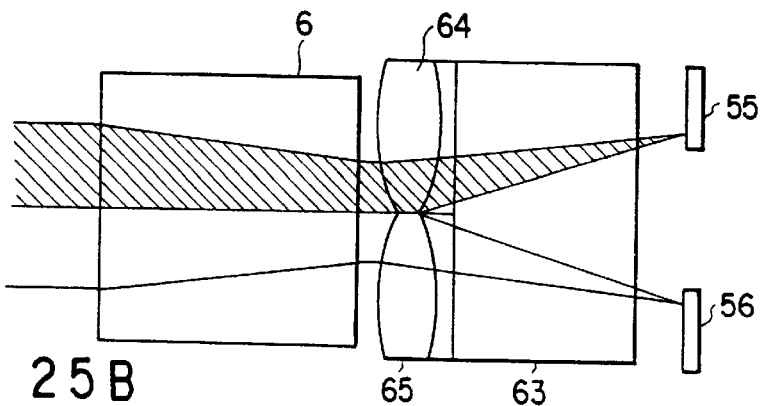
F I G. 25B

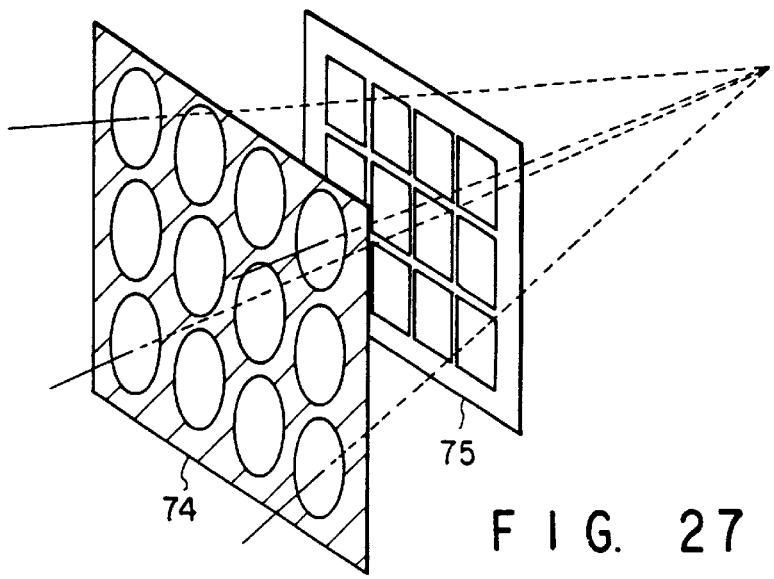
F I G. 27
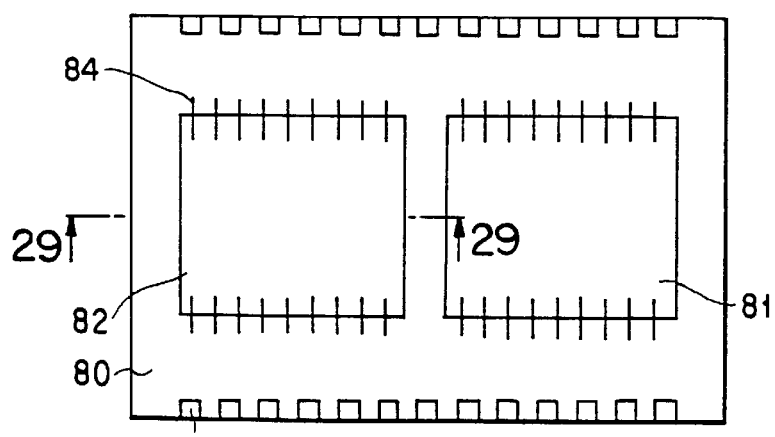
F I G. 28
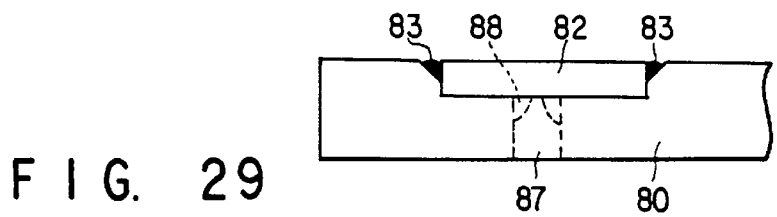
F I G. 29
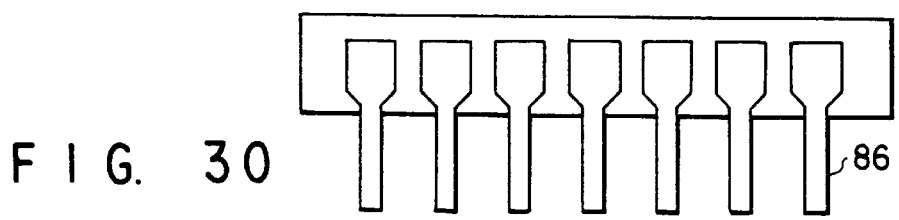
F I G. 30

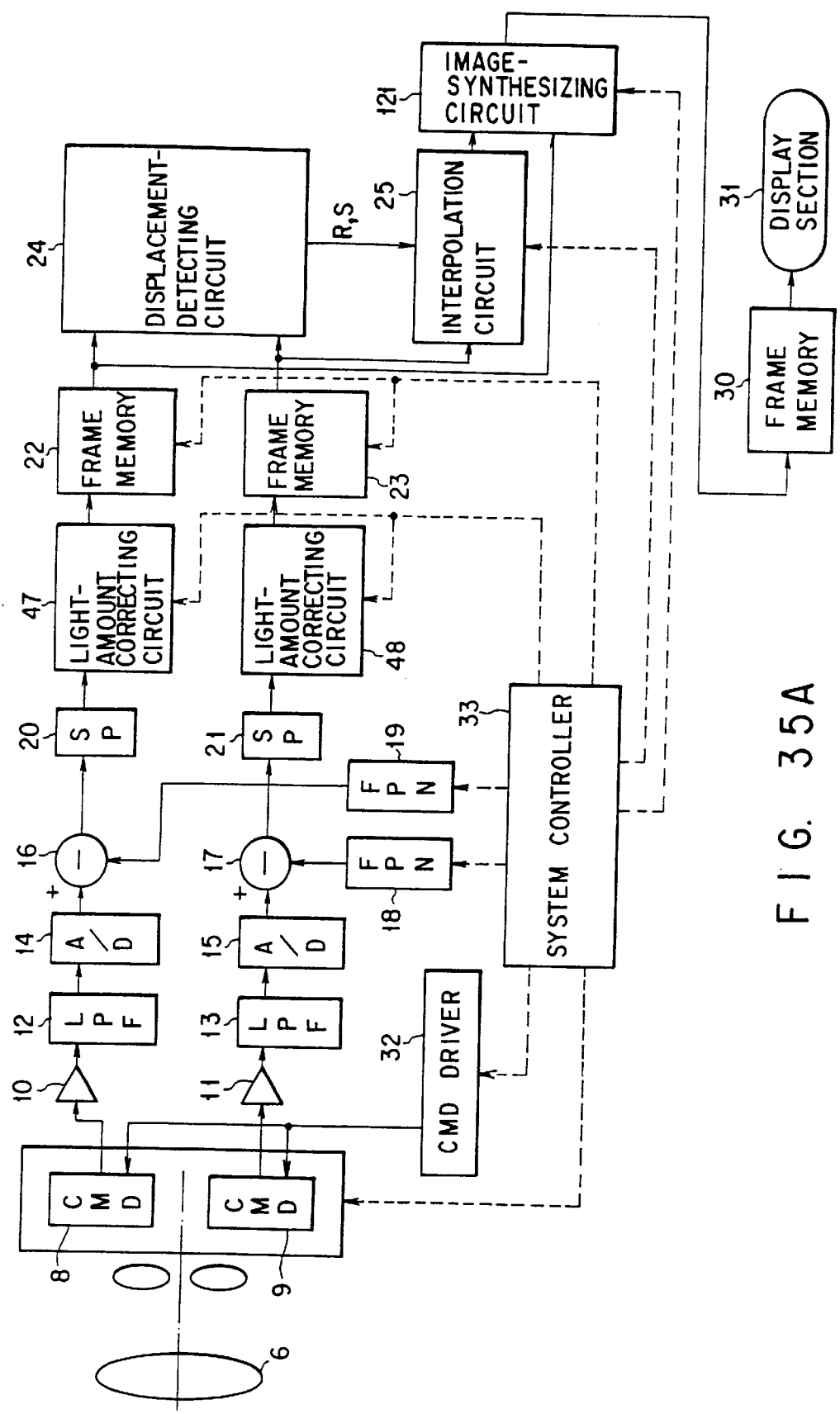
F I G. 35A

VALUES OF OUTPUT
PIXEL SIGNALS $P_3 \geq X_1 : f(X_1)$ $P_3 < X_1 < P_4$ : REGION OF LINEAR INTERPOLATION $f(P_3) - (X_1 - P_3) * (f(P_3) - g(P_4)) / (P_4 - P_3)$ $P_4 \leq X_1 : g(X_1)$ $P_1 > X_1$ :
$$a = 1.0$$
$$b = 0.0$$

$P_1 \leq X_1 < P_2$ :
$$a = (P_2 - X_1) / (P_2 - P_1)$$
$$b = (X_1 - P_1) / (P_2 - P_1)$$

$P_2 \leq X_1$ :
$$a = 0.0$$
$$b = 1.0$$

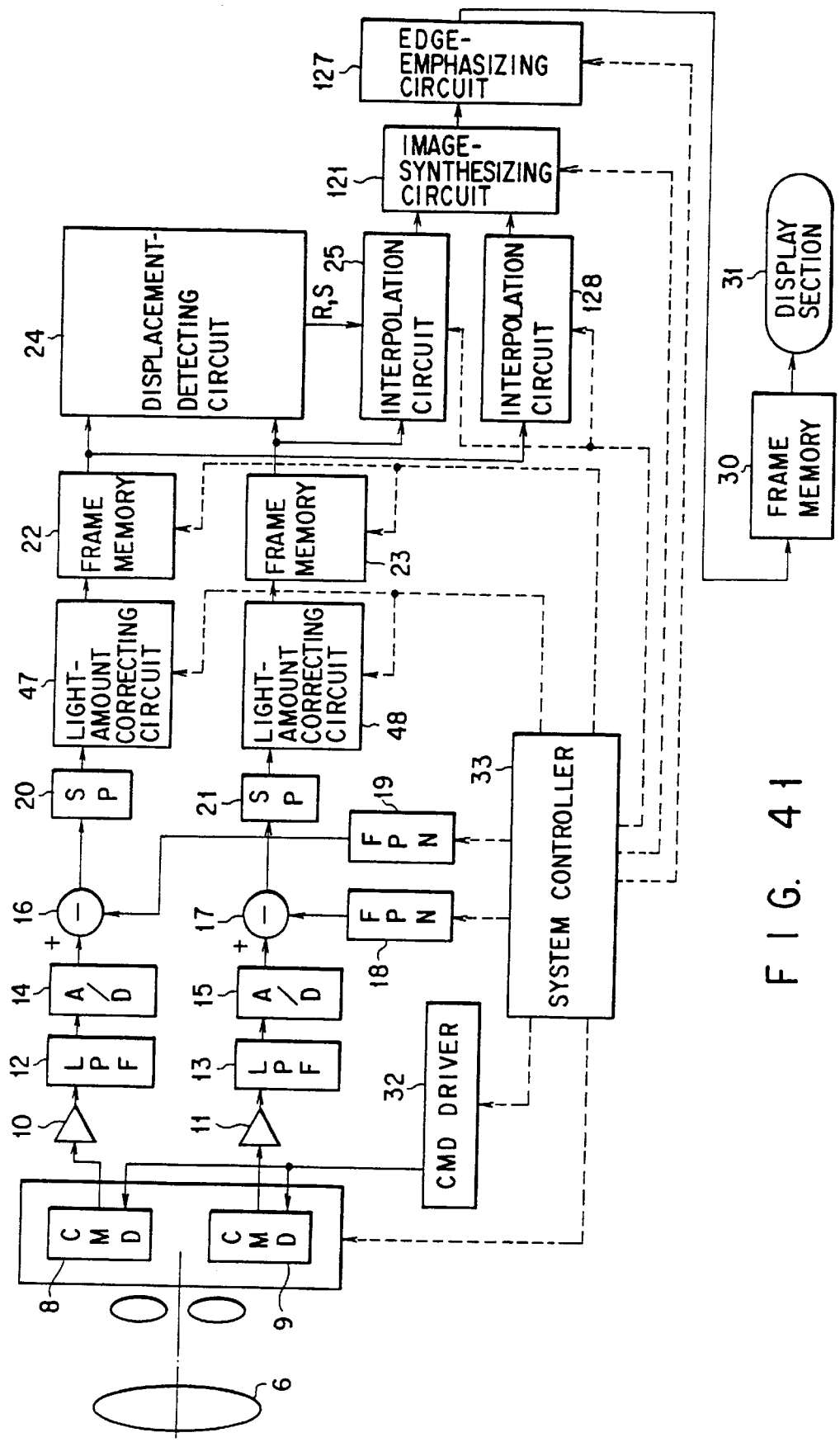
F I G. 41

```
  0  -1   0        -1  -1  -1         1  -2   1
 -1   5  -1        -1   9  -1        -2   5  -2
  0  -1   0        -1  -1  -1         1  -2   1
 _____/   _____/    _____/

```

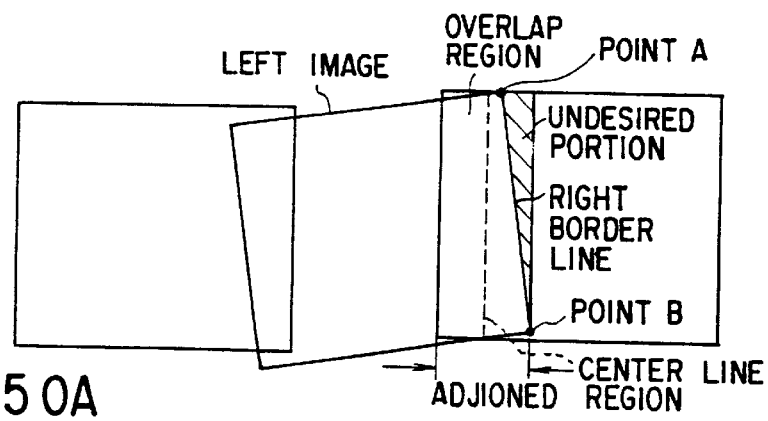
F I G. 50A
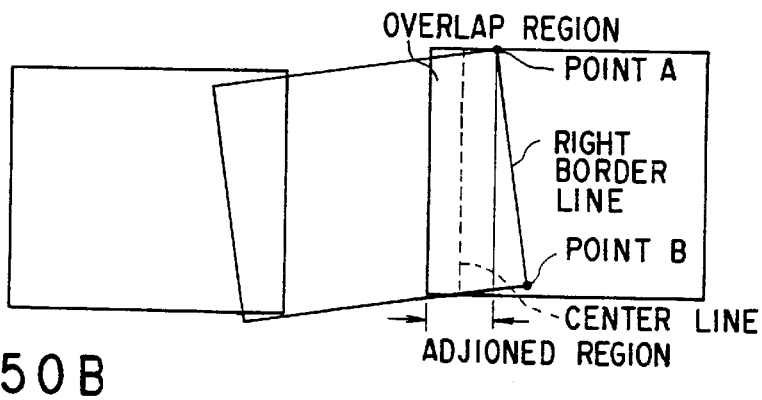
F I G. 50B
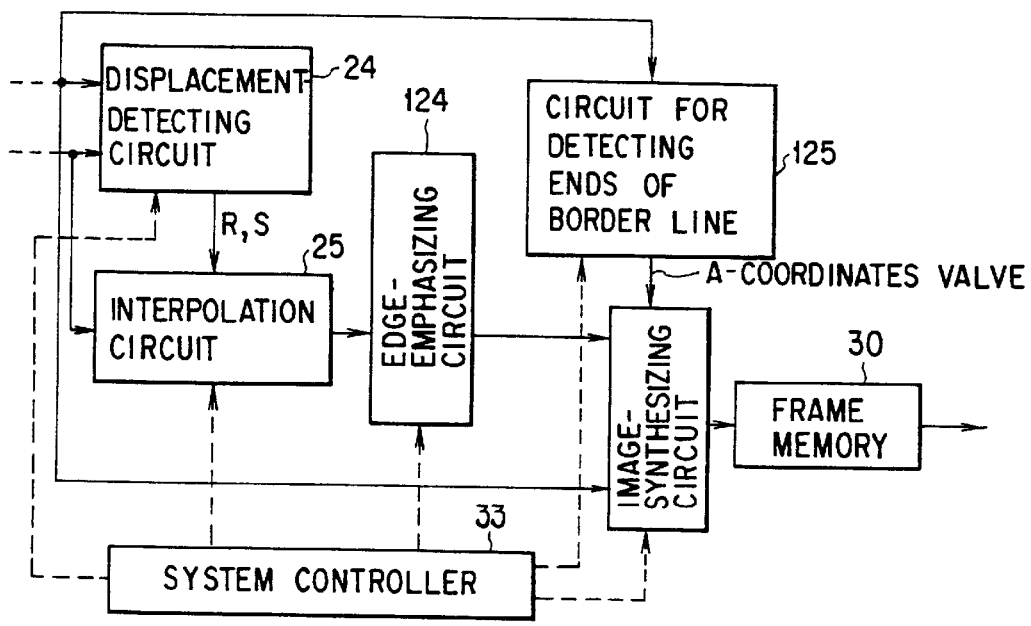
F I G. 51

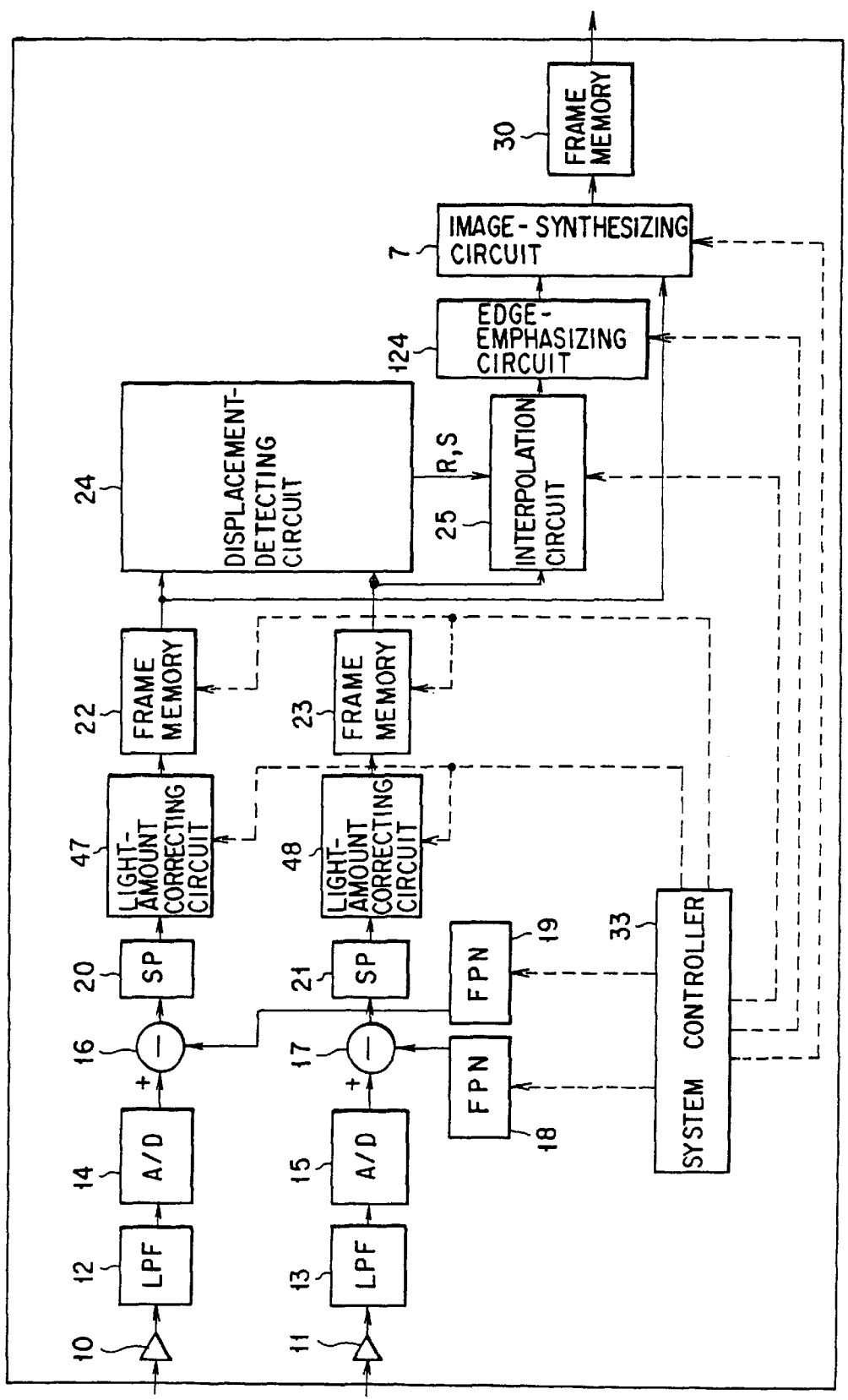
F I G. 52

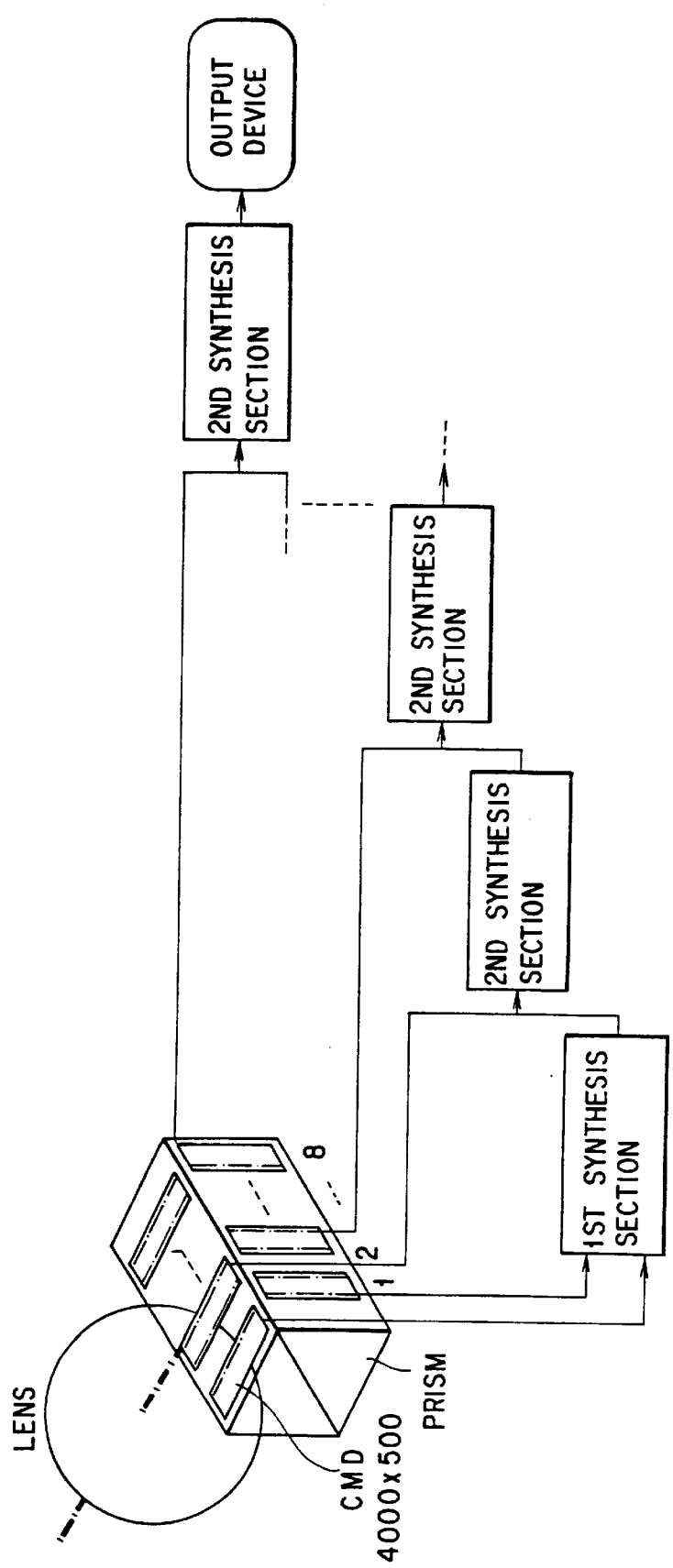
F I G. 53

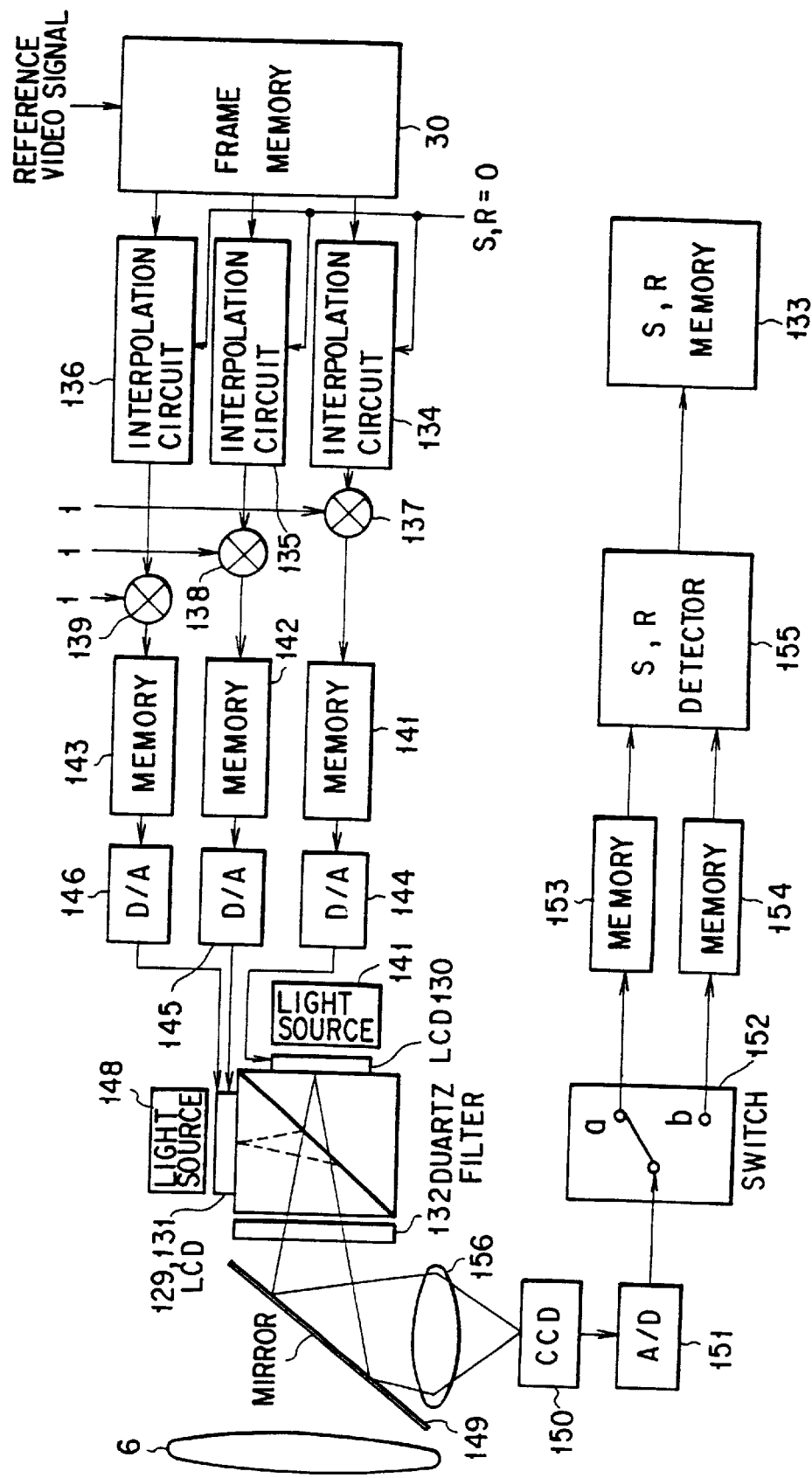
F I G. 60

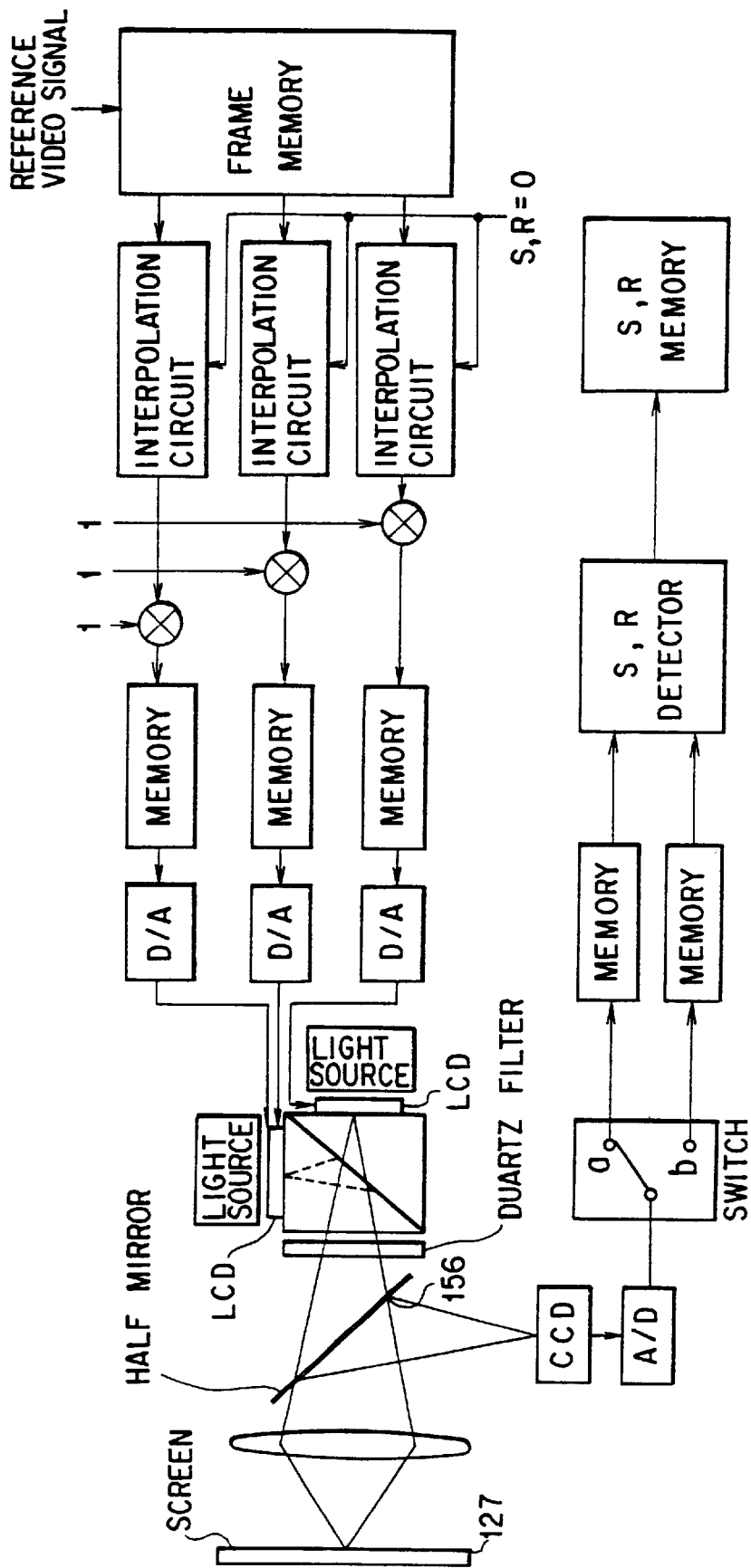
F I G. 61

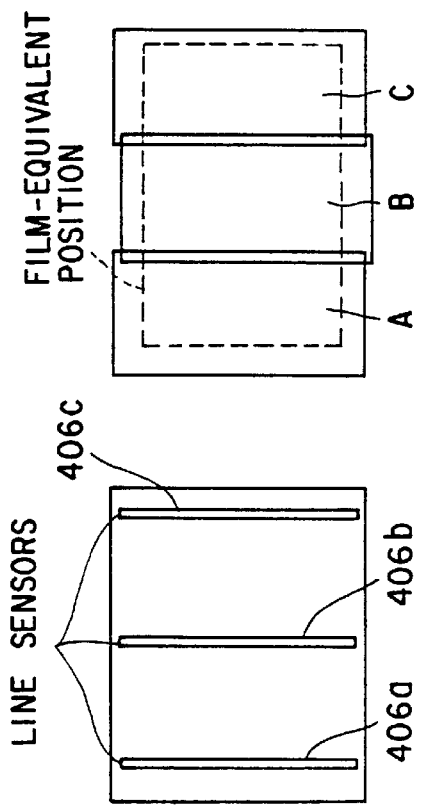
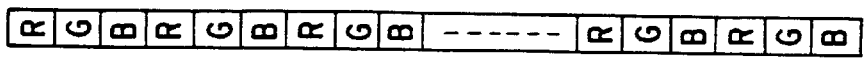
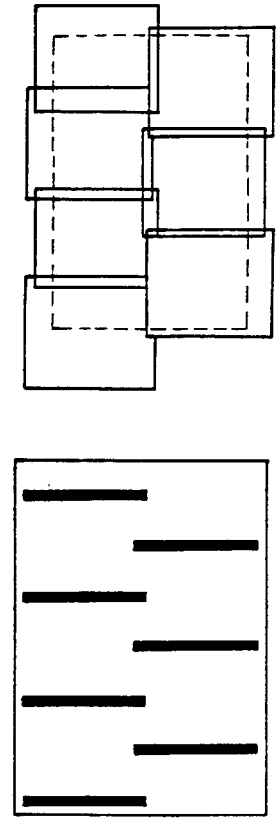
FIG. 64A
FIG. 64B
FIG. 64C
FIG. 64D
FIG. 64E

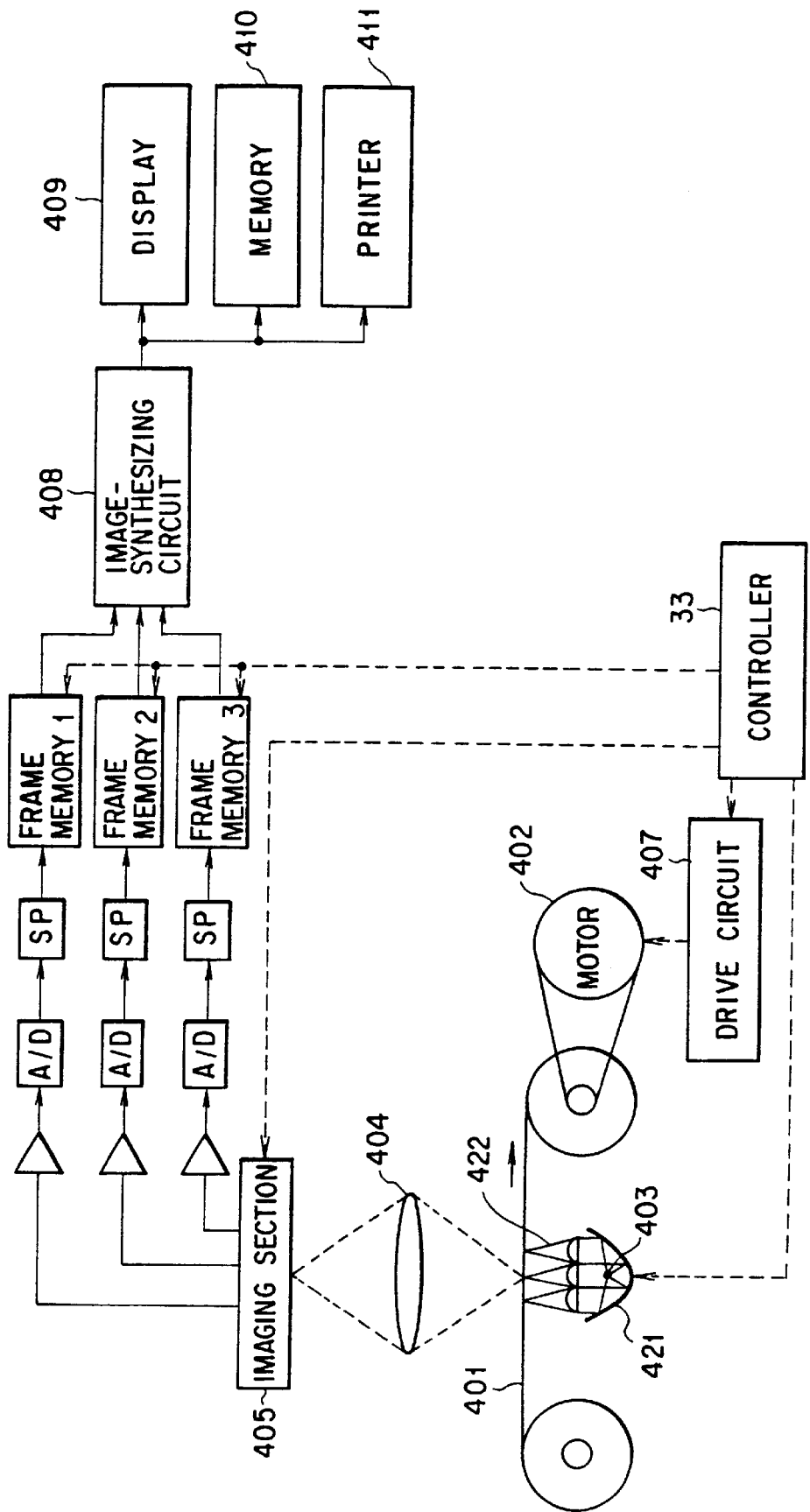
F I G. 66

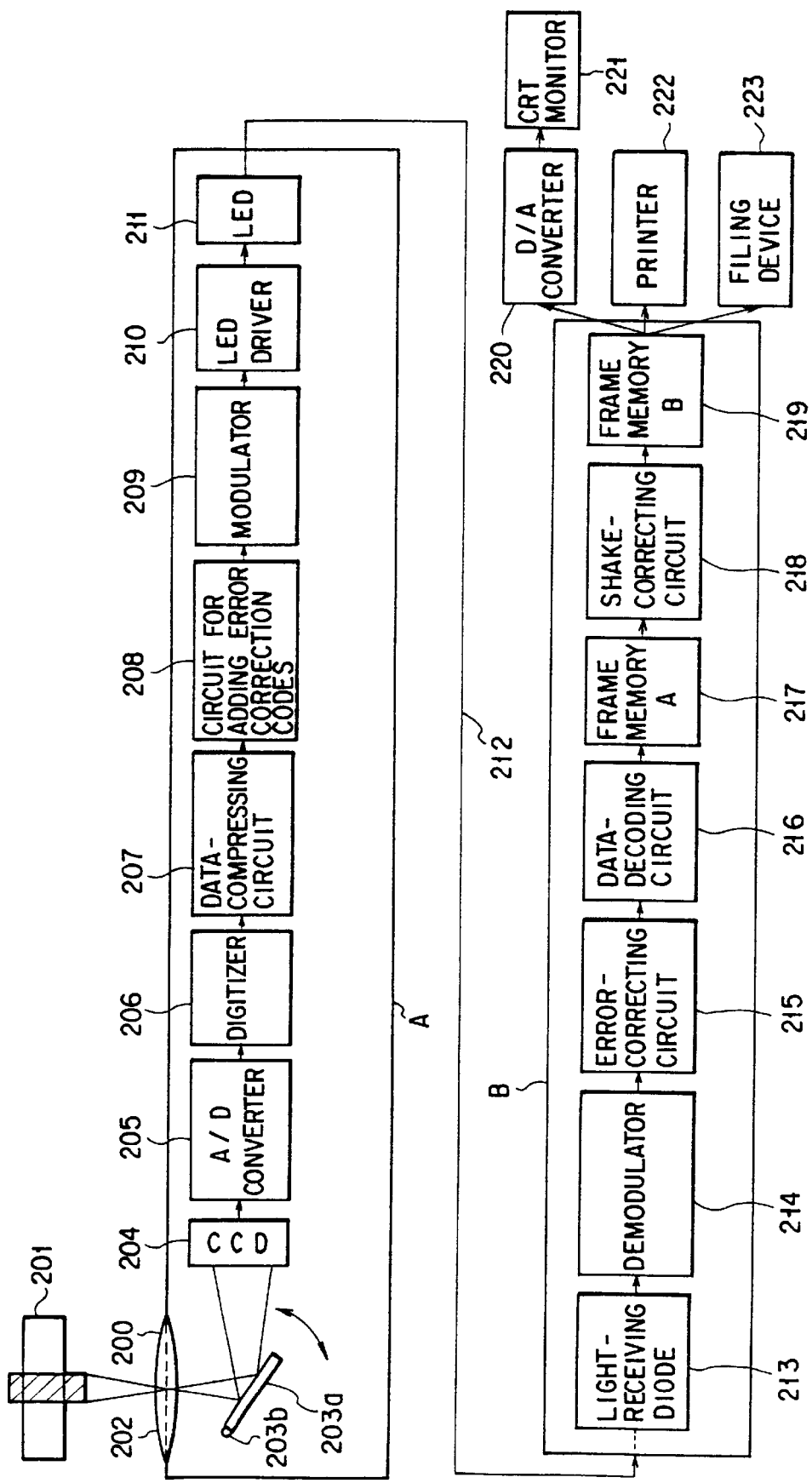
F I G. 67

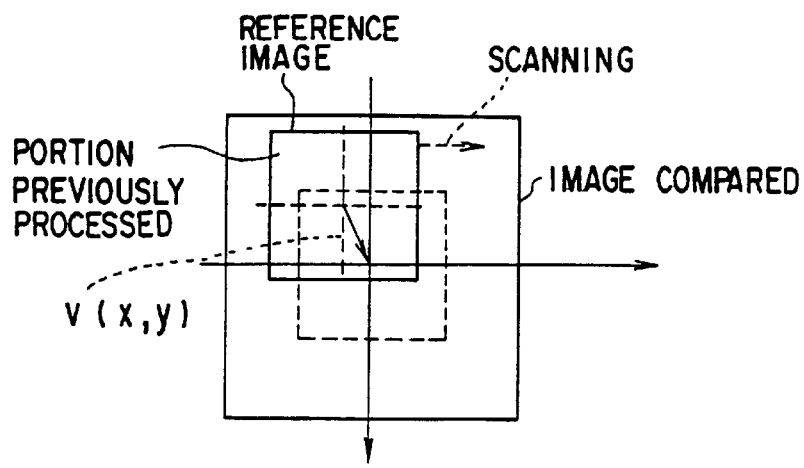
F I G. 71
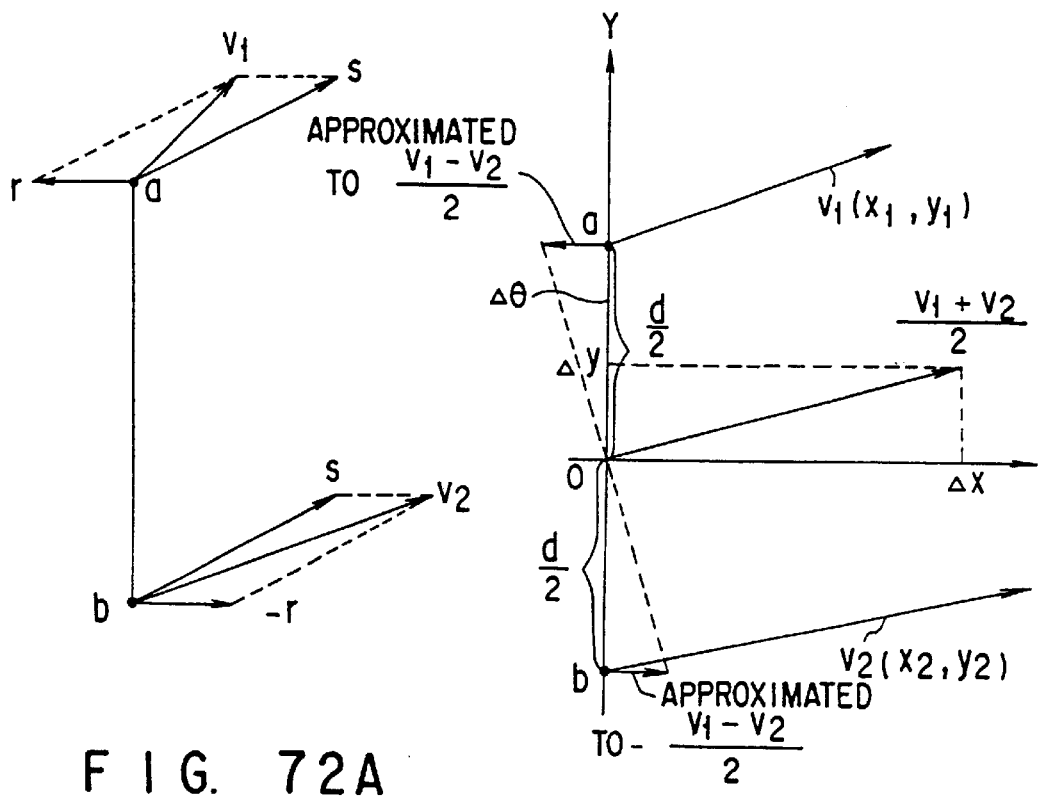
F I G. 72A
F I G. 72B

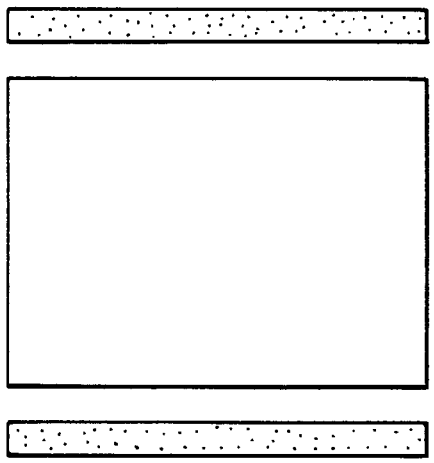
F I G. 76A
F I G. 76B
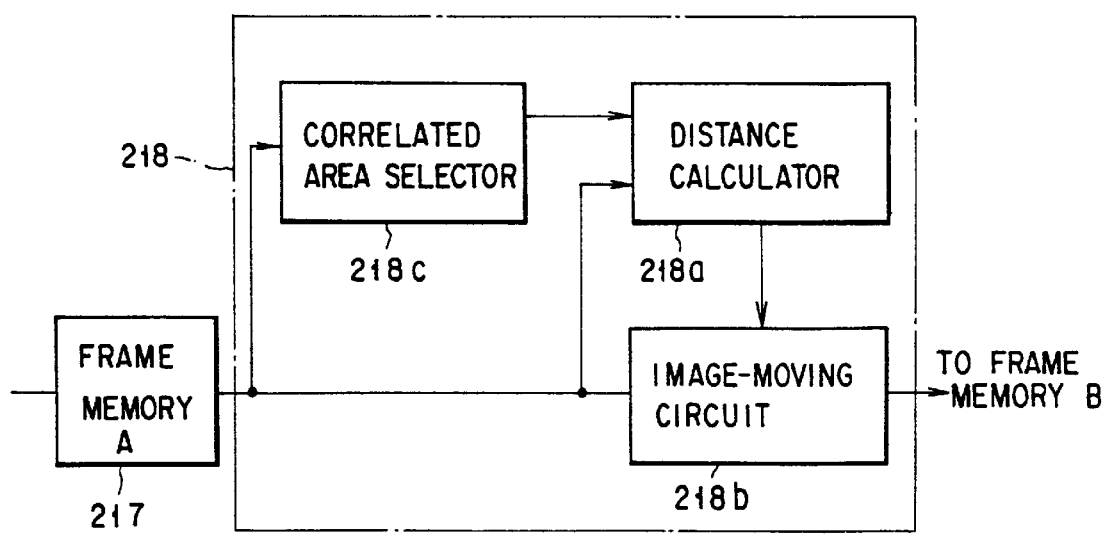
F I G. 77

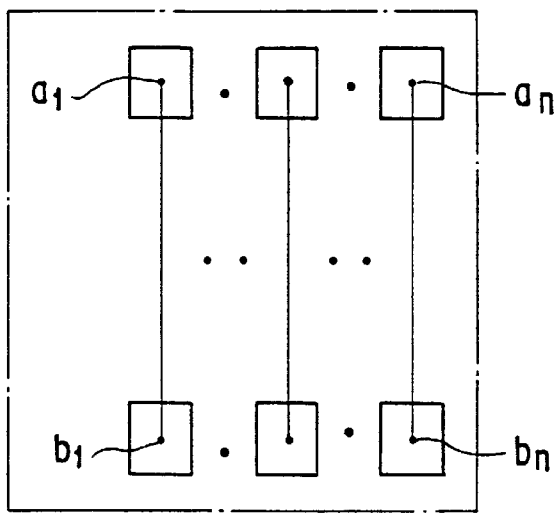
FIG. 79
| 0 | −1 | 0 |
|---|---|---|
| −1 | 5 | −1 |
| 0 | −1 | 0 |
FIG. 80A
| −1 | −1 | −1 |
|---|---|---|
| −1 | 9 | −1 |
| −1 | −1 | −1 |
FIG. 80B
| 1 | −2 | 1 |
|---|---|---|
| −2 | 5 | −2 |
| 1 | −2 | 1 |
FIG. 80C
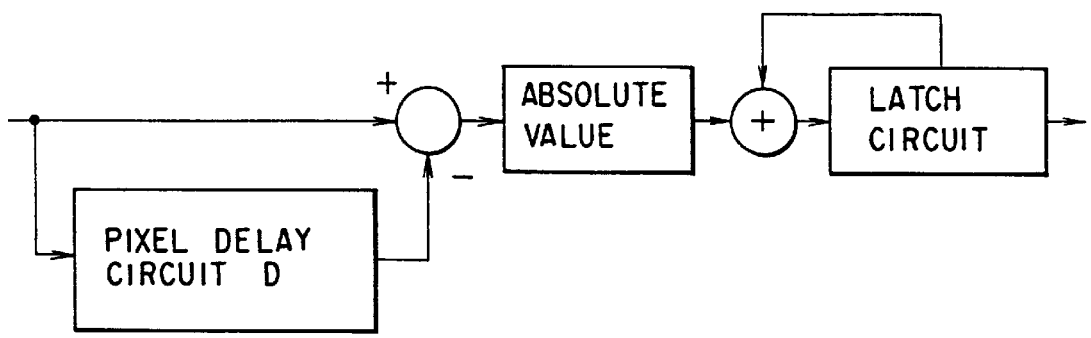
FIG. 81

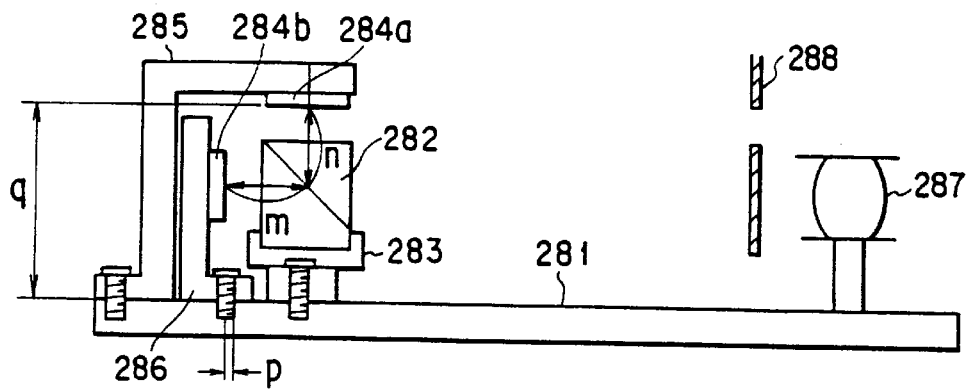
F I G. 82
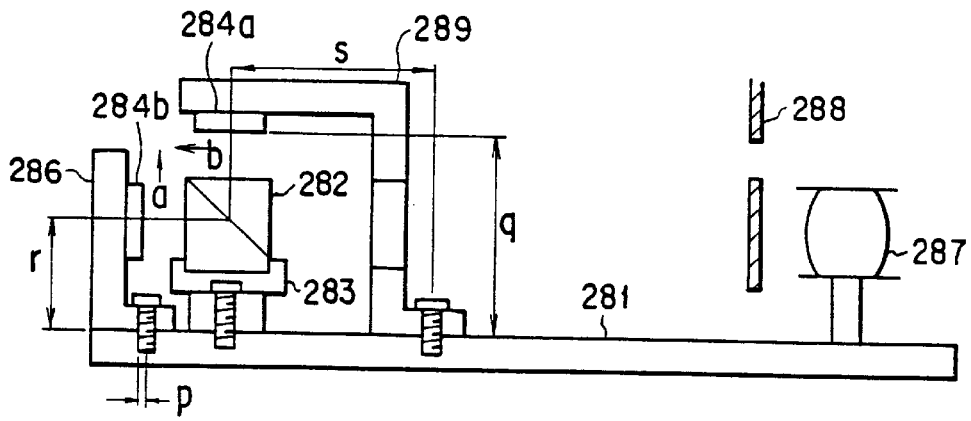
F I G. 83
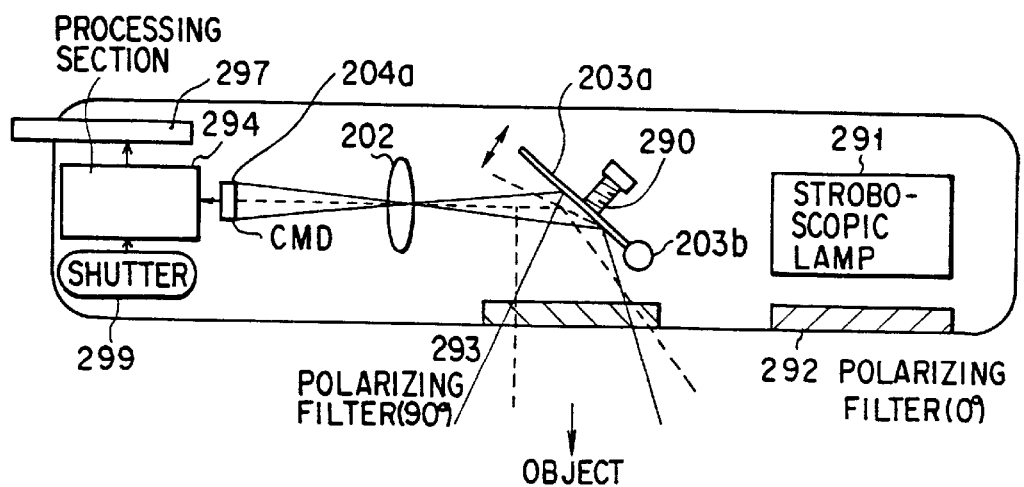
F I G. 84

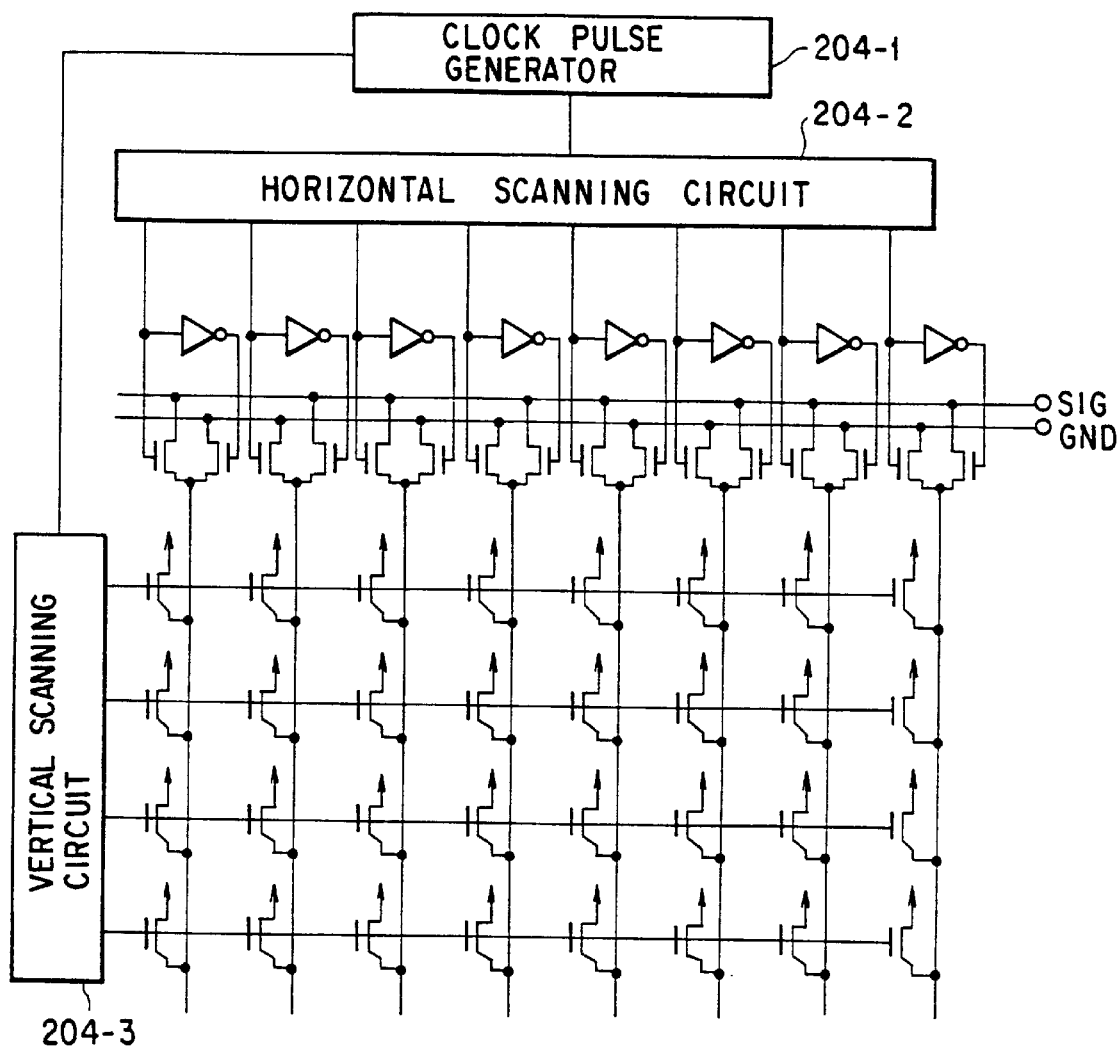
F I G. 85

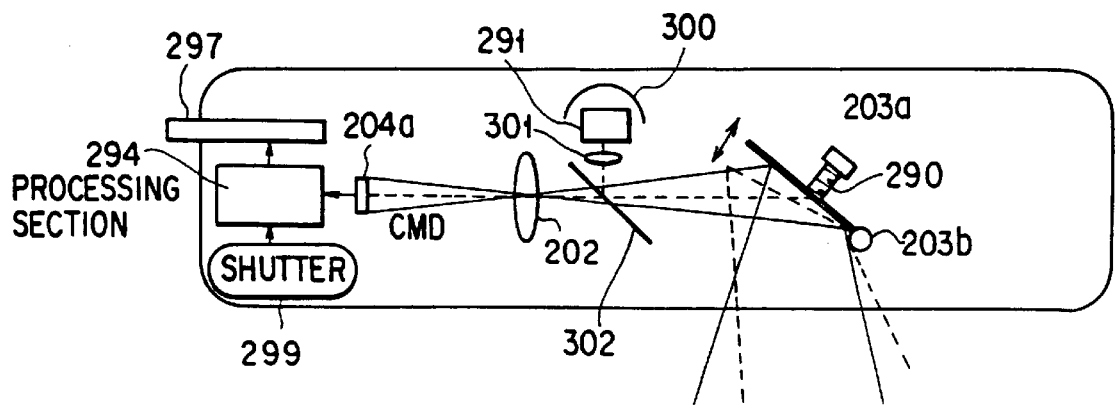
F I G. 88
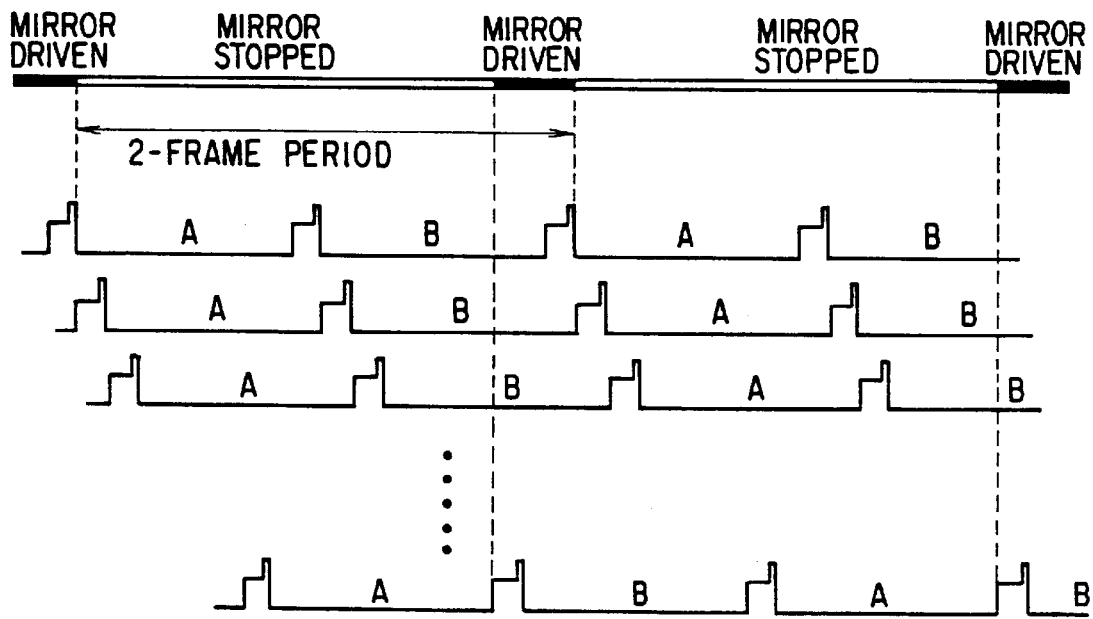
F I G. 89

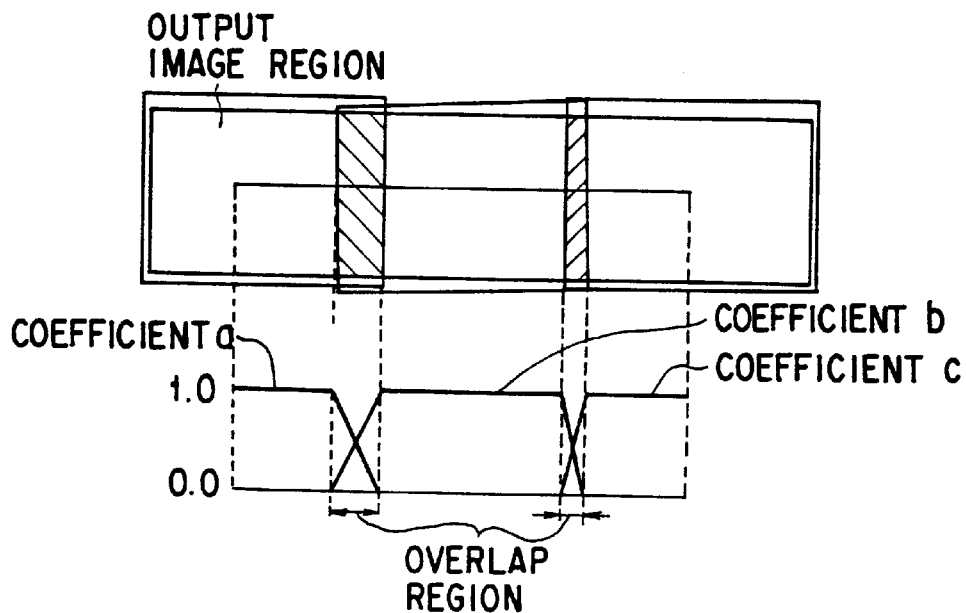
F I G. 100
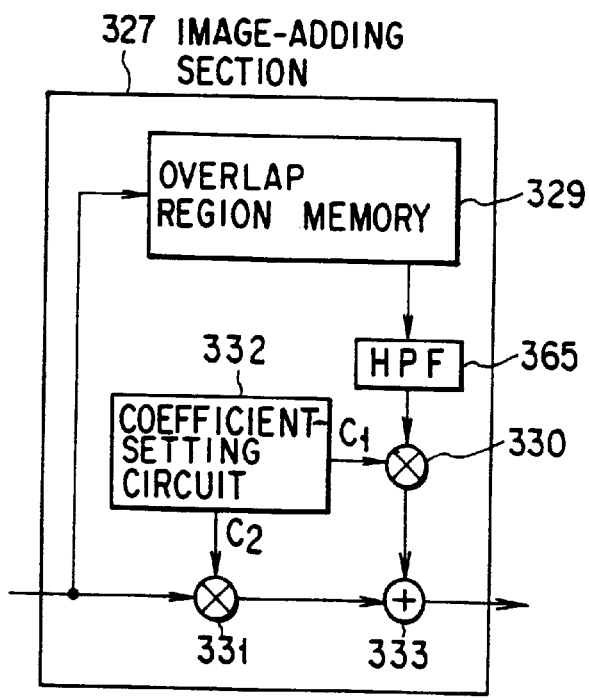
F I G. 101

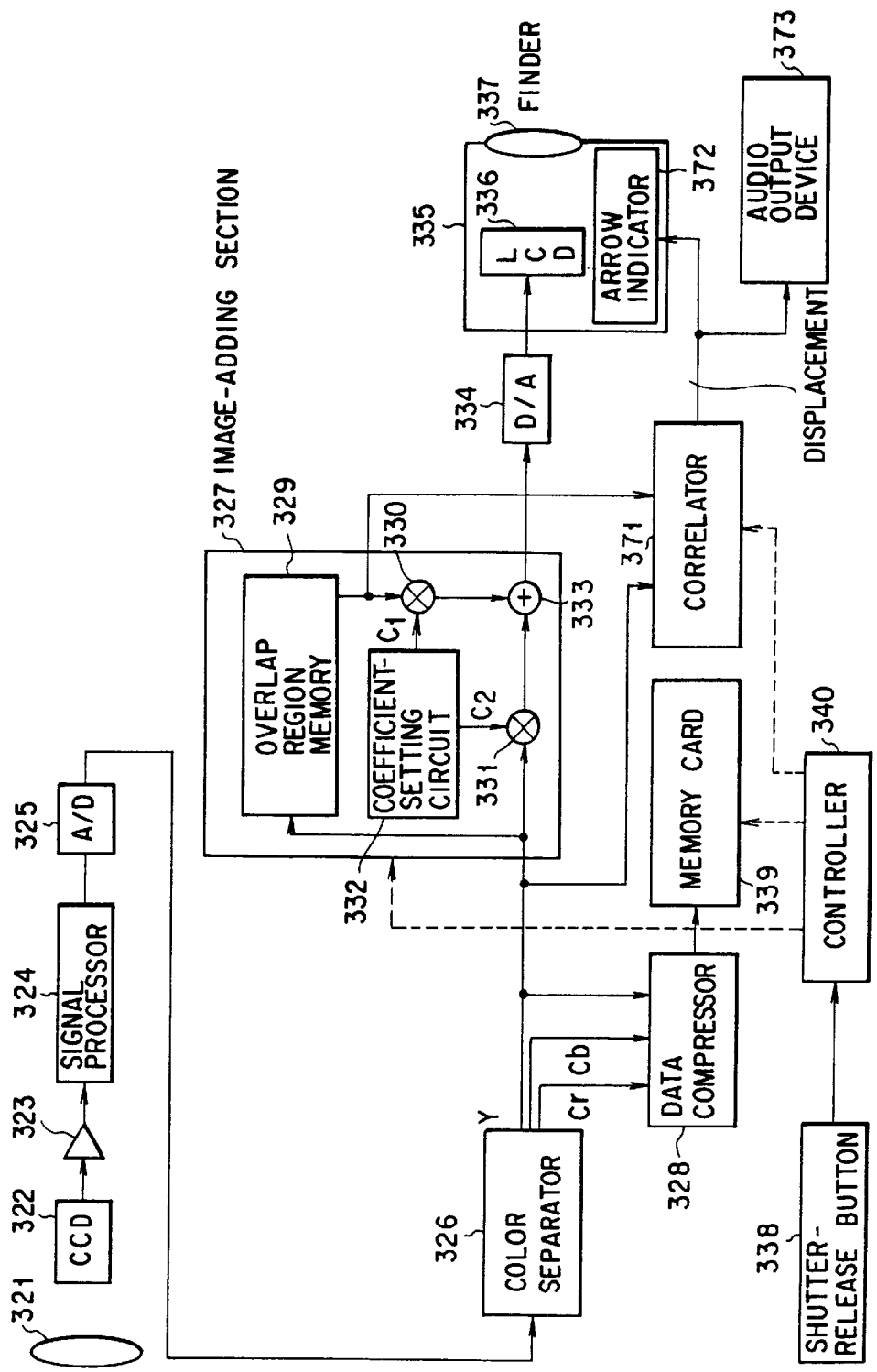
F I G. 102

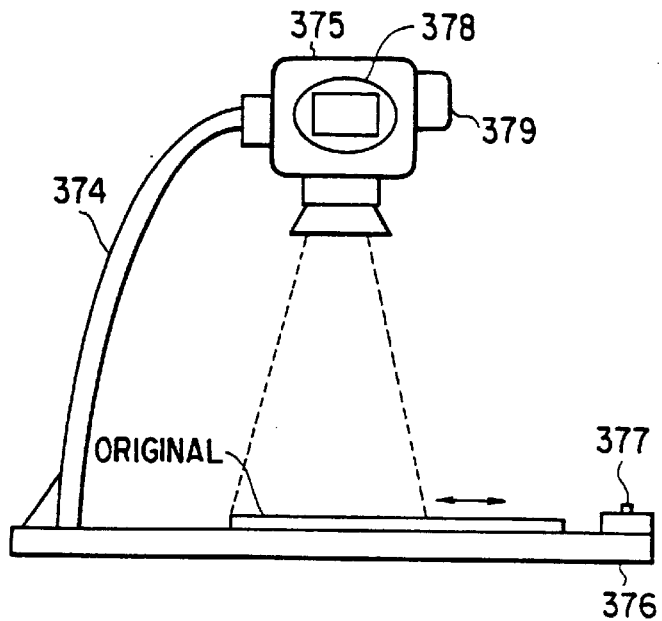
F I G. 105A
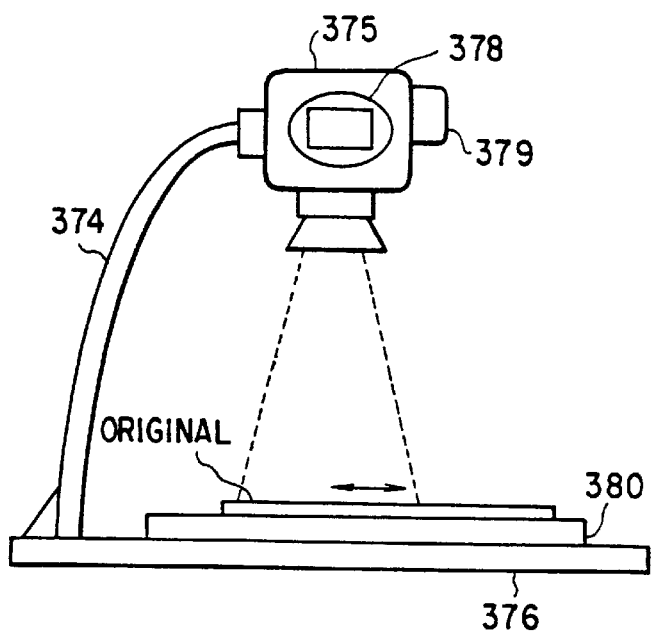
F I G. 105B

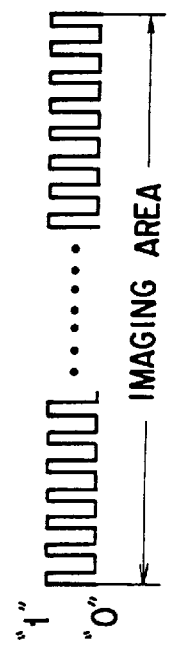
F I G. 108
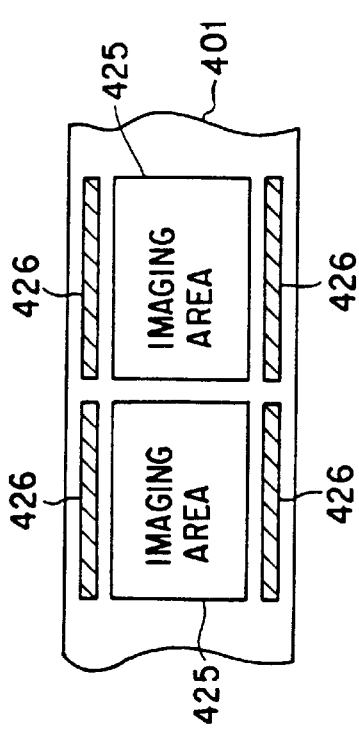
F I G. 107
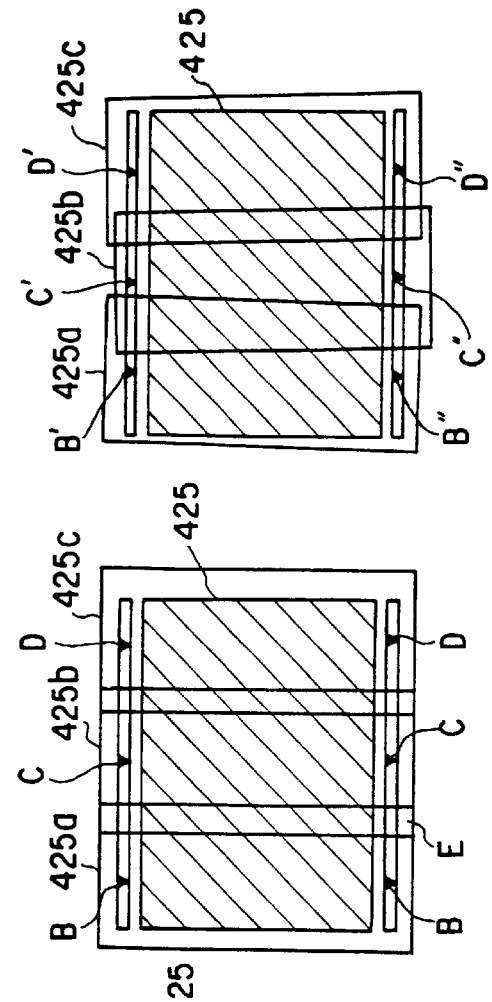
F I G. 109C
F I G. 109B
F I G. 109A

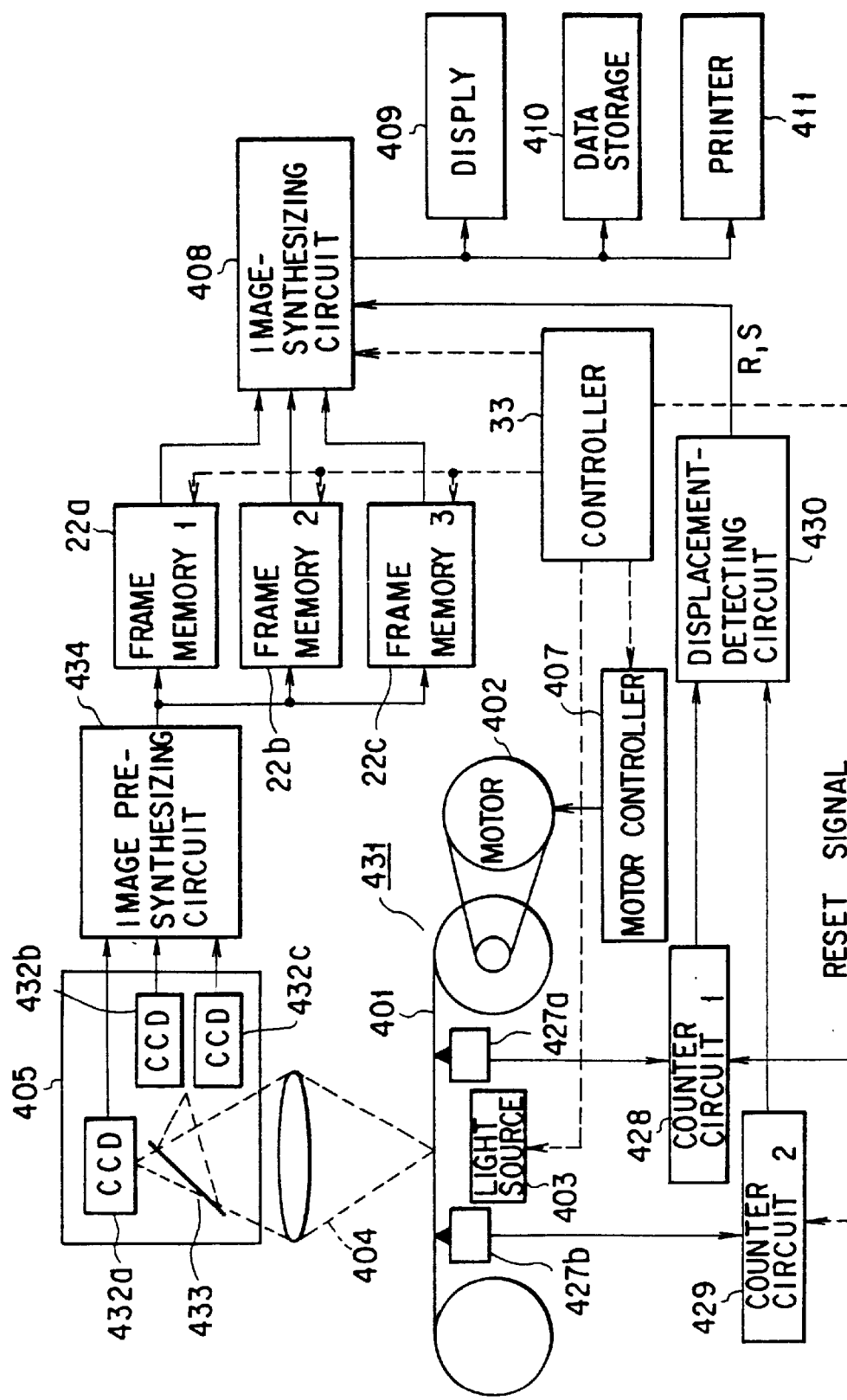
F I G. 110

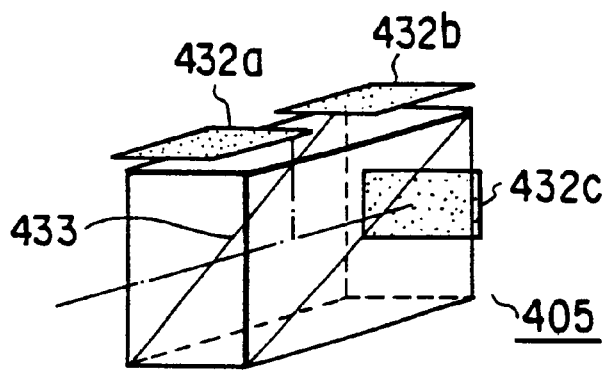
F I G. 111
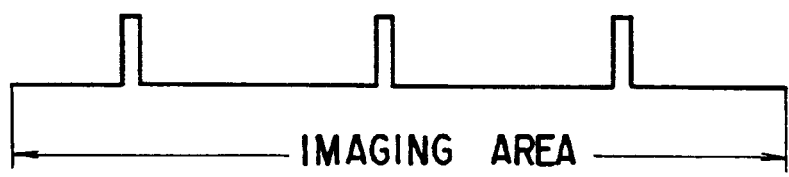
F I G. 113

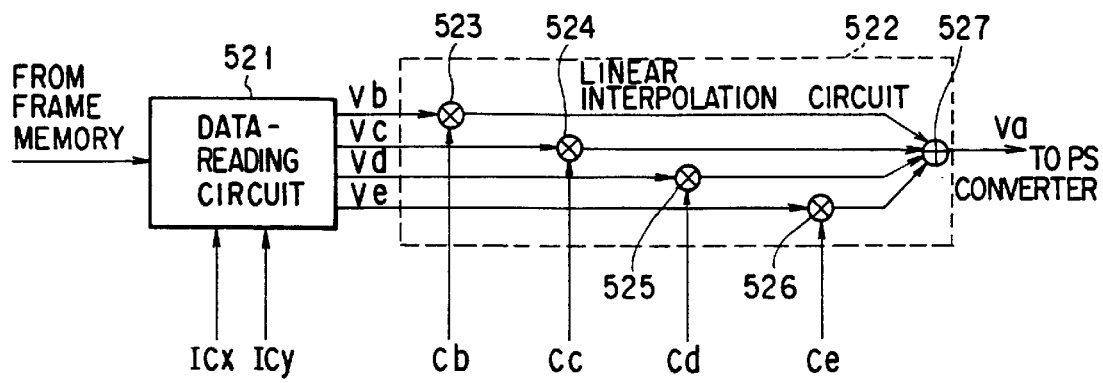
F I G. 115
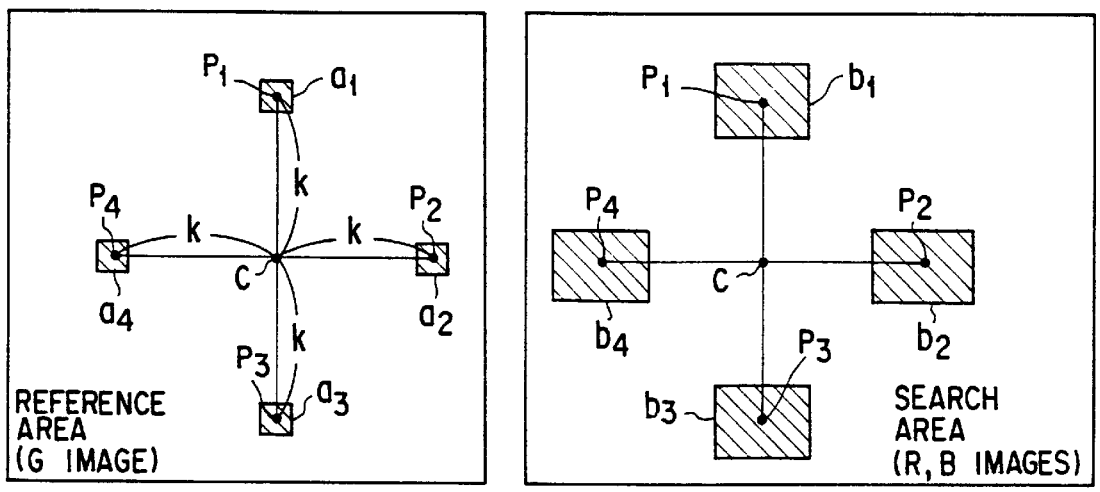
F I G. 116A   F I G. 116B

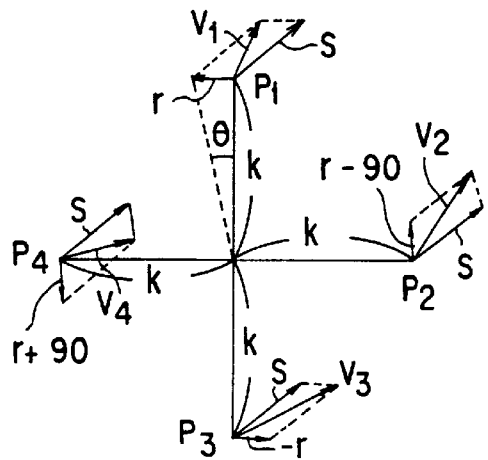
F I G. 117
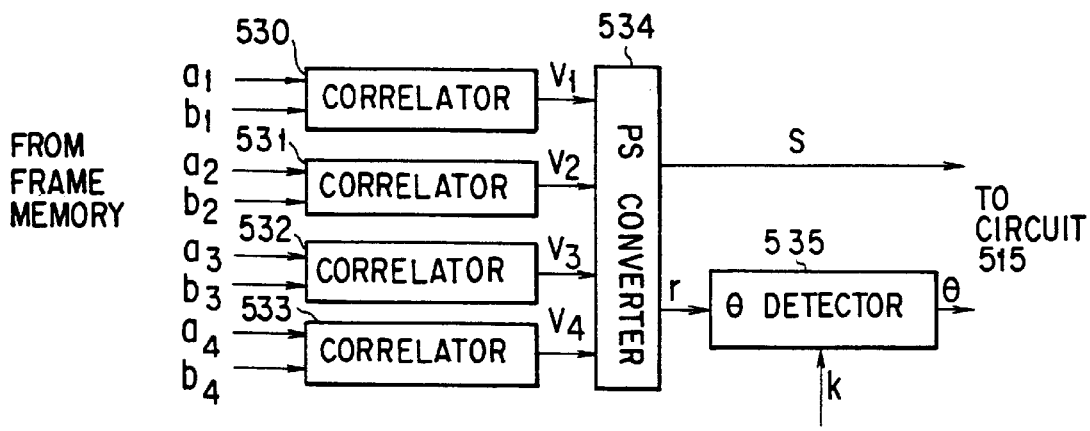
F I G. 118
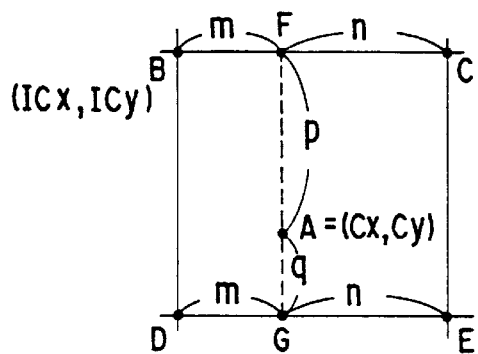
F I G. 119

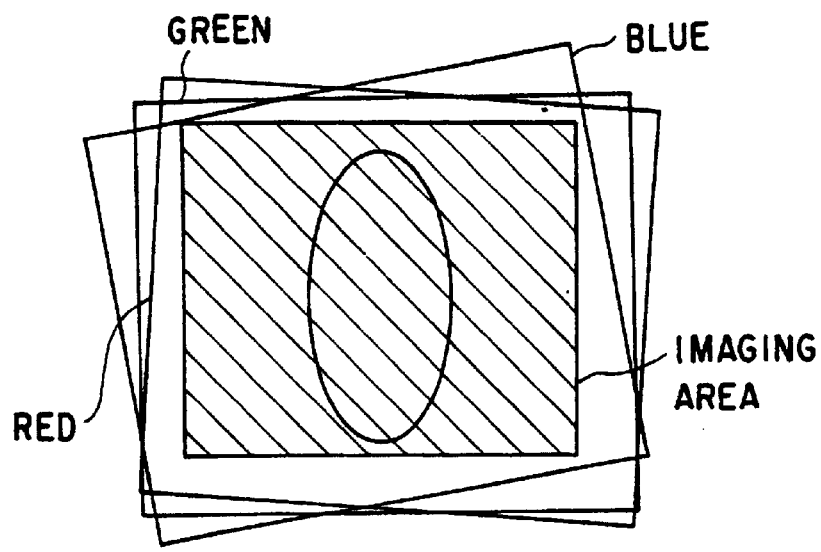
F I G. 122
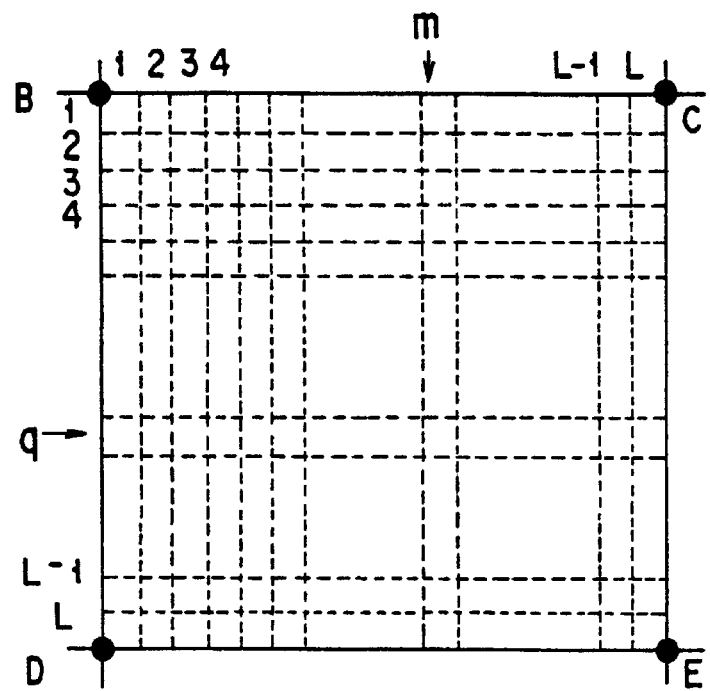
F I G. 126

IMAGE PROCESSING APPARATUS

This is a division of application Ser. No. 08/969,937 filed Nov. 28, 1997, now U.S. Pat. No. 6,205,259, which is a Continuation of application Ser. No. 08/045,038 filed Apr. 8, 1993, now abandoned.

BACKGROUND OF THE INVENTION

1. Field of the Invention

The present invention relates to an image processing apparatus for forming either images of the parts of an object or images of an object which are identical but different in color, and for combining the images into a wide high-resolution image of the object.

2. Description of the Related Art

Image processing apparatuses using a solid-state imaging device such as a CCD are generally used in electronic still cameras, video cameras, and the like. It is demanded that an image processing apparatus have a higher resolution, particularly so high a resolution that the apparatus may provide a wide image of an object. Also it is desired that the image processing apparatus have so high a resolution that it can form an image as wide as a panoramic image.

Two techniques are available for increasing the resolution of the image processing apparatus. The first technique is to use a solid-state imaging device with a sufficiently high resolution. The second technique is to use a plurality of solid-state imaging devices for obtaining images of parts of an object, respectively, and to combine the images into a single high-resolution image of the entire object.

More precisely, the first resolution-increasing technique is to use more pixels per unit area of the device chip. In other words, smaller pixels are arranged in a greater number in the unit area, thus increasing the pixel density of the imaging device.

The second resolution-increasing technique is classified into two types. The first-type technique comprises the first step of controlling the optical system incorporated in an image processing apparatus, thereby switching the view field of the apparatus from one part of an object to another part and thus enabling the imaging devices to produce images of parts of an object, and the second step of combining the images, thus produced, into a high-resolution image of the entire object. The second-type technique comprises the first step of dividing an optical image 600 of an object into, for example, four parts by means of prisms as shown in FIG. 1, the second step of applying the parts of the optical image to four imaging devices 611, 621, 631, and 641, respectively, and the third step of combining the image data items output by the devices, thereby forming a single image of the object. In the second-type technique, the imaging devices 611 to 641 are so positioned as to cover the predetermined parts of the object as illustrated in FIG. 2.

There is known another resolution-increasing technique similar to the second-type technique described in the preceding paragraph. This technique uses a detector 611 having four imaging devices 612 which are arranged in the same plane in a 2×2 matrix, spaced apart from one another for a predetermined distance as is shown in FIGS. 3A to 3C. The view-field image 613 of an object (i.e., a broken-line square) is intermittently moved with respect to the imaging-device matrix by driving an optical system, in the sequence indicated by FIGS. 3A, 3B, 3C, and 3D. The optical image of an object need not be divided by prisms or similar means, unlike in the second-type technique.

The conventional resolution-increasing techniques, described above, are disadvantageous in the following respects.

The first technique can increase the resolution but to a limited degree, for two reasons. First, the number of pixels the existing manufacturing technology can form in the unit area of the device chip is limited. Second, the smaller a pixel, the less sensitive it is. A larger device chip may indeed be used to form more pixels on the chip. With the conventional manufacturing method, however, the ratio of defective pixels to good ones will increase if many pixels are formed on a large chip. Consequently, solid-state imaging devices having a large image-receiving surface can hardly be manufactured with a sufficiently high yield.

In the second resolution-increasing technique, the image data items output from the imaging devices (e.g., four devices) are combined to produce a single image. To render the reproduced image substantially identical to the original image of the object, the images of the object parts should neither be spaced apart nor overlap one another. The images will be spaced apart or overlap unless the pixels arranged along that edge of one device which abut on the edge of the next device are spaced by exactly the one-pixel distance from the pixels arranged along that edge of the next device. The imaging devices therefore need to be positioned with very high precision during the manufacture of the image processing apparatus. It takes much time to position the devices so precisely, inevitably reducing the manufacture efficiency and, ultimately, raising the cost of the image processing apparatus.

Also in the resolution-increasing technique similar to the second-type technique, the imaging devices must be positioned with high precision. In addition, the optical system must be driven with high precision in order to intermittently move the view-field image of an object (i.e., a broken-line square) with respect to the imaging-device matrix. A high-precision drive is indispensable to the image processing apparatus. The use of the drive not only makes it difficult to miniaturize or lighten the apparatus, but also raises the manufacturing cost of the apparatus.

A color image processing apparatus is known, a typical example of which is a so-called "three-section color camera." This color camera comprises a color-component generating system and three imaging devices. The color-component generating system decomposes an input optical image of an object into a red image, a green image, and a blue image. The three imaging devices convert the red image, the green image, and the blue image into red signals, green signals, and blue signals—all being television signals of NTSC system or the like. The signals output from the three imaging devices are combined, whereby the red, green and blue images are combined, forming a single color image of the object. A color image with no color distortion cannot be formed unless the imaging devices are positioned or registered with high precision.

Images of parts of an object are combined, also in an image processing apparatus which has a plurality of optical imaging devices for photographing the parts of the object on photographic film, thereby forming a panoramic image of the object. To form a high-quality panoramic image, the images of the object parts should neither be spaced apart nor overlapping one another. Hence, the optical system incorporated in this image processing apparatus must be controlled with high precision. Consequently, the apparatus requires a complex device for controlling the optical system, and cannot be manufactured at low cost.

SUMMARY OF THE INVENTION

Accordingly it is the object of this invention is to provide an image processing apparatus in which either images of the parts of an object or images of an object which are identical but different in color, and for combining the images into a wide high-resolution image of the object.

In a first aspect of the invention, there is provided an image processing apparatus for combining a plurality of images into a single large image such that the images have overlap regions, comprising: image storing means for storing image data items representing the images; interpolation means for detecting a positional relation between a reference pixel and a given pixel in the overlap area of each image from image data read from the image storing means and representing the overlap area, and for interpolating the image data item read from the image storing means and representing the image, in accordance with a displacement coefficient indicating the positional relation, thereby to generate interpolated image data; and image-synthesizing means for combining the interpolated image data items generated by the interpolation means, thereby to form a single large image.

In a second aspect of the invention, there is provided an image processing apparatus for combining a plurality of images into a single large image such that the images have overlap regions, comprising: light splitting means for splitting an object image; a plurality of imaging devices arranged such that an imaging area of each overlaps that of another; image storing means for storing image data items generated by the imaging devices and representing images overlapping one another and overlap regions of the images; displacement detecting means for detecting displacement (i.e., a displacement coefficient consisting of a rotation angle R and a parallel displacement S) representing a relation between a reference pixel and a given pixel in the overlap area of each image from the image data item read from the image storing means and representing the overlap area; interpolation means for interpolating the image data items read from the image storing means, in accordance with the rotation angle R and the parallel displacement S detected by the displacement detecting means, thereby to generate interpolated image data items; and image-synthesizing means for combining the interpolated image data items generated by the interpolation means, thereby to form a single large image.

In a third aspect of the invention, there is provided an image processing apparatus for combining a plurality of images into a single large image such that the images have overlap regions, comprising: imaging means for intermittently scanning parts of an object image, thereby generating a plurality of image data items; image storing means for sequentially storing the image data items generated by the imaging means; reference image storing means storing an image data item representing a reference image; motion vector detecting means for comparing each image data item read from the image storing means with the image data item read from the reference image storing means, thereby detecting correlation between the reference image and the image represented by the image data item read from the image storing means and detecting a motion vector; and image-synthesizing means for processing the image data items stored in the image storing means, in accordance with the motion vectors detected by the motion vector detecting means, thereby combining the image data items.

In a fourth aspect of this invention, there is provided an image processing apparatus for combining a plurality of images into a single large image such that the images have overlap regions, comprising: image storing means for storing image data items; a plurality of display means for displaying images represented by the image data items read from the image storing means; interpolation means for interpolating the image data items in accordance with displacement coefficients for the display means, thereby generating interpolated image data items representing images which are to be displayed by the display means, adjoining one another without displacement; and image-synthesizing and displaying means for combining the image data items stored in the image storing means and for displaying the images represented by the image data items and adjoining one another without displacement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing the positional relation of the optical system and the imaging devices—all incorporated in a conventional image processing apparatus;

FIG. 2 is a diagram showing the specific positions the imaging devices assume in a conventional image processing apparatus, in order to cover the predetermined parts of the object;

FIGS. 3A to 3D are diagrams explaining how a view-field image of an object is intermittently moved with respect to four imaging devices in a conventional image processing apparatus;

FIGS. 4A and 4B are a block diagram and a diagram, respectively, showing the basic structure and operation of an image processing apparatus according to the invention;

FIG. 5A is a diagram showing the imaging areas of the two CMDs incorporated in the apparatus shown in FIG. 4A, and FIG. 5B is a diagram showing the positional relation which each screen pixel has with the nearest four CMD pixels;

FIG. 6 is a block diagram showing an image processing apparatus according to a first embodiment of the present invention;

FIGS. 14A and 14B are diagrams showing the light-splitting section of an image processing apparatus according to a third embodiment of this invention;

FIG. 15 is a diagram representing the light distributions in the imaging areas of the CMDs 8 and 9 used in the third embodiment;

FIG. 16 is a diagram illustrating the light distributions which have been obtained by applying an inverse function to different light distributions;

FIG. 20 is a block diagram showing an image processing apparatus according to a fifth embodiment of the present invention;

FIG. 22A is a block diagram showing an image processing apparatus according to a sixth embodiment of this invention;

FIG. 22B is a diagram explaining how the CMDs are arranged in the apparatus of FIG. 22A;

FIGS. 24A and 24B are a side view and a top view, respectively, of the light-splitting section shown in FIG. 23A;

FIGS. 25A and 25B are a side view and a top view, respectively, of the light-splitting section shown in FIG. 23B;

FIG. 27 is a perspective view showing an image processing apparatus according to an eighth embodiment of the present invention;

FIGS. 28 and 29 are a plan view and a sectional view, respectively, explaining the first method of positioning CMDs;

FIG. 30 is a side view of a CMD ceramic package having protruding metal terminals;

FIG. 35A is a block diagram showing an image processing apparatus according to a ninth embodiment of the present invention;

FIG. 41 is a block diagram showing a modification of the apparatus shown in FIG. 40;

FIGS. 50A and 50B are diagrams explaining how to eliminate an undesirable portion from the adjoining area of a synthesized image, in the process of combining three or more images into a single image;

FIG. 51 is a block diagram illustrating an image processing apparatus according to a fourteenth embodiment of the invention, in which an undesirable portion is eliminated from the adjoining area of a synthesized image as is shown in FIGS. 50A and 50B;

FIG. 52 is a block diagram showing a first-type synthesis section incorporated in an image processing apparatus according to a fifteenth embodiment of the invention;

FIG. 53 is a diagram showing the apparatus which is the fifteenth embodiment of the present invention;

FIG. 60 is a block diagram showing the system incorporated in the projector, for detecting the displacements of the LCDs used in the projector;

FIG. 61 is a block diagram showing another system which may be used in the projector, to detect the displacement of the LCDs;

FIGS. 64A to 64E are diagrams various positions the line sensors may assume in the apparatus shown in FIG. 63, and showing the condition of an image formed;

FIG. 66 is a block diagram illustrating an image processing apparatus which is a twentieth embodiment of the present invention;

FIG. 67 is a block diagram showing an electronic camera which is a twenty-first embodiment of this invention;

FIG. 71 is a diagram explaining the method of finding the correlation between a reference image and an object image by moving the object image with respect to the reference image;

FIGS. 72A and 72B are diagrams explaining how to determine the distance and angle by which an image has moved and rotated;

FIGS. 76A and 76B are diagrams explaining the technique which is employed in a twenty-third embodiment of the invention in order to calculate the correlation between images with high accuracy;

FIG. 77 is a block diagram showing a shake-correcting circuit for use in a twenty-fourth embodiment of the invention;

FIG. 79 is a diagram showing images one of which may be selected by the image-selecting circuit incorporated in the correlated area selector shown in FIG. 78;

FIGS. 80A, 80B, and 80C show three sets of coefficients for a convolution filter;

FIG. 81 is a circuit for obtaining the absolute sum of the value differences among adjacent pixels;

FIG. 82 is a side view showing the imaging section of an electronic camera;

FIG. 83 is a side view illustrating another type of an imaging section for use in the electronic camera;

FIG. 84 is a cross-sectional side view of the imaging section of an electronic camera which is a twenty-fifth embodiment of the invention;

FIG. 85 is a circuit diagram showing the CMD incorporated in the imaging section of FIG. 84;

FIG. 88 is a cross-sectional side view of the imaging section of an electronic camera which is a twenty-sixth embodiment of the invention;

FIG. 89 is a timing chart explaining how the mirror is intermittently driven in the imaging section shown in FIG. 88;

FIG. 100 is a diagram explaining how three images overlap and how the coefficients for the overlap regions change;

FIG. 101 is a block diagram illustrating the image-adding section incorporated in the imaging section of FIG. 97C;

FIG. 102 is a block diagram showing an electronic camera which is a thirty-first embodiment of the invention;

FIGS. 105A and 105B are side views showing an electronic camera which is a thirty-third embodiment of the invention and which is used to read data from a flat original;

FIG. 107 is a plan view showing the photosensitive film used in the apparatus of FIG. 106;

FIG. 108 is a diagram illustrating an address signal recorded on the magnetic tracks of the film shown in FIG. 107;

FIGS. 109A, 109B, and 109C are diagrams showing the positions which recorded images assume on the imaging area of the film;

FIG. 110 is a block diagram showing an image processing apparatus according to a thirty-fifth embodiment of the present invention;

FIG. 111 is a perspective view showing the imaging section of the apparatus shown in FIG. 110;

FIG. 113 is a diagram illustrating an address signal recorded on the magnetic tracks of the film used in the apparatus of FIG. 112;

FIG. 115 is a diagram showing the interpolation circuit incorporated in the apparatus of FIG. 114;

FIG. 116A is a diagram showing the reference areas used for detecting the displacement of a G image;

FIG. 116B is a diagram showing areas which are searched for that part of a R or B image which corresponds to a predetermined part of the G image;

FIG. 117 is a diagram illustrating displacement vectors detected and processed in the thirty-seventh embodiment;

FIG. 118 is a diagram showing, in detail, one of the identical correlation circuits used in the apparatus of FIG. 114;

FIG. 119 is a diagram explaining how a pixel value is interpolated in the apparatus of FIG. 114;

FIG. 120 is a diagram showing, in detail, one of the identical coefficient calculators incorporated in the apparatus of FIG. 114;

FIG. 121 is a diagram showing, in detail, one of the identical coefficient memories of the apparatus shown in FIG. 114;

FIG. 122 is a diagram showing an imaging area in which a R image, a G image, and a B image overlap one another;

FIGS. 123A and 123B is a block diagram illustrating an image processing apparatus according to a thirty-eighth embodiment of the invention;

FIG. 124 is a diagram showing a coefficient calculator incorporated in an image processing apparatus according to a thirty-ninth embodiment of the present invention;

FIG. 125 is a diagram showing a coefficient memory used in the thirty-ninth embodiment; and FIG. 126 is a diagram illustrating one of L×L blocks of an image.

DETAILED DESCRIPTION OF THE PREFERRED EMBODIMENTS

Figure 7:
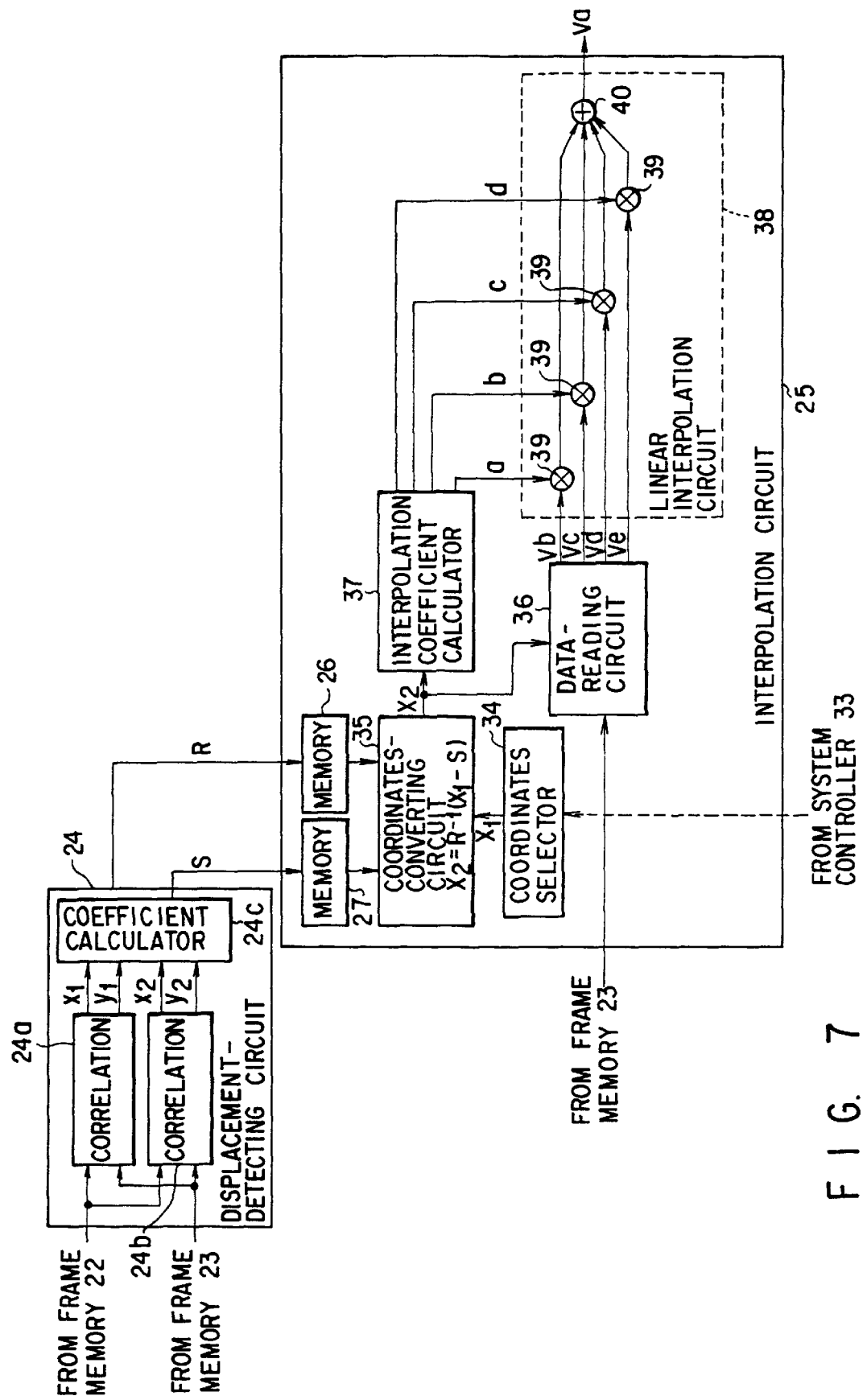
FIG. 7 is also a block diagram showing the displacement-detecting circuit and the interpolation circuit, both incorporated in the apparatus shown in FIG. 6.

The basic structure and operation of an image processing apparatus according to the present invention will be described, with reference to FIGS. 4A and 4B and FIGS. 5A and 5B.

As FIG. 4A shows, the apparatus comprises a light-splitting section 1, an imaging section 2, an image-storing section 3, a displacement-detecting section 4, an interpolation section 5, an objective lens 6, a image-synthesizing section 7, and a display section 31. The imaging section 2 has two CMDs 8 and 9 (i.e., solid-state imaging devices). As shown in FIG. 4B, the CMDs 8 and 9 are positioned with such precision that they receive two parts of the optical image which over; lap in part.

In operation, the objective lens 6 applies an optical image of an object (not shown) to the light-splitting section 1. The section 1 splits the input light into two parts representing two parts of the image which overlap in part. The parts of the image are applied to the CMDs 8 and 9 of the imaging section 2. The CMDs 8 and 9 convert the image parts into image signals, which are supplied to the image-storing section 3. The section 3, e.g., a frame memory, temporarily stores the image signals.

Then, the displacement-detecting section 4 detects the positional relation between one of the pixels of either CMD (Charge Modulation Devices) and the corresponding pixel of the screen of the display section 31, from the image signal read from the image-storing section 3 and representing the overlap regions d of the two image parts shown in FIG. 5A, wherein the black dots indicate the pixels of the CMDs and the white dots indicate the pixels of the display screen. More specifically, the section 4 performs correlation on the value of each CMD pixel, thereby calculating two conversion factors, i.e., rotation angle R and displacement S.

In accordance with the conversion factors, the interpolation section 5 interpolates the value of each screen pixel from the values of the CMD pixels located near the screen pixel, thereby producing an interpolated pixel signal representing the screen pixel. Thus, the interpolation section 5 outputs the interpolated pixel signals representing all pixels of the display section 31, to the image-synthesizing section 7.

The image-synthesizing section 7 combines the image signals produced by the interpolation section 5 with the image signals read from the image-storing section 3, thereby generating image signals which represent a single continuous image of the object. These image signals are supplied to the display section 31. The section 31 displays a high-resolution image of the object.

Schematically shown in FIG. 5A are the imaging area a (i.e., an M×N pixel matrix) of the CMD 8, the imaging area b (i.e., an M×N pixel matrix) of the CMD 9, and the display area c of the display section 31. As is evident from FIG. 5A, the display area c is an (u+v)×w pixel matrix and is completely covered with the imaging areas a and b which overlap at regions d. In the instance shown in FIG. 5A, each pixel of the display area c assumes the same position as the corresponding pixel of the imaging area a.

As has been described, the displacement-detecting section 4 detects the positional relation (i.e., rotation angle R and displacement S), between each pixel of the imaging area b and the corresponding pixel of the display area c, from the image signals read from the image-storing section 3 and representing the overlap regions d. To detect the positional relation, the section 4 needs the values of the pixels $d_{11}$, $d_{21}$, ... d (u+v)w of the display area c—all indicated by white dots. For the values of the pixels $d_{ij}$ (i=1 to u, j=1 to w) of the display area c, the values of the pixels of CMD 8 are utilized. The value for each of the remaining pixels A of the display area c, i.e., the pixels $d_{ij}$ (i=u+1 to u+v, j=1 to w), is interpolated from the values of the four pixels B, C, D and E of the imaging area b which surround the pixel $d_{ij}$, as is illustrated in FIG. 5B.

In order to calculate the value for any desired pixel of the display area c, it suffices to position the CMDs 8 and 9 with such precision that their imaging areas a and b completely cover the display area c of the display section 31 and overlap in part appropriately. Even if the pixels of either imaging area are deviated from the corresponding pixels of the display area c for a distance of several pixels, the apparatus can form a high-resolution single image of an object. It is therefore not necessary to position the CMDs 8 and 9 with high precision on the order of a one-pixel distance as in the conventional image processing apparatus. Hence, the image processing apparatus according to the invention can be easily manufactured, and its manufacturing cost can be low.

An image processing apparatus, which is a first embodiment of the invention, will now be described, with reference to FIGS. 6 to 12.

The apparatus has a half prism 1a comprised of two right-angle prisms connected together. Two CMDs 8 and 9 (i.e., two-dimensional solid-state imaging devices) 8 and 9 are mounted on the top and back of the half prism 1a, respectively. The CMDs 8 and 9 are positioned such that their imaging areas overlap in part.

To the half prism 1a, an optical system 6 applies light which represents an image of an object (not shown). The half prism 1a splits the input light into two parts. The parts of the input light are applied to the CMDs 8 and 9. Each of the CMDs 8 and 9 converts the input light into an image signal, under the control of a CMD driver 32.

The image signals output by the CMDs 8 and 9 are supplied to pre-amplifiers 10 and 11, which amplify the signals. Low-pass filters (LPFs) 12 and 13 remove noise components from the amplified image signals. The signals output by the filters 12 and 13 are input to A/D converters 14 and 15, respectively. The A/D converters 14 and 15 convert the input signals into digital image signals, which are supplied to subtracters 16 and 17.

The FPNs (Fixed Pattern Noises) of the CMDs 8 and 9, stored in FPN memories 18 and 19, are supplied to the subtracters 16 and 17, respectively. The subtracter 16 takes the FPN of the CMD 8 from the image signal output from the A/D converter 14. Similarly, the subtracter 17 takes the FPN of the CMD 9 from the image signal output from the A/D converter 15. The image signals output by the subtracters 16 and 17 are input to signal processors (SPs) 20 and 21, which perform γ correction or outline emphasis on the input image signals.

The image signals processed by the processors 20 and 21 are stored into frame memories 22 and 23, respectively. At a proper time, the image signals are read from the frame memories 22 and 23 and supplied to a displacement-detecting circuit 24. The circuit 24 detects the displacement of the overlap regions of the imaging areas of the CMDs 8 and 9. The displacement is defined by two conversion factors R and S. The factor R represents the rotation matrix R which one CMD imaging area has with respect to the other CMD imaging area. The factor S represents the displacement vector which results from a parallel movement of one CMD imaging area with respect to the other CMD imaging area.

The displacement, or the conversion factors R and S, are supplied from the circuit 24 to an interpolation circuit 25. The circuit 25 interpolates the pixel values read from the frame memory 23 in accordance with the conversion factors R and S. The pixel values, thus interpolated, are input to a parallel-serial (PS) converter 29, along with the signals read from the frame memory 22. The converter 29 converts the pixel values and the signals into serial signals. The serial signals are written into a frame memory 30 and read therefrom to a display section 31. The display section 31 displays a high-resolution single image of the object.

The image processing apparatus has a system controller 33. The controller 33 controls the FPN memories 18 and 19, the frame memories 22 and 23, the interpolation circuit 25, the PS converter 29, and the CMD driver 32.

The displacement-detecting circuit 24 and the interpolation circuit 25 will be described in detail, with reference to FIG. 7.

The displacement-detecting circuit 24 comprises correlators 24a and 24b and a coefficient calculator 24c. The correlators 24a and 24b receive the image signals read from the frame memories 22 and 23, respectively, and perform correlation on the input image signals. The image signals, thus processed, are input to the coefficient calculator 24c. The calculator 24c detects the displacement of the overlap regions of the CMD imaging areas, i.e., the conversion factors R and S.

The conversion factors R and S are stored into the memories 26 and 27 incorporated in the interpolation circuit 25. In the interpolation circuit 25, the factors R and S read from the memories 26 and 27 are input to a coordinates-converting circuit 35.

The coordinates value X1 of the point designated by the system controller 33 is input via a coordinates selector 34 to the coordinates-converting circuit 35. The circuit 35 converts the coordinates value $X_1$ to a coordinate value $X_2$, using the conversion factors R and S, in accordance with a predetermined conversion formula (10) which will be described later. The coordinate value $X_2$ pertains to the imaging area of the CMD 9. The value $X_2$ is supplied from the coordinates-converting circuit 35 to a data-reading circuit 36 and an interpolation coefficient calculator 37.

From the coordinate value $X_2$ the data-reading circuit 36 produces pixel values $v_b$, $v_c$, $v_d$, and $v_e$, which are input to a linear interpolation circuit 38. Meanwhile, the interpolation coefficient calculator 37 calculates interpolation coefficients a, b, c, and d from the coordinate value $X_2$ and inputs these coefficients a, b, c, and d to the linear interpolation circuit 38. In the linear interpolation circuit 38, the pixel values $v_b$, $v_c$, $v_d$, and $v_e$ are supplied to four multipliers 39, respectively, and the interpolation coefficients a, b, c, and d are supplied also to the multipliers 39, respectively. The first multiplier 39 multiples the pixel value $v_b$ by the coefficient a; the second multiplier 39 multiples the pixel value $V_c$ by the coefficient b; the third multiplier 39 multiples the pixel value $v_d$ by the coefficient c; and the fourth multiplier 39 multiples the pixel value $v_e$ by the coefficient d. Further, in the linear interpolation circuit 38, the outputs of the multipliers 39 are input to an adder 40 which adds the outputs of the multipliers 39, generating an interpolation value $v_a$.

Figure 8:
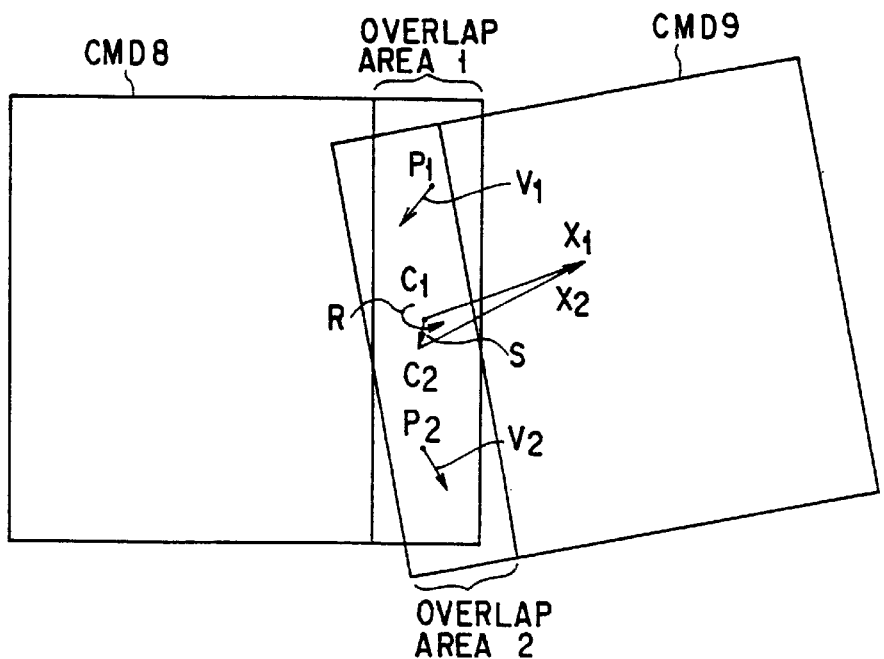
FIG. 8 is a diagram illustrating the imaging areas of the CMDs used in the apparatus of FIG. 6, which overlap each other in part.
Figure 9:
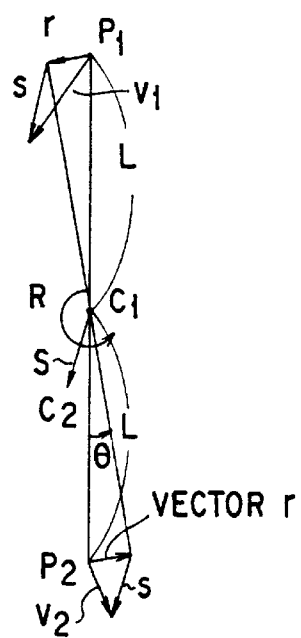
FIG. 9 is a diagram representing two displacement vectors resulting from the rotation and parallel movement of one CMD imaging area with respect to the other CMD imaging area, respectively.

To obtain the conversion factors R and S it is required that a reference point be set for the rotation and parallel movement of one of the CMD imaging areas with respect to the other CMD imaging area. In the first embodiment, as FIG. 8 shows, the reference point is the center $C_1$ of an overlap area 1, i.e., those portions of the imaging areas of the CMDs 8 and 9 which will overlap one another if the CMDs 8 and 9 are positioned precisely. In practice, the CMDs 8 and 9 cannot be positioned precisely, and an overlap area 2, i.e., the mutually overlapping portions of the imaging areas of the CMDs 8 and 9, has a center $C_2$ which is displaced from the center $C_1$ for a distance corresponding to the conversion factor S. As can be understood from FIG. 8, the overlap area 2 is rotated around the center $C_2$ with respect to the overlap area 1 by an angle corresponding to the conversion factor R.

The conversion factors S and R can be obtained from, for example, displacement vectors $v_1$ and $v_2$ in the overlap area 1 which are at positions $P_1$ and $P_2$ which are symmetrical with respect to the center $C_1$. The vectors $v_1$ and $v_2$ are presented by the following equations (1) and (2), respectively, because of the vectors r and s which result from the rotation of the imaging area the CMD 9 with respect to that of the CMD 8:

Vector $v_1$=vector r+vector s

Vector $v_2$=−(vector r)+vector s    (1)

where the vectors s and r are given as:

|Vector r|=L tan θ    (2)

Therefore, the vectors s and r are:

Vector $s=(v_1+v_2)/2$    (3)

Vector $r=(v_1-v_2)/2$    (4)

The rotation matrix of the imaging area of the CMD 9 with respect to that of the CMD 8 is represented by the following equation:

$$R = \begin{pmatrix} \cos\theta & -\sin\theta \\ \sin\theta & -\cos\theta \end{pmatrix} \quad (5)$$

Angle θ is found from the equation (2), as follows:

θ=tan$^{-1}$ (vector r)/L    (6)

In the equation (6), L is a known amount, and vector r is determined by the equation (4). Hence, angle θ can be found, and the rotation matrix R can also be obtained. The rotation matrix R and the displacement vector S (i.e., the vector of the parallel displacement of the imaging area of the CMD 9), thus calculated from the displacement vectors $v_1$ and $v_2$ at positions $P_1$ and $P_2$, are stored as conversion factors R and S in the memories 26 and 27, respectively.

Figure 10:
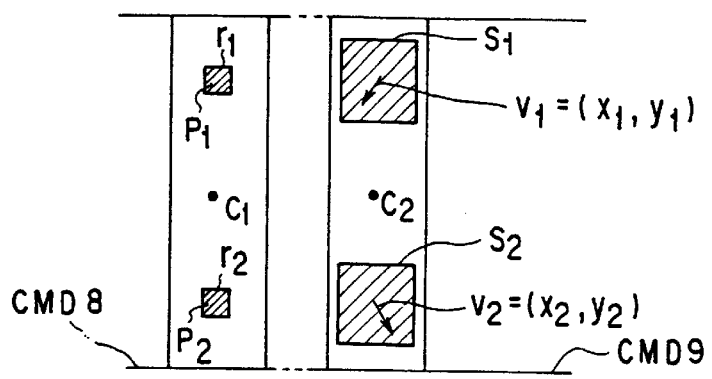
FIG. 10 is a diagram explaining how the displacement-detecting circuit shown in FIG. 7 executes correlation.

The correlation the correlators 24a and 24b execute on the input image signals may be one of the various types hitherto known. In this embodiment, the correlation is effected as is shown in FIG. 10. That is, the correlator 24a detects the position ($x_1$, $y_1$) where the absolute sum of the reference area $r_1$ and $r_2$ of the CMD 8 is minimum in the search area $S_1$ of the CMD 9, and the correlator 24b detects the position ($x_2$, $y_2$) where the absolute sum of the reference area $r_1$ and $r_2$ of the CMD 8 is minimum in the search area $S_2$ of the CMD 9. The coordinates values of these positions, ($x_1$, $y_1$) and ($x_2$, $y_2$), are input to the coefficient calculator 24c. The calculator 24c performs the operations of the equations (3), (4), (6), and (5) sequentially on the coordinates values ($x_1$, $y_1$) and ($x_2$, $y_2$), obtaining the rotation matrix R and the displacement vector S. The displacement vector S=($S_x$, $S_y$).

The operation of the interpolation circuit 25 will be explained, with reference to FIGS. 6 and 7.

The interpolation circuit 25 performs linear interpolation on the four pixel values read from the frame memory 23, thereby finding the value of the pixel at the position designated by the system controller 33, as will be described with reference to FIG. 11. First, the value $v_a$ of the pixel A is obtained from the values $v_b$, $v_c$, $v_d$, and $v_e$ of the four pixels B, C, D, and E which are located around the pixel A. More precisely, the values of $v_f$ and $v_g$ which the pixels located at the intersections F and G of the vertical line passing the pixel A, the line BC connecting the pixels B and C, and the line DE connecting the pixels D and E are:

$v_f=nv_b+mb_c/m+n$    (7-a)

$v_g=nv_d+mv_e/m+n$    (7-b)

where BF=DG=m, and FC=GE=n.

Assuming FA=p and AG=q, then the value va for the pixel A can be given as:

$v_a=qv_f+pv_g/p+q$    (8)

If it is assumed that the inter-pixel distance is "1," then m+n=p+q=1. Hence, from the equations (7-a), (7-b), and (8), the value $v_a$ for the pixel A is calculated as follows:

$v_a=av_b+bv_c+cv_d+dv_e$    (9)

where a=(1−p)(1−m), b=(1−p)m, c=p(1−m), and d=pm. Namely, the pixel value $v_a$ can be obtained directly from m, p, and the values $v_b$, $v_c$, $v_d$, and $v_e$ of the four pixels located around the pixel A.

Figure 12:
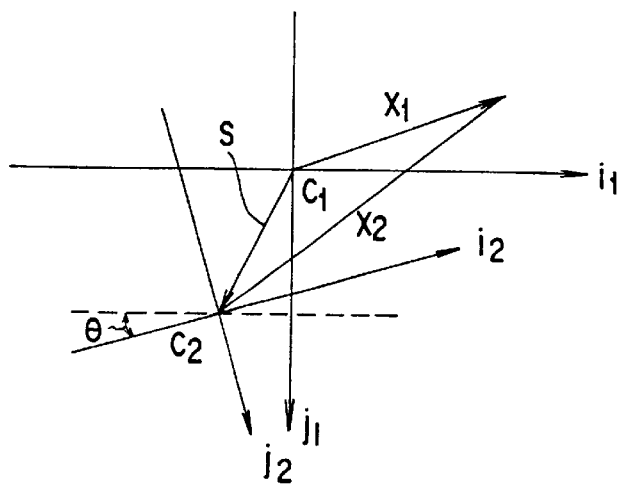
FIG. 12 is a diagram showing the position of each pixel in the CMD 8 and that of the corresponding pixel of the CMD 9, in terms of vectors.

It will now be explained how to find values for m and p, with reference to FIG. 12. In the first embodiment, m and p are of such values that the center $C_1$ of the overlap area 1 of the CMD 8 is considered the origin of the coordinate, the position any pixel assumes in the overlap area 1 is represented by vector $x_1$, the center $C_2$ of the overlap area 2 of the CMD 9 is regarded as the origin of the coordinate, and the position any pixel assumes in the overlap area 1 is represented by vector $x_2$. To find m and p, it is necessary to convert the coordinates of the position represented by the vector $x_1$ into vector $x_2$. In other words, coordinate conversion must be carried out. Assuming that $x_1=(i_1, j_1)$, and $x_2=(i_2, j_2)$, and that the vectors $x_1$ and $x_2$ have different coordinate axes, the vector $x_2$ will then be given as follows:

$x_2=(x1-S)$    (10-a)

where R-1 means the rotation by angle of −θ. In terms of the components of the vectors x nd x, the equation (10-a) changes to:

$$\begin{pmatrix} i_2 \\ j_2 \end{pmatrix} = \begin{pmatrix} \cos\theta & \sin\theta \\ -\sin\theta & \cos\theta \end{pmatrix} \begin{pmatrix} i_1 - s_x \\ j_1 - s_y \end{pmatrix} \quad (10\text{-b})$$

The equation (10-b) shows that the coordinates (i1, j1) in the imaging area of the CMD 8 are equivalent to the following coordinates in the imaging area of the CMD 9:

$(i_2, j_2)=\{(i_1-s_x)\cos\theta+(j_1-s_y)\sin\theta, -(i_1-s_x)\sin\theta+(j_1-s_y)\cos\theta\}$(10-b)

Figure 11:
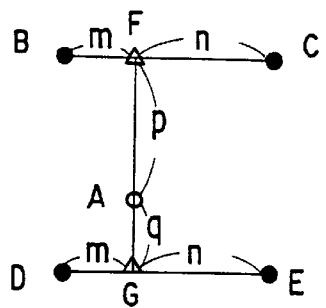
FIG. 11 is a diagram illustrating the positional relation a specified screen pixel has with four CMD pixels located around the screen pixel.

The notation of ($i_2$, $j_2$) represents real numbers which define the coordinates of the pixel A shown in FIG. 11. Hence, m and p are given as:

$m=i_2-(\text{int})i_2$    (11-a)

$p=j_2-(\text{int})j_2$    (11-b)

where the notation of (int) means integration of numbers. Similarly, the coordinates of the pixels B, C, D, and E are represented as follows:

$B=((\text{int})i_2, (\text{int})j_2)$ $C=((\text{int})i_2+1, (\text{int})j_2)$ $D=((\text{int})i_2, (\text{int})j_2+1)$ $E=((\text{int})i_2+1, (\text{int})j_2+1)$    (12)

The conversion factors R and S calculated as described above are written into the memories 26 and 27 of the interpolation circuit 25 during the manufacture of the image processing apparatus. Thereafter it is unnecessary for the displacement-detecting circuit 24 to detect the conversion factor R or the conversion factor S. It suffices to read the factors R and S from the memories 26 and 27, respectively, whenever it is required to do so.

Therefore, once the conversion factors R and S have been thus stored into the memories 26 and 27 of the interpolation circuit 25, the displacement-detecting circuit 24 is no longer necessary in the image processing apparatus. Stated in another was, a user of the apparatus need not make use of the circuit 24. Usually, the circuit 24 is removed from the apparatus and used again in the factory to detect conversion factors R and S for another apparatus of the same type.

It will now be explained how to use the image processing apparatus according to the first embodiment of the invention.

First, the user holds the apparatus at a proper position, thus placing the image of an object within the view field, which he or she wishes to photograph at high resolution. The user then pulses the shutter-release button of the apparatus, whereby two image signals are stored into the frame memories 22 and 23. These image signals represent those parts of the optical image applied to the imaging areas of the CMD 8 and 9, respectively.

Next, the image signals are read from the frame memories 22 and 23, ultimately inputting to the frame memory 30 the pixel signals representing the (u+v)×w pixels, i.e., the pixel d 11 to d (u+v)w arranged in the display area c of the display section 31. As is evident from FIG. 5A, the values of the pixels of CMD 8 are utilized for those of the pixels d 11 to $d_{ij}$ (i=1 to u, j=1 to w) of the display area c. The value for each of the remaining pixels of the display area c, i.e., the pixels $d_{ij}$ (i=u+1 to u+v, j=1 to w), is interpolated from the values of the four pixels B, C, D and E of the imaging area b of the CMD 9 which are located around the pixel of the display area c. More precisely, the system controller 33 designates the coordinates value $X_1$ of any desired pixel $d_{ij}$, and this value $X_1$ is input to the interpolation circuit 25. In the circuit 25, the coordinates selector 34 selects a coordinates value $x_1$ representing the position the pixel $d_{ij}$ assumes in the overlap area 1 of the CMD 8. The value x1, thus selected, is input to the coordinates-converting circuit 35. The circuit 35 calculates the coordinates value $x_2$ of the from the coordinates value $x_1$ pertaining to the imaging area a of the CMD 8, using the conversion factors R and S in accordance with the equation (10). The coordinate value $x_2$ is input to both the data-reading circuit 36 and the interpolation coefficient calculator 37.

The data-reading circuit 36 calculates, from the coordinate value $x_2$, the coordinates of the four pixels B, C, D, and E around the pixel A in accordance with the equation (12). Then, the circuit 36 reads the pixel values $v_b$, $v_c$, $v_d$, and $v_e$ from the frame memory 23, which correspond to the coordinates values thus calculated, and inputs these pixel values to the linear interpolation circuit 38.

The interpolation coefficient calculator 37 calculates m and p from the coordinate value $x_2$ in accordance with the equation (11), thereby obtaining interpolation coefficients a, b, c, and d. These coefficients a, b, c, and d are input to the linear interpolation circuit 38.

The linear interpolation circuit 38 interpolates the value $v_a$ of the pixel $d_{ij}$ from the pixel values $v_b$, $v_c$, $v_d$ and $v_e$ and the interpolation coefficients a, b, c and d, in accordance with the equation (9). The coordinates value $v_a$, thus calculated, is supplied to the PS converter 29. The coordinate values for all other desired pixel $d_{ij}$ are calculated in the same way and input to the PS converter 29. The PS converter 29 converts the pixel values, which are parallel data, to serial data, or a continuous image signal. The continuous image signal is written at predetermined addresses of the frame memory 30. The image signal is read from the frame memory 30 and supplied to the display section 31. The display section 31 displays a high-resolution single image of the object.

The value for each pixel $d_{ij}$ may be output to the display section 31 from the PS converter 29 immediately after it has been interpolated by the interpolation circuit 25. If this is the case, the frame memory 30 can be dispensed with.

As has been described, the image processing apparatus according to the first embodiment of the invention can form a single high-resolution image of na object even if the CMDs 8 and 9 are not positioned precisely, since the interpolation circuit 25 interpolates the value for any desired pixel. Thus, the CMDs 8 and 9 need not be positioned with high precision, whereby the image processing apparatus can be manufactured at low cost. Moreover, since the apparatus has no mechanical, movable components, it can be made small and light.

In the first embodiment, the displacement-detecting circuit 24 is incorporated during the manufacture of the apparatus and is removed therefrom after the conversion factors R and S are stored into the memories 26 and 27 of the interpolation circuit 25. Instead, the imaging section of the apparatus can have a connector so that the circuit 24 may be connected to the imaging section or disconnected therefrom. Further, the interpolation circuit 25 is not limited to the type which executes linear interpolation. Rather, the circuit 25 may be one which effects a higher interpolation such as spline interpolation or a sinc interpolation.

An image processing apparatus, which is a second embodiment of the invention will be described, with reference to FIG. 13.

The first embodiment described above must process a considerably large amount of data whenever an image of an object is photographed, performing the calculations based on the equations (9), (10), (11), and (12). The second embodiment is designed not to effect these calculations on the image signals representing each image taken. To be more specific, as shown in FIG. 13, the second embodiment has an interpolation-coefficient writing circuit 28 and an interpolation circuit 25a which replace the displacement-detecting circuit 24 and the interpolation circuit 25, respectively. The second embodiment is identical to the first in all other respects. Its components identical to those of the first embodiment are therefore designated at the same reference numerals in FIG. 13 and will not described in detail in the following description.

Figure 13:
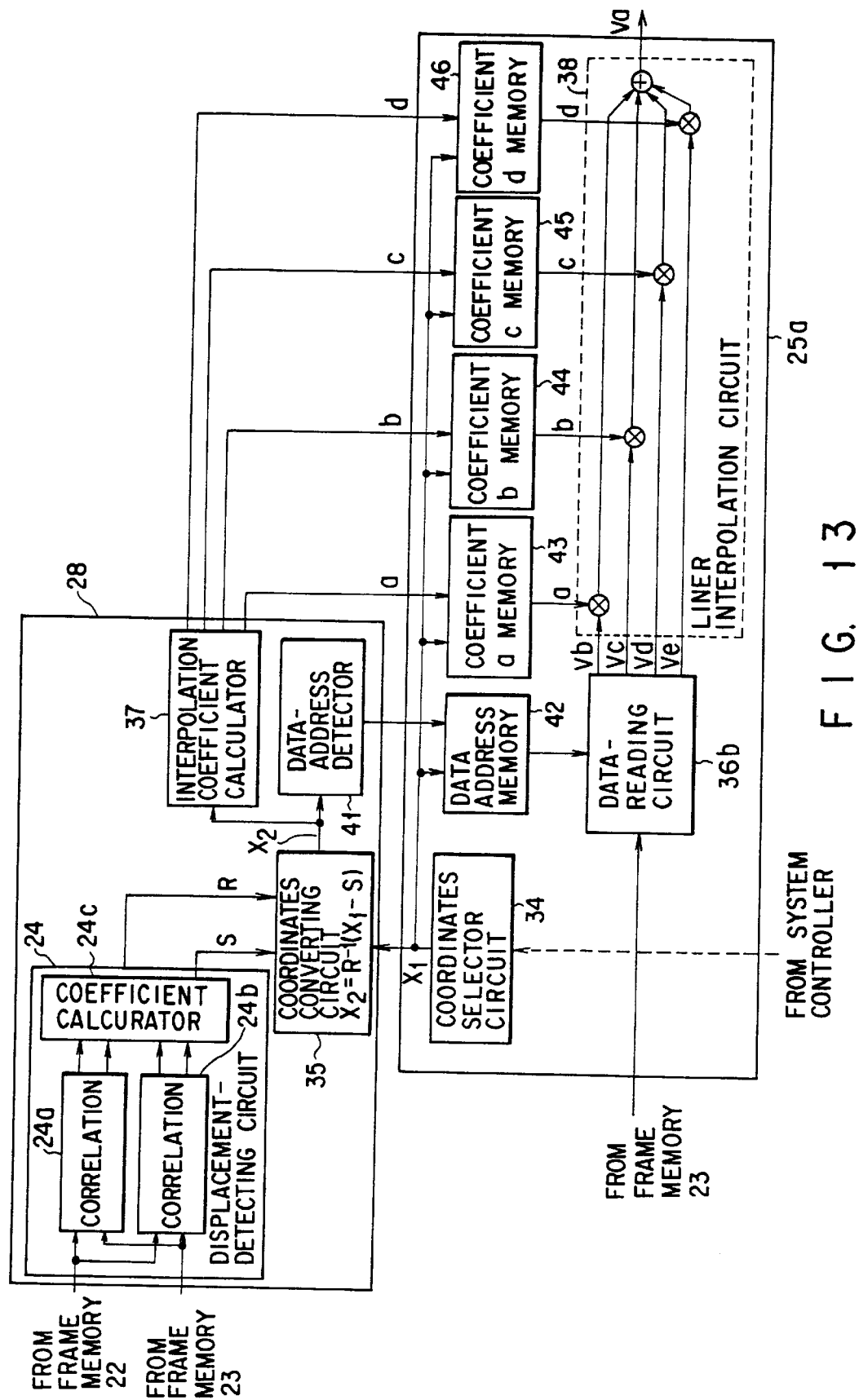
FIG. 13 is a block diagram which shows the displacement-detecting circuit and the interpolation circuit, both incorporated in an image processing apparatus according to a second embodiment of the present invention.

As shown in FIG. 13, the interpolation-coefficient writing circuit 28 comprises a displacement-detecting circuit 24, a coordinates-converting circuit 35, an interpolation coefficient calculator 37, and a data-address detector 41. The coordinates-converting circuit 35 performs the operation of the equation (10), the interpolation coefficient calculator 37 effects the operations of the equations (11) and (9), and the data-address detector 41 executes the operation of the equation (12). The circuit 37 calculates interpolation coefficients a, b, c, and d. The detector 41 detects the coordinates value of each pixel. The coefficients a, b, c, and d, and the coordinate value of the pixel are input to the interpolation circuit 25a.

In the interpolation circuit 25a, the coordinate value of the pixel is stored into a data address memory 42, and the interpolation coefficients a, b, c, and d are stored into four coefficient memories 43, 44, 45, and 46, respectively. The circuit 25a further comprises a coordinates selector 34, a data-reading circuit 36b, and a linear interpolation circuit 38.

As indicated above, the second embodiment effects the coordinate conversion of the equation (10), the interpolation-coefficient calculation of the equation (11), and the coordinates-value calculation of the equation (12) during the manufacture of the apparatus, and the results of these operations are stored into the data-address memory 42 and the coefficient memories 43 to 46. Hence, it is only the operation of the equation (9) that the linear interpolation circuit 38 needs to accomplish.

The use of the data-address memory 42 and the coefficient memories 43 to 46, all incorporated in the interpolation circuit 25a, greatly reduce the amount of data that needs to be processed. This enables the apparatus to process, at sufficiently high speed, the image signals which are sequentially generated by continuous imaging.

In the second embodiment, the interpolation-coefficient writing circuit 28 may be connected to the apparatus only during the manufacture of the apparatus, and may be disconnected therefrom after the operations of the equations (10), (11) and (12) are performed and the results thereof are stored into the data-address memory 42 and the coefficient memories 43 to 46.

An image processing apparatus, which is a third embodiment of this invention, will be described with reference to FIGS. 14A and 14B and FIGS. 15 to 17. The third embodiment is similar to the first embodiment shown in FIG. 6, and the same components as those of the first embodiment are denoted at the same reference numerals in FIG. 17 and will not be described in detail.

In the first and second embodiments, the input light representing the optical image of an object is split into two parts by means of the half prism 1a. The use of the half prism 1a is disadvantageous in that one half of the input light is wasted. In the third embodiment, to avoid wasting of the input light, one of the prisms constituting the light-splitting section has a coating on a part of its output surface as is shown in FIG. 14A. Thus, the portions of the first prism have different transmission coefficients.

FIG. 14A shows an input light flux which is coaxial with the optical axis of the light-splitting section. The upper half (shaded part) of the flux is reflected to a CMD 8 from the coated part of the output surface of the first prism, whereas the lower half of the flux passes through the first prism and the second prism, reaching a CMD 9. On the other hand, FIG. 14B shows an input light flux whose axis deviates upwards from the optical axis of the light-splitting section. A greater upper (shaded) part of the flux is reflected to the CMD 8 from the coated part of the output surface of the first prism, whereas the smaller lower half of the flux passes through the first prism and the second prism, forming a small part of the input image on the upper edge portion of the CMD 9.

The amount of light input to the light-splitting section is proportional to the area of the output aperture of the objective lens. Thus, when the input light flux is coaxial with the optical axis of the light-splitting section as is shown in FIG. 14A, the light distributions in the imaging areas of the CMDs 8 and 9 are symmetrical with respect to the optical axis of the light-splitting section, as is illustrated in FIG. 15. As is evident from FIG. 15, the light amount at the optical axis of the light-splitting section is equal to the amount applied to the CMDs through the half prism 1a in the first and second embodiments. The light distributions in the imaging areas of the CMDs 8 and 9 are different, particularly in the overlap areas thereof.

From the light distributions in the imaging areas of the CMDs 8 and 9 which are different, a displacement, if any, of the imaging area of one CMD with respect to that of the other CMD cannot be detected correctly. Namely, the displacement detected is erroneous. Further, if the light distributions on the CMDs differ, the image formed by the apparatus will have brightness distortion. In order to prevent such brightness distortion, some measures must be taken to render the light distributions on the CMDs equal.

Figure 17:
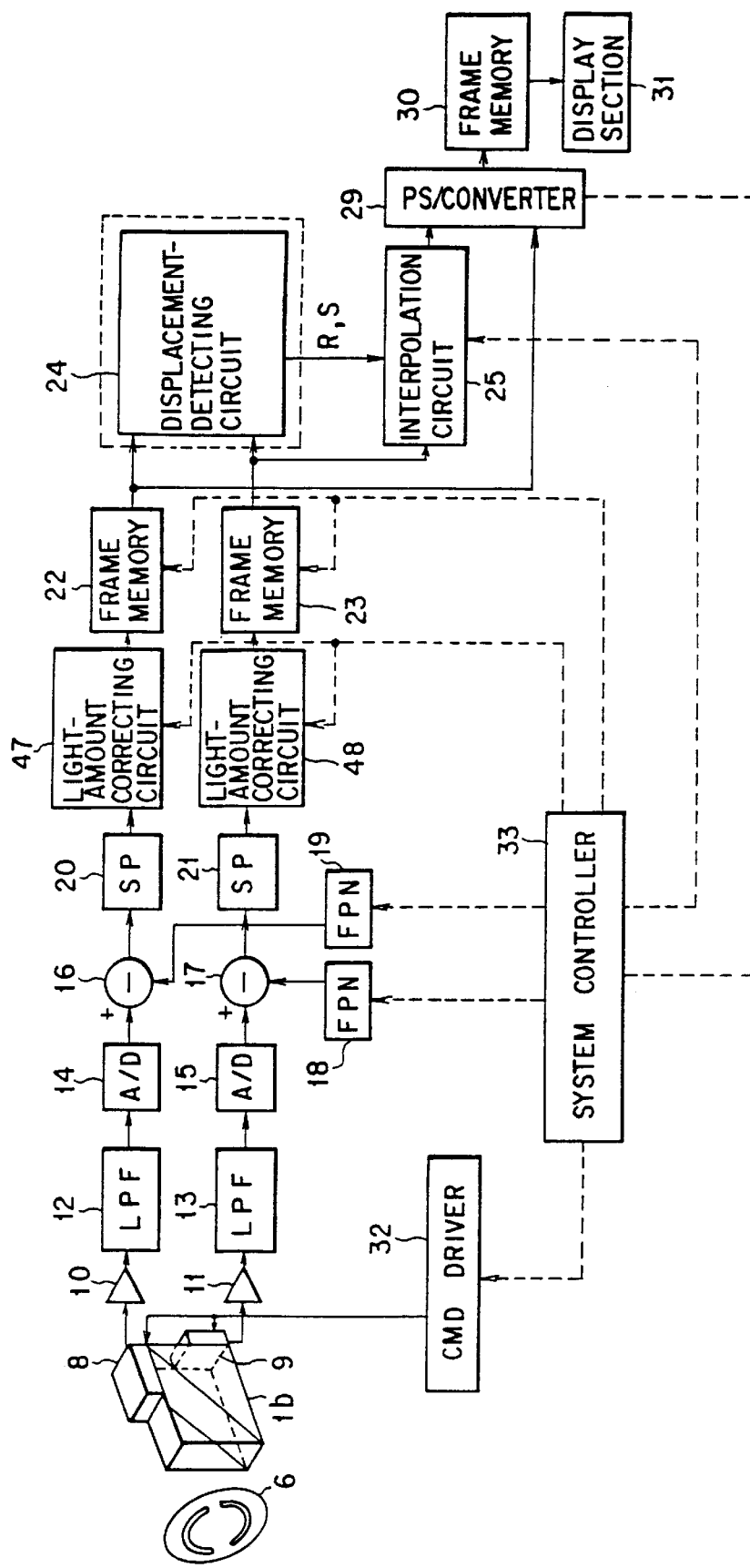
FIG. 17 is a block diagram showing the image processing apparatus according to the third embodiment of the invention.

In the third embodiment, use is made of light-amount correcting circuits 47 and 48 as shown in FIG. 17. These circuits 47 and 48 amplify input image signals originated from the CMDs 8 and 9, making the light distributions on the CMDs equal to each other as shown in FIG. 16. In other words, the circuits 47 and 48 apply an inverse function to the different light distributions on the CMDs 8 and 9. The light-amount correcting circuits 47 and 48 may be look-up tables. The light-splitting section 1b of the third embodiment comprises two prisms. One of the prisms has a coating on a part of its output surface as is shown in FIG. 14A and consists of two portions having different transmission coefficients.

Consisting of two portions with different transmission coefficients, this prism reduces the loss of input light to a minimum, whereby the apparatus is made suitable for photographing dark objects. In the third embodiment, the prisms have each two parts having greatly different transmission coefficients. Each of them may be replaced by a prism which has such a coating that its transmission coefficient gradually changes in one direction.

An image processing apparatus, which is a fourth embodiment of the invention, will be described with reference to FIG. 18 and FIGS. 19A, 19B, and 19C. The fourth embodiment is also similar to the first embodiment (FIG. 6). The components identical to those of the first embodiment are denoted at the same reference numerals in FIG. 18 and will not be described in detail.

Figure 19A:
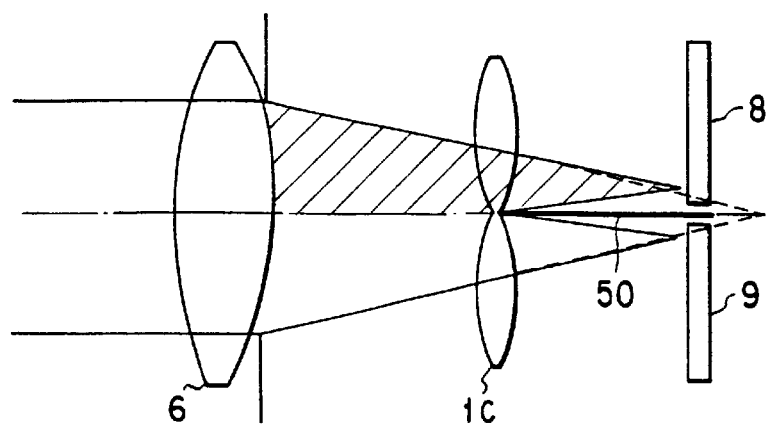
FIGS. 19A, 19B, and 19C are diagrams explaining how an input light flux applied may be applied through separator lenses in various manners, in the apparatus shown in FIG. 18.
Figure 19B:
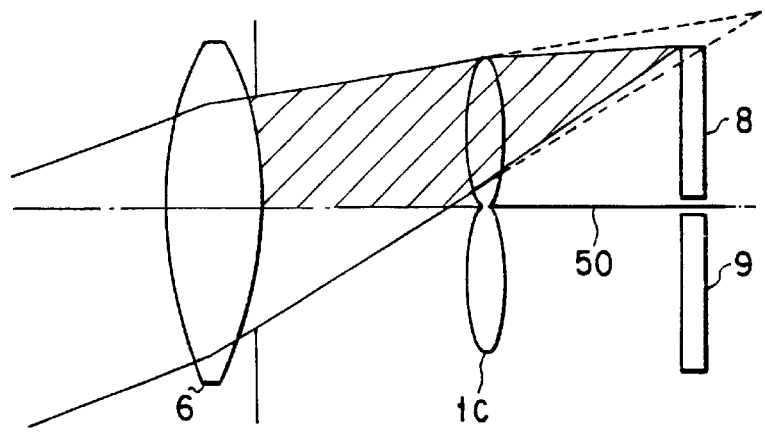
Figure 19C:
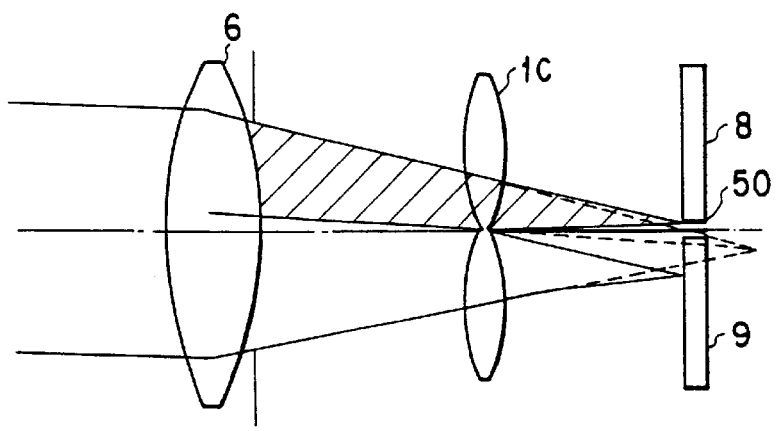

FIGS. 19A, 19B, and 19C explain how a light flux applied from an objective lens 6 is applied through the separator lenses 1c, forming an image on CMDs 8 and 9 in various manners. To be more specific, FIG. 19A shows a light flux applied through the lenses 1c to the CMDs 8 and 9, exactly along the optical axis of the lens 6. FIG. 19B shows a light flux extending along a line inclined to the optical axis of the objective lens 6, forming an image on the upper edge portion of the CMD 8 only. FIG. 19C shows a light flux extending along a line parallel to and deviating downward from the optical axis of the lens 6, forming an image on the upper edge portion of the CMD 9 only. When the input light flux is applied as shown in FIG. 19A or 19C, the lenses 1c split the flux into two parts, and these parts of the flux form images on both CMDs 8 and 9 or on the CMD 9 only, which overlap in part. A light shield 50 is arranged between the separator lenses 1c and the CMDs 8 and 9, extending in a horizontal plane containing the optical axis of the lens 6. Hence, the shield 50 prevents mixing of the two flux parts.

As can be understood from FIGS. 19B and 19C, the light distributions on the CMDs 8 and 9 will differ unless the light flux is applied along the optical axis of the objective lens 6. The fourth embodiment therefore has two light-amount correcting circuits 47 and 48 of the same type used in the third embodiment (FIG. 17).

As indicated above, in the image processing apparatus according to the fourth embodiment of the invention, the separator lenses 1c are used, in place of prisms, to split the input light flux into two parts. Since the lenses 1c are smaller than prisms, the light-splitting section of the apparatus can easily be made small.

Figure 18:
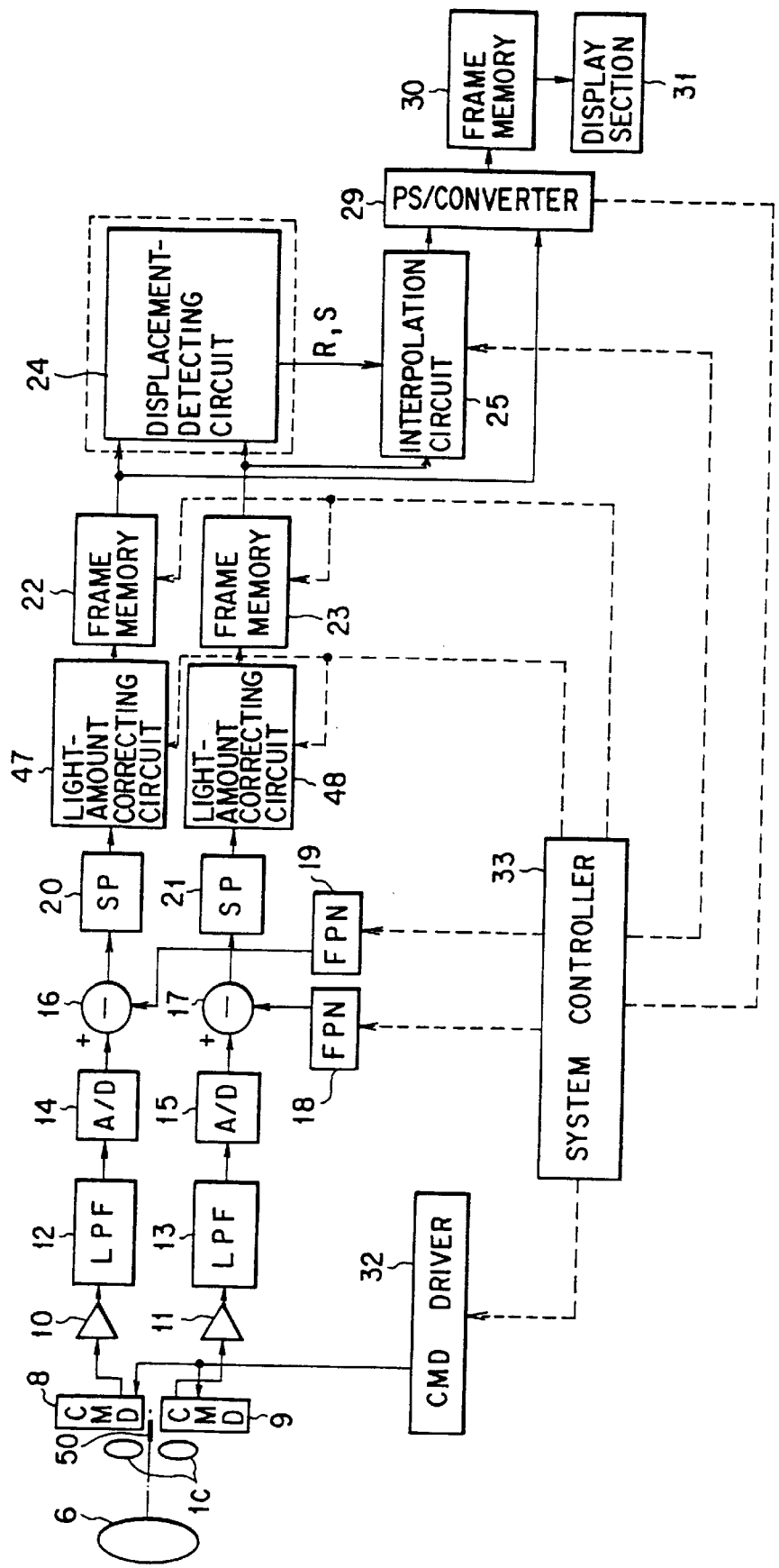
FIG. 18 is a block diagram showing an image processing apparatus according to a fourth embodiment of the present invention.
Figure 21:
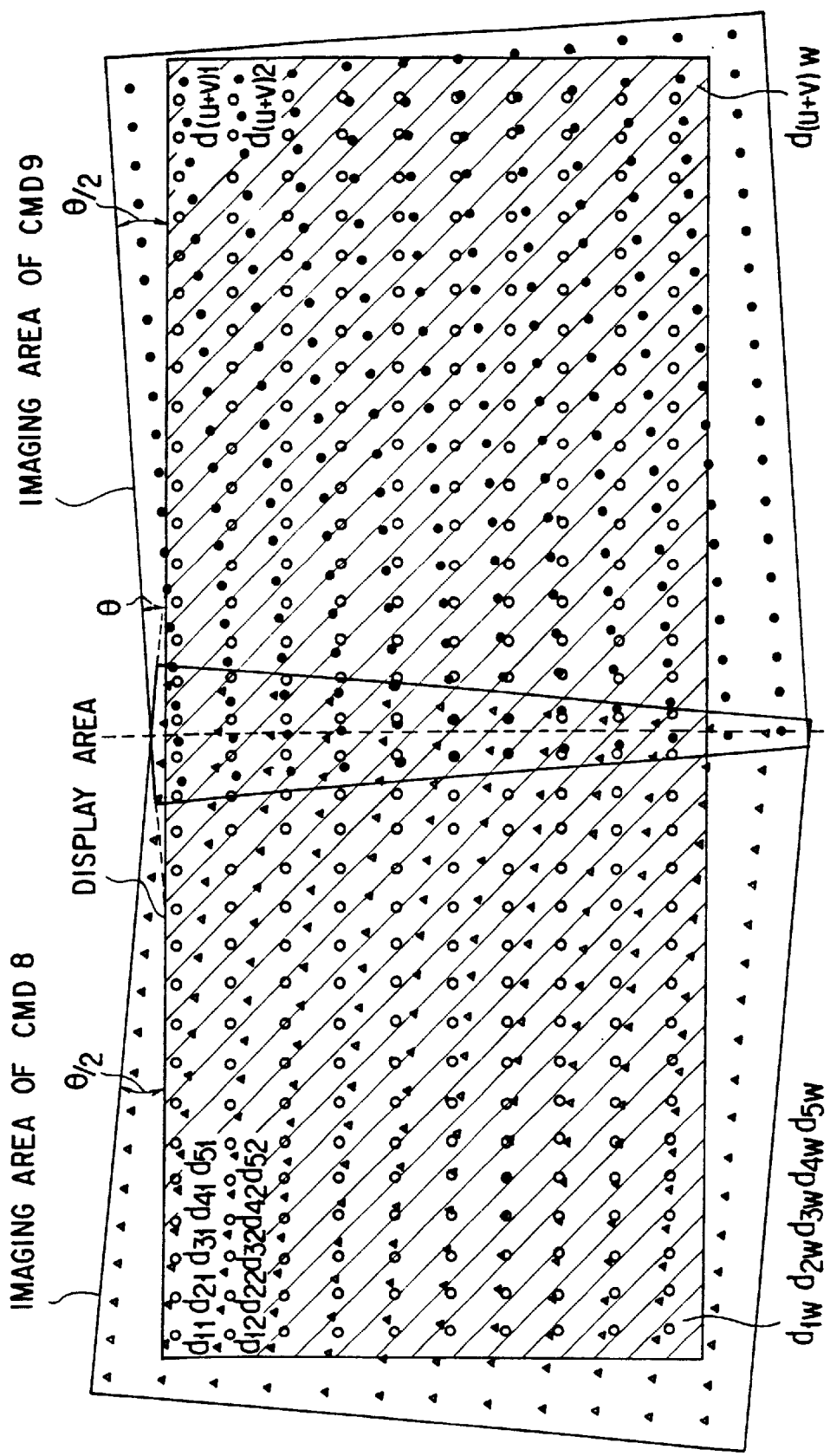
FIG. 21 is a diagram showing the imaging areas of the two CMDs incorporated in the apparatus shown in FIG. 20.

Another image processing apparatus, which is a fifth embodiment of this invention, will be described with reference to FIGS. 20 and 21. As is evident from FIG. 20, the fifth embodiment is similar to the embodiment of FIG. 18, and the same components as those of the embodiment of FIG. 18 are denoted at the same reference numerals in FIG. 20 and will not be described in detail.

As has been described, in the first embodiment, the values interpolated for the pixels $d_{ij}$ of one half of the display screen (i=u+1 to u+v, j=1 to w) are interpolated, whereas the values for the pixels of the other half of the screen are the pixel signals which the CMD 8 has output. The interpolated values of the screen pixels may deteriorate in some case, as compared to those which are the pixel signals output by the CMD 8, and the left and right halves of the image the first embodiment forms may differ in resolution.

The fifth embodiment is designed to form a single image of uniform resolution. As FIG. 21 shows, CMDs 8 and 9 (FIG. 20) are so positioned that their imaging areas incline at the same angle to a display area of a display section 31 (FIG. 20). Thus, as is shown in FIG. 21, if the imaging area of the CMD 8 is inclined at angle θ to that of the CMD 9, the imaging areas of the CMDs 8 and 9 incline at an angle of θ/2 to the display area. In this case, the values of the screen pixels $d_{ij}$ (i=1 to (u+v)/2, j=1 to w) defining the half display area left of the broken line are interpolated from the pixel signals output by the CMD 8, whereas the values of the screen pixels $d_{ij}$ (i=(u+u)/2 to u+v, j=1 to w) defining the half display area on the right of the broken line are interpolated from the pixel signals output by the CMD 9.

The fifth embodiment has a CMD rotating mechanism 49. The mechanism 49 rotates the CMDs 8 and 9, inclining their imaging areas at the same angle to the display area, if the imaging areas of the CMDs 8 and 9 incline to the display area when the image processing apparatus is held with its display area extending horizontally. The angle by which the mechanism 49 rotates either imaging area to the display area is determined by the conversion factors R and S which have been detected by a displacement-detecting circuit 24. The fifth embodiment further comprises an additional interpolation circuit 25, which performs interpolation on the pixel signals output by the CMD 8 to calculate the values of the screen pixels defining the left half display area (FIG. 20).

Since the CMD rotating mechanism 49 rotates the CMDs 8 and 9, if necessary, thereby inclining their imaging areas at the same angle to the display area, the image processing apparatus can form an image which is uniform in resolution. The imaging areas of the CMDs need not be inclined at the same angle to the display area; an image can be formed which has a substantially uniform resolution.

It should be noted that the CMD rotating mechanism 49, which characterizes the fifth embodiment, may be incorporated in the first to fourth embodiments, as well.

An image processing apparatus, which is a sixth embodiment of the invention, will be described with reference to FIGS. 22A and 22B. As may be understood from FIG. 22a, the sixth embodiment has components similar to those of the first embodiment shown in FIG. 6. Therefore, the same components as those of the first embodiment are denoted at the same reference numerals in FIG. 22A and will not be described in detail.

As is evident from FIG. 22A, four CMDs 51, 52, 53, and 54, are provided each having a 1000×1000 pixel matrix. Each CMD has many as pixels as a general-purpose NTSC imaging device. Hence, the CMDs 51 to 54 can be manufactured with a much higher yield than HDTV imaging devices which have a 1920×1035 pixel matrix. As FIG. 22B shows, the CMDs 51 to 54 are mounted on a half prism 1d and juxtaposed with the CMD 51 used as positional reference, such that their imaging areas overlap at regions a, b, and c.

Like any embodiment described above, the sixth embodiment has a displacement-detecting circuit 24. The circuit 24 detects the displacements of the CMDs 52, 53, and 54, each in the form of conversion factors S and R (i.e., displacement S and rotation angle R), from the image signals representing the overlap regions a, b, and c. The three displacement data items, each consisting of the factors S and R, are input to three interpolation circuits 25, respectively.

In the sixth embodiment, the half prism 1d is used as light-splitting section 1. Nonetheless, the half prism 1d may be replaced by two such prisms as used in the third embodiment, one which has a coating on a part of its output surface and consists of two portions having different transmission coefficients. Further, each of the interpolation circuits 25 may have built-in coefficient memories as in the second embodiment which is shown in FIG. 13.

Another image processing apparatus, which is a seventh embodiment of the invention, will be described. The seventh embodiment is identical to the six embodiment (FIG. 22A), except in that its light-splitting section is of any one of the types illustrated in FIGS. 23A, 23B, 23C, and 23D and differs from that of the sixth embodiment which is a half prism 1d on which four CMDs are mounted.

Figure 23A:
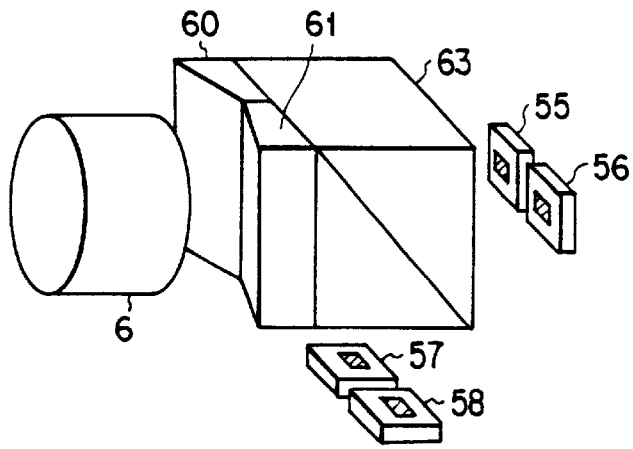
FIGS. 23A to 23D are perspective views of four alternative light-spitting sections for use in an image processing apparatus according to a seventh embodiment of the present invention.
Figure 26:
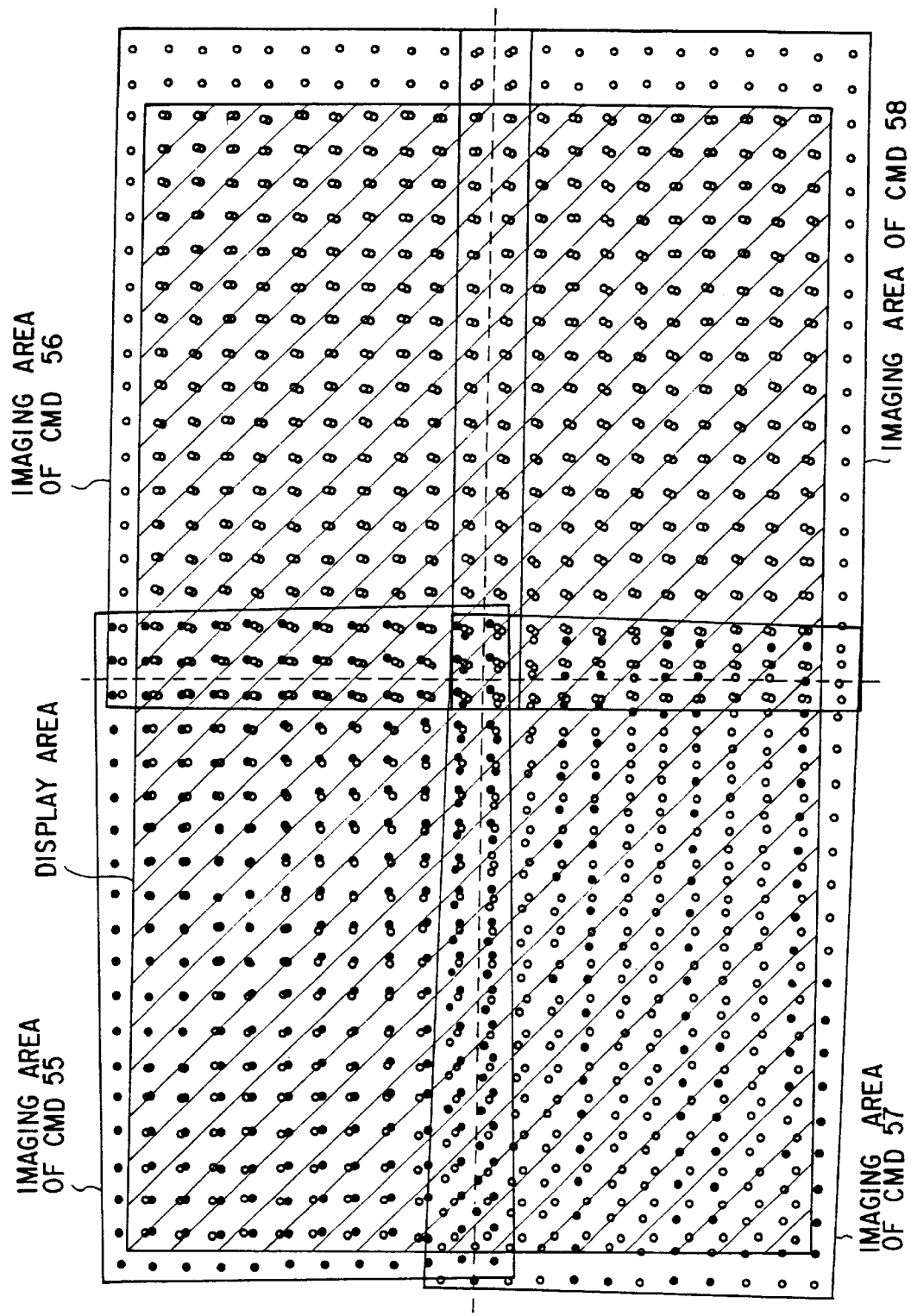
FIG. 26 is a diagram representing the imaging areas of the CMDs used in the seventh embodiment, and also the display area of the display section incorporated in the seventh embodiment.

FIG. 23A shows the first type of the light-splitting section 1 which comprises two wedge-shaped prisms 60 and 61 and a beam splitter 63. The prisms 60 and 61 and the beam splitter 63 cooperate, splitting the input light into four parts. The parts of the input light are applied to CMDs 55, 56, 57, and 58, forming four parts of an object image on the imaging areas of the CMDs 55 to 58, respectively, as is illustrated in FIG. 26.

FIG. 24A is a side view of the light-splitting section 1 shown in FIG. 23A, and FIG. 24B is a plan view thereof. As clearly illustrated in FIGS. 24A and 24B, the wedge-shaped prisms 60 and 61 split the input light into two parts, each of which is split by the beam splitter 63 into two parts. As a result, the input light is divided into four parts. The beam splitter 62 is formed of two right-angle prisms connected together. As shown in FIG. 24A, a total-reflection mirror coating is applied to the upper half of the interface between the right-angle prisms.

Figure 23B:
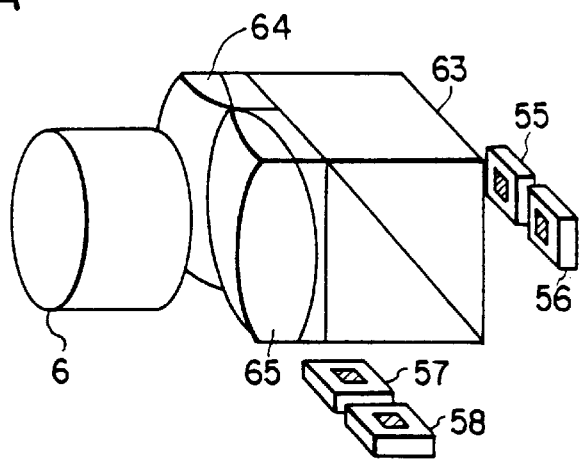

FIG. 23B shows the second type of the light-splitting section 1 which differs from the type of FIG. 23A, in that two eccentric lenses 64 and 65 are used in place of the two wedge-shaped prisms 60 and 61. Unlike the prisms 60 and 61 which deflect a light flux, the eccentric lenses 64 and 65 not only deflect a light flux but also form an image. The objective lens 6 through which the input light is applied to the eccentric lenses 64 and 65 may be that type which emits an afocal flux (see FIGS. 25A nd 25B). The light-splitting section 1 of the second type (FIG. 23B) need not be positioned so precisely with respect to the objective lens 6, owing to the use of the eccentric lenses 64 and 65. This facilitates the assembling of the image processing apparatus. Both eccentric lenses 64 and 65 are achromatic doublets, but can be lenses of any other types.

Figure 23C:
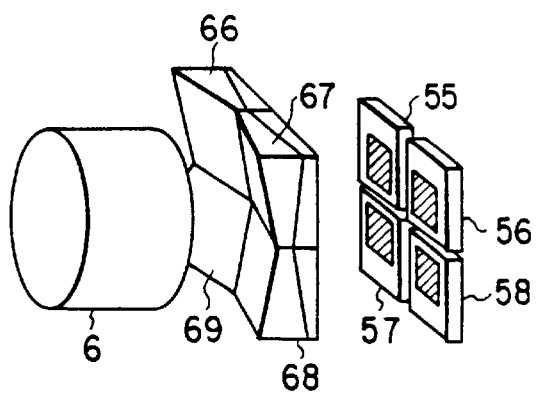

FIG. 23C shows the third type of the light-splitting section 1 which comprises four wedge-shaped prisms 66, 67, 68, and 69. These lenses 66 to 69 are connected, side to side, forming a 2×2 matrix which has a concave at the center. The input light applied via the objective lens 6 onto the 2×2 matrix is divided into four parts, i.e., an upper-left part, a lower-left part, and an upper-right part, and a lower-right part. Each of the wedge-shaped prisms is an achromatic prism consisting of two glass components which have different refraction indices. It is desirable that a telecenteric system be located at the output of the objective lens 6, to prevent distortion of the image which would otherwise occur due to the flux refraction caused by the wedge-shaped lens 66 to 69. Hence, the telecenteric system serves to accomplish good image synthesis.

Figure 23D:
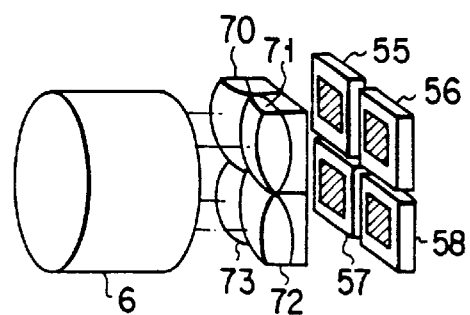

FIG. 23D shows the fourth type of the light-splitting section 1 which comprises four eccentric lenses 70, 71, 72, and 73 which are connected, side to side, forming a 2×2 matrix. It is desirable that this light-splitting section 1 be used in combination with an objective lens 6 which emits an afocal flux.

The seventh embodiment, which has a light-splitting section comprising prisms or lenses, needs light-amount correcting circuits of the type described above.

As may be understood from the above description, the seventh embodiment is an image processing apparatus which has four solid-state imaging devices. The imaging devices are not restricted to CMDs. Needless to say, they may be CCDs or AMIs. If CCDs for use in NTSCs, which are generally used imaging devices and have 768×480 pixels each, are utilized in the seventh embodiment, the seventh embodiment will form an image of resolution as high as about 1400×800 pixels. Alternatively, four imaging devices for use in PALs, each having 820×640 pixels, may be employed. In this case, the seventh embodiment will form an image of higher resolution.

An image processing apparatus, which is an eighth embodiment of this invention, will be described with reference to FIG. 27. This embodiment is identical to the first embodiment (FIG. 6), except for the features which will be described below.

The seventh embodiment has a light-splitting section which comprises four imaging devices. According to the present invention, however, the number of imaging devices used is not limited to four at all. The eighth embodiment of the invention is characterized in that a large number of lenses and a large number of imaging devices, that is, a lens array 74 and a CMD array 75, as is clearly shown in FIG. 27. The lenses and the CMDs have one-to-one relation, and the CMDs have their imaging areas overlapping in part. The lens array 74 has a light shield formed on its entire surfaces, except for the lenses. The lens array 74 can be produced at low cost by means of, for example, press-processing.

The imaging devices used in the eighth embodiment are not restricted to CMDS. Rather, they may be CCDs, MOS devices, or the like.

It will now be explained how the imaging devices are positioned in each of the fourth to eighth embodiments described above. In the fourth to eighth embodiments, the CMDs are located close to one another and cannot be located at such positions as shown in FIGS. 19A to 19C. Thus, they are positioned by one of various methods which will be described with reference to FIGS. 28 to 32 and FIGS. 33A to 33C, and FIG. 34.

FIGS. 28 and 29 are a plan view and a sectional view, respectively, explaining the first method of positioning CMDs. In this method, CMDs 81 and 82 are mounted, in the form of bare chips, on a ceramic substrate 80 as is shown in FIG. 28. As is best shown in FIG. 29, a sectional view taken along line 29—29 in FIG. 28, the CMDs 81 and 82 are set in two square recesses formed in the surface of the ceramic substrate 80 and fixed with adhesive 83. The rims of either square recess have been planed off, so that the adhesive 83 is applied in sufficient quantity. The recesses are positioned and formed so precisely that the CMDs 81 and 82 are positioned with sufficient precision when they are set in the recesses. The electrodes of the CMDs 81 and 82 are bonded to the electrodes formed on the ceramic substrate 80, respectively. The electrodes on the substrate 80 are, in turn, connected to terminals 85 formed at the edges of the substrate 80 for electrically connecting the CMDs 81 and 82 to external components. As shown in FIG. 30, the terminals 85 may protrude downward from the edges of the ceramic substrate 80.

The square recesses made in the surface of the substrate 80 not only serve the purpose of positioning the CMDs 81 and 82 with required precision but also they serve to provide a broad effective imaging area. The adhesive 83 is applied to the sides of each CMD as shown in FIG. 29, not to the bottom of the CMD, so that the position of the CMD may be adjusted with respect to the optical axis of the light-splitting section. Were the adhesive 83 applied to the bottom of the CMD, the CMD might tilt or move to assume an undesirable position with respect to the optical axis of the light-splitting section.

Each CMD may be fastened to the ceramic substrate 80 in another way. As FIG. 29 shows, a hole 87 may be in the substrate 80 bored from the lower surface thereof, and adhesive 88 may be applied in the hole. This method of securing the CMD to the substrate 80 is advantageous in two respects. First, it minimizes the risk that the adhesive should cover the light-receiving surface of the CMD. Second, much care need not be taken to apply the adhesive 88.

Figure 31:
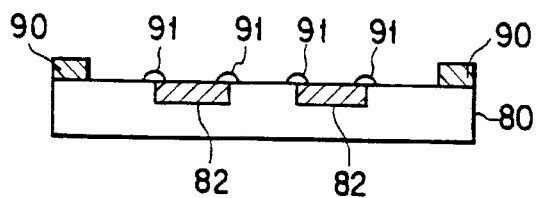
FIG. 31 is a side view of a CMD ceramic package comprising a substrate and spacers mounted on both edges of the substrate.

FIG. 31 is a cross-sectional view, explaining the second method of positioning CMDs. In the second method, a ceramic substrate 80 is bonded to a prism or a quartz filter (not shown) by means of spacers 90 mounted on both edges of the substrate 80. As a result, the substrate 80 is spaced away from the prism or the filter. Hence, no load is exerted from the prism or filter on the bonding wires 91 formed on the substrate 80, provided that the height H of the spacers 90 is greater than that h of the bonding wires 91.

Figure 32:
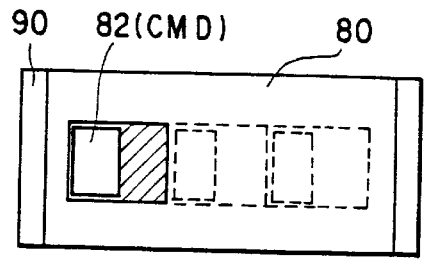
FIG. 32 is a plan view, explaining a method of positioning bare CMD chips on a ceramic substrate.

FIG. 32 is a plan view, explaining the third method of positioning bare CMDs. This method is to use a substrate 80 having rectangular recesses in its surface. Bare CMD chips 82 are placed in the recesses, respectively, each abutted on one edge of the recess and thereby positioned in the horizontal direction. The chips 82, thus positioned, are fixed to the substrate 80 by using adhesive.

Figure 33A:
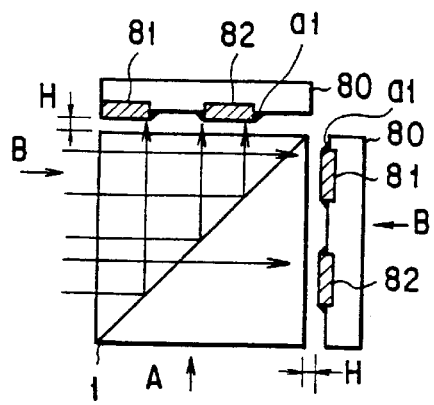
FIGS. 33A to 33C are views, explaining a method of positioning CMDs, which is employed in the six embodiment of the invention.
Figure 33B:
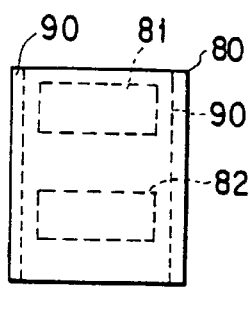
Figure 33C:
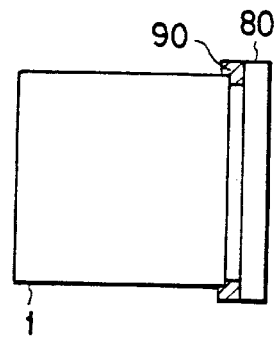

FIGS. 33A to 33C explain the fourth method of positioning CMDs, which is employed to manufacture the image processing apparatus according to the six embodiment. FIG. 33A is a side view, FIG. 33B a front view seen in the direction of arrow B in FIG. 33A, and FIG. 33C a bottom view seen in the direction of arrow A in FIG. 33A. As shown in FIG. 33C, spacers 90 are mounted on a substrate 80, thereby protecting the bonding wires 91.

Figure 34:
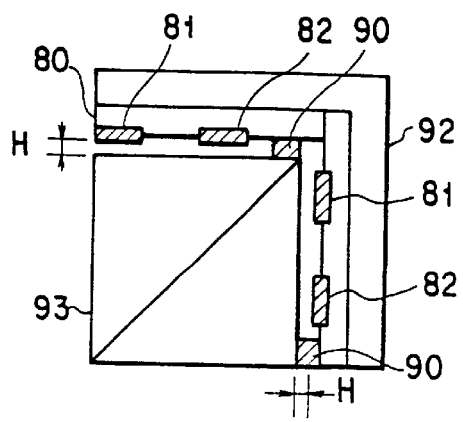
FIG. 34 is a side view, also explaining another method of positioning bare CMD chips on a ceramic substrate.

FIG. 34 is a side view, explaining the fifth method of positioning CMDs. In this method, two ceramic substrate 80 are sutured to a backing member 92 which has a right-angle L cross section. Spacers 90 are mounted on the substrates 80, and a half prism 93 is abutted on the spacers 90. Hence, the half prism 93 is secured, at its two adjoining sides, to the ceramic substrates 80 and spaced away therefrom by the height H of the spacers 90.

Another image processing apparatus, which is a ninth embodiment of the invention, will be described with reference to FIG. 35A. As a comparison between FIG. 17 and FIG. 35 may reveal, the ninth embodiment is similar to the third embodiment but different in that an image-synthesizing circuit 121. Therefore, the same components as those of the third embodiment (FIG. 17) are denoted at the same reference numerals in FIG. 35A and will not be described in detail.

Figure 36:
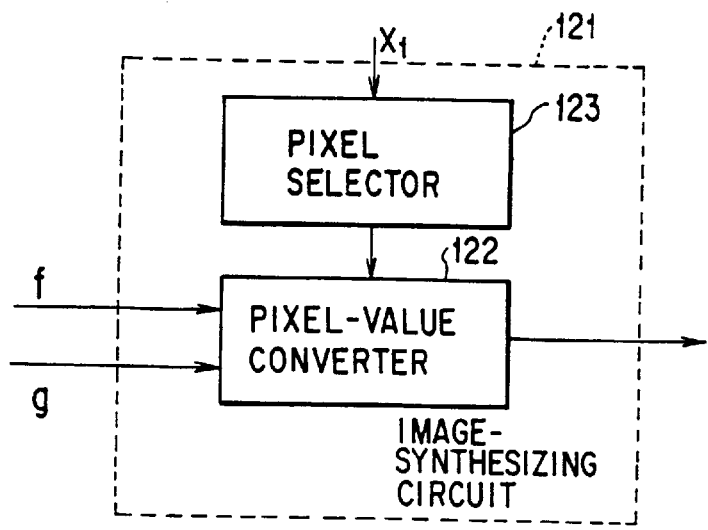
FIG. 36 is a block diagram illustrating an image-synthesizing circuit incorporated in the ninth embodiment.
Figure 37:
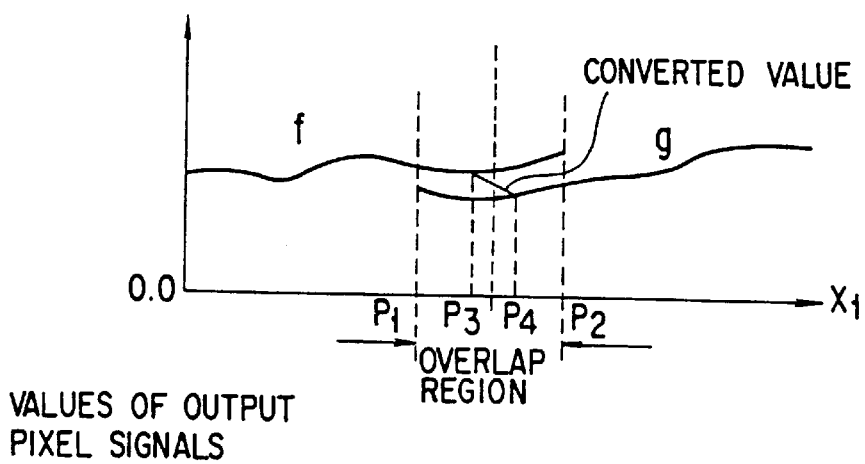
FIG. 37 is a diagram explaining the linear interpolation the image-synthesizing circuit performs.

The image-synthesizing circuit 121 has the structure shown in FIG. 36. The circuit 121 comprises a pixel-value converter 122 and a pixel selector 123. The value f of an input pixel and the value g of another input pixel to be combined with the first-mentioned pixel are input to both the converter 122 and the selector 123. The pixel selector 123 selects some pixels which are located near an overlap region, in accordance with the vector (coordinate value) $X_1$ representing the position of an output pixel. The pixel-value converter 122 converts the input values of the two pixels so as to display an image which has no discontinuity. More precisely, as FIG. 37 illustrates, the converter 122 converts the input values in accordance with the positions the pixels assume within an overlap region.

Figure 38:
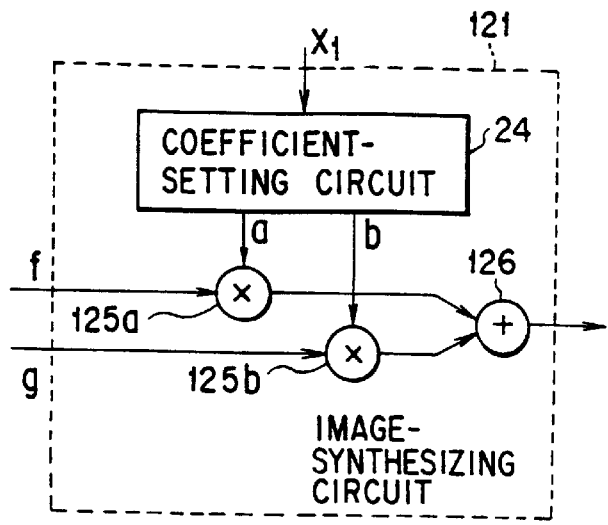
FIG. 38 is a block diagram showing an image-synthesizing circuit which may be used in the ninth embodiment.

Alternatively, the image-synthesizing circuit 121 may have the structure shown in FIG. 38. That is, the circuit 121 may comprise a coefficient-setting circuit 124, two multipliers 125a and 125b, and an adder 126. The circuit 124 sets weighting coefficients a and b for two input pixel values f and g. The multiplier 125a multiplies the pixel value f by the weighting coefficient a, and the multiplier 125b multiplies the pixel value g by the weighting coefficient b. The adder 126 adds the outputs of the multipliers 125a, generating the sum, (fa+gb), which is input as an output pixel value to the frame memory 30 (FIG. 35A).

Figure 39:
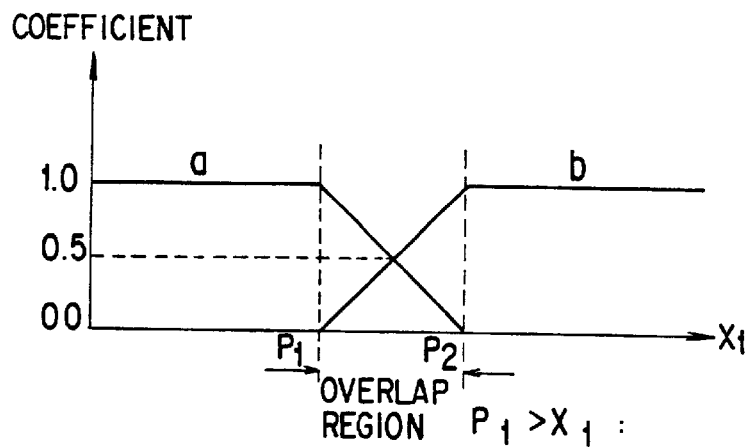
FIG. 39 is a diagram explaining the linear interpolation which the circuit shown in FIG. 38 performs.

The coefficient-setting circuit 124 sets the coefficients for either pixel at a value of "1.0" if the pixel is located outside the overlap region and at a value linearly ranging from "0.0" to "1.0" if the pixel is located in the overlap region. In FIG. 39, $X_1$ is the ordinate in the direction of combining image parts, and $P_2-P_1$ is the length of the overlap region.

Figure 35B:
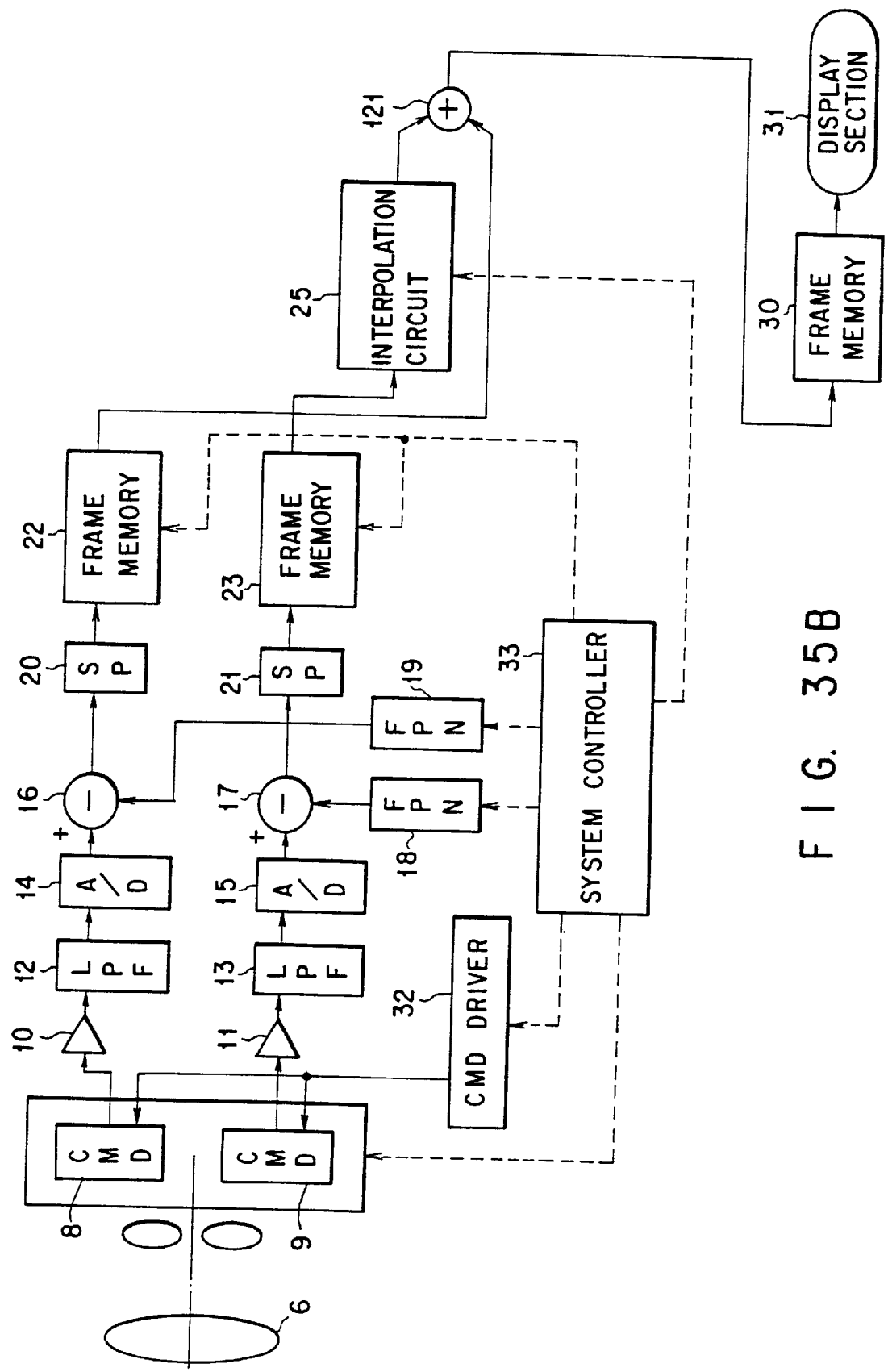
FIG. 35B corresponds to FIG. 35A, but with the image-synthesizing circuit being simplified to comprise an adder.

As may be understood from FIGS. 38 and 39, the circuit 121 shown in FIG. 38 does not change the input pixel values f and g without changing them if the pixels are located outside the overlap region. If the pixels are located in the overlap region, the circuit 121 linearly changes the weighting coefficients a and b, multiplies the values f and g by the coefficients a and b, respectively, obtaining fa and gb, and adds the values fa and gb, and outputs the sum (fa+and gb) as an output pixel value. Hence, the resultant image has no brightness discontinuity which would otherwise result from the difference in sensitivity between the imaging devices. Also the image-synthesizing circuit 121 can reduce geometrical discontinuity, if any, that occurs in the overlap region due to the correlation and the interpolation which the displacement-detecting circuit 24 and the interpolation circuit 25 produce. Thus can the circuit 121 decrease, to some degree, the brightness discontinuity and geometrical discontinuity in the vicinity of the overlap region. Once the displacement-detecting circuit 24 has detected the displacement, the light-amount correcting circuits 47 and 48 may be removed so that the image-synthesizing circuit 121 can be made simple, comprising only an adder as is illustrated in FIG. 35B. This is because, the circuit 121 no longer needs to change the coefficients a and b linearly, since the light amounts on the imaging areas of the CMDs gradually change in the overlap region as is shown in FIG. 15.

To reduce the brightness discontinuity further, the bias gains of the SPs (Signal Processors) 20 and 21 may be adjusted.

Figure 40:
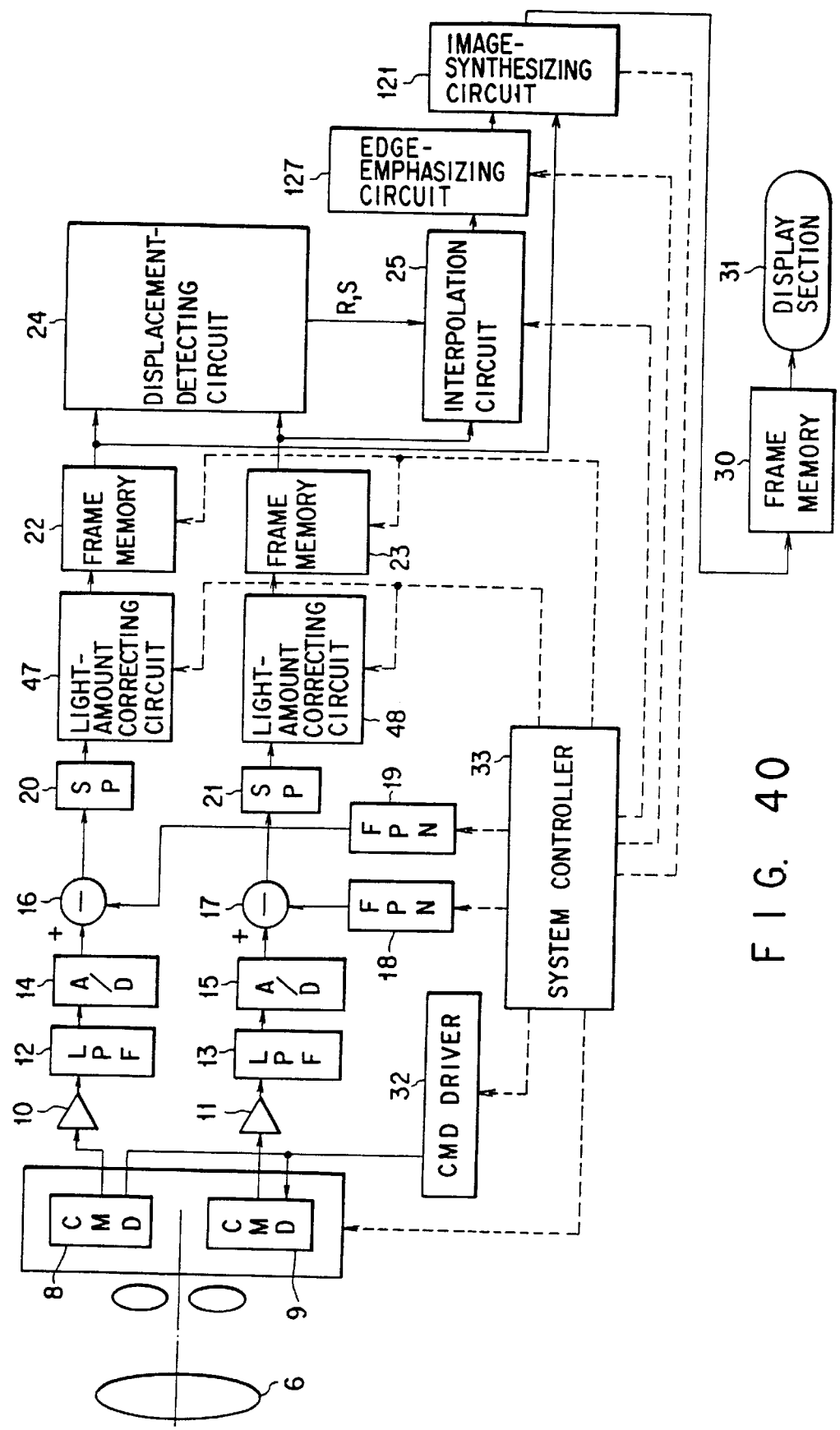
FIG. 40 is a block diagram showing an image processing apparatus according to a tenth embodiment of the present invention.

An image processing apparatus, which is a tenth embodiment of the invention, will be described with reference to FIG. 40. The tenth embodiment is identical to the ninth embodiment (FIG. 35A), except that a edge-emphasizing circuit 127 is connected between the output of an interpolation circuit 25 and an image-synthesizing circuit 121. The circuit 127 is designed to restore the quality of an image which has been deteriorated due to the interpolation effected by the interpolation circuit 25. The same components as those of the ninth embodiment are denoted at the same reference numerals in FIG. 40, and only the characterizing features of the tenth embodiment will be described in detail.

The edge-emphasizing circuit 127 calculates a Laplacian by using the local operator of a digital filter or the like. For instance, the circuit 127 calculates a Laplacian from an original image. That is:

$$\text{Output image} = \text{input image} - \Im^2 \text{ input image} \times \omega$$

where $\omega$ is a constant (see FIG. 42D), $\Im^2$ is a Laplace operator. The Laplace operator used here is, for example, the operators of FIGS. 42A, 42B, and 42C. Alternatively, the following selective image-emphasizing method may be performed:

$$\text{Output image} = \text{input image} - h(x,y) * 2 \text{ input image}$$

where $h(x,y)$ is, for example, an operator for detecting lines forming the input image.

Another method of emphasizing the frame is to used a high-pass filter. To be more specific, the input image data is subjected to Fourier transformation and then input to the high-pass filter. The filter emphasizes the high-frequency component of the image data, performing inverse Fourier transformation on the input image data.

In order to emphasize the input image uniformly, the edge-emphasis may be performed after shifting each pixel of the reference image by a predetermined distance (e.g., ½ pixel width, ⅓ pixel width, or the like), interpolating the pixel, and inputting the pixel to the image-synthesizing circuit 121. FIG. 41 shows a modification of the tenth embodiment (FIG. 40) in which an edge-emphasizing circuit 127 is connected to the output of an image-synthesizing circuit 121 so that the synthesized image data output by the circuit 121 may be edge-emphasized uniformly.

Figure 45A:
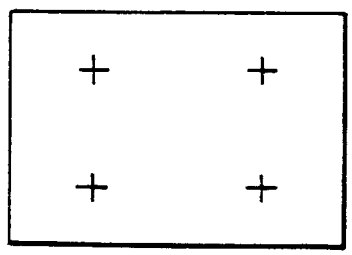
FIGS. 45A, 45B, and 45C are diagrams showing three alternative reference patterns which are alternatively used in the eleventh embodiment.
Figure 45B:
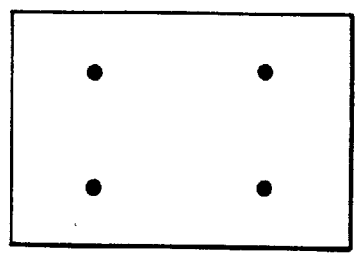
Figure 45C:
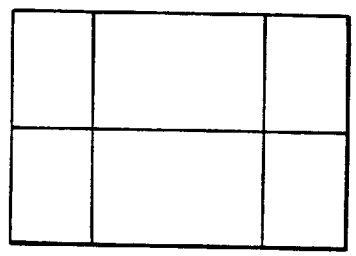

An image processing apparatus, which is an eleventh embodiment of the invention, will be described with reference to FIGS. 43 and 44, FIGS. 45A to 45C, and FIGS. 46A and 46B. As can be understood from FIGS. 43 and 45 which show the eleventh embodiment, the embodiment is characterized in that the displacements of CMDs 8 and 9 are detected by using a reference image which has such a specific pattern as shown in FIGS. 45A, 45B, or 45C. If the case of the image pattern of FIG. 45A, the positions of the intersections of the crosses are measured with high precision. In the case of the pattern of FIG. 45B, the positions of the dots are measured with high precision. In the case of the pattern image of FIG. 45C, the positions of the intersections of the lines are measured with high precision.

Figure 43:
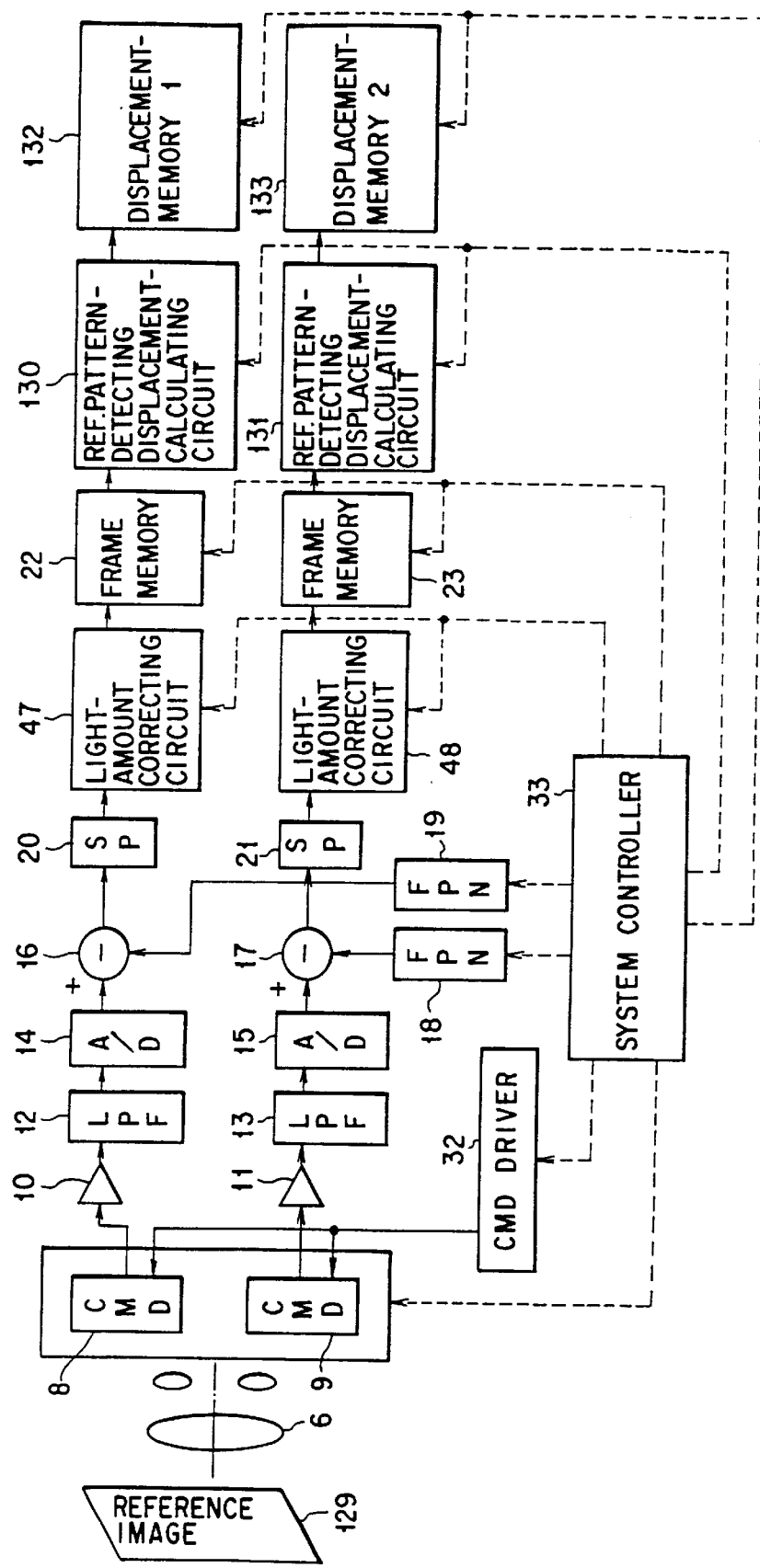
FIGS. 43 and 44 are block diagram showing an image processing apparatus according to an eleventh embodiment of this invention.
Figure 44:
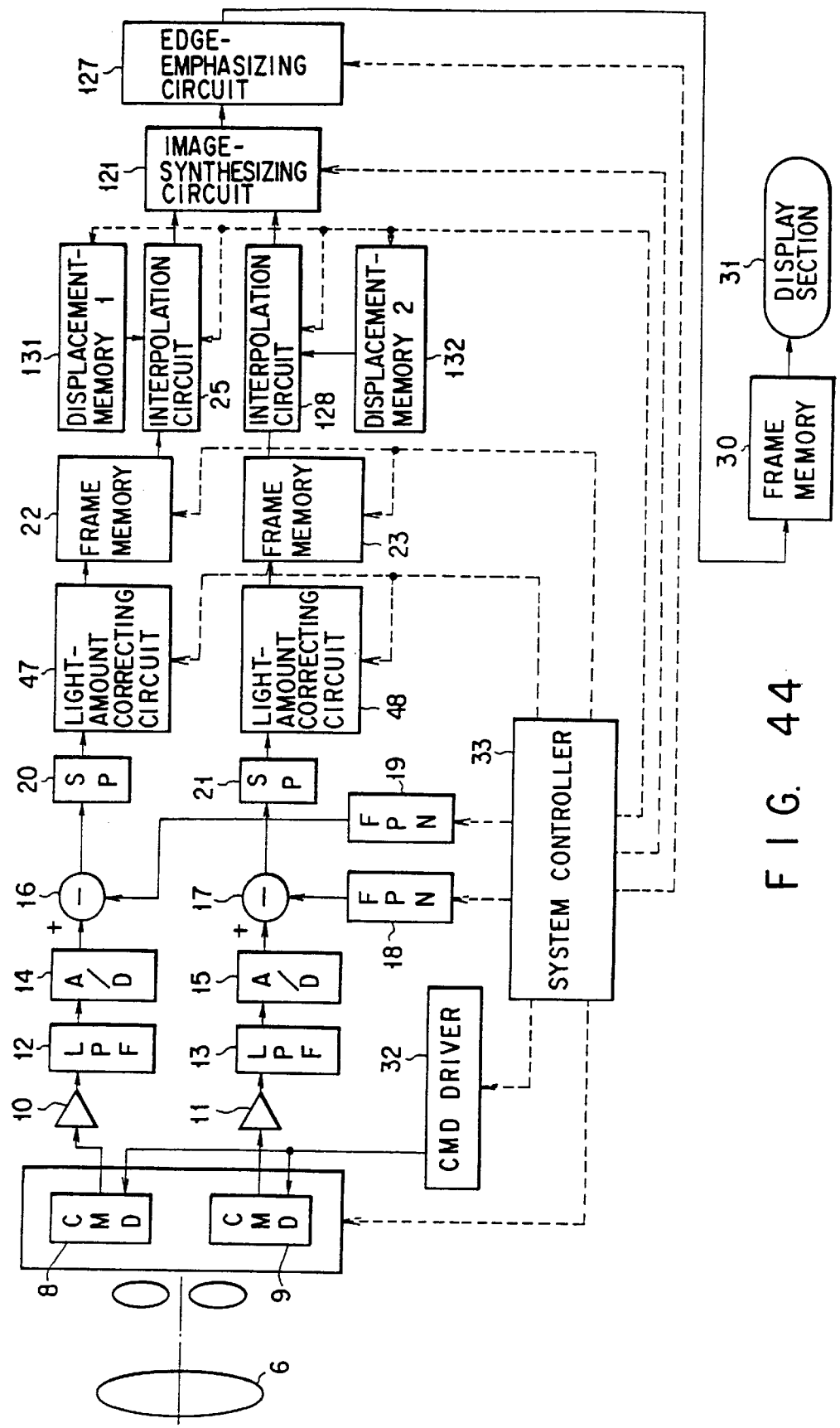

The reference image is photographed, whereby the CMDs 8 and 9 generate image data items representing a left half-image and a right half-image, respectively, as can be understood from FIG. 43. The data items representing these half-images are input to reference pattern-detecting and displacement-calculating circuits 130 and 131, respectively. The circuits 130 and 131 detect the half-images of the reference pattern and calculate the displacements (each consisting of a shift distance and a rotation angle) of the half-images, i.e., the displacements of the CMDs 8 and 9, from the data representing the positions of the intersections of the crosses or lines defining the image patterns (45A, 45B, or 45C). The displacements, thus calculated, are stored into displacement memories 132 and 133. Then, the displacements stored in the memories 132 and 133 are processed in the same way as in the tenth embodiment, as can be understood from FIG. 44.

Various methods can be utilized to detect the reference patterns. To detect the pattern of FIG. 45A or 45C, the vicinity of each line may be tracked. To detect the pattern of FIG. 45B, the center of each dot may be detected. Many patterns other than those of FIGS. 45A, 45B and 45C can be used in the eleventh embodiment.

Owing to the use of a reference image, the displacements of the CMDs 8 and 9 can be detected even if the half-images have each so narrow an overlap region that any correlation cannot help detect the displacements of the corresponding CMD. In this respect the eleventh embodiment is advantageous.

Another image processing apparatus, which is a twelfth embodiment of the invention, will be described with reference to FIGS. 46A and 46B, FIG. 47, and FIGS. 48A and 48B. As is evident from FIG. 47, the embodiment is characterized by the use of a reference pattern filter 135 through which to apply an optical image of an object to an objective lens 6.

Figure 46A:
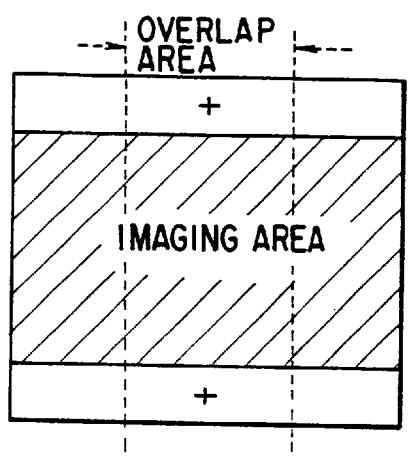
FIGS. 46A and 46B are diagrams showing two types of reference pattern filters which are alternatively incorporated in an image processing apparatus according to a twelfth embodiment of the invention.
Figure 46B:
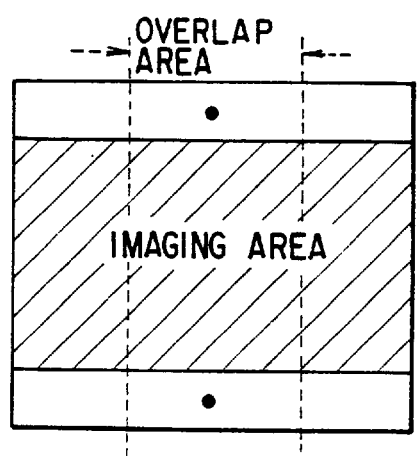

The reference pattern filter 135 is either the type shown in FIG. 46A or the type shown in FIG. 46B. The pattern filter of FIG. 46A has a reference pattern which consists of two crosses located at the upper and lower portions of the overlap region, respectively. The pattern filter of FIG. 46B has a reference pattern which consists of two dots located at the upper and lower portions of the overlap region, respectively. The reference pattern of either type is read along with the input image halves.

Figure 47:
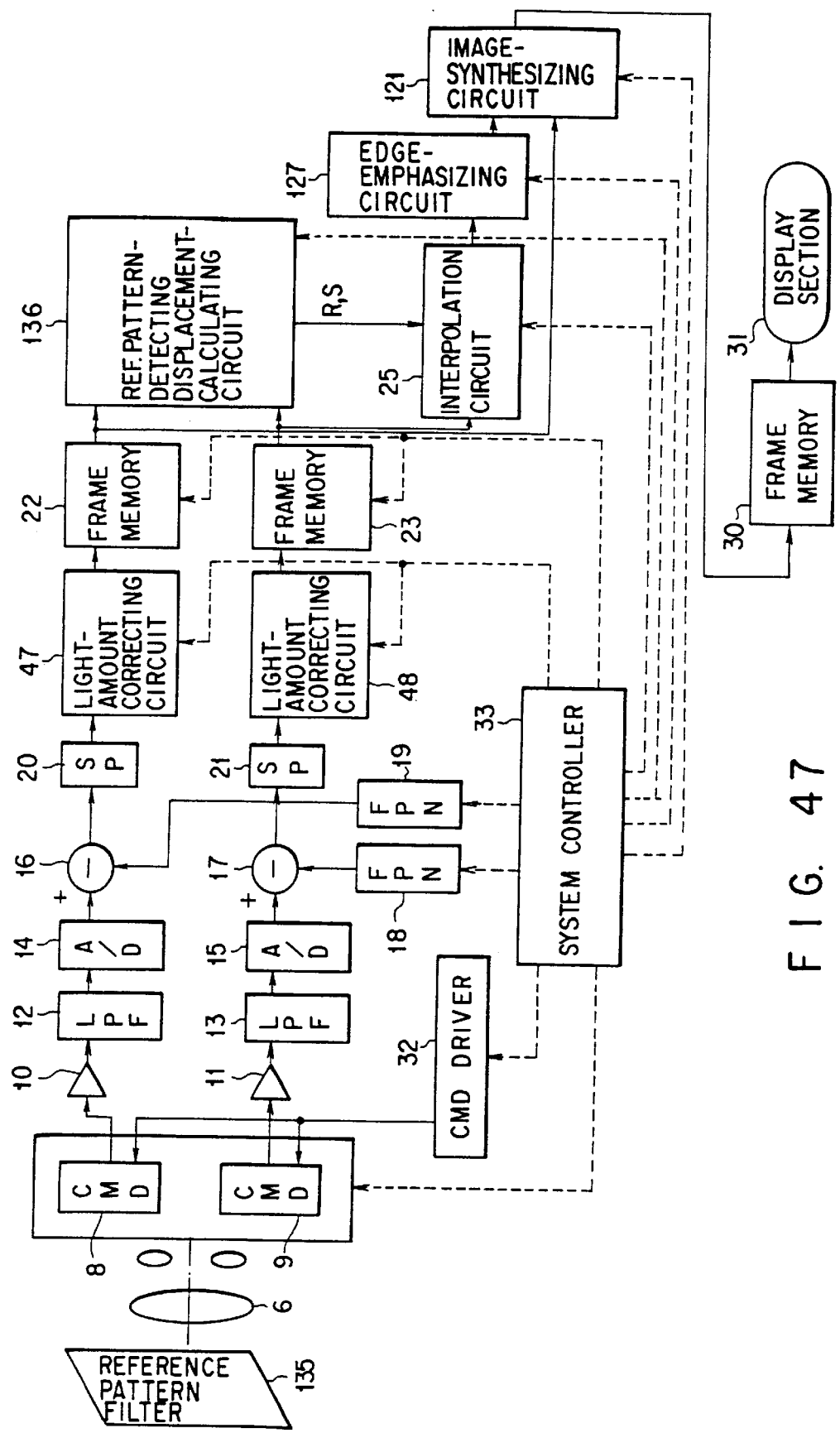
FIG. 47 is a block diagram showing the apparatus which is the twelfth embodiment of this invention.

As FIG. 47 shows, the twelfth embodiment has a reference pattern-detecting and displacement-calculating circuit 136 which detects the reference pattern from the upper and lower edge portions of the overlap region. More specifically, the circuit 136 detects the reference pattern of FIG. 46A by tracking the vicinity of each of the lines forming the crosses, and detects the reference pattern of FIG. 46B by detecting the center of each dot. The circuit 136 determines the displacements of the left and right halves of the input image from the reference pattern. Thereafter, the same sequence of operations is carried out as in the tenth embodiment. The reference pattern filter 135 is useful and effective, particularly in the case where the input image is one reproduced from silver salt film.

The twelfth embodiment can fast determine the positional relation between the left and right halves of the input image. Since the reference pattern filter 135 is used, the relative positions of the image halves can be detected more accurately than otherwise. The filter 135 may be removed from the optical path of the objective lens 6, thereby modifying the system structure quite easily.

Figure 48A:
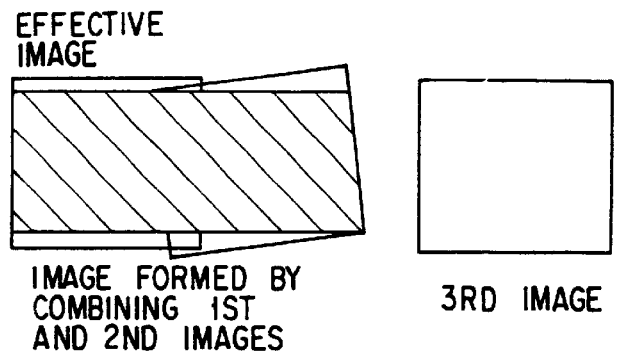
FIGS. 48A and 48B are diagrams explaining how a synthesized image is rotated with respect to another image before being combined with the other image.
Figure 48B:
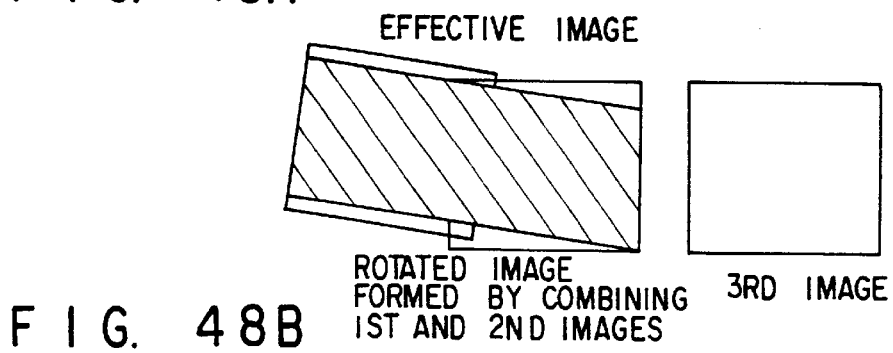
Figure 49:
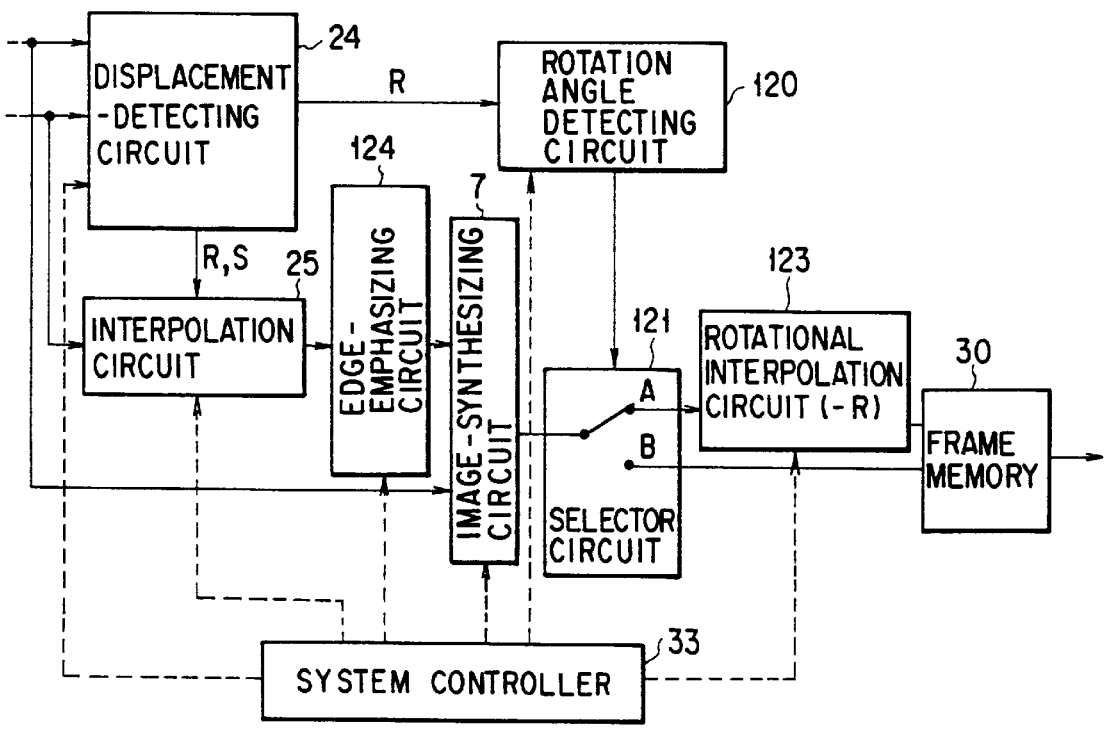
FIG. 49 is a block diagram showing an image processing apparatus according to a thirteenth embodiment of the invention, in which a synthesized image is rotated as shown in FIGS. 48A and 48B.

An image processing apparatus according to a thirteenth embodiment of the invention will be described with reference to FIGS. 48A and 48B and FIG. 49. This embodiment is identical to the tenth embodiment (FIG. 40), except that a rotation-angle detecting circuit 120 and a rotational interpolation circuit 123 are used so that three or more image parts may be combined into a single image. The thirteenth embodiment is designed to prevent erroneous detection of the correlation among images even if there are many images to be combined and one image is greatly rotated with respect to another as is shown in FIG. 48A.

The rotation angle R detected by a displacement-detecting circuit 24 is input to the rotation-angle detecting circuit 120. From the angle R, the circuit 120 determines whether or not the synthesized image output by an image-synthesizing circuit 7 should be processed by the rotational interpolation circuit 123. To be more precise, the circuit 120 connects the movable contact of a selector circuit 121 to the fixed contact A thereof if the angle R is greater than a threshold value as is shown in FIG. 48A. In this case, the synthesized image is input to the rotational interpolation circuit 123. The circuit 123 rotates the image by angle of −R as is illustrated in FIG. 48B, and then combines the image with a third image. The resultant image, i.e., a combination of three images, is stored into a frame memory 30.

If the angle R is equal to or less the threshold value, the rotation-angle detecting circuit 120 connects the movable contact of a selector circuit 121 to the fixed contact B thereof. In this case, the synthesized image is stored directly into the frame memory 30.

When the thirteenth embodiment is employed to combine three or more images into a single image, the rotation-angle detecting circuit 120, the selector circuit 121, and the rotational interpolation circuit 123 cooperate to prevent erroneous correlation of images, i.e., mis-matching of images.

Another image processing apparatus, which is a fourteenth embodiment of the invention, will be described with reference to FIGS. 50A and 50B and FIG. 51. The fourteenth embodiment is identical to the tenth embodiment (FIG. 40), except that a circuit 125 is used which is designed to detect the ends of a border line. This embodiment is utilized to combine three or more images into one image.

If there are many images to combine, the right edge of the region over which a first image adjoins a second image may incline as shown in FIG. 50A, and an undesired portion may be formed when the second image is combined with a third image by the process described with reference to FIGS. 38 and 39 since the center of the adjoining region is used as the center in said process. The fourteenth embodiment is designed to prevent the forming of such an undesired portion.

As is shown in FIG. 51, the data representing a left image is supplied to the circuit 125. The circuit 125 detects ends A and B of the right order line of the image. The coordinates values of the end A, whose y-coordinate is less than that of the end B, is input to an image-synthesizing circuit 7. The circuit 7 uses the y-coordinate of the end A, defining the right edge of the region over which the second and the third image adjoin as shown in FIGS. 50A and 50B. Then, as FIG. 50B shows, the circuit 7 combine the synthesized image with the next image such that the point A defines the right edge of the adjoining region and the adjoining region is positioned with its center line passing a midpoint between the point A and the left edge of the overlap region.

In the fourteenth embodiment, the circuit 125 detects the ends A and B of the right border line of the left image, and the image-synthesizing circuit 7 uses the y-coordinate of the end A which is less than than that of the end B, defining the right edge of the adjoining region. As a result of this, an undesired portion is eliminated from the adjoining region.

Figure 54:
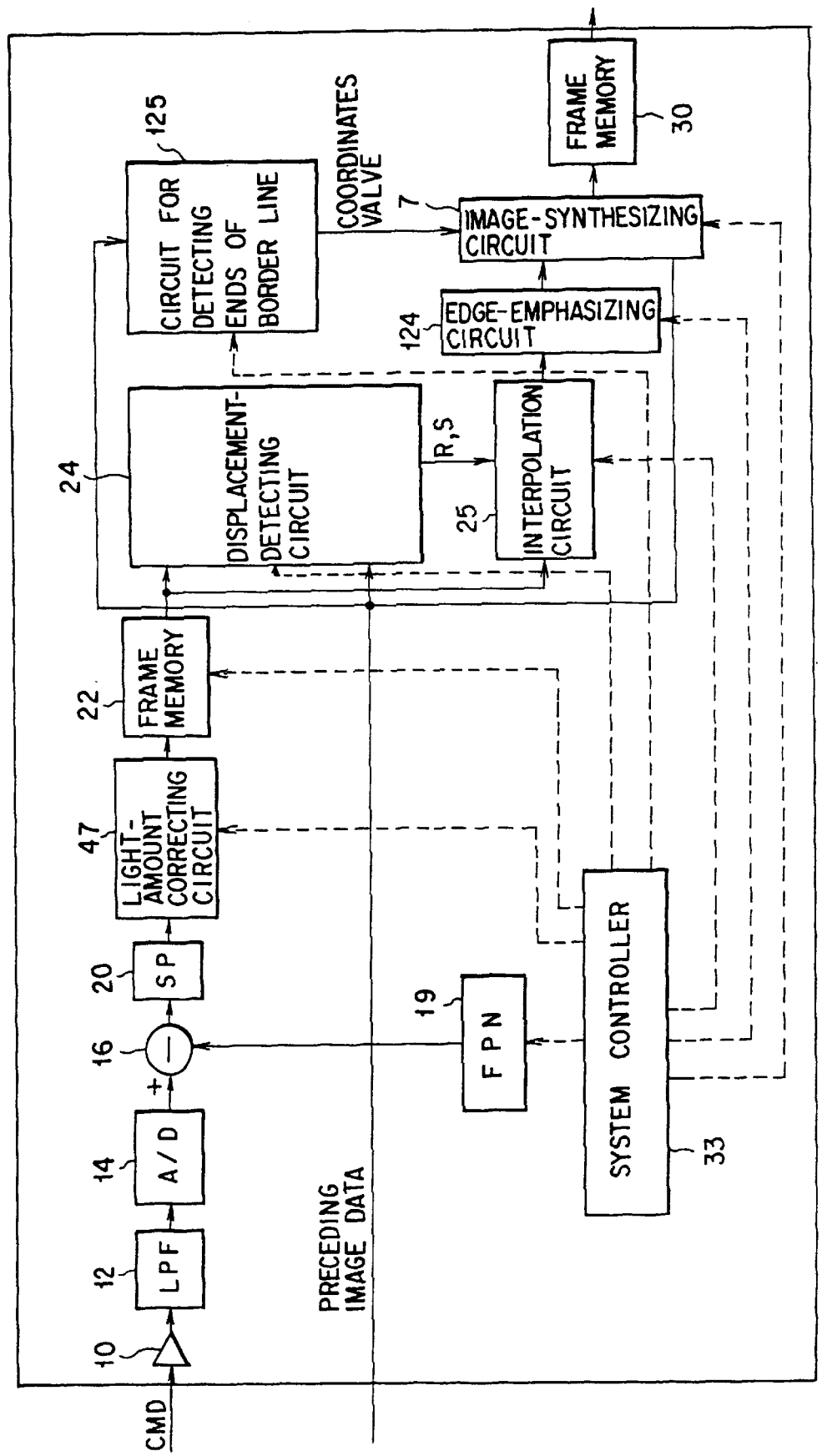
FIG. 54 is a block diagram showing one of identical second-type synthesis sections used in the apparatus shown in FIG. 53.

Another image processing apparatus according to a fifteenth embodiment of the present invention will be described, with reference to FIGS. 52, 53, and 54. As is shown in FIG. 53, the fifteenth embodiment comprises 16 CMDs, a first-type synthesis section, and second-type synthesis sections. Each CMD has a 4000×500 pixel matrix and outputs image data showing an image overlapping the image formed by another CMD for about 60-pixel distance. The synthesis sections combine 16 image data items output by these CMDs into a single image having resolution as high as 4000×6000 which is the resolution achieved by silver-salt film.

The first-type synthesis section has the structure shown in FIG. 52. Each of the second-type synthesis sections has the structure shown in FIG. 54. Each second-type synthesis section is connected to receive two inputs. The first input is an image signal supplied from a CMD, and the second input is the image data read from the frame memory 30 of the preceding second-type synthesis section. The second input is input directly to a displacement-detecting circuit 24. Each second-type synthesis section has a circuit 125 for eliminating an undesired portion of the adjoining region of a synthesized input image. The circuit 125 serves to eliminate an undesired portion from the adjoining region of a synthesized image.

As can be understood from FIG. 53, the image signals the 16 CMDs have generated are processed in 16 image-synthesizing steps. The image processing apparatus according to the fifteenth embodiment can, therefore, form an image having high resolution comparable with the resolution of 4000×6000 which is accomplished by silver-salt film.

Figure 55:
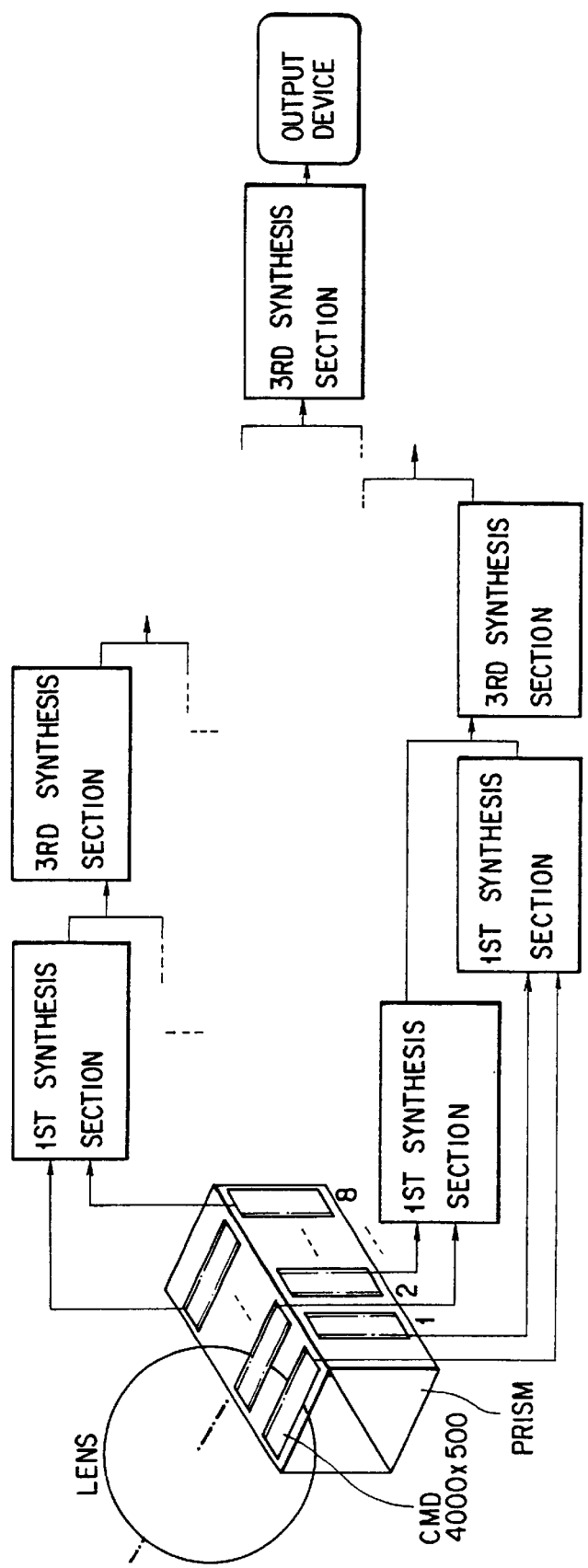
FIG. 55 is a diagram showing an image processing apparatus according to a sixteenth embodiment of the present invention.
Figure 56:
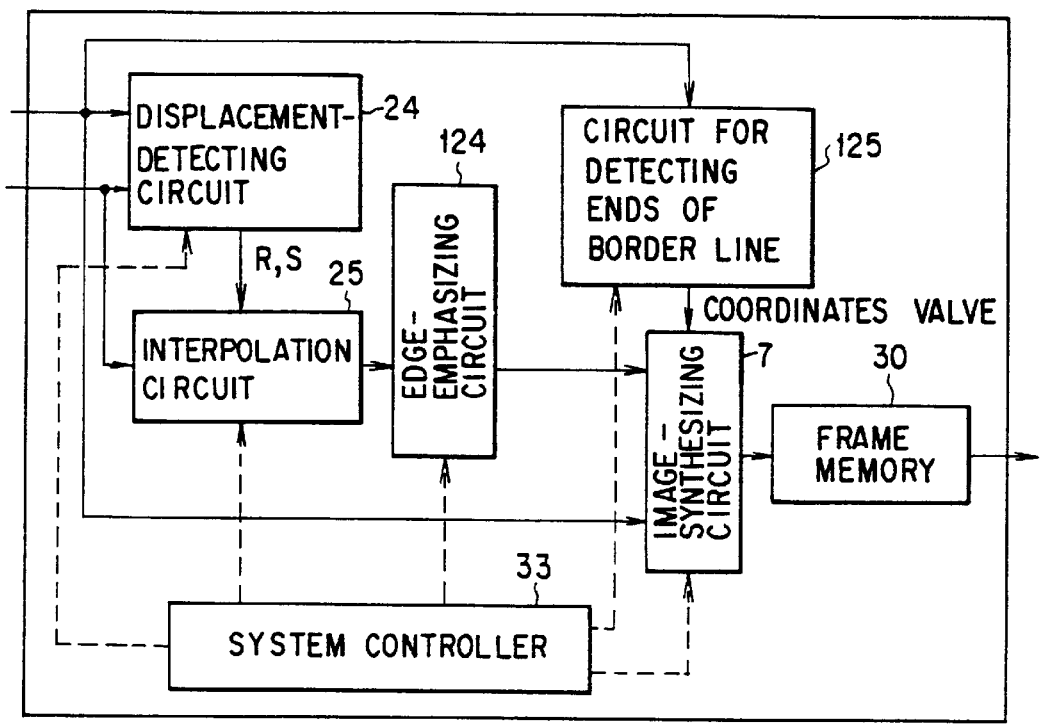
FIG. 56 is a block diagram showing one of the identical third-type synthesis sections used in the sixteenth embodiment.

An image processing apparatus, which is a sixteenth embodiment of the invention, will be described with reference to FIGS. 55 and 56. As is evident from FIG. 55, this embodiment is similar to the fifteenth embodiment (FIG. 53), comprising 16 CMDs, first-type synthesis sections, and third-type synthesis sections. The first-type synthesis sections are identical to the first-type synthesis section incorporated in the fifteenth embodiment and shown in detail in FIG. 52. The third-type synthesis sections are identical and have the structure illustrated in FIG. 56.

In each of the third synthesis sections, the two data items read from the frame memories 30 of the preceding two synthesis sections are input to the displacement-detecting circuit 24. Each third synthesis section has a circuit 125 for eliminating an undesired portion of the adjoining region of a synthesized input image.

The sixteenth embodiment performs many image syntheses in parallel to shorten the time for forming a synthesized image. More specifically, it produces a synthesized image in four sequential steps only, whereas the fifteenth embodiment forms a synthesized image in 15 sequential steps. Obviously, the sixteenth embodiment can effect image-synthesizing faster than the fifteenth embodiment.

In the fifteenth and sixteenth embodiments, 16 CMDs each having 4000×500 pixels are utilized. Nonetheless, more or less imaging devices of having the same number of pixels or a different number of pixels may be incorporated, if necessary, in either embodiment.

Figure 57:
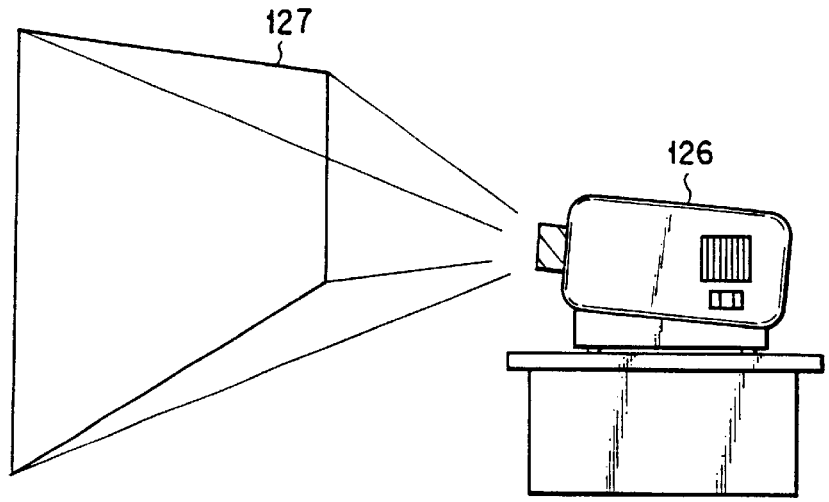
FIG. 57 is a side view of a projector which is a seventeenth embodiment of the invention.
Figure 58:
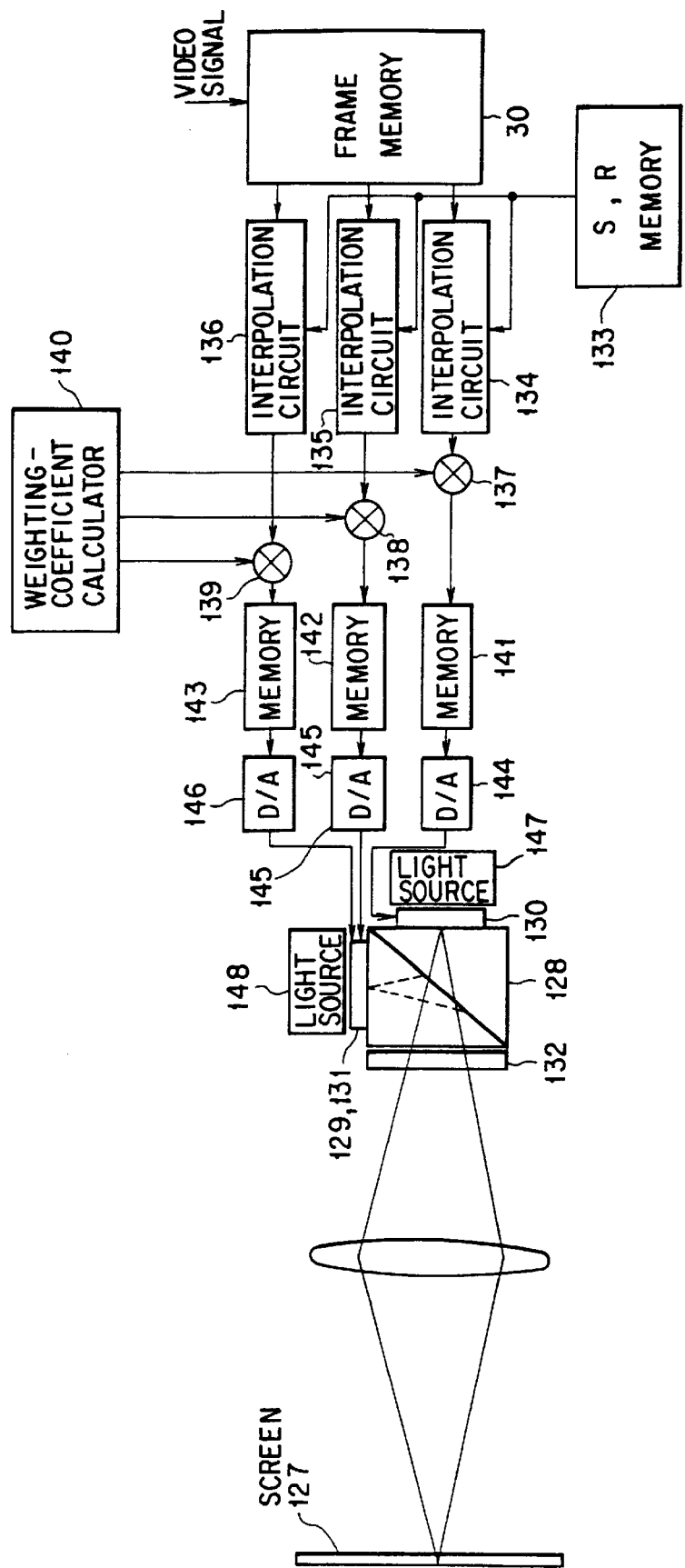
FIG. 58 is a block diagram of the imaging section of the projector shown in FIG. 57.

A projector, which is a seventeenth embodiment of this invention, will be described with reference to FIGS. 57 to 62. As shown in FIG. 57, the projector 126 is designed to project a plurality of images to a screen 127, which are combined into a single image on the screen 127. As is shown in FIG. 58, the projector 126 has a half prism 128 and three LCDs (Liquid-Crystal Displays) 129, 130, and 131. The LCDs display images, which are projected onto the screen 127 and combined thereon into a single image. As will be explained, the projector 126 can form a combined image with virtually no discontinuity even if the LCDs 129, 130, and 131 are not positioned precisely.

Figure 59:
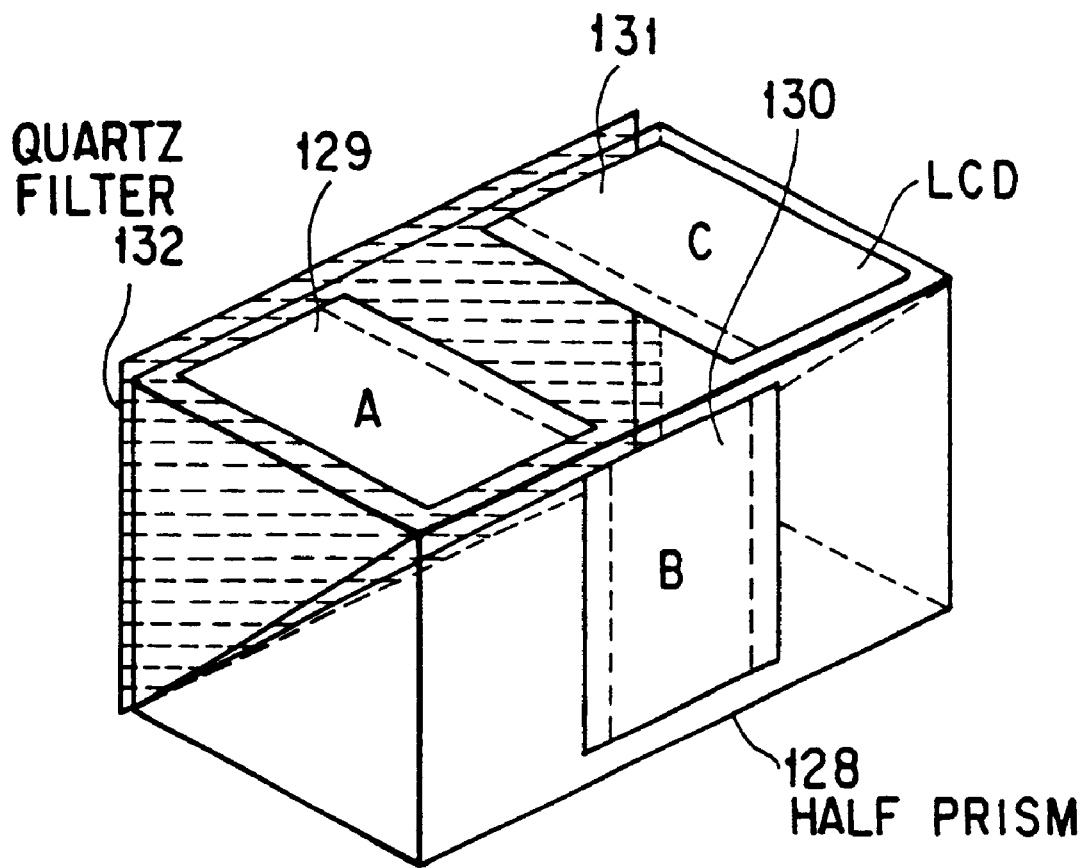
FIG. 59 is a perspective view showing the half prism and the components associated therewith—all incorporated in the projector.

As shown in FIG. 59, the LDCs 129, 130, 131 are mounted on the half prism 128. The are so positioned that the images projected from them will be combined on the screen 127 into a single image which has overlap regions. A quartz filter 132 is placed in front of the light-emitting surface of the half prism 128. The filter 132 functions as a low-pass filter for preventing the individual pixels of each LCD from being visualized on the screen 127 to degrade the quality of the projected image.

As is shown in FIG. 58, the seventeenth embodiment has an S,R memory 133 for storing the displacements (i.e., a distance S and a rotation angle R) of the LCD 129, 130, and 131 which are determined in a specific method, which will be described later.

Video signals, or image data representing an image to form on the screen 127 is stored into the frame memory 30. The image data is divided into three data items representing three images which the LCDs 129, 130, and 131 are to display. The three data items are input to the interpolation circuits 134, 135, 136, respectively. The circuits 134, 135, and 136 execute interpolation on the input data items in accordance with the displacement data read from the S,R memory 133, so that the divided images projected onto the screen 127 from the LCDs 129, 130, and 131 form a single image with no discontinuity.

The interpolated data items are supplied to multipliers 137, 138, and 139, respectively. The weighting coefficient calculator 140 calculates weighting coefficients in the same way as in the ninth embodiment, as has been explained with reference to FIG. 39. The weighting coefficients are supplied to the multipliers 137, 138, and 139. The multipliers 137, 148, and 139 multiply those pixel signals of the interpolated data items which represent the overlap regions of three images to be projected onto the screen 127 by the weighting coefficients supplied from the calculator 140. The brightness of each overlap region will therefore be adjusted. All pixel signals output from the multiplier 137 are stored into the memory 141; all pixel signals output from the multiplier 138 into the memory 142; and all pixel signals output from the multiplier 139 into the memory 143. The pixel signals read from the memory 141 are input to the D/A converter 144; the pixel signals read from the memory 142 to the D/A converter 145; and the pixel signals read from the memory 143 to the D/A converter 147. The D/A converters 146, 144, and 147 convert the input signals to three analog image data items, which are supplied to the LCDs 129, 130, and 131. Driven by these analog data items, the LCDs display three images, respectively. A light source 147 applies light to the LCD 130, and a light source 148 applies light to the LCDs 129 and 131. Hence, three beams bearing the images displayed by the LCDs 129, 130, and 131, respectively, are applied to the screen 127 through the half prism 128 and the quartz filter 132. As a result, the three images are combined on the screen 127 into a single image.

Because of the LCDs used, the seventeenth embodiment can be a projector which can project a high-resolution image on a screen. Since the interpolation circuits 134, 135, and 136 and the S,R memory 133 cooperate to compensate for the displacements of the LCDs 129, 130, and 131, it is unnecessary to position the LDCs with high precision. In addition, since the multipliers 137, 138, and 139 multiply the pixel signals which represent the overlap regions of three images to be projected on the screen 127 by the weighting coefficients, the overlap regions are not conspicuous. Further, the quartz filter 132 prevents the images of the individual LCD pixels from being projected onto the screen 127, increasing the quality of the image formed on the screen 127. Three other quartz filters may be used, each for one LCD.

With reference to FIG. 60, it will now be explained how to detect the displacement of the LCDs 129, 130, and 131.

As FIG. 60 shows, a displacement-detecting mirror 149 is interposed between a lens 6 and the quartz filter 132. The mirror 149 is inclined so as to receive the images projected from the LCDs 129, 130, and 131 and reflect them to a CCD 150 through a focusing lens 156. Hence, three images identical to those projected onto the screen 127 can be focused on the light-receiving surface of the CCD 150.

To detect the displacement of the LCDs 129, 130, and 131, three reference data items representing three reference images which are greatly correlated and not displaced at all (S=R=0) are input to the interpolation circuits 134, 135, and 136, respectively. The circuits 134, 135, and 136 do not process the input data items at all, and the multipliers 141, 142, and 143 multiply these data items by a weighting coefficient of "1."

At first, the first data item is supplied to the LCD 129, which displays the first reference image. The mirror 149 reflects the first reference image, and the lens 156 focuses it on the CCD 150. The CCD 150 converts the first reference image into analog signals, and an A/D converter 151 converts the analog signals to digital data. The digital data is stored into a memory 153 through a switch 152 whose movable contact is connected to the fixed contact a which in turn is connected to the memory 153.

Next, the second data item is supplied to the LCD 130, which displays the second reference image. The second reference image is focused on the CCD 150 in the same way as the first reference image. The second reference image is converted into analog signals and hence to digital data, in the same way as the first reference image. In the meantime, the movable contact of the switch 152 is moved and connected to the fixed contact b which is connected to a memory 154. As a result, the digital data representing the second reference image is stored into the memory 154. The data items stored in the memories 153 and 154 are read to an S,R detector 155. The detector 155 detects the displacement of the second reference image with respect to the first reference image, and produces data representing the displacement. The displacement data is stored into an S,R memory 133.

Then, the third data item is supplied to the LCD 130, which displays the third reference image. The third reference image is focused on the CCD 150 in the same way as the first reference image. The third reference image is converted into analog signals and hence to digital data, in the same way as the first reference image. Meanwhile, the movable contact of the switch 152 is moved and connected to the fixed contact a which is connected to the memory 153, and the digital data representing the third reference image is stored into the memory 153. The data items stored in the memories 153 and 154 are read to the S,R detector 155. The detector 155 detects the displacement of the third reference image with respect to the second reference image, and produces data representing the displacement. The displacement data is stored into the S,R memory 133.

Figures 42A, 42B, 42C, 42D:
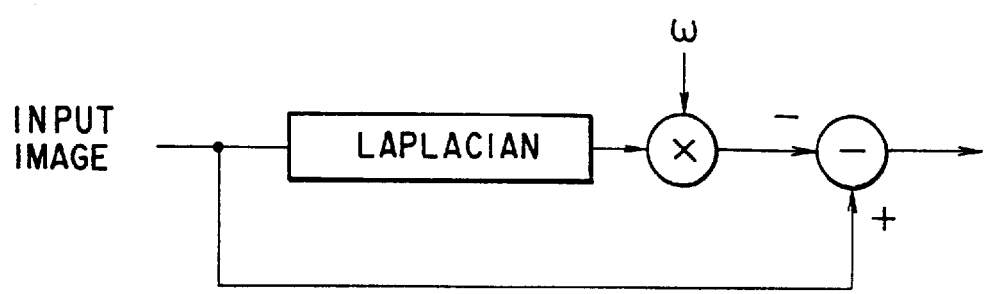
FIGS. 42A, 42B, and 42C are diagrams showing various operators which are used as weighting coefficients in the apparatus shown in FIG. 40.
FIG. 42D is a block diagram showing an edge-emphasizing circuit of FIG. 40.

Hence, with the projector it is possible to detect the displacements of the LCDs 129, 130, and 131. To obtain the three reference data items, use may be made of a reference image similar to the one used in the eleventh embodiment (FIGS. 42A, 42B, 43C).

The mirror 149, which is used to detect the displacements of the LCDs 129, 130, and 131, may be replaced by a half mirror 156 as is shown in FIG. 61. In this case, the reference image displayed by each LCD is projected onto the screen 127, and the light reflected from the screen 127 is applied to the half mirror 156, which reflects the light to the CCD 150. Alternatively, a camera may be used exclusively for detecting the displacements of the LCDs 129, 130, and 131.

Figure 62:
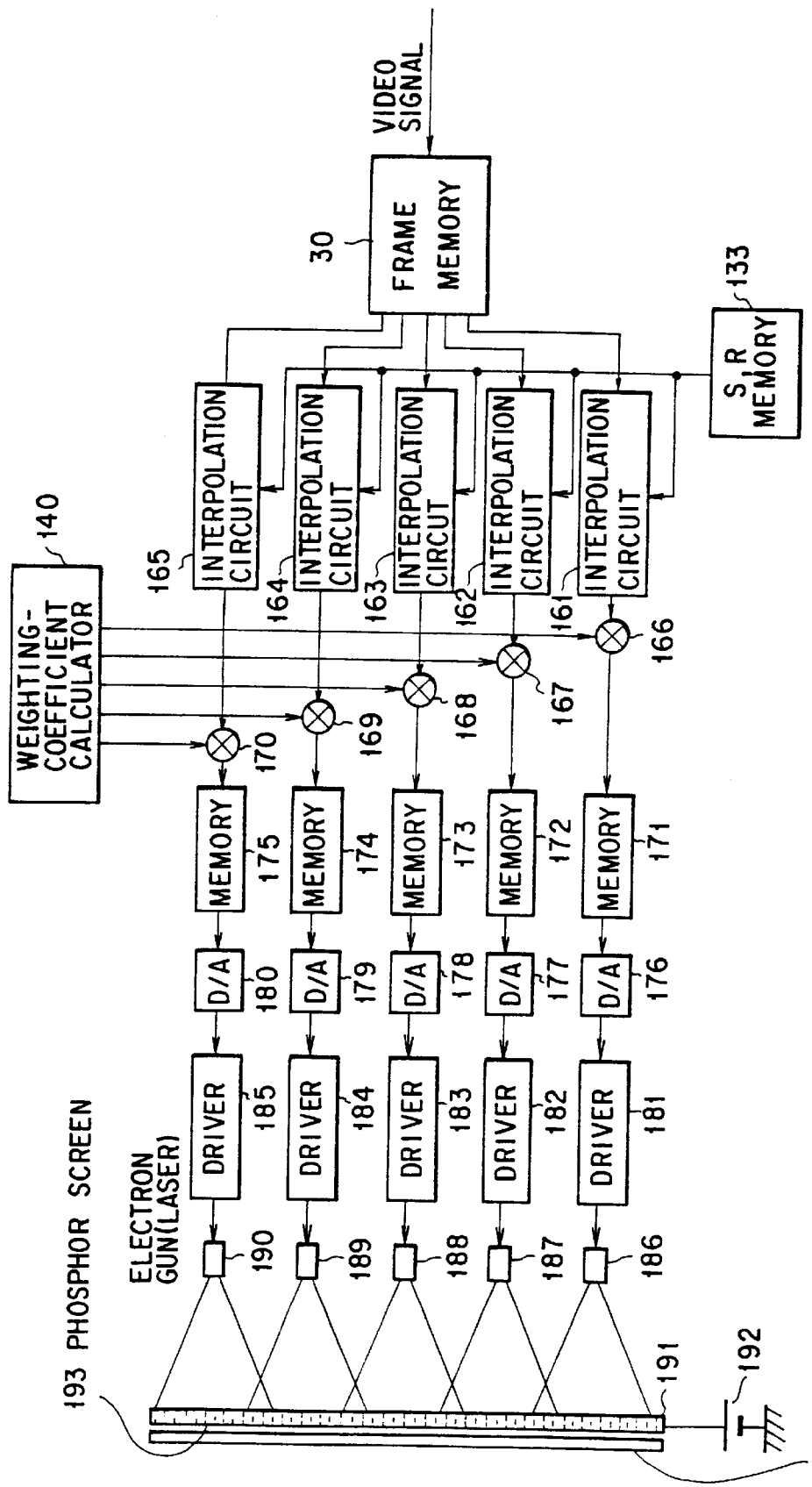
FIG. 62 is a CRT monitor according to the present invention.
Figure 63:
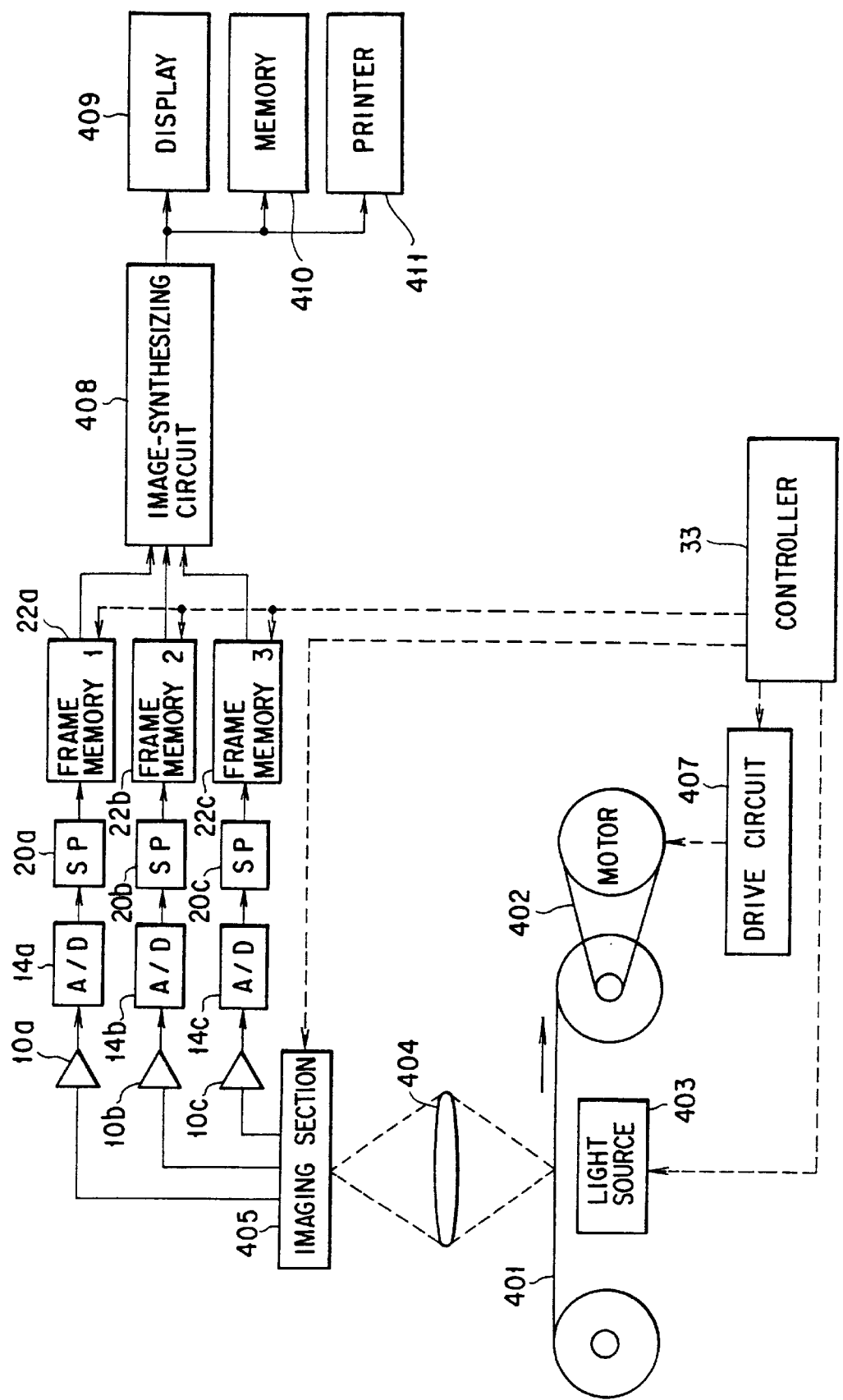
FIG. 63 is a block diagram of a film-editing apparatus which is an eighteenth embodiment of this invention.

The present invention can be applied to a CRT monitor of the structure shown in FIG. 62. As FIG. 62 shows, the CRT monitor comprises interpolation circuits 161 to 165, electron guns 186 to 190, a phosphor screen 193, and a spatial filter 194. The electron guns 186 to 190 emit electron beams to the screen 193, thereby forming parts of an image. The interpolation circuits 161 to 165 process the data items representing the image parts. As a result, the image parts will be moved linearly and rotated on the screen 193, compensating the displacements of the electron guns with respect to their desired positions, and forming an image having no discontinuity. The spatial filter 194 is a low-pass filter such as a quartz filter.

Since a plurality of electron guns are used, the distance between the phosphor screen 193 and the beam-emitting section is shorter than in the case where only one electron gun is used. The electron guns 186 to 190 may be replaced by, for example, lasers or a unit comprising LEDs (having a lens) and micro-machine mirrors.

The distortion of image, caused by electromagnetic deflection, may be eliminated by means of the interpolation circuits 161 to 165. The intervals of the scanning lines, which have changed due to the image distortion, may be utilized to set a cutoff frequency for the spatial filter 194. Further, when lasers are used in place of the electron guns, spatial filters may be located in front of the lasers, respectively.

A film-editing apparatus, which is an eighteenth embodiment of the invention and which incorporates line sensors, will be described with reference to FIG. 63 and FIGS. 64A to 64E.

The film-editing apparatus comprises a loading mechanism 402, a light source 403, a focusing lens 404, an imaging section 405, a drive circuit 407, an image-synthesizing circuit 408, a display 409, a memory 410, and a printer 411.

When driven by the circuit 407, the loading mechanism 402 rewinds film 401. The light source 403 is located opposite to the focusing lens 404, for applying light to the lens 404 through the film 401. The lens 404 focuses the image recorded on the film 401 on the light-receiving surface of the imaging section 405. The section 405 converts the input image into image signals, which are amplified by preamplifiers 10a, 10b, and 10c. The amplified signals are supplied to A/D converters 14a, 14b, and 14c and converted thereby to digital signals. The signal processors 20a, 20b, and 20c perform γ correction and edge emphasis on the digital signals. The digital signals, thus processed, are stored into frame memories 22a, 22b, and 22c.

The image signals read from the frame memories 22a, 22b, and 22c are input to the image-synthesizing circuit 408. The circuit 408, which has a structure similar to that of FIG. 55, processes the input signals, generating three data items representing a red (R) image, a green (G) image, and a blue (B) image. These image data items are output to the display 409, the memory 410, and the printer 411. The imaging section 405 has the structure shown in FIG. 64A. That is, it comprises three line sensors 406a, 406b, and 406c. As is evident from FIG. 64C, each line sensor is equipped with an optical RGB filter.

The film-editing apparatus is characterized in that the line sensors detect images while the film 401 is fed, passing through the gap between the light source 403 and the focusing lens 404, and that the images thus read from the film 401 are combined into a single image. To be more specific, the images A, B, and C which the line sensors 406a, 406, and 406c receive as is shown in FIG. 64B, are combined into a single image which corresponds to one-frame image on the film 401. The images A, B, and C are displaced with respect to one another since the line sensors cannot and are not positioned with precision. Nevertheless, the mutual displacement will be compensated in the film-editing apparatus by means of the technique described above.

The line sensors 406a, 406, and 406c are much more inexpensive than area sensors. Hence, the film-editing apparatus can accomplish high-resolution photographing at a very low cost. If the film 401 is a color one, the apparatus can easily produce color image signals. More line sensors may be used, arranged in staggered fashion, as is shown in FIG. 64D. In this case, the images detected by the sensors are positioned as is illustrated in FIG. 64E.

The film-editing apparatus can be modified in various ways. For example, not the film 401, but the light source 403, the lens 404, and the imaging section 405 may be moved together parallel to the film, thereby to read images from the film 401. Further, each line sensor-RGB filter unit may be replaced by an RGB line sensor which is designed for RGB photography. Still further, the RGB filter (FIG. 64C) may be replaced by a rotating color filter.

An image processing apparatus according to a nineteenth embodiment of the invention will be described with reference to FIGS. 65A and 65B. This embodiment uses CMDs and requires no frame memories whatever for assisting interpolation.

The nineteenth embodiment can perform random access and nondestructive read. The random access is to read the values of a pixel at any given position. The nondestructive read is to read pixel signals as many times as desired, without losing signal charges, up until the pixel signals are reset. Due to the nondestructive read it is possible to use each CMD as a sort of a memory, at least for a relatively short period of time.

Utilizing the random access and the nondestructive read, interpolation can be executed without using frame memories. More precisely, pixel values required for achieving interpolation are read by the random access from the CMDs which are used in place frame memories.

Figures 65A, 65B:
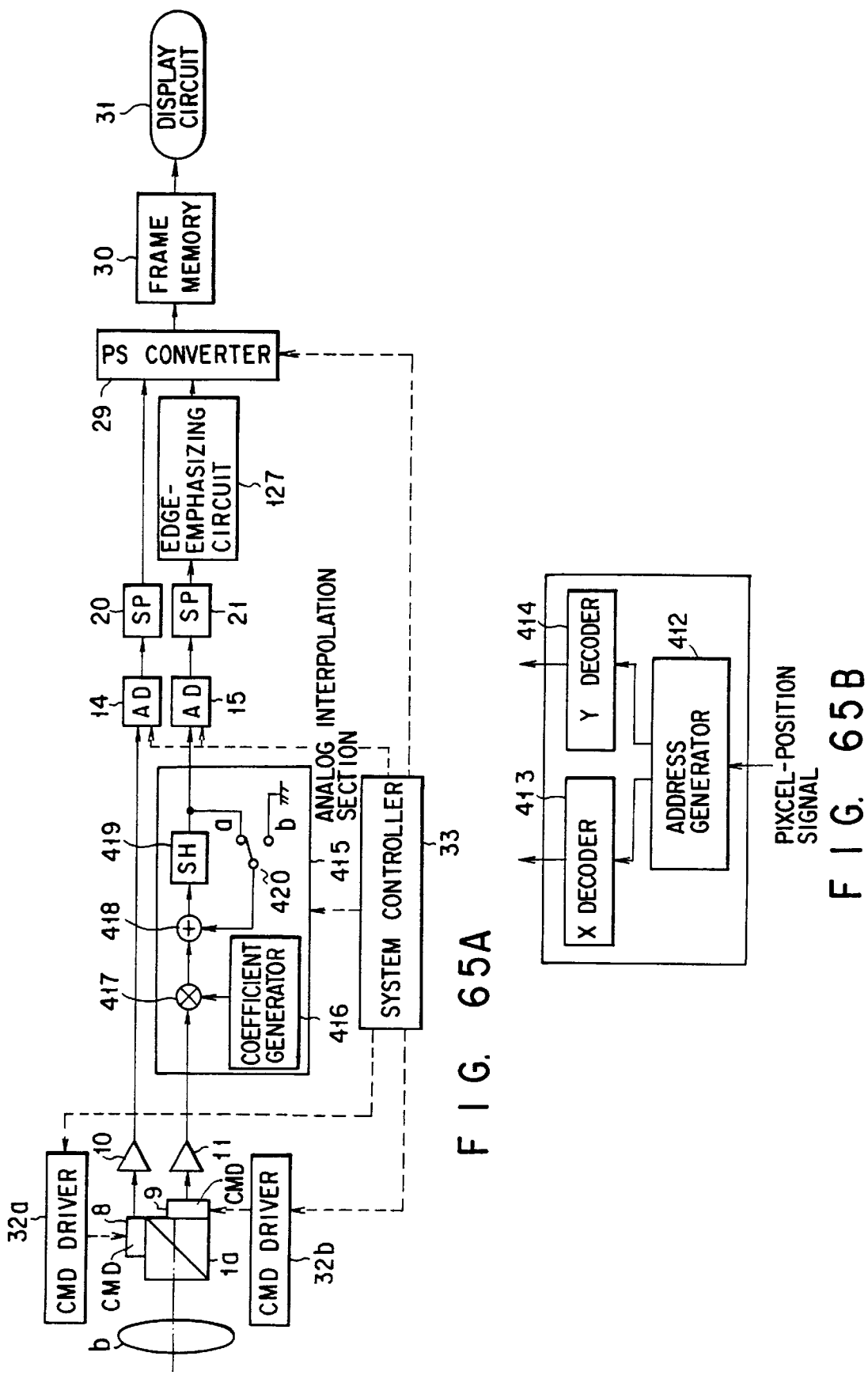
FIGS. 65A and 65B are block diagrams showing, in detail, an image processing apparatus according to a nineteenth embodiment of the invention.

As FIG. 65A shows, the image processing apparatus comprises, among other components, CMD drivers 32a and 32b, a system controller 33, and an analog interpolation section 415.

The CMD drivers 32a and 32b are independently controlled by the system controller 33. They are identical in structure, comprising an address generator 412, an x-decoder 413, and a y-decoder 414 as shown in FIG. 65B. The address generator 412 generates addresses, which are supplied to the x-decoder 413 and the y-decoder 414, respectively. In accordance with the input addresses the decoders 413 and 414 produce pulse signals representing the position of a designated pixel. The pulse signals produced by the CMD driver 32a are supplied to a CMD 8, whereas the pulse signals produced by the CMD driver 32b are supplied to a CMD 9.

The analog interpolation section 415 comprises a coefficient generator 416, a multiplier 417, an adder 418, a sample-hold circuit 419, and a switch 420. The switch 420 connects the output of the sample-hold circuit 419 to either the ground or the adder 418.

The interpolation, which is a characterizing feature of the nineteenth embodiment, will be explained. The interpolation performed in this embodiment is similar to that one which is effected in the first embodiment (FIG. 6). As shown in FIGS. 5A and 5B, the signal representing a pixel $d_{ij}$ (i=1 to u, j=1 to w) is read from the CMD 8, converted to a digital signal, processed, and written into a frame memory 30 at a specified address thereof. In the meantime, a pixel $d_{ij}$ (i=u+1 to u+v, j=1 to w), the four signals representing four pixels located around a pixel $d_{ij}$ (i=u+1 to u+v, j=1 to w) are read from the CMD 9 by means of random access and nondestructive read. The analog interpolation section 415 executes analog operation defined by the equation (9) on the four pixel signals. The pixel signals thus processed are converted to digital signals, which are subjected to edge-emphasis and then written into the frame memory 30 at specified addresses thereof. The same pixel signal can be repeatedly read from the CMD 9, as many times as desired, since it is not destroyed at all whenever read from the CMD 9.

Every time a pixel value is calculated by virtue of analog interpolation, the switch 420 connects the output of the sample-hold circuit 419 to the ground, thereby resetting the circuit 419 to "0." Alternatively, the switch 420 may connect the circuit 419 to the ground only when the value for the first of the four pixels is calculated, and connect the circuit 419 to the adder 418 when the values for the second to fourth pixels are calculated.

The image processing apparatus shown in FIGS. 65A and 65B can combine a plurality of images into one, without using frame memories equivalent to the memories 22 and 23 which are indispensable to the first embodiment (FIG. 6). The apparatus can, therefore, be manufactured at low cost.

The displacements of the CMD 8 and 9 can be measured in the same method as in the first embodiment. The coefficients output by the coefficient generator 416 may be those selected from several typical coefficient sets prepared. If so, the generator 416 can be a small-scale circuit. The PS converter 29 may be replaced by an image-synthesizing circuit of the type illustrated in FIG. 38.

Another image processing (image-reproducing) apparatus, which is a twentieth embodiment of this invention, will be described with reference to FIG. 66. To read images from photographic film by a plurality of line sensors at high speed, so that these images are fast combined and recorded, it is usually necessary to shorten the exposure time of each line sensor. To this end, the amount of light applied to the film must be increased. The light amount can be increased by using a high-power light source, but such a light source has a great size and and consumes much electric power. In the twentieth embodiment, use is made of a special illumination unit.

As shown in FIG. 66, the illumination unit comprises a light source 403, a concave mirror 421, a cylindrical lens 422. The source 403 emits light, the mirror 421 applies the light to the cylindrical lens 422. The lens 422 converts the input light into three converged beams. The beams, which are intense and have an elongated cross-section, are applied to photographic film 401, illuminating only those three portions of the film 401 which oppose the line sensors of the imaging section 405. Hence, image data can be fast input, without using a high-power, large light source.

An image processing apparatus according to a twenty-first embodiment of the invention will be described, with reference to FIGS. 67 and 68, FIGS. 69A to 69D, FIGS. 70A to 70D, FIG. 71, FIGS. 72A and 72B, FIG. 73, and FIGS. 74A and 74B.

Figure 74B:
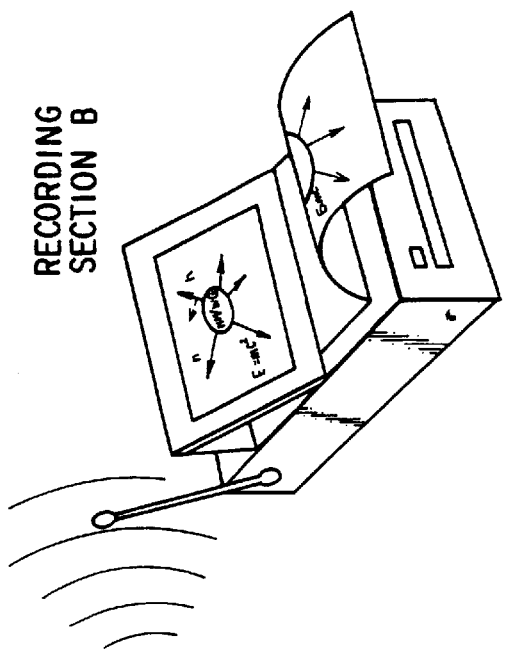
FIGS. 74A and 74B are perspective views of the electronic camera (FIG. 67) and a recording section, explaining how to operate the camera in order to form an image of an object and record the image.
Figure 74A:
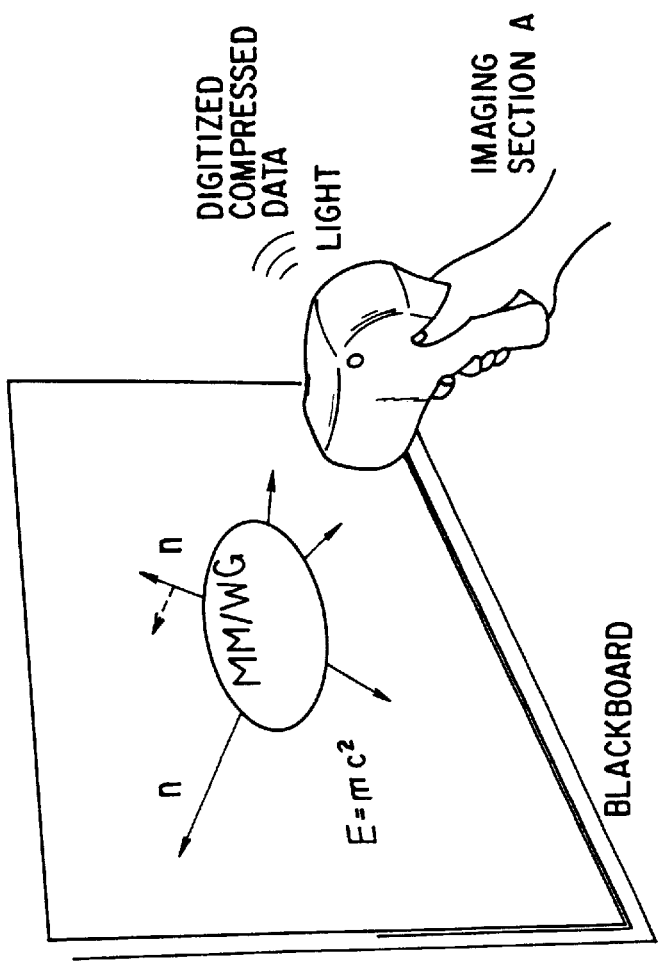

As FIGS. 74A and 74B show, this apparatus comprises two major sections, i.e., a imaging section A and an recording section B. The section A is designed to form an image of an object, and the section B to record or store the image formed by the section A. The image signals data by the imaging section A are transmitted to the recording section B, in the form of optical signals.

In the imaging section A, the image 201 of an object is supplied through an imaging lens system 202, reflected by a mirror 203a, and focused on a CCD 204 (i.e., an imaging device). The mirror 203a is connected at one edge to a shaft 203b and can be rotate around the shaft 230b by means of a drive mechanism (not shown)

To take the image of the object, the drive mechanism intermittently rotates the mirror 203a in the direction of the arrow shown in FIG. 67, whereby the imaging area of the section A shifts over the object as shown in FIGS. 69A to 69D or FIGS. 70A to 70D. As a result, the imaging section A can photograph the object in a wide view. The drive mechanism rotates the mirror 203a intermittently at such timing that any two consecutive frame images overlap at least in part. The mirror 203a may be rotated manually, in which case the drive mechanism can be dispensed with.

The light reflected by the mirror 203a is input to the CCD 204. The CCD 204 converts the light into an image signal, which is supplied to an A/D converter 205. The converter 205 converts the signal into digital image data. The data is digitized by a digitizer 206 by the know method and then compressed by a data-compressing circuit 207. The data is digitized and compressed. As a result, the digital image data is reduced so much that it can be transmitted, in the form of optical signals, from the imaging section A to the recording section B within a short time. However, the data may be damaged while being transmitted, due to the ambient light. To avoid such transmission errors, a circuit 208 adds error-correction codes to the compressed image data by Reed-Solomon method or a similar method. The image data, now containing the error-correction codes, is modulated by a modulator 209 and then supplied to an LED driver 210. In accordance with the input image data, the LED driver 210 drives an LED 211, which emits optical signals 212.

At the recording section B, a light-receiving diode 213 receives the optical signals 212 transmitted from the imaging section A. The signals 212 are demodulated by a demodulator 214, which produces digital image data. The data is input to an error-correcting circuit 215. The circuit 215 eliminates errors, if any, in the data, with reference to the error-correction codes contained in the image data. The image data, thus corrected, is supplied to a data-decoding circuit 216. The corrected image data is temporarily stored in a frame memory A 217.

As indicated above, the mirror 203a is intermittently rotated, thereby shifting the imaging area of the section A intermittently and, thus, photographing the object repeatedly to form a wide-view image thereof. The imaging section A may shake during the interval between any two photographing steps since it it held by hand. If this happen, the resultant frame images of the object may be displaced from one another so much that a mere combination of them cannot make a high-resolution image of the object. To form a high-resolution image, the image data is read from the memory A 217 and input to a shake-correcting circuit 218. The circuit 218, which will be later described in detail, processes the image data, reducing the displacements of the frame images, which have been caused by the shaking of the section A. The data output from the circuit 218 is stored into a frame memory B 219.

The first frame image data (representing the image photographed first) is not processed by the shake-correcting circuit 218 and stored into the frame memory B 219. The circuit 218 processes the second frame image data et seq., converting these frame image data items represent frame images which are connected to the first frame image. These data items are also stored into the frame memory B 219.

Every pixel of the regions, over which the frame images overlap one another, is represented by the average of the values of the pixels defining all frame images, whereby a noise-reduced, high-quality single image will be obtained.

The image data items read from the frame memory B 219 are supplied to a D/A converter 220 and converted to analog image data. The analog data is input to a CRT monitor 221, which displays the image represented by these data items. Alternatively, the image data items read from the memory B 219 are supplied to a printer 222, which prints the image. Still alternatively, the image data are input to a filing device 223 to enrich a data base.

Figure 68:
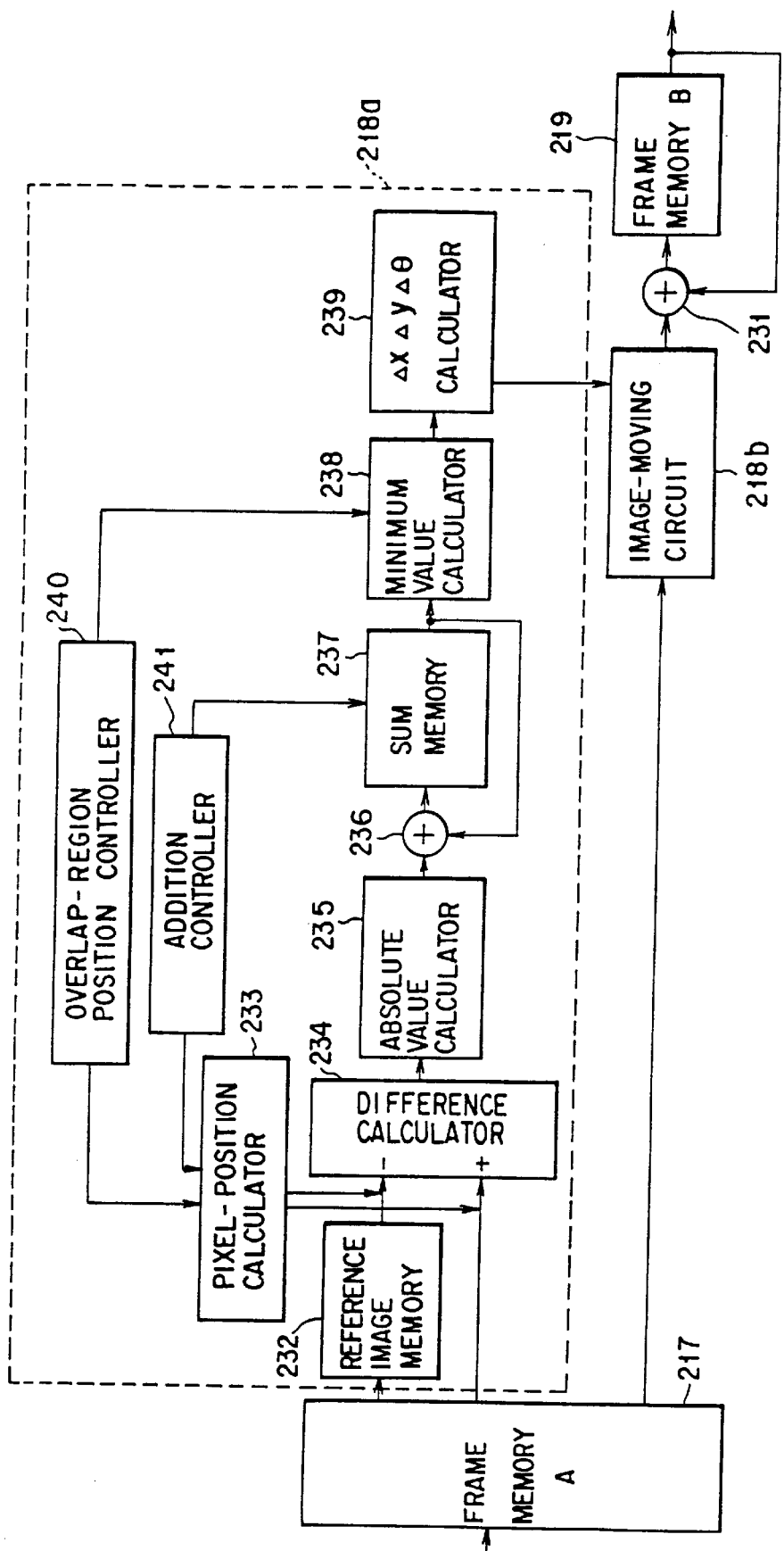
FIG. 68 is a block diagram showing the shake-correcting circuit incorporated in the electronic camera of FIG. 67.
Figure 69D:
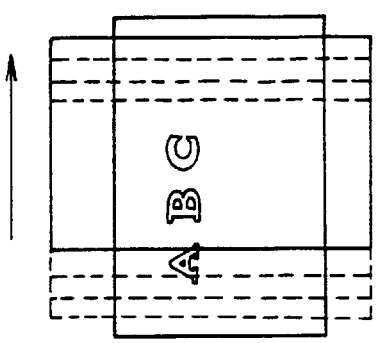
FIGS. 69A to 69D are diagrams explaining how the imaging area of the camera (FIG. 67) moves, without shaking, with respect to the image of an object.
Figure 69C:
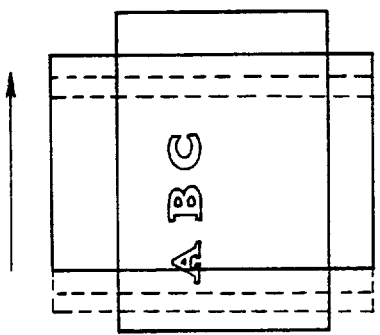
Figure 69B:
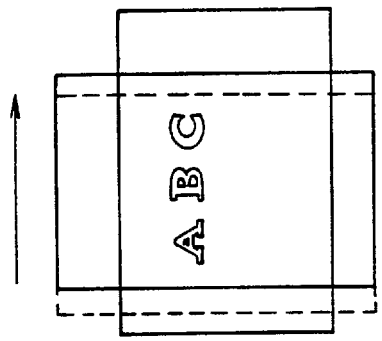
Figure 69A:
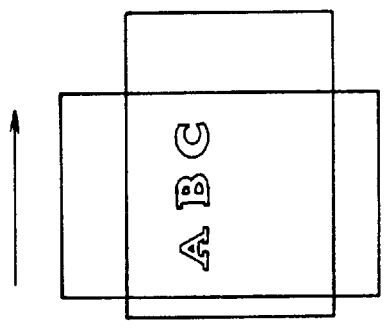
Figure 70D:
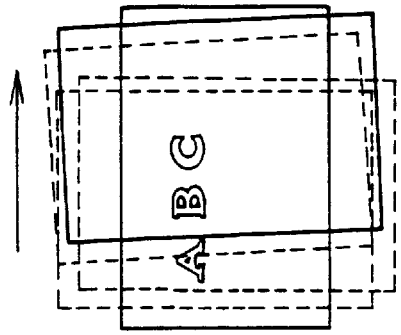
FIGS. 70A to 70D are diagrams illustrating how the imaging area of the camera moves, while shaking, with respect to the image of an object.
Figure 70C:
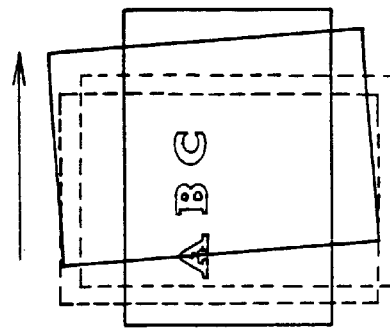
Figure 70B:
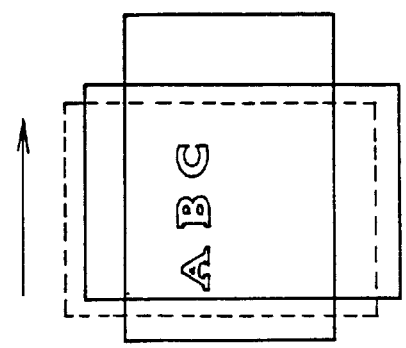
Figure 70A:
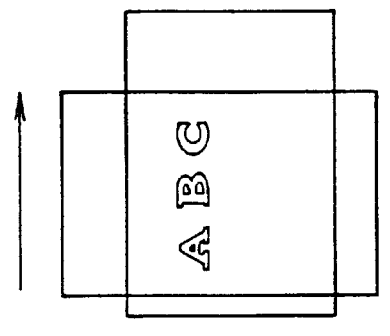
Figure 73:
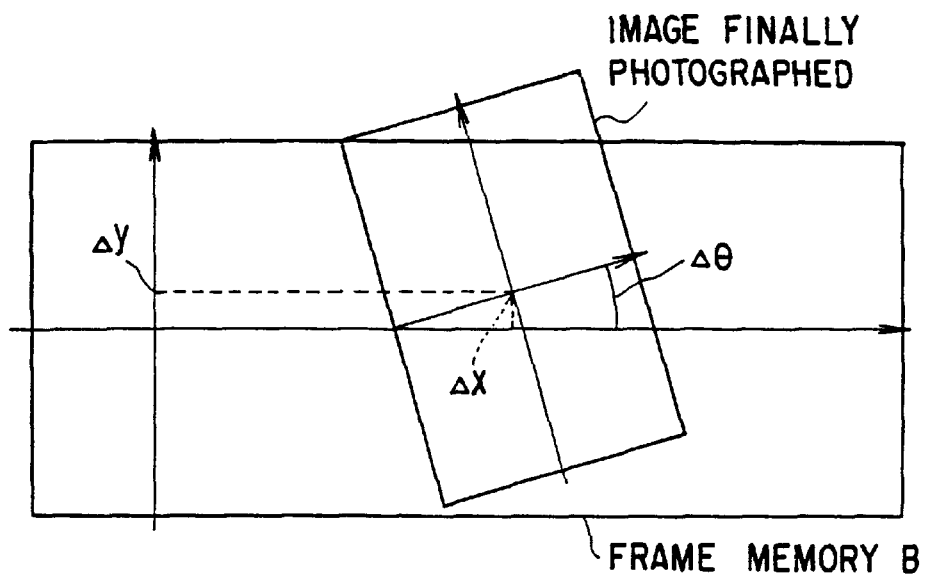
FIG. 73 is a diagram showing how an image is moved.

With reference to FIG. 68, the shake-correcting circuit 218 will now be described in detail. Also it will be explained how the circuit 213 operates to correct the displacement of, for example, the Nth frame image, which has resulting from the shake of the imaging section A.

The shake-correcting circuit 218 comprises two main components. One is a distance-measuring section 218a for measuring the distances the Nth frame image is displaced from the two adjacent frame images, the (N−1)th frame image and the (N+1)th frame image. The other is an image-moving section 218b for moving one adjacent frame image in parallel and rotating the other adjacent frame, so that the (N−1)th, Nth and (N+1)th frame images may be connected appropriately.

The imaging area of the section A shifts over the object, while tilting in one direction and the other, as is illustrated in FIGS. 70A to 70D. Hence, the image of the object appears as if moving and rotating. The displacement of one frame image with respect to the next one can, therefore, be represented by a motion vector. The motion vector changes from a frame image to another, because it includes a component corresponding to the rotation of the frame image.

The distance-measuring section 218a determines the motion vectors at two or more points in the common region of two adjacent frame images, thereby to measure the distance and the angle the second frame image is displaced and rotated with with respect to the second frame image. The distance and the angle, thus measured, are supplied to the image-moving section 218b. In accordance with the distance and the angle, the section 218b converts the image data item showing the second frame image to a data item which represents a frame image assuming a proper position with respect to the first frame image. As a result, the two adjacent frame images are connected in a desirable manner.

It will be explained how the distance-measuring section 218a measures the distance and the angle the second frame image is displaced and rotated with with respect to the second frame image. First, part of the data item representing the (N−1)th frame image is read from the frame memory A 217 and stored into a reference memory 232. Each frame image has a size of 16×16 pixels in this instance. To detect the positional relation between the (N−1)th frame image and the Nth frame image, the two frame images are correlated. To be more specific, the data stored in the reference memory 232, which represents a portion of the (N−1)th frame image (hereinafter called "reference image"), is compared with the data representing that portion of the Nth frame image (hereinafter called "comparative image") which assumes the same position as said portion of the (N−1)th frame image and which is larger than said portion of the (N−1)th frame image.

Next, as shown in FIG. 71, the reference image is moved to various positions over the comparative image, by means of an overlap-region position controller 240. While the reference image remains at each position, the value of every pixel of the reference image is compared with the value of the corresponding pixel of the comparative image. The absolute values of the differences between all pixels of the reference image, on the one hand, and the corresponding pixels of the comparative image, on the other, are added together under the control of an addition controller 241. The sum of the absolute values of said differences is thereby obtained.

Then, the sums of absolute difference values, which have been obtained when the reference image stays at the various positions over the comparative image, are compared with one another. The position at which said sum of absolute difference values is the minimum is thereby determined. The displacement which the reference image at this very position has with respect to the comparative image is regarded as a motion vector.

The signal output by the overlap-region position controller 240 and the signal produced by the adding controller 241 are input to a pixel-position calculator 233. One of the pixels of the Nth frame image stored in the frame memory A 217 is thereby designated. The value of this pixel is supplied to one input of a difference calculator 234. Meanwhile, the signal output by the adding controller 241 designates one of the pixels of the (N−1)th frame image stored in the reference memory 232, and the value of the pixel thus designated is supplied to the other input of the difference calculator 234.

The difference calculator 234 calculates the difference between the input pixel values. The difference is input to an absolute value calculator 235, which obtains the absolute value of the difference. The absolute value is supplied to an adder 236. The adder 236 adds the input absolute value to the absolute difference value stored in a sum memory 237. Ultimately, the sum memory 237 stores the sum of 256 differences for the 16×16 pixels stored in the reference memory 237, under the control of the adding controller 241. This sum is input to a minimum value calculator 238 and used as a correlation signal representing the size of the overlap region of the (N−1)th frame image and the Nth frame image.

The overlap region of two frame images is shifted under the control of the overlap-region position controller 240, and the correlation signal obtained while the overlap region remains at each position is input to the minimum value calculator 238. The calculator 238 determines the position where the correlation signal has the minimum magnitude. The displacement of the Nth frame image with respect to the (N−1)th frame image is input, as a motion vector v, to a ΔxΔyΔθ calculator 239.

Assume that the correlation between the reference image and the comparative image is most prominent when the reference image is located at the position (−x, −y), as is illustrated in FIG. 71. Then, the motion vector v is (x, y). The motion vectors are accumulated in a memory (not shown), whereby the motion vector is obtained which indicates the position the Nth frame image has with respect to the first frame image. Motion vectors of this type are obtained for at least two given points a and b in the Nth frame image. The two motion vectors are input to the ΔxΔyΔθ calculator 239. The calculator 239 calculates two motion vectors for the points a and b, i.e., v1(x1, y1) and v2(x2, y2).

The ΔxΔyΔθ calculator 239 calculates, from the vectors v1 and v2, the position at which to write the Nth frame image (now stored in the frame memory A 217) in the frame memory B 219. This position is defined by the parallel motion distances (Δx and Δy) and counterclockwise rotation angle Δθ of the Nth frame image. How the calculator 239 calculates the position will be explained with reference to FIGS. 72A and 72B.

As can be understood from FIG. 72A, a motion vector v can be considered one synthesized from two vectors S and r which pertain to the parallel motion and rotation of a frame image. The motion vector v is evaluated in units of one-pixel width. Nonetheless, it can be evaluated more minutely by interpolating a correction value from the correlations among the pixels, as is disclosed in Published Unexamined Japanese Patent Application 4-96405. Namely:

Vector $v1=S+r$

Vector $v2=S-r$

Therefore, the vector S and the vector r are:

Vector $S=(v1-v2)/2$

Vector $r=(v1-v2)/2$

The components of the vector S are Δx and Δy. As evident from FIG. 72B, The value for Δθ can be given approximately as:

$\Delta\theta=\arctan(|v1-v2|/d)$

The distances of parallel motion and the angle of rotation can be obtained more accurately by using not only the motion vectors for the points a and b, but also the motion vectors for many other points.

The parallel motion distances Δx and Δy and the rotation angle Δθ are input to the image-moving section 218b. The circuit 218b processes the image data showing the Nth frame image in accordance with the distances Δx and Δy and the angle Δθ, thereby moving the Nth frame image linearly and rotating it. The image data item showing the Nth frame image thus moved and rotated is written into the frame memory B 219. It suffices to set the center of rotation of the Nth frame image at the mid point between the points a and b. If motion vectors are calculated for three or more points, the center of rotation may be set in accordance with the positions of those points.

Since the pixel positions are discrete, each pixel of the Nth frame image, moved and rotated, usually does not assume the same position as the corresponding position in the frame memory B 219. For this reason, instead of the signal representing the pixel, the signal representing an adjacent pixel which takes the position most similar to that position in the memory B 218 may be written at said position in the memory B 219. Alternatively, a pixel value interpolated from the values of some pixels which assume positions similar to that position in the memory B 219 may be stored at the position in the memory B 219. (The method utilizing interpolation is preferable since it may serve to form a high-quality image.)

If any pixel of the Nth frame image is identical to one pixel of the (N−1)th frame image, whose value is already stored in the frame memory B219, its value is not written into the memory B 219. Rather, its value and the value of the identical pixel are added, in a predetermined ratio, and the resultant sum is stored into the memory B 219. This method helps enhance the quality of an output image. The optimal value for the predetermined ratio depends on how many times the same pixel is written into the frame memory B 219.

In the twenty-first embodiment, the imaging area of the section A can be switched rather roughly, and a simple means such as a polygonal mirror can be used to control the optical system for switching the imaging area. Further, the imaging section A can operate well even while held by hand because its shake is compensated well.

FIGS. 74A and 74B illustrate how the apparatus according to the twenty-first embodiment is used. The imaging section A can be held by hand as shown in FIG. 74A since its shake is compensated. The imaging section A and the recording section FIG. 74B need not be connected by a cable and can therefore be located far from each other. This is because, as is shown in FIGS. 74A and 74B, the section A can transmit signals to the recording section B, in the form of infrared rays or radio waves. The imaging section A can be small and light and can therefore be manipulated easily.

Figure 75:
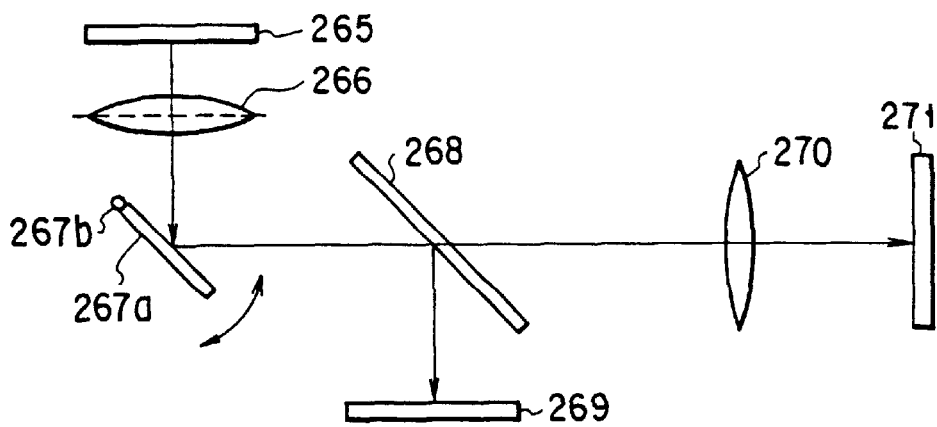
FIG. 75 is a diagram showing the imaging section of an electronic camera which is a twenty-second embodiment of the invention.

An image processing apparatus, which is a twenty-second embodiment of this invention, will be described with reference to FIG. 75. FIG. 75 shows only the components which characterize this embodiment. Except for these components, the twenty-second embodiment is identical to the twenty-first embodiment.

The twenty-second embodiment has an optical system designed exclusively for detecting the shake of an image.

In operation, an image 265 of an object is applied through a lens system 266 to a mirror 267a. The mirror 267 reflects the image to a half mirror 268. The half mirror 268 reflects the image and applies it to an imaging device 269 which is a line sensor. The imaging device 269 converts the image into image data, which is supplied to a CRT or a printer (neither shown) so that the image may be displayed or printed. Meanwhile, the input image is applied through the half mirror 268 and a magnifying system 270 to an imaging device 271. As a result, the image is magnified and focused on the imaging device 271. The device 271 converts the image into image data from which a shake, if any, of the image will be detected.

Since the image focused on the imaging device 271 has been magnified by the magnifying system 270, the motion vectors pertaining to the pixels forming the image can be detected in high resolution. Hence, the parallel motion distances $\Delta x$ and $\Delta y$ and the rotation angle $\Delta \theta$, i.e., the factors required in reconstructing the image, can be calculated more accurately than in the twenty-first embodiment. As a result, the reconstructed image will have higher quality. In addition, the imaging device 269, which is a line sensor, can read the input image at high speed, that is, can read many pixels per unit of time.

In the twenty-first embodiment and the twenty-second embodiment, the displacement of an image with respect to the next image taken is detected from the positional correlation between the two images. If the images are low-contrast ones, however, the results of the correlation calculation are inevitably great.

With reference to FIGS. 76A and 76B, an image processing apparatus will be described which can calculate the correction with sufficient accuracy and which is a twenty-third embodiment of the present invention.

As FIG. 76A shows, two highly correlative objects are placed above and below an object of photography. The "highly correlative" objects have broad bands in the nyquist frequency range, such as two-dimensional chirp waves, random-dot patterns defined by random numbers, white-noise amplified patterns, or dot-image patterns. Alternatively, as shown in FIG. 76B, characters and lines may be drawn on the upper and lower edge of the image of an object.

For example, an image located near a dot-image pattern is used a reference image in calculating the correlation. In this case, the apparatus can calculate the correlation with very high accuracy.

An image processing apparatus according to a twenty-fourth embodiment will be described with reference to FIGS. 77 to 79, FIGS. 80A to 82C, and FIGS. 81 to 83. This embodiment can increase the accuracy of the correlation calculation without using highly correlative patterns of the types utilized in the twenty-third embodiment. The embodiment is identical to the twenty-first embodiment (FIG. 67), except that a correlated area selector is incorporated in a shake-correcting circuit 218 of the type shown in FIG. 68, so that a highly correlative area is selected. Hence, FIG. 77 shows only the components which characterize the twenty-third embodiment.

In operation, the image data output from a frame memory A 217 is input to a distance calculator 218a, an image-moving section 218b, and a correlated area selector 218c. The circuit 218c selects the most highly correlative part of the input image, and input data representing a reference image to a distance-measuring section 218a, which will be described later.

From the two input images the distance-measuring section 218a measures the displacement of one of the images with respect to the other image. The displacement, thus measured, is supplied to the circuit 218b, which moves and rotates the first image, thus positioning the first image such that the first image is properly connected to the second image.

Figure 78:
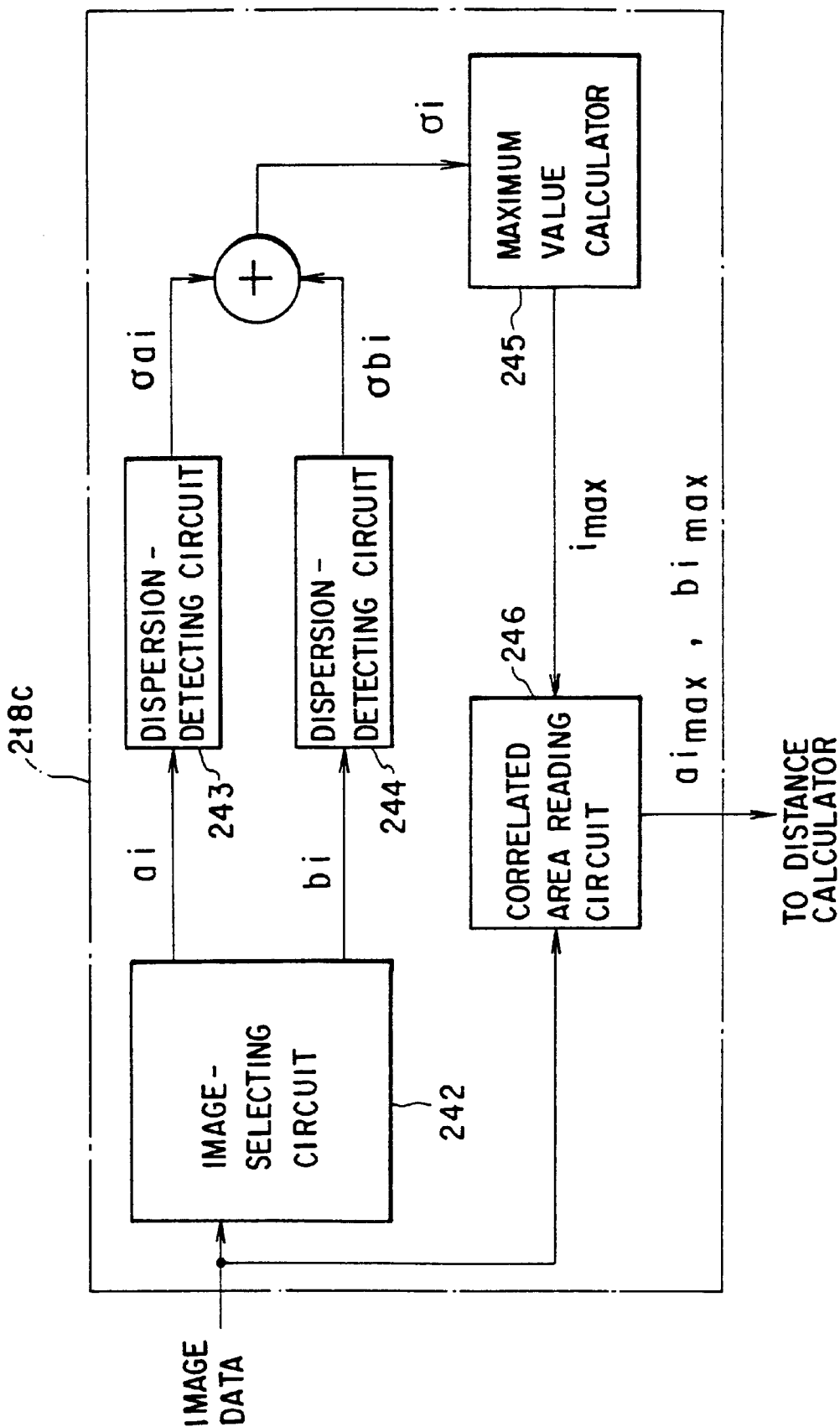
FIG. 78 is a block diagram showing the correlated area selector incorporated in the circuit illustrated in FIG. 77.

FIG. 78 shows, in detail, the correlated area selector 218c. As is evident from FIG. 78, in the selector 218c, an image is selected from among, for example, n possible images $a_1$ to $a_n$ and one of possible images $b_1$ to $b_n$ shown in FIG. 79, in accordance with the input image data, and dispersion-detecting circuits 243 and 244 detect the dispersion values $\sigma a_i$ and $\sigma b_i$ for the selected images $a_i$ and $b_j$. The sum $\sigma i$ of these dispersion values is supplied to a maximum value calculator 245. The calculator 245 outputs value $i_{max}$ which renders the sum $\sigma_i$ maximal. The value $i_{max}$ is supplied to a correlated area reading circuit 246. The circuit 246 reads two reference images $i_{max}$ and $i_{max}$, which are input to the distance-measuring section 218a. Hence, the two images compared have high contrast, and the correlation calculation can therefore be performed with high accuracy.

The dispersion-detecting circuits 243 and 244 can be of various types. For example, they may be a high-pass filter or a band-pass filters. Alternatively, they may be a convolution filter having such coefficients as is shown in FIGS. 80A–80C. Further, the circuits 243 and 244 may be of the type shown in FIG. 81, wherein use is made of the sum of the value differences among adjacent pixels.

An image processing apparatus, designed to form a high-resolution image or a wide image, has a plurality of imaging devices. The holders holding the imaging devices may expand or contract as their temperature changes with the ambient temperature or with an increase and decrease of the heat they generate. In such an event the relative positions of the devices will alter, making it difficult to provide a high-quality image. To prevent the devices from changing their relative positions, the holders are usually made of material having a small thermal expansion coefficient. Generally, such material is expensive and hard to process. The manufacturing cost of the image processing apparatus is inevitably high.

In the present invention, a technique may be applied in the imaging section to avoid changes in the relative positions of the imaging devices, without using material having a small thermal expansion coefficient. Two examples of the technique will be described with reference to FIG. 82 and FIG. 83.

In the example of FIG. 82, a beam splitter 282 for splitting input light into two parts is secured to a holder 283, which in turn is fastened to one end of a base 281. An L-shaped holder 285 holding an imaging device 284a (e.g., a CCD), and a holder 286 holding an imaging device 284b are fastened to the base 281, such that the devices 284a and 284b are so positioned as to receive the two light beams output from the beam splitter 282 and convert them into electric signals. In other words, the imaging devices 284a and 284b are set in planes conjugate to that of the semi-transparent mirror of the beam splitter 282. At the other end of the base 281 an optical system 287 is located. A rotary filter 288 is arranged between the beam splitter 282 and the optical system 287.

The first imaging device 284a is spaced apart from the semitransparent mirror of the beam splitter 282 for a distance n. The second imaging device 284b is spaced apart from the semitransparent mirror for a distance m. The distance m is equal to the distance n, that is, m=n. The light-receiving surface of the first device 284a is spaced in vertical direction from the top of the base 281 by a distance q. The screw fastening the holder 286 to the base 281 has a play p. The play p is far less than distance q, that is, p<q.

Generally, material having an extremely small thermal expansion coefficient is chosen for the holders 285 and 286 holding the devices 284a and 284b, respectively, in order to prevent displacement of one imaging device with respect to the other when the holders 285 and 286 experience temperature changes. Such material is expensive and, to make matters worse, has poor processibility, and should better not be used. The materials in common use have thermal expansion coefficients differing over a broad range.

In the present example shown in FIG. 82, a material having a large thermal expansion coefficient is also positively used, ultimately reducing the manufacturing cost of the image processing apparatus. More specifically, two different materials are selected for the holders 285 and 286, respectively, to satisfy the following equation:

$$p \times \alpha = \text{and } q \times \beta$$

where $\alpha$ and $\beta$ are the thermal expansion coefficients of the materials, respectively, p is the play p of the screw, and q is the distance q between the base 281 and the device 284a.

Hence, even if the holders 285 and 286 undergo temperature changes, the distances m and n remain equal to each other, whereby the imaging devices 284a and 284b are maintained, each at the same position relative to the other as before. Stated in another way, they are always in planes conjugate to that of the semitransparent mirror of the beam splitter 282.

In the example of FIG. 83, the imaging devices 284a and 284b are moved not only along the axis of the optical system 287, but also in a line extending at right angles to the axis of the system 287. More precisely, the positions of the holders 286 and 289 and holding the first imaging device 284a and the second imaging device 284b, respectively, are reversed as compared to the first example (FIG. 82). Suppose that the holder 286 is heated and expands in the direction a, and the holder 289 holding the device 284a is also heated and its vertical and horizontal portions expand in the direction a and the direction b, respectively. As a result, the device 284b held by this holder 286 moves in the direction a, while the imaging device 284a held by the holder 289 moves in the direction b. If the displacement of the device 284a in the direction b is equal to that of the device 284b in the direction a, the relative positions of the devices 284a and 284b remain unchanged. As clearly understood from the equation of $p \times \alpha = \text{and } q \times \beta$, $\alpha > \beta$. To keep the devices 284a and 284b at the same relative positions, the following equation must be satisfied:

$$r \times \alpha = S \times \beta$$

where r is the vertical distance between the base 281 and the axis of the imaging device 284b, and S is the horizontal distance between the axis of the imaging device 284a and the axis of the screw fastening the holder 289 to the base 281.

As evident from FIG. 83, r<S, and hence $\alpha > \beta$. Therefore, only if r and S have values which satisfy the equation of $p \times \alpha = q \times \beta$, then the two following equations hold simultaneously:

$$p \times \alpha = q \times \beta$$
$$r \times \alpha = S \times \beta$$

In other words, since the components take the positions specified in FIG. 83, not only the displacement of either imaging device along the axis of the optical system 287, but also the displacement thereof in a line extending at right angles to the axis of the system 287.

In either example it is possible to prevent changes in the relative positions of the imaging devices placed in planes conjugate to the semitransparent mirror of the beam splitter 282 merely by selecting two materials having different thermal expansion coefficients for the holders supporting the imaging devices 284a and 284b, respectively. Neither holder needs to be made of material having a small thermal expansion coefficient, which is expensive and has but low processibility.

Assume that the materials of the holders have difference thermal expansion coefficients which are known. Then, those portions of the holders to which the devices 284a and 284b are attached may have lengths determined in accordance with the known thermal expansion coefficients. In this case as well, the relative positions of the devices can be prevented from changing even if the holders experience temperature changes.

According to the present invention, the components of the imaging section need not be made of materials having a very small thermal expansion coefficient to avoid changes in the relative positions of the imaging devices. Rather, they are made of materials having different large thermal expansion coefficients. They can yet prevent changes in the relative positions of the imaging devices, because they have the sizes as specified above and are located at the positions described above.

An electronic camera, which is a twenty-fifth embodiment of the invention, will now be described with reference to FIGS. 84 and 85.

In the twenty-first embodiment shown in FIG. 67, the mirror 203a is arranged between the imaging lens system 202 and the imaging device 204 (i.e., the CCD). Hence, the wider the input image, the greater the aberration of the image, the greater the reduction in ambient light. The twenty-fifth embodiment, or the electronic camera is characterized in that, as shown in FIG. 84, a mirror 203a is provided between an object and an imaging lens system 202.

The electronic camera comprises a CMD 204a having 2048×256 pixels which are arranged in rows and columns as is illustrated in FIG. 85. The CMD 204a has a clock pulse generator 204-1, a horizontal scanning circuit 204-2, and a vertical scanning circuit 204-3. It should be noted that the rows of pixels, each consisting of 2048 pixels, extend perpendicular to the plane of FIG. 85.

The CMD 204a is of XY-address read type. When the clock pulse generator 204-1 supplies read pulses to the horizontal scanning circuit 204-2 and the vertical scanning circuit 204-3, pixel signals are output from the signal terminal SIG.

As FIG. 84 shows, the electronic camera further comprises a stroboscopic lamp 291, polarizing filters 292 and 293, a voice coil 290, a processing section 294, a shutter-release button 299, and a memory card 297. The lamp 291 emits flashing light to illuminate an object of photography. The polarizing filters 292 and 293 are positioned with their polarizing axes crossing at right angles. The voice coil 290 is used to rotate the mirror 203a. The processing section 294 processes the pixel signals output by the CMD 204a. The memory card 297 is connected to the section 294, for storing the image data produced by the CMD 204a.

Figure 86:
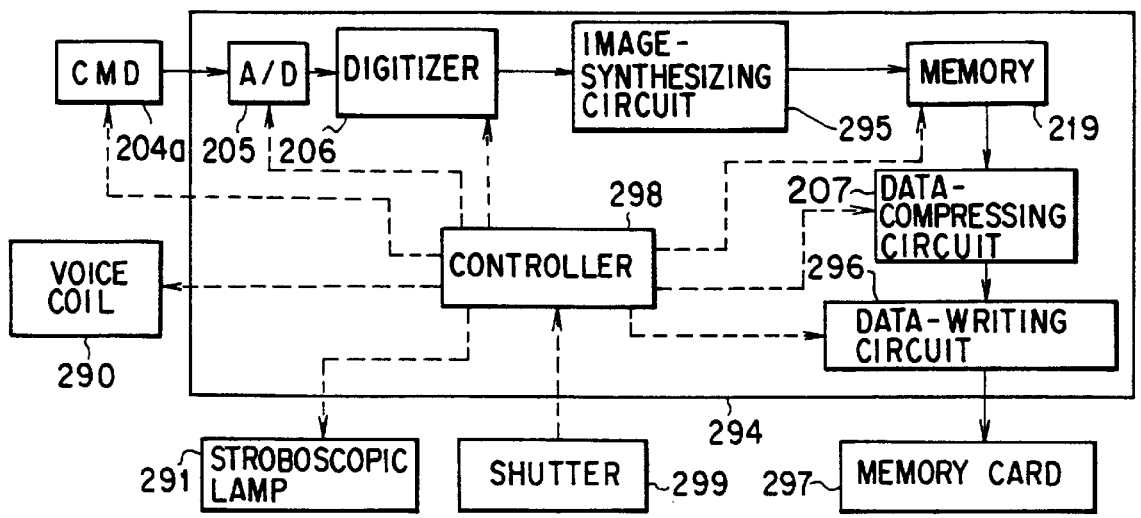
FIG. 86 is a block diagram of the processing section used in the imaging section shown in FIG. 84.

The processing section 294 has the structure shown in FIG. 86. It comprises an A/D converter 205, a digitizer 206, an image-synthesizing circuit 295, a data-compressing circuit 207, a data-writing circuit 296, and a controller 298. The A/D converter 205 converts the analog pixel signals supplied from the CMD 204a to digital pixel signals. The digitizer 206 converts the digital pixel signals to binary image signals. The circuit 295 combines the image signals into image data representing a single image. The circuit 207 compresses the image data by a specific method. The circuit 296 writes the compressed image data into the memory card 297. The controller 298 controls all other components of the processing section 294, the voice coil 290, and the stroboscopic lamp 291, every time it receives a signal generated when a photographer pushes the shutter-release button 299.

The image-synthesizing circuit 295 comprises a fame memory A 217 and a shake-correcting circuit 218—both being identical to those described above.

Figure 87A:
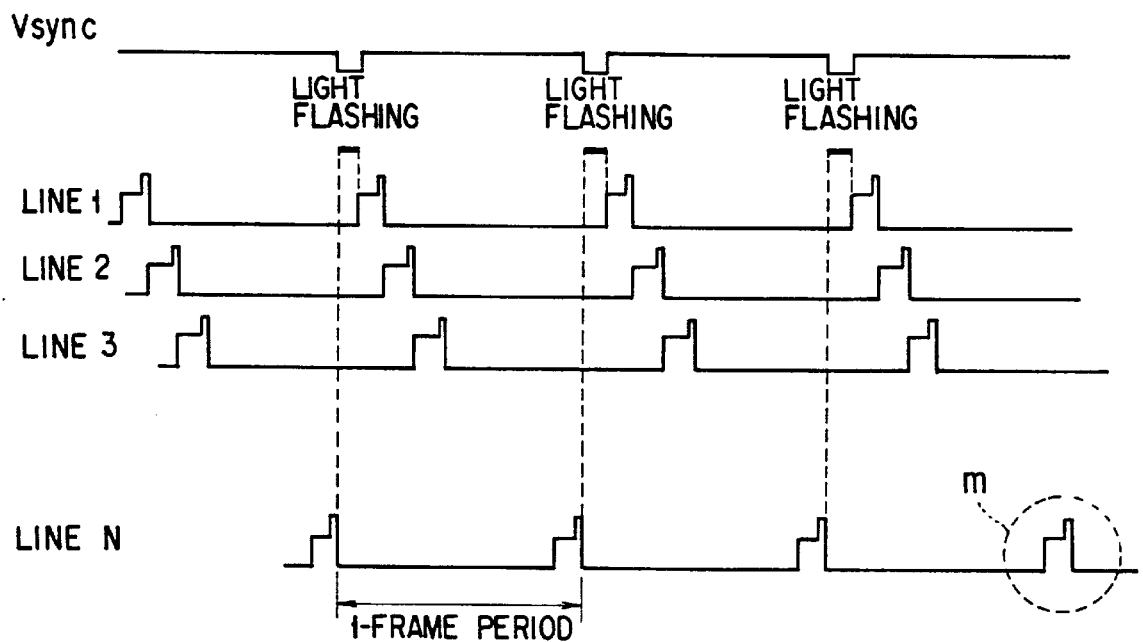
FIGS. 87A and 87B are a timing chart representing the timing of light-emission at the stroboscopic lamp incorporated in the electronic camera shown in FIG. 84.
Figure 87B:
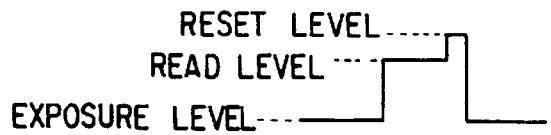

The electronic camera takes a picture of an object when the stroboscopic lamp 291 emits flashing light while the mirror 203a is rotating. FIG. 87A indicates the timing of driving the stroboscopic lamp 291. More precisely, FIG. 87A illustrates the timing the stroboscopic lamp 291 is driven, or changes in the voltages the vertical scanning circuit 204-3 applies to the N vertical scanning lines. FIG. 87B shows part of the waveform of a voltage applied to the Nth vertical scanning line. As evident from FIG. 87B, the voltage applied to each line is at the lowest level to expose the CMD 204 to light, at the intermediate level to read a pixel signal, and at the highest level to reset a pixel. Since the exposure timing and the signal-reading timing differ from line to line, the stroboscopic lamp 291 is driven to emit flashing light for the vertical blanking period during which all pixels of the CMD 204a are exposed to light.

The operation of the electronic camera shown in FIGS. 84 to 86 will be explained.

When the photographer pushes the shutter-release button 299, the voice coil 290 rotates the mirror 203a and the stroboscopic lamp 291 emits flashing light at the time shown in FIG. 87A. The light is applied to the object through the polarizing filter 292 and is reflected from the object. The reflected light is applied through the polarizing filter 293 to the mirror 203a. The mirror 203a reflects the light, which is applied to the CMD 204a through the imaging lens system 202. Due to the use of the polarizing filters 292 and 293, the light applied to the CMD 204a is free of straight reflection.

The A/D converter 205 converts the pixel signals generated by the CMD 204a to digital signals. The digitizer 206 converts the digital signals to binary signals, which are input to the image-synthesizing circuit 295. The A/D converter 205 and the digitizer 206 repeat their functions a predetermined number of times, whereby the circuit 295 produces image data representing an image. The data-compressing circuit 207 compresses the image data. The image data compressed by the circuit 207 is written into the memory card 297.

Upon applying flashing light 15 times to the object, the electronic camera can form an image of the object which has high resolution of about 2000×3000 pixel. Since the mirror 203a is located between the object and the imaging lens system 202, the resultant image is free of aberration, and no reduction in the ambient light occurs. Further, the two polarizing filters 292 and 293 prevent straight reflection of the light emitted from the stroboscopic lamp 291. Since the period for which the lamp 291 emits a beam of light is extremely short, the camera shakes so little, if it does at all, during the exposure period. Hence, each frame image is not displaced with respect to the next one even though the mirror 203a continues to rotate, whereby the resultant image is sufficiently clear.

Once the image data is written into the memory card 297 which is portable, the data can easily be transferred to a printer or a personal computer.

Even if the mirror 203a is rotated at uneven speed, the controller 298 need not control the voice coil 290 so precisely. This is because a shake-correcting circuit (not shown) detects the changes in the speed and compensates for these changes.

An electronic camera, which is a twenty-sixth embodiment of the invention, will be described with reference to FIGS. 88 and 89 and FIGS. 90A and 90B. This embodiment is similar to the twenty-fifth embodiment shown in FIG. 84. The same components as those shown in FIG. 84 are denoted at the same reference numerals in FIG. 88, and only the characterizing features of the twenty-sixth embodiment will be described in detail.

In the electronic camera of FIG. 84, the flashing light emitted from the stroboscopic lamp 291 illuminates not only the object but also the background thereof. In other words, the light is applied to those areas outside the view field of the camera. This is a waste of light.

The electronic camera shown in FIG. 88 is designed to save light. To be more specific, a reflector 300 and a lens system 301 converge the flashing light from a stroboscopic lamp 291, producing a converged light beam. The light beam is applied to a half mirror 302 and hence to a mirror 203a. The mirror 203a reflects the light beam to the object. The light reflected from the object is applied to the mirror 203a. The mirror 203a reflects the beam, which is applied to a CMD 204a through the half mirror 302 and an imaging lens system 202. Thus, the light is applied to the object, not being wasted. The half mirror 302 has a polarizing plate and can, therefore, remove positively reflected components from the light reflected from the object.

In the case where the stroboscopic lamp 291 cannot be used, the mirror 203a may be intermittently rotated with such timing as is illustrated in FIG. 89. If the mirror 203a is rotated at one-frame intervals, however, the image data items representing frame images may mix together. In the present embodiment, the mirror 203a is rotated at two-frame intervals (or longer intervals) so that the signals the CMD 204a generates during each exposure period A only may be supplied to the image-synthesizing circuit (not shown) incorporated in a processing section 294. The signals the CMD 204a produces during each exposure period B are not used at all.

Figure 90A:
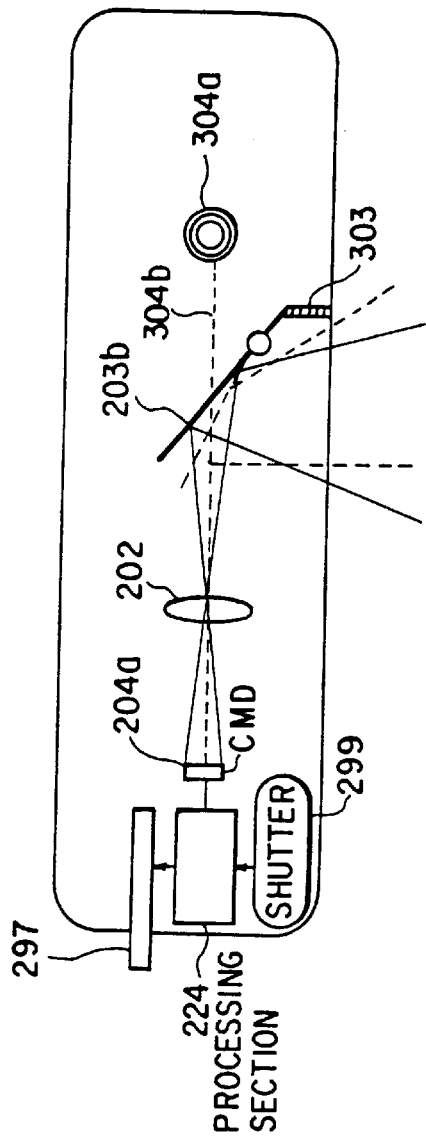
FIGS. 90A and 90B are cross-sectional side views of the imaging section of an electronic camera which is a twenty-seventh embodiment of the invention.

Another electronic camera, which is a twenty-seventh embodiment of the invention, will be described with reference to FIGS. 90A and 90B. This camera is characterized in that, as shown in FIG. 90A, a spring 303, a cam 304a, and a connecting rod 304b work in concert, rotating a mirror 203b intermittently.

Figure 90B:
Figure 90D:
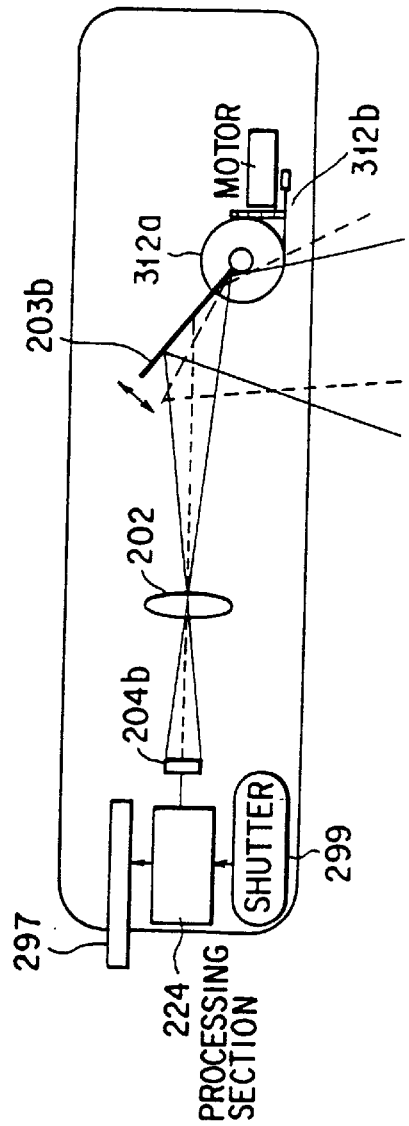
FIG. 90D is a cross-sectional view of the cam of FIG. 90A.
Figure 90E:
FIG. 90E is a plan view of the screw of FIG. 90B.

Alternatively, as shown in FIG. 90B, a gear 312a and a screw 312b in mesh with the gear 312a may be used for intermittently rotating the mirror 203b. In this case, a FIT (Flame Interline Transfer)-type CCD 204b is used instead of the CMD 204a. The screw 312b has a helical groove, each turn of which consists of a flat part and a driven part. As the screw 312b rotates at constant speed, the gear 312a is periodically rotated and stopped. The FIT-type CCD 204b has its even-numbered field and its odd-numbered field exposed sub-stantially at the same time. The time during which to expose either field can be changed.

Figure 90C:
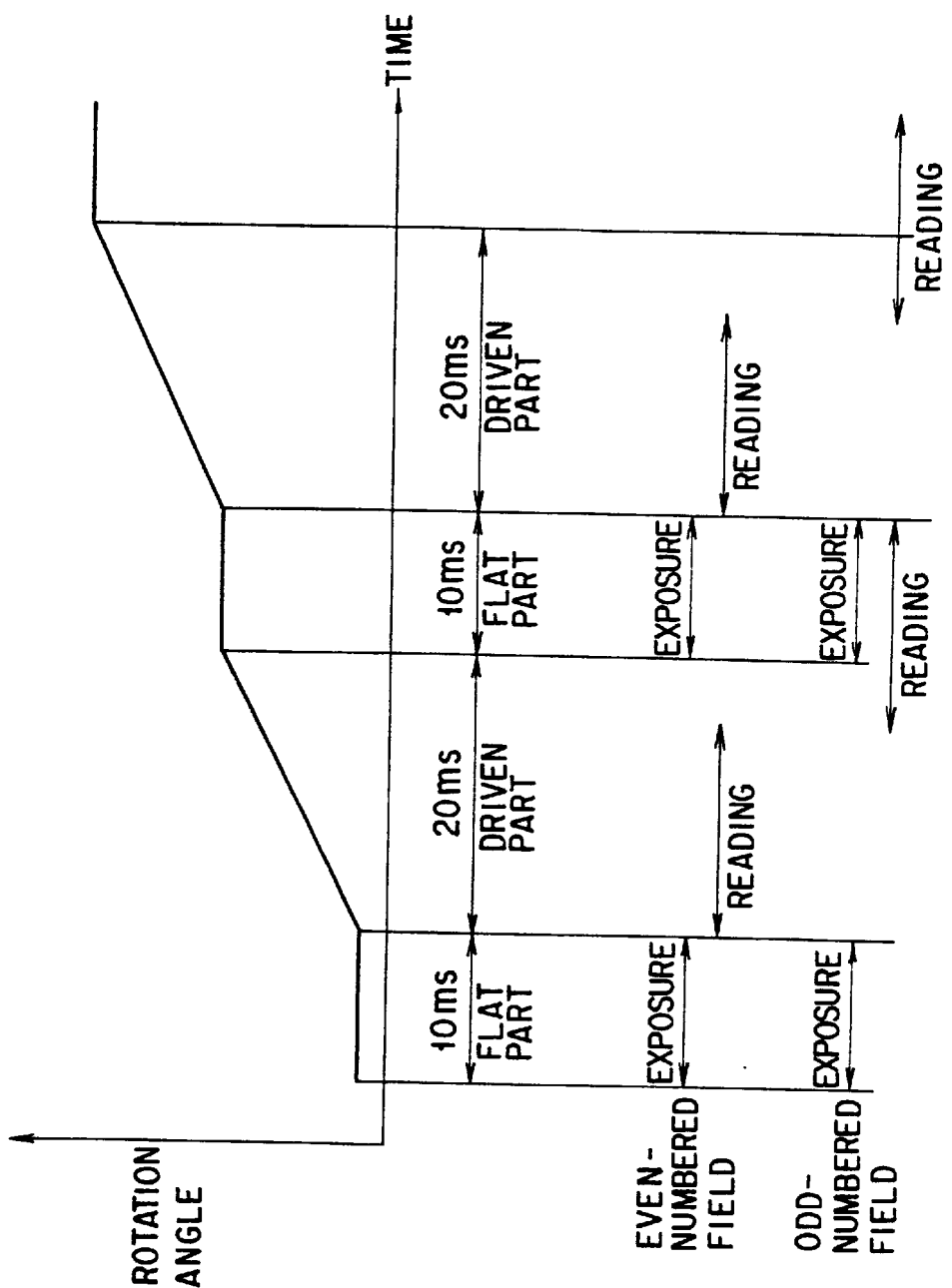
FIG. 90C is a chart representing the timing of exposure performed in the imaging section of FIGS. 90A and 90B.

FIG. 90C is a chart representing the timing at which exposure is performed, and the angle by which to rotate the mirror 203b, in the case where the mirror-driving mechanism shown in FIG. 90B is employed. As long as the gear 312a stays in mesh with any flat part of the helical groove of the screw 312b, the mirror 203b remains to rotate for some time (e.g., 10 ms). It is during this time that both the even-numbered field and the odd-numbered field are exposed to light. While the gear 312a stays in engagement with any driven part of the helical groove, the mirror 203b is rotating for some time (e.g., 20 ms). During this time the signals produced by the exposure of the fields are supplied to a processing section 224.

The gear 312a and the screw 312b easily transform the rotation of the shaft of a motor to the intermittent rotation of the mirror 203b. The mirror-driving mechanism of FIG. 90B makes less noise than the mechanism of FIG. 90A which comprises the cam 304a. By virtue of the mechanism shown in FIG. 90B, the frame-image data items are readily prevented from mixing together, and the illumination light is not wasted.

The imaging device incorporated in the electronic cameras of FIG. 90B is the FIT-type CCD 204b. The CCD 204b can be replaced by a CMD, provided that the mirror 203b is rotated at two-frame intervals or longer intervals.

An image processing apparatus according to a twenty-eighth embodiment of this invention will be described with reference to FIG. 91. This embodiment is characterized in that a TV camera is rotated to take frame images of an object, whereas the mirror 203b is intermittently rotated for the same purpose in the twenty-seventh embodiment (FIGS. 90A, 90B, and 90C). In the twenty-eighth embodiment, too, the frame images combined into a single image.

Figure 91:
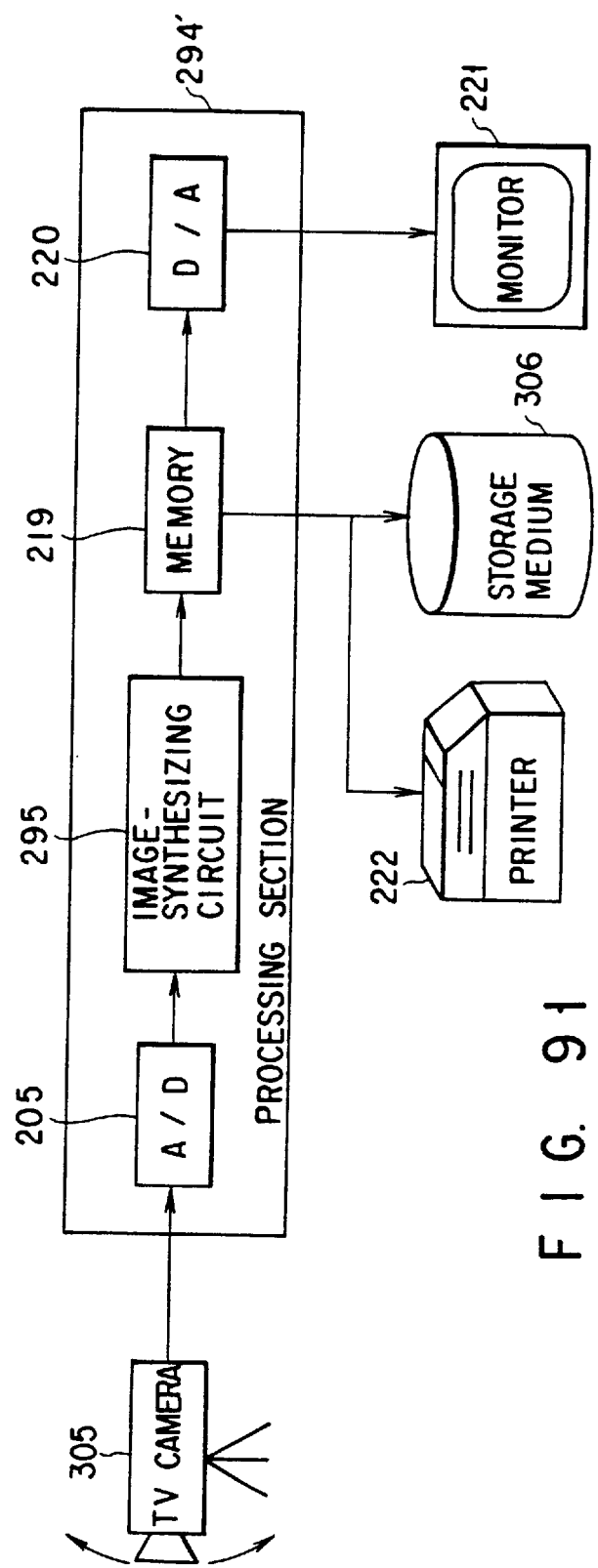
FIG. 91 is a block diagram illustrating the imaging section of an electronic camera which is a twenty-eighth embodiment of the invention.

As FIG. 91 shows, the apparatus comprises a TV camera 305 such as a CCD camera, a processing section 294' which performs the same function as the section 294 shown in FIG. 84, a recording medium 306 such as a hard disk, a CRT monitor 221, and a printer 222. The section 294' comprises an A/D converter 205, an image-synthesizing circuit 295, a memory 219, and a D/A converter 220. This apparatus is designed to form a gray-scale image, and the image signals output by the TV camera 305 are not converted to binary ones.

Another image processing apparatus, which is a twenty-ninth embodiment of the invention, will be described with reference to FIGS. 92, 93 and 94, FIGS. 95A and 95B, and FIG. 96.

Figure 92:
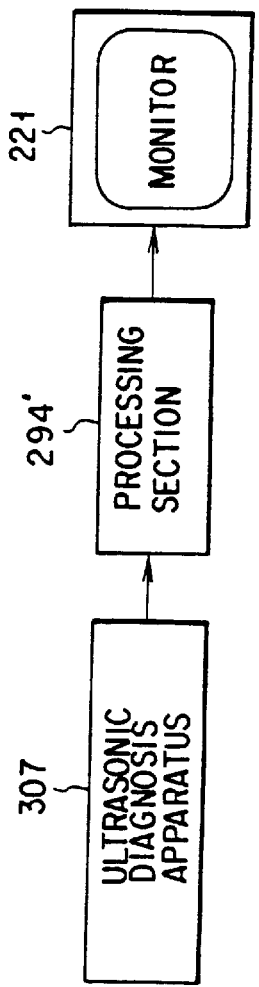
FIG. 92 is a block diagram showing an ultrasonic diagnosis apparatus which is a twenty-ninth embodiment of this invention and which is a modification of the embodiment shown in FIG. 91.
Figure 94:
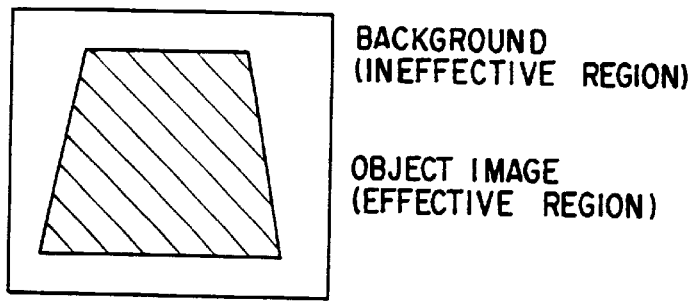
FIG. 94 is a diagram showing a convex-type ultrasonic image.
Figure 95A:
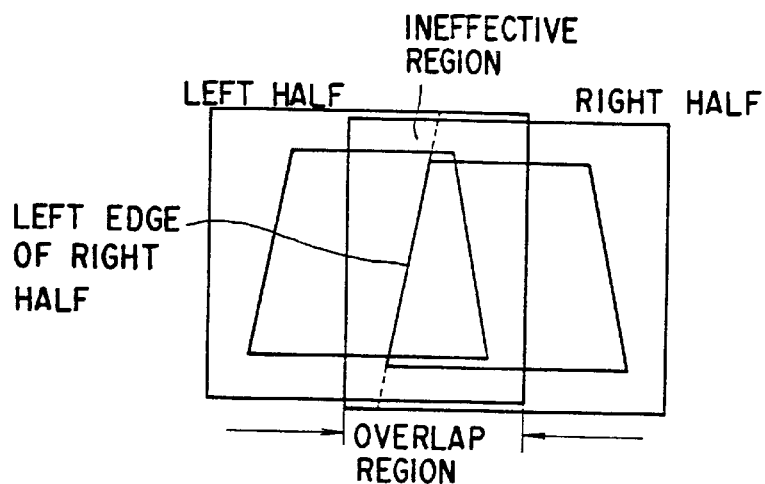
FIGS. 95A and 95B are diagrams explaining how to combine two images in the twenty-ninth embodiment of the invention.
Figure 95B:
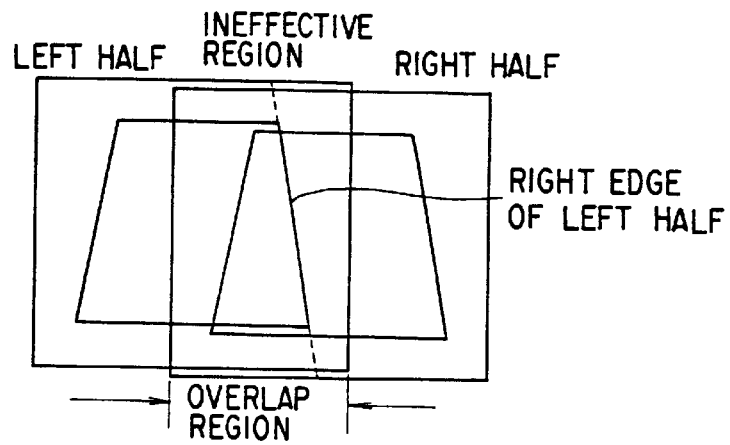

As can be understood from FIG. 92, this apparatus is similar to the apparatus of FIG. 91 and characterized in that an ultrasonic diagnosis apparatus 307 is used in place of the TV camera 305. The diagnosis apparatus 307 produces a convex-type ultrasonic sonic image. This image consists of a trapezoidal image of an object and background, as is illustrated in FIG. 94. The background, which is a region ineffective, must not be used in synthesizing images such as text data. More precisely, that portion of the left image, which overlaps the ineffective region of the right image as is shown in FIG. 95A, is not used in image synthesis. That portion of the right image, which overlaps the ineffective region of the left image, is not used in image synthesis, either.

Figure 96:
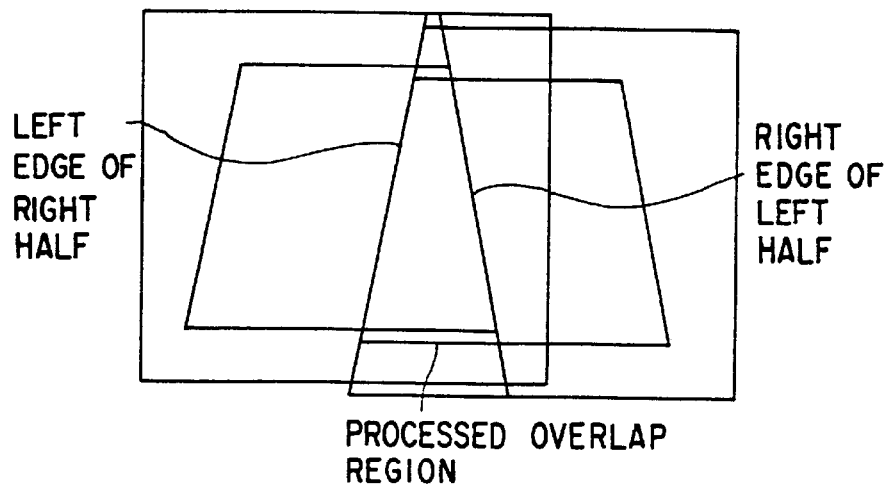
FIG. 96 is a diagram how to synthesize an image.

The left and right images are combined by processing the pixel signals defining the overlap regions of the images as is illustrated in FIG. 96, that is, in the same way as in the first embodiment.

Figure 93:
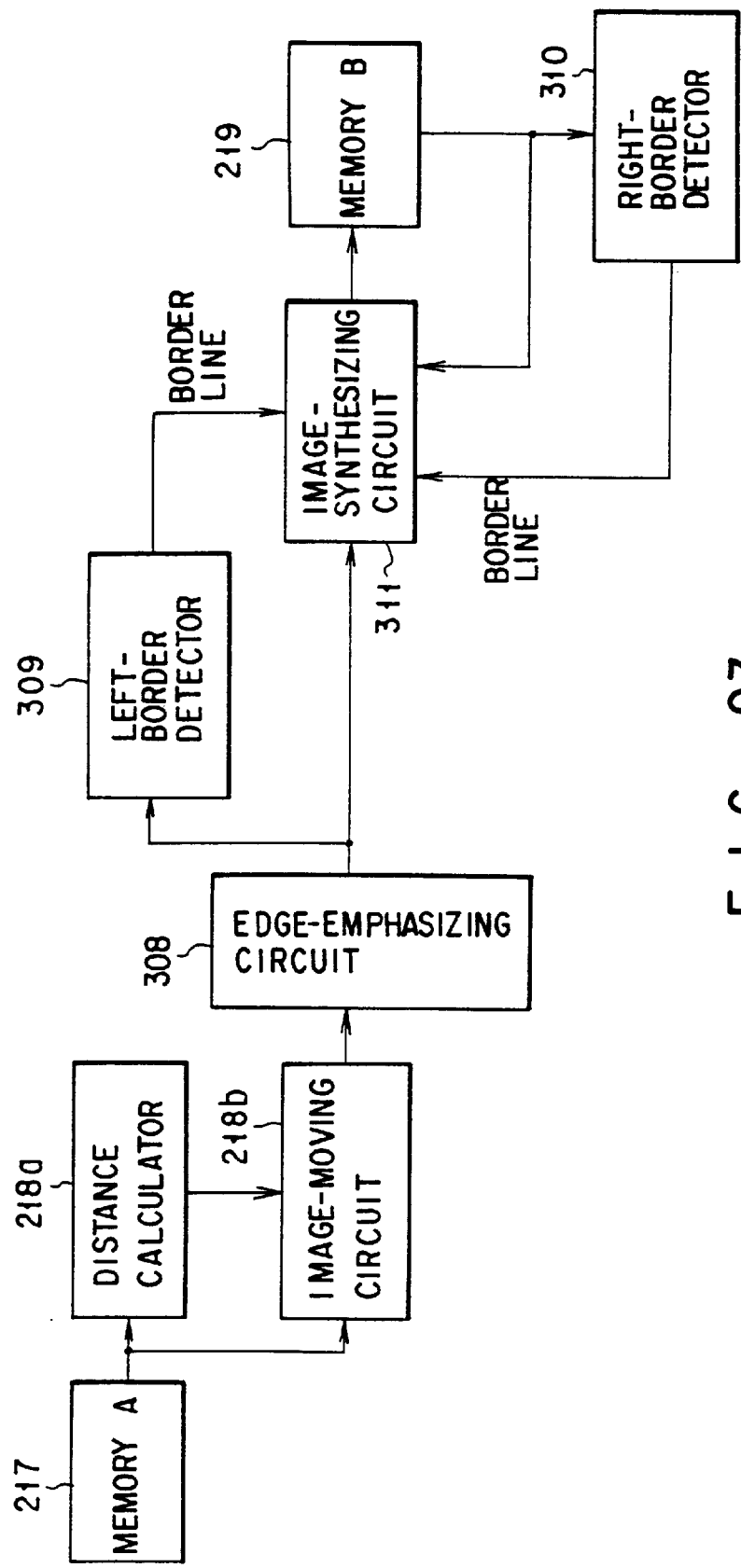
FIG. 93 is a block diagram showing the imaging section of the twenty-ninth embodiment.

FIG. 93 shows the imaging section of the twenty-ninth embodiment. The output of a memory A 217 is connected to a distance calculator 218a and an image-moving circuit 218b. The image-moving circuit 218b is connected to an edge-emphasizing circuit 308 designed for effecting edge-emphasis on signals deteriorated due to interpolation. The circuit 308 is connected to a left-border detector 309 for detecting the left border of the right image, and also to an image-synthesizing circuit 311. The left-border detector 309 and a memory B 219 are connected to the image-synthesizing circuit 311. The memory A 217 stores image data representing the left image, whereas the memory B 219 stores image data representing the right image.

The image-synthesizing circuit 311 writes two image data items into the memory B 219. The first data item represents that part of the the left image which is on the left of left border of the right image. The second data item represents that part of the right image which is on the right border of the left image. The circuit 311 processes the pixel signals defining the overlap regions of the left and right images, and writes the processed signals into the memory B 219. The imaging section can therefore combine convex-type ultrasonic images appropriately.

Figure 97A:
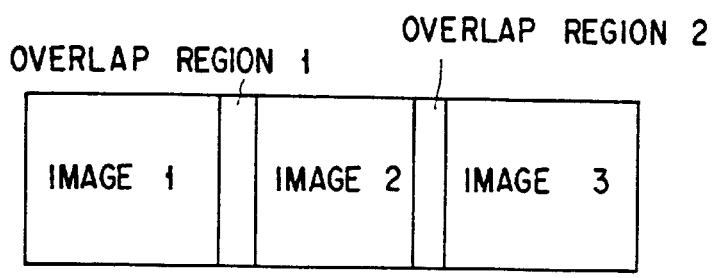
FIGS. 97A, 97B, and 97C are diagrams illustrating the imaging section of an electronic camera which is a thirtieth embodiment of the present invention.

An electronic camera, which is a thirtieth embodiment of the invention, will be described with reference to FIGS. 97A, 97B and 97C and FIGS. 98 to 101. This camera is designed to take three images of an object which overlap one another as shown in FIG. 97A, and to combine the images into a panoramic image. To be more specific, each image is taken when its left edge, seen in the field of the view finder, adjoins the right edge of the image taken previously and displayed in the field of the view finder.

Figure 97B:
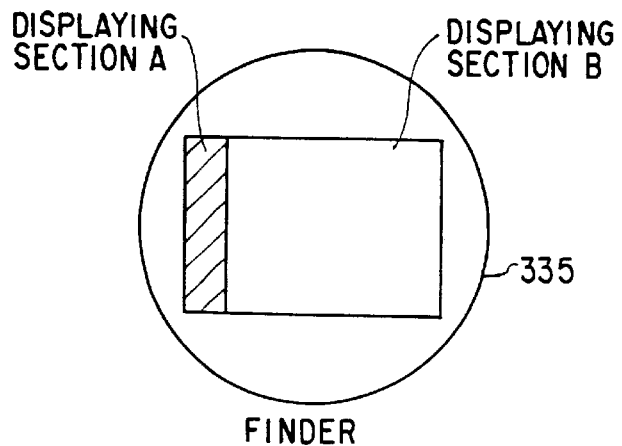

As shown in FIG. 97B, the field of the view finder is comprised of displaying sections A and B. The section A is provided to display a right edge portion of the first image previously taken. The section B is used to display the second image which adjoins the right edge portion of the first image displayed in the section A.

In order to photograph the image 2 shown in FIG. 97A after the image 1 shown in FIG. 97A has been taken, a photographer pans the camera until the left edge of the second image adjoins that part of the first image which is shown in section A. Seeing the the left edge of the second image adjoining said part of the first image displayed in the section A, the photographer pushes the shutter-release button, photographing the image 2.

The imaging section of the thirtieth embodiment will be described in detail, with reference to FIG. 97C. The imaging section comprises a lens 321 for focusing an input optical image, a CCD 322 for converting the image into electric image signals, a preamplifier 323 for amplifying the image signals, a signal processor 324 for performing γ correction or the like on the image signals, an A/D converter 325 for converting the signals to digital image signals, and a color separator 326 for separating each digital signal into a luminance signal Y and chrominance signals Cr and Cb.

Figure 97C:
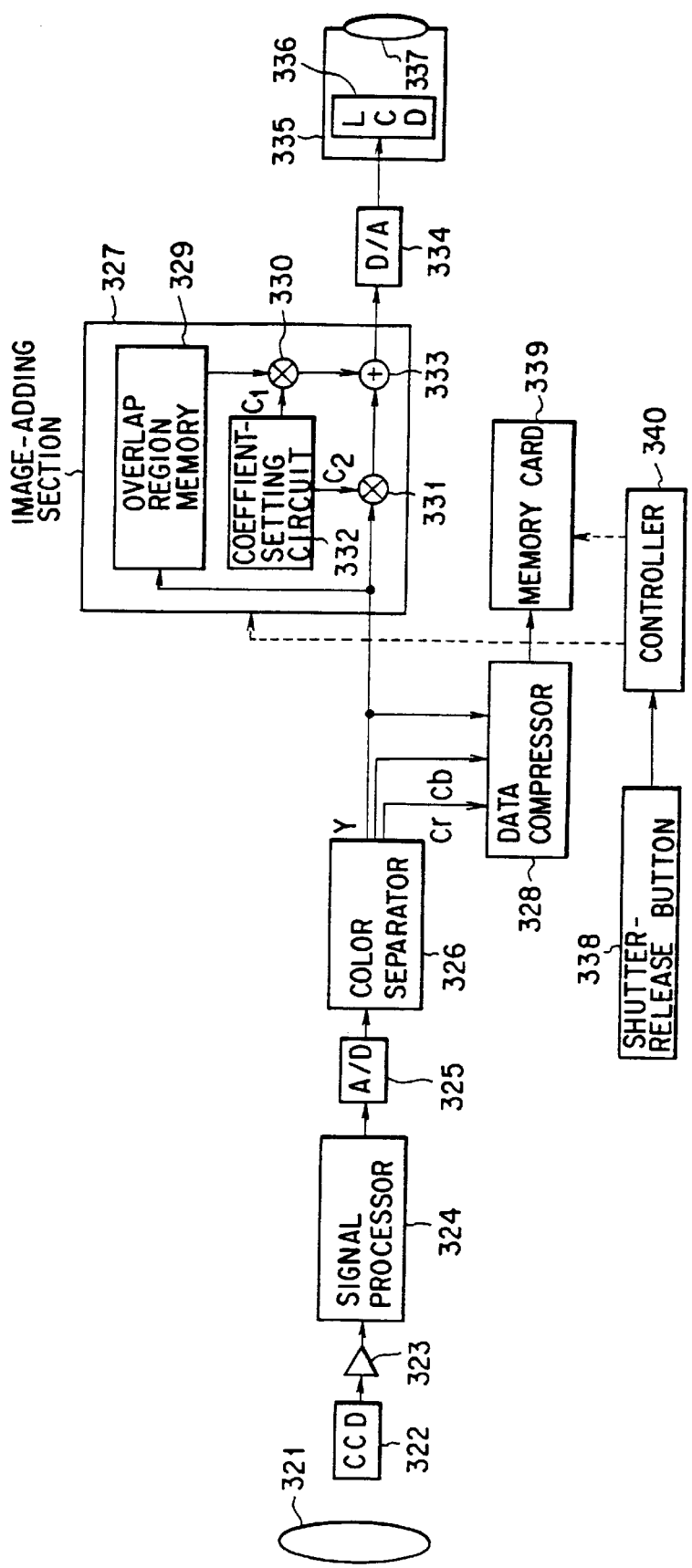

As FIG. 97C shows, an image-adding section 327 is connected to the output of the color separator 326 to receive the luminance signal Y. Also, a data compressor 328 is connected to the output of the color separator 326 to receive the luminance signal Y and the chrominance signals Cr and Cb and compress data formed of these input signals.

The image-adding section 327 comprises an overlap region memory 329, multipliers 330 and 331, a coefficient-setting circuit 332, and an adder 333. The memory 329 is provided for storing the image data representing an image previously photographed. The coefficient-setting circuit 332 is designed to produce coefficients C1 and C2 to supply to the multipliers 330 and 331, respectively.

In operation, a luminance signal Y is supplied to the image-adding section 327. The section 327 adds part of the image data stored in the memory 329 to the luminance signal Y. The resultant sum is supplied from the image-adding section 327 to a D/A converter 334. The coefficients C1 and C2 are "1" and "0," respectively for the displaying section A (FIG. 97B), and are "0" and "1," respectively, for the displaying section B (FIG. 97A). The output of the D/A converter 334 is connected to a view finder 335. The view finder 335 comprises a liquid-crystal display (LCD) 336 and an ocular lens 337.

The data compressor 328 compresses the input signals Y, Cr, and Cb. The compressed signals are written into a memory card 339 at the same time the photographer pushes a shutter-release button 338. The memory card 339 can be removed from the electronic camera. The shutter-release button 338 is a two-step switch. When the button 338 is depressed to the first depth, the camera measures the distance between itself and the object and also the intensity of the input light. When the button 338 is pushed to the second depth, the camera photographs the object. A controller 340 is connected to the image-adding section 327 and also to the memory card 339, for controlling the section 327 and for controlling the supply of write addresses to the memory card 339.

The operation of the electronic camera according to the thirtieth embodiment of the invention will now be explained.

First, the photographer holds the camera at such a position that the left edge of an object is placed at the center of the field of the view finder 335. He or she then pushes the shutter-release button 338 to the first depth. The distance-measuring system and the photometer system (either not shown) operate to adjust the focal distance and the exposure time. The CCD 322 converts the first optical image 1 into image signals, which are amplified by the preamplifier 323. The signal processor 324 effects γ correction or the like on the amplified image signals. The A/D converter 325 converts the output signals of the processor 324 to digital signals. The color separator 326 separates each digital image signal into a luminance signal Y and chrominance signals Cr and Cb. The signals Y, Cr, and Cb are input to the data compressor 328. When the photographer further pushes the shutter-release button 338 to the second depth, the data compressor 328 compresses the image data representing the first image 1, and the compressed image data is written into the memory card and stored in a prescribed storage area of the memory card 339.

In the meantime, the image data representing the right part of the image 1 (i.e., the overlap region 1 shown in FIG. 97A) is stored into the overlap region memory 329. The adder 333 adds this image data to the image data representing the second image 2, generating combined image data. The D/A converter 334 converts the combined image data to analog image data, which is supplied to the LCD 336. The LCD 336 displays the image shown in FIG. 97B. As FIG. 97B shows, displayed in the region A is the right edge of the image 1 which is represented by the image data stored in the overlap region memory 329; displayed in the region B is the second image 2 which is focused on the CCD 322 at present. The left edge of the image 2, which overlaps the right edge of the image 1 cannot be seen in the field of the view finder 335.

The camera is then panned until the position where the images 1 and 2 properly adjoin each other appears in the field of the view finder 335. The photographer depresses the shutter-release button 338 completely, or to the second depth, upon judging that the images 1 and 2 are connected appropriately. The image data of the image 2 now focused on the CCD 322 is is thereby written in a prescribed storage area of the memory card 338. Simultaneously, the right edge of the image 2, i.e., the area 2 overlapping the third image 3, is written in the overlap region memory 329.

Thereafter, the third image image 3 is photographed in the same way as the first image 1 and the second image 2. As a result, the three frame images 1, 2, and 3 are formed. Their overlap regions 1 and 2 (FIG. 97A) may be displaced from the desirable positions. Such displacement can be compensated by the image-synthesis to be described later. The photographer need not pan the camera with so much care as to place the overlap region 1 or 2 at a desired position, and can therefore take many pictures within a short time.

Figure 98:
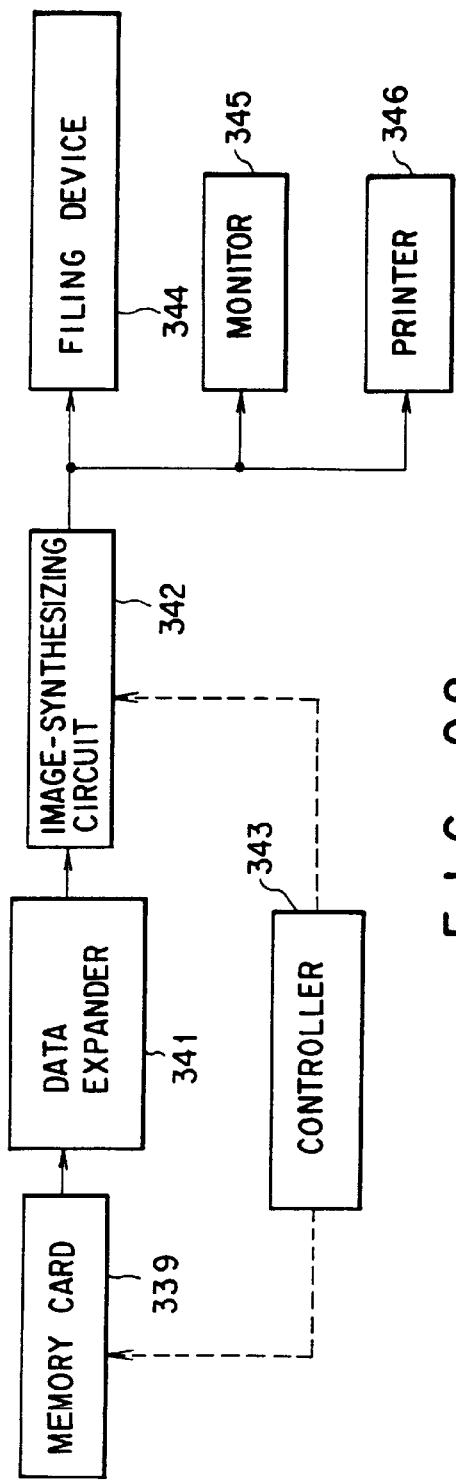
FIG. 98 is a block diagram showing an apparatus for reproducing the image taken by the imaging section shown in FIGS. 97A, 97B, and 97C.

The images 1, 2, and 3 taken by the electronic camera shown in FIG. 97C are reproduced from the memory card 339 by the image-reproducing apparatus shown in FIG. 98. The image-reproducing apparatus comprises a data expander 341 for expanding the image data items read from the memory card 339, an image-synthesizing circuit 342 for combining the expanded data items, a controller 343 for controlling the read address of the card 339 and the image-synthesizing circuit 342, a filing deice 344 for storing synthesized images, a monitor 345 for displaying the synthesized images, and a printer 346 for printing the synthesized images.

Figure 99:
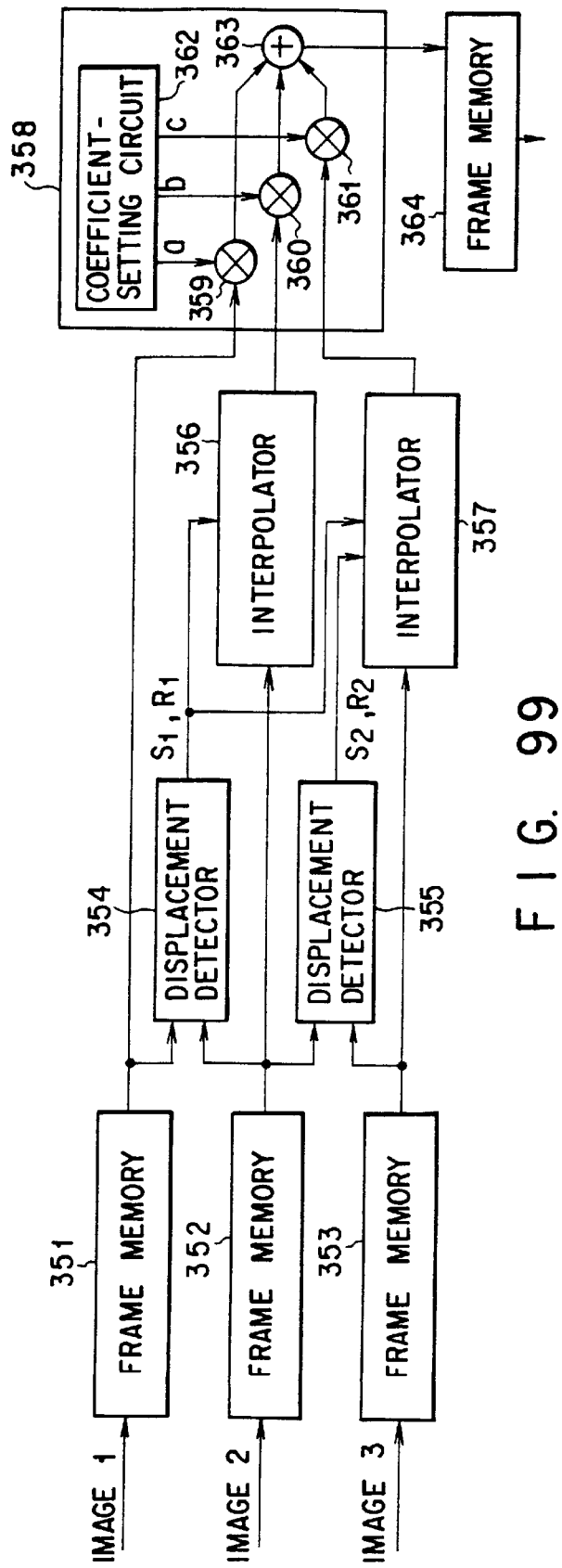
FIG. 99 is a block diagram showing, in detail, the image-synthesizing circuit incorporated in the apparatus of FIG. 98.

The image-synthesizing circuit 342 has the structure shown in FIG. 99. It comprises three frame memories 351, 352, and 353, displacement detectors 354 and 355, interpolation circuits 356 and 357, an image-synthesizing section 358, and a frame memory 364. The frame memories 351, 352, and 353 store the data items representing the images 1, 2, and 3, respectively. The displacement detectors 354 and 355 detect the displacement of the overlap regions 1 and 2 from the image data items read from the frame memories 351, 352, and 353. The detector 354 calculates the parallel displacement S1 and rotation angle R1 of the second image 2, with respect to the first image 1. Similarly, the detector 355 calculates the parallel displacement S2 and rotation angle R2 of the third image 3, with respect to the second image 2. The displacement S1 and the angle R1 are input to the interpolation circuit 356, and the displacement S2 and the angle R2 to the interpolation circuit 357.

The interpolation circuit 356 interpolates the pixel signals read from the second frame memory 352 and representing the second image 2, thereby producing a data item showing an image appropriately adjoining the first image 1. The interpolation circuit 357 interpolates the pixel signals read from the third frame memory 353 and representing the third image 3, thereby producing a data item representing an image properly adjoining the second image 2. The image data items produced by the circuits 356 and 357 are input to the image-synthesizing section 358.

As shown in FIG. 99, the image-synthesizing section 358 comprises multipliers 359, 360, and 361, a coefficient-setting circuit 362, and an adder 363. The circuit 362 is designed to produce coefficients a, b, and c for the images 1, 2, and 3, respectively. The coefficients a, b, and c linearly change in the overlap regions 1 and 2 as is illustrated in FIG. 100. The image-synthesizing section 358 calculates values for the pixel signals defining the image which the image-synthesizing circuit 342 is to output. These values are stored, in the form of image data, into the frame memory 364.

The image data representing the combined image is read from the frame memory 364, and is supplied to the filing deice 344, the monitor 345, and the printer 346—all incorporated in the image-reproducing apparatus shown in FIG. 98. Hence, the synthesized, panoramic image is thereby recorded by the filing device 344, displayed on the monitor 345, and printed by the printer 346.

The image-reproducing apparatus, which combines the frame images produced by the electronic camera (FIG. 97C), may be built within the electronic camera.

In the thirtieth embodiment, only the right edge of the image previous taken is displayed in the section A of the view-finder field, while the image being taken is displayed in the section B of the view-finder field. Instead, both images may be displayed such that they overlap in the display section A. To accomplish this it suffices for the photographer to operate the coefficient-setting circuit 362, thereby setting the coefficients C1 and C2 at 0.5 for the display section A and at 1 and 0, respectively, for the display section B, and to pan the camera such that the second image overlaps, in part, the first image displayed in the section B. Thus, the photographer can take images overlapping in a desired manner, at high speed.

The signals supplied to the LCD 336 are exclusively luminance signals Y, and the images the LCD 336 can display are monochromic. Nonetheless, the LCD 335 may be replaced by a color LCD. The color LCD, if used, may display the two images in different colors so that they may be distinguished more clearly than otherwise. Further, the image signals read from the overlap region memory 329 may be input to an HPF (High-Pass Filter) 365 and be thereby subjected to high-pass filtering, such as a Laplacian operation, as is illustrated in FIG. 101, the two frame images can be more easily overlapped in a desired manner.

As has been described, the thirtieth embodiment is designed to take three frame images by panning the camera and to combine them into a panoramic image. Instead, four or more frame images may be combined into a single wider image.

Figure 103:
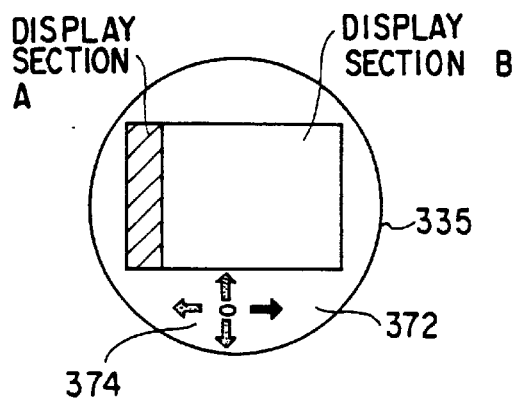
FIG. 103 is a diagram showing the field of the view finder view of the camera illustrated in FIG. 102.

Still another electronic camera, which is a thirty-first embodiment of this invention, will now be described with reference to FIGS. 102 and 103. This electronic camera is similar to the camera (FIG. 97C) according to the thirtieth embodiment of the invention. Hence, the same components as those shown in FIG. 97C are designated at the same reference numerals in FIG. 102, and will not be described in detail.

The camera shown in FIG. 102 is characterized in three respects. First, a correlator 371 is used which finds the correlation between the image data read from the overlap region memory 329 and the data representing the image being taken, thereby to calculate the displacement of the image with respect to the image previously taken. Second, an arrow indicator 372 is incorporated in the view finder 335, for indicating the displacement calculated by the correlator 371. Third, an audio output device 373 is incorporated to generate a sound or a speech informing a photographer of the direction in which the camera is being moved.

The arrow indicator 372 displays an arrow in the field of the view finder 335. The arrow may extend upwards, downwards, to the left, or to the right, indicating how much the image is displaced in which direction, with respect to as FIG. 103 shows, the image previously taken. The indicator 372 has a light source 374 which emits red light and blue light.

If the correlation the correlator 371 has calculated has a very small value (indicating that the two frame images do not overlap), the light source 374 emits red light. In the case where the correlation has been correctly detected, determining the displacement of the second image with respect to the first, then the indicator 372 displays a arrow extending in the direction the first image is displaced. The camera is moved to bring the second image to a position where the image properly overlaps the first image, thus reducing the displace to substantially "0." At this time, the light source 374 emits blue light.

Not only is an arrow displayed in the field of the view finder 335, but also the audio output device 373 gives forth an audio message, as "Pan the camera to the right!" or "Pan the camera to the left!," instructing the photographer to pan the camera in that direction. If the displacement is large, the device 373 may generate a message "Pan the camera much to the left!" or a message "Pan the camera a little to the right." Alternatively, the arrow indicator 372 may display a blinking arrow indicating that the second image is displaced excessively.

Figures 104A, 104B:
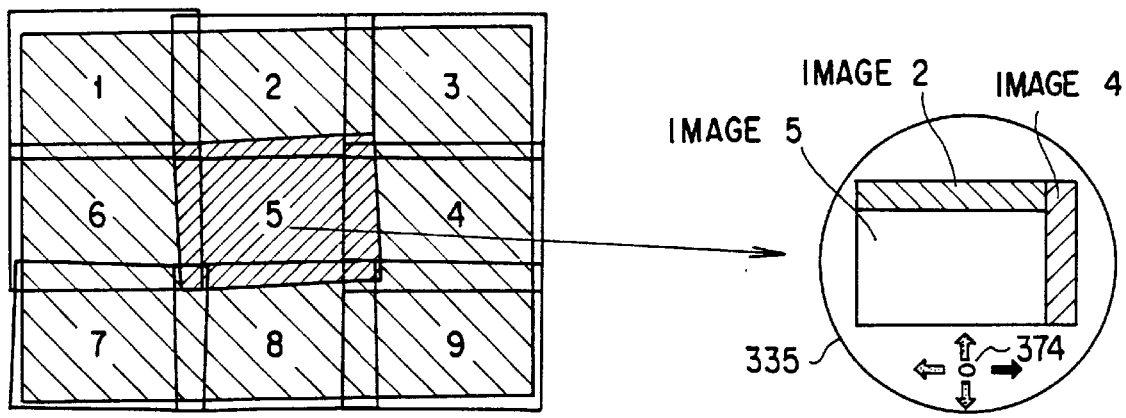
FIG. 104A is a diagram explaining how to combine a plurality of images into a wide image in a thirty-second embodiment of the invention.
FIG. 104B is a diagram showing the field of the view finder of the camera used in the thirty-second embodiment.

A thirty-second embodiment of the present invention will be described with reference to FIGS. 104A and 104B. In this embodiment, nine frame images overlapping one another as shown in FIG. 104A are combined into a large single image. The numerals shown in FIG. 104A indicate the order in which the images are photographed. To take the image 5, a photographer moves the camera so that the LCD of the view finder displays the images 2, 4 and 5 at such positions as is shown in FIG. 104B. When the upper and right edges of the image 5 appropriately overlap the lower edge of the image 2 and the left edge of the image 4, respectively, the photographer depresses the shutter-release button, thereby taking the image 5.

Since the LCD displays not only a frame image located on the left or right side of the target image, but a frame located above or below the target image, it is possible with the thirty-second embodiment to photograph many frame images arranged in both the horizontal direction and the vertical direction, overlapping one another. To achieve this multi-image photographing, the imaging section (not shown) of this embodiment needs an overlap region memory which has a greater storage capacity than the overlap region memory 329 used in the thirtieth embodiment (97C.)

An image processing apparatus according to a thirty-third embodiment of the invention will be described, with reference to FIGS. 105A and 105B. This embodiment is a data-reading apparatus for reading data from a flat original. As is shown in FIG. 105A, the imaging section 376 of the apparatus is attached to a stay 374 protruding upwards from a base 376 and located above the base 376. A shutter-release button 377 is mounted on the base 376. When the button 376 is pushed, the imaging section 375 photographs the image data of an original placed on the base 376. The imaging section 375 has a view finder 378. A memory card 379 is removably inserted into the imaging section 375.

A photographer does not move the imaging section 375 as in the thirtieth embodiment. Rather, he or she moves the original on the base 376 and takes frame images of the original. The photographer pushes the shutter-release button when he or she sees the target part of the original is displayed in the field of the view finder 378.

An XY stage 380 may be mounted on the base 376 as is illustrated in FIG. 105B, and the original may be placed on the XY stage 380. In this case, the stage 380 can be automatically moved along the X axis and the Y axis in accordance with the displacement which the correlator 371 has calculated and which the frame image being taken has with respect to the frame image previously taken. In other words, the photographer is not bothered to move the original to locate the image of the desired part of the original in the field of the view finder 378. Alternatively, a drive mechanism (not shown) may drive the stay 374 along the X axis and the Y axis in accordance with the displacement which the correlator 371 has calculated.

To identify each image taken, a numeral or any ID mark may be superimposed on the image. Further it is possible for the photographer to operate a switch on the imaging section 375, displaying, in the view-finder field, all frame images taken thus far of an original, so that he or she may recognize what a single combined image would look like. Still further, the CCD incorporated in the imaging section 375 may be replaced by a line sensor.

Another image processing apparatus, which is a thirty-fourth embodiment of this invention, will be described with reference to FIGS. 106 to 108 and FIGS. 109A to 109C. This embodiment is a modification of the film-editing apparatus shown in FIG. 63, which uses photographic film.

Figure 106:
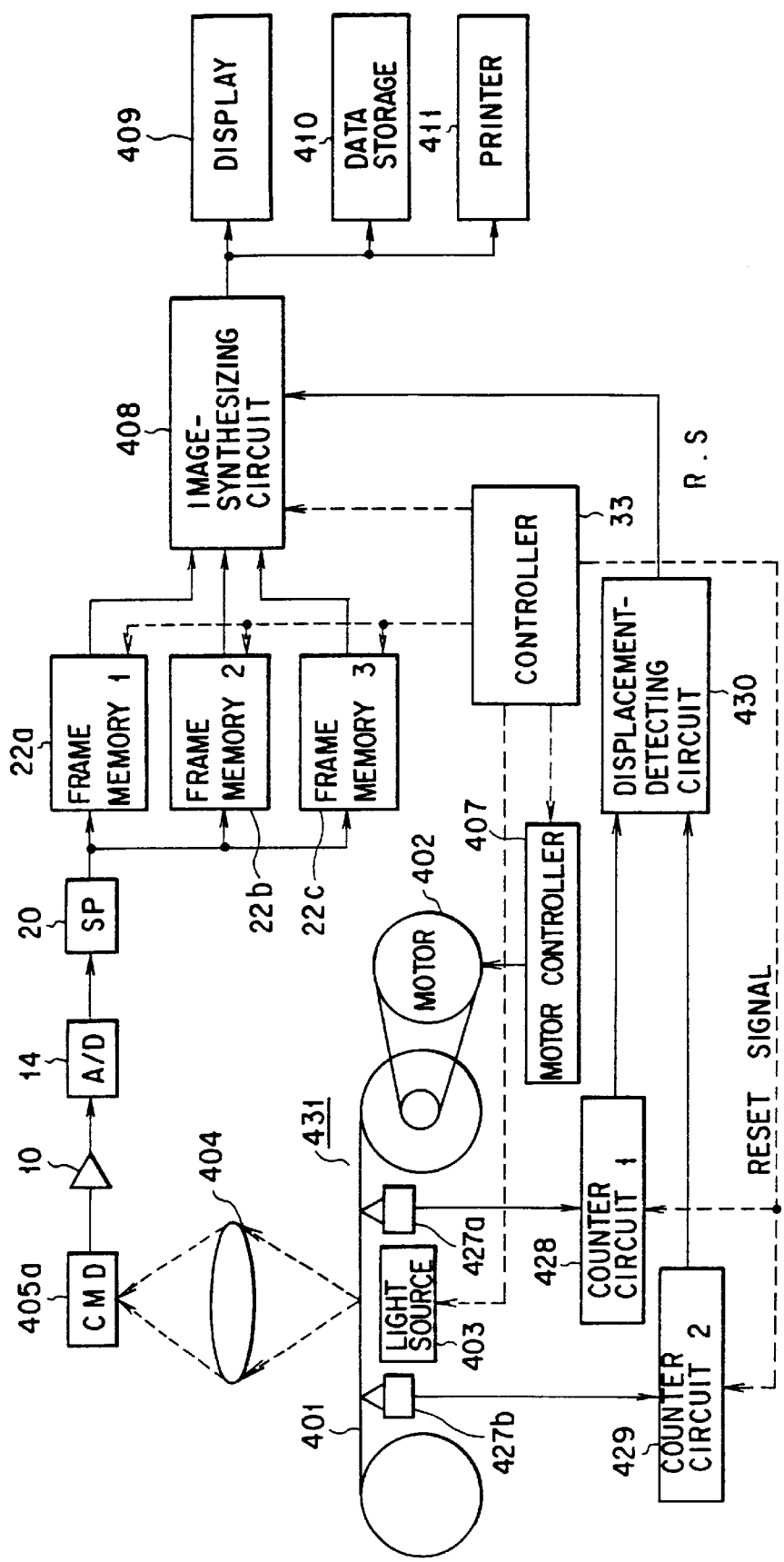
FIG. 106 is a block diagram showing an image processing apparatus according to a thirty-fourth embodiment of the present invention.

The film-editing apparatus shown in FIG. 106 uses a special type of photographic film 401. As FIG. 107 shows, the film 401 has a series of imaging areas 425 and two series of magnetic tracks 426 extending along the perforations, or along the edges of the imaging areas 425. An address signal of the type shown in FIG. 108, consisting of 0s and 1s, is recorded on each magnetic track 426. In this embodiment, the image formed in each imaging area 425 of the film 401 is divided into three images 425a, 425b, and 425c, as is shown in FIGS. 109A, 109B, and 109C. These images 425a, 425b, and 425c will be detected by an imaging device (later described).

As can be understood from FIG. 106, a controller 33 controls a motor controller 407, which in turn drives an electric motor 402. The motor 402 rotates the film take-up shaft, whereby the film 401 loaded in a film-feeding mechanism 431 is taken up around the take-up shaft. Two magnetic heads 427a and 427b are in contact with the film 401 to read the address signals from the magnetic tracks 426 of the film 401. A light source 403 is located near the film 401, for applying image-reading light to the film 401.

The optical image read from each imaging area 425 of the film 401 is focused on a CMD 405a, i.e., a solid-state imaging device, by means of an optical system 404. (The CMD 405a is used since it can be shaped relatively freely.) The CMD 405a converts the input optical image into image signals, which are amplified by a preamplifier 10. An A/D converter 14 converts the amplified signals to digital signals, which are input to a signal processor (SP) 20. The converter 20 generates three data items representing the images 425a, 425b, and 425c, respectively. These image data items are stored into frame memories 22a, 22b, and 22c, respectively.

A low-pass filter (LPF) may be connected between the preamplifier 10 and the A/D converter 14, for removing noise components from the amplified image signals. Further, a FPN (Fixed Pattern Noise)-removing circuit may be incorporated in the CMD 405a.

Meanwhile, the address signals read by the magnetic heads 427a and 427b are supplied to counters 428 and 429, which count these signals. When the count of either counter reaches a predetermined value, the controller 33 causes the motor controller 407 to stop the motor 402, terminating the take-up of the film 401. The count values of both counters 428 and 429 are input to a displacement-determining circuit 430. The circuit 430 determines the displacement of the film with respect to a prescribed position, from the count values the counters 428 and 429 have when the film take-up is stopped. The displacement is defined by a rotation angle R and a parallel displacement S, which have been calculated in the same method as has been explained in connection with the first embodiment of the present invention.

The controller 33 controls the frame memories 22a, 22b, and 22c, reading the image data items therefrom to an image-synthesizing circuit 408. The circuit 408 combines the input image data items in accordance with the rotation angle R and the parallel displacement S which have been detected by the displacement-determining circuit 430. As a result, the image recorded in each imaging area 425 of the film 401 is reconstructed in the same way as has been explained in conjunction with the first embodiment of the invention.

The image data representing the image reconstructed by the circuit 408 is input to a display 409, a data storage 410, or a printer 411.

It will now be explained how the film-editing apparatus of FIG. 106 performs its function.

First, the film 401 is loaded into the film-feeding mechanism 431 and is taken up around the take-up shaft. In the process, the counters 428 and 429 count address signals the magnetic heads 427a and 427b read from the magnetic tracks 426.

When the count of either counter reaches the predetermined value, the film-feeding mechanism 431 is stopped, and the magnetic heads 427a and 427b move relative to the film 401 to positions B, when the film 401 is stopped—as is shown in FIG. 109A. Next, the light source 403 applies light to the film 401, reading a first part of the image recorded in the imaging area 425 of the film 401. The optical system 404 focuses the image, thus read, on the CMD 405a. The CMD 405a converts the input optical image into image signals, which are processed by the preamplifier 10, the A/D converter 14, and the signal processor 20, into an image data item representing the first part of the image. This image data item is written into the frame memory 22a.

Thereafter, the magnetic heads 427a and 427b move relative to the film 401 to position C, when the film 401 is stopped, and then the heads 427a and 427b move relative to the film 401 to position D—as is illustrated in FIG. 109b. The light source 403, the optical system 404, the CMD 405a, the preamplifier 10, the A/D converter 14, and the signal processor 20 operate in the same way as described in the preceding paragraph. As a result, two image data items representing the second and third parts of the image are stored into the frame memories 22b and 22c, respectively.

Next, the three data items are read from the frame memories 22a, 22b, and 22c and supplied to the image-synthesizing circuit 408. The circuit 408 combines the input data items, thus reconstructing the image recording in the imaging area 425 of the film 401—in accordance with the displacement data items (each consisting of R and S) produced by the displacement-determining circuit 430.

The three parts of image shown in FIG. 109B are those which would be read from the film 401 if the film 401 stopped at desired positions. In practice, the parts of the image assume positions B', C', and D' shown in FIG. 109C, displaced with respect to one another. This is inevitable because the film 401 cannot stop at the desired positions due to the inertia of the film-feeding mechanism 431.

If any image part assumes an undesirable position when the film 401 is stopped, the actual count of each counter is either greater or less than the predetermined value. The difference in count is equivalent to a motion vector detected and utilized in any embodiment described above that incorporates correlator or correlators. The displacement-determining circuit 430 can accurately calculate the rotation angle R and the parallel displacement S from that difference in count, and the image-synthesizing circuit 408 can combine the image parts with high precision.

Because of the photographic film 401 with address signals recorded on it, the circuit 430 can accurately calculate the displacements of image parts even if the image parts are low-contrast ones, unlike a correlator. Supplied with the displacement calculated by the displacement-determining circuit 430, the image-synthesizing circuit 408 can reconstruct a high-resolution image from the image data output by the CMD 405a, thought the CMD 405a is a relatively small solid-state imaging device.

Nonetheless, the displacement-determining circuit 430 may replaced by a correlator. In this case, the correlator calculates the motion vector from the positions which the perforations of the film 401 assumes relative to the CMD 405a.

A film-editing apparatus, which is a thirty-fifth embodiment of the present invention, will be described with reference to FIGS. 110 and 111. This apparatus is similar to the thirty-fourth embodiment shown in FIG. 106. The same components as those shown in FIG. 106 are, therefore, designated at the same reference numerals in FIG. 110, and will not be described in detail.

This apparatus is characterized in that each of three parts of an image read from a photographic film 401 is divided into three parts by a half mirror 433, and nine data items representing the resulting nine image parts are combined, thereby reconstructing the original image read from the film 401.

In operation, the image part 425a shown in FIG. 109B read from the film 401 is applied by an optical system 404 to the half mirror 433. The mirror 433 divides the input image into three, which are applied to three CCDs 432a, 432b, and 432c. The CCDs 432a, 432b, and 432c convert the input three image parts into three data items, which are input to an image pre-synthesizing circuit 434. The circuit 434 combines the three data items into a single data item which represents one of the three parts of the image read from the film 401. The circuit 434 combines two other sets of three data items representing the image parts 425b and 425c shown in FIG. 109B, thereby producing two data items which represent the two other parts of the image read from the photographic film 401. The three data items produced by the image pre-synthesizing circuit 434 are stored into three frame memories 22a, 22b, and 22c, respectively.

These data items are read from the frame memories 22a, 22b, and 22c and input to an image-synthesizing circuit 408. The circuit 408 combines the three input data items in accordance with the displacement data items R and S which a displacement-determining circuit 430 has generated from the counts of counters 428 and 429, as in the thirty-fourth embodiment. A single image identical to the original image is thereby reconstructed. Reconstructed from nine image parts, the resultant image has a resolution higher than the image reconstructed by the thirty-fourth embodiment (FIG. 106).

Figure 112:
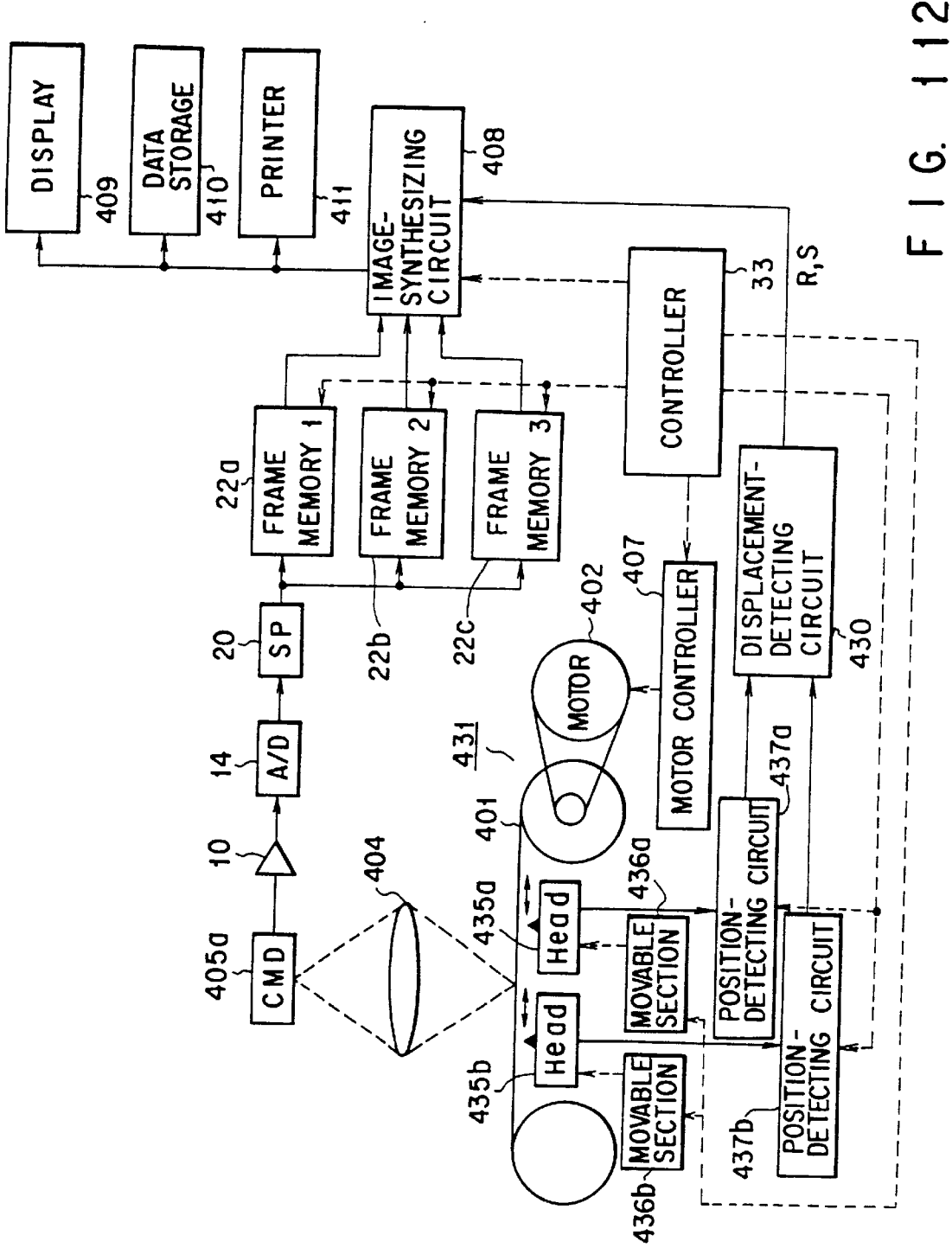
FIG. 112 is a block diagram showing an image processing apparatus according to a thirty-sixth embodiment of the present invention.

Another film-editing apparatus, which is a thirty-sixth embodiment of the invention, will be described with reference to FIGS. 112 and 113. This apparatus is similar to the thirty-fifth embodiment of FIG. 110. The same components as those shown in FIG. 106 are denoted at the same reference numerals in FIG. 111, and will not be described in detail.

The thirty-sixth embodiment is characterized in that the address signals recorded in the magnetic tracks 426 of photographic film 401 are used to control a film-feeding mechanism 431 such that the three parts of each frame image recorded on the film 401 are located at desired positions (i.e., positions A, B, and C specified in FIGS. 109A and 109B) with respect to a CMD 405a. Hence, three address signals recorded for every frame image.

In this embodiment, the film 401 with the address signals recorded on it is loaded in the film-feeding mechanism 431, and magnetic heads 435a and 435b contacting the film 401 can be moved along the magnetic tracks of the film 401 by means of drive sections 436a and 436b which are controlled by a controller 33.

In operation, the film 401 loaded in the film-feeding mechanism 431 is taken up under the control of the controller 33. When the magnetic heads 435a and 435b detect the first of the three address signals recorded for every frame image, the mechanism 431 stops the film 401. The first image part is stopped not at the desired position A (FIG. 109A), but at a more forward position, inevitably because of the inertia of the film-feeding mechanism 431. Nonetheless, the controller 33 controls the drive sections 436a and 436b such that the drive sections move the heads 435a and 435b to the first image part. The distances the heads 435a and 435b are moved are detected by position-determining circuits 437a and 437b, which generate signals representative of these distances. The signals are input to a displacement-determining circuit 430. The circuit 430 calculates a rotation angle R and a parallel displacement S from the input signals. The three image data items, which the CMD 405a produces in the same way in the thirty-fourth embodiment, are stored into three frame memories 22a, 22b, nd 22c and eventually input to an image-synthesizing circuit 408. The circuit 408 combines the three data items into a single image, in accordance with the angle R and displacement S which have been supplied from the displacement-determining circuit 430.

In the thirty-fourth, thirty-fifth, and thirty-sixth embodiments, a photographic film is intermittently stopped, each time upon counting a predetermined number of address signals read from the film, and the displacement (i.e., a rotation angle R and a parallel displacement S) of each image part with respect to another image part is calculated from the difference between said pre-determined number of address signals and the number of address signals counted the moment the film 401 is actually stopped. The data items representing the image parts are corrected in accordance with the displacement data (R and S) and then are combined, thereby reconstructing an image.

In the thirty-fourth, thirty-fifth and thirty-sixth embodiments, the overlap regions of the image parts are located by various methods, not by processing the data items representing the image parts as in the conventional image processing apparatuses. These embodiments can therefore accurately calculate the displacements of the image parts, not requiring complex components which will raise the manufacturing cost. Further, these embodiments, though simple in structure, can position the image parts with high precision, thereby reconstructing an original image, even if the image parts have low contrast and their relative position cannot be well determined by a correlator.

In the thirty-sixth embodiment, wherein address signals of the type shown in FIG. 113 are used, other data pulses can be added between any two adjacent pulses defining the positions where to stop the film 401 intermittently.

As described above, in the thirty-fourth, thirty-fifth and thirty-sixth embodiments, the overlap regions of image parts are detected by using the positioning pulses read from the photographic film. These embodiments can therefore reconstruct an original image with high precision.

An image processing apparatus according to a thirty-seventh embodiment of the invention will be described with reference to FIGS. 114 and 115, FIGS. 116A and 116B, and FIGS. 117 to 121.

In the thirty-seventh embodiment, an input optical image is applied through an optical system 502 to a color-separating prism 503. The prism 503 is, for example, a dichroic mirror for separating the input image into a red beam, a green beam, and a blue beam. These beams are applied to three CCDs 503r, 503g, and 503b, respectively.

The CCDs 503r, 503g, and 503b are driven by a CCD driver 516, and convert the red beam, the green beam, and the blue beam into image signals. The image signals are input to preamplifiers 504r, 504g, and 504b and are thereby amplified. The amplified signals are supplied to A/D converters 505r, 505g, and 505b, respectively, and are converted thereby to digital signals. The digital signals are input to signal processors (SP) 506r, 506g, and 506b, which perform γ correction, edge-emphasis, or the like on the input digital signals. The signals output by the signal processors 506r, 506g, and 506b are stored into frame memories 507r, 507g, and 507b.

The image signals read from the frame memories 507r, and 507b are input to interpolation circuits 508r and 508b. The circuits 508r and 508b interpolate each red-pixel signal and each blue-pixel signal which correspond to one green-pixel signal, in accordance with the coefficients read from coefficient memories 509r and 509b, which will be described later.

The interpolation circuits 508r and 508b are identical in structure, and only the circuit 508r will be described in detail. As FIG. 115 shows, the circuit 508r comprises a data-reading circuit 521 and a linear interpolation circuit 522. The circuit 521 reads the values of four pixels, $V_b$, $B_c$, $V_d$, and $V_e$, from the frame memory 507r in accordance with the coordinates ($IC_x$, $IC_y$) read from the coefficient memory 509r. The linear interpolation circuit 522 comprises multipliers 523, 524, 525, and 526 and an adder 527. The multiplier 523 multiplies the pixel value $V_b$ by the interpolation coefficient $C_b$ read from the coefficient memory 509r; the multiplier 524 multiplies the pixel value $V_c$ by the interpolation coefficient $C_c$ read from the coefficient memory 509r; the multiplier 525 multiplies the pixel value $V_d$ by the interpolation coefficient $C_d$ read from the coefficient memory 509r; and the multiplier 526 multiplies the pixel value $V_e$ by the interpolation coefficient $C_e$ read from the coefficient memory 509r. The products output by the multipliers 523, 524, 525, and 526 are added by the adder 527. As a result, the value $V_a$ of the red pixel is interpolated. Namely:

$$V_a = C_b V_b + C_c V_c + C_d V_d + C_e V_e \quad (13)$$

The value of the blue pixel is interpolated by the interpolation circuit 508b in the same way.

The red-pixel value and the blue-pixel value, thus interpolated, are input to a PS (Parallel-Serial) converter 510, along with the green-pixel value. The PS converter 510 combines the input pixel values, forming a color image signal, e.g., an NTSC television signal. The color image signal is output to a monitor 511, a printer 512, or a filing device 520.

The CCD driver 516, the frame memories 507r, 507g, and 507b, the coefficient memories 509r and 509b, and the PS converter 510 are controlled by a system controller 517.

Figure 114A:
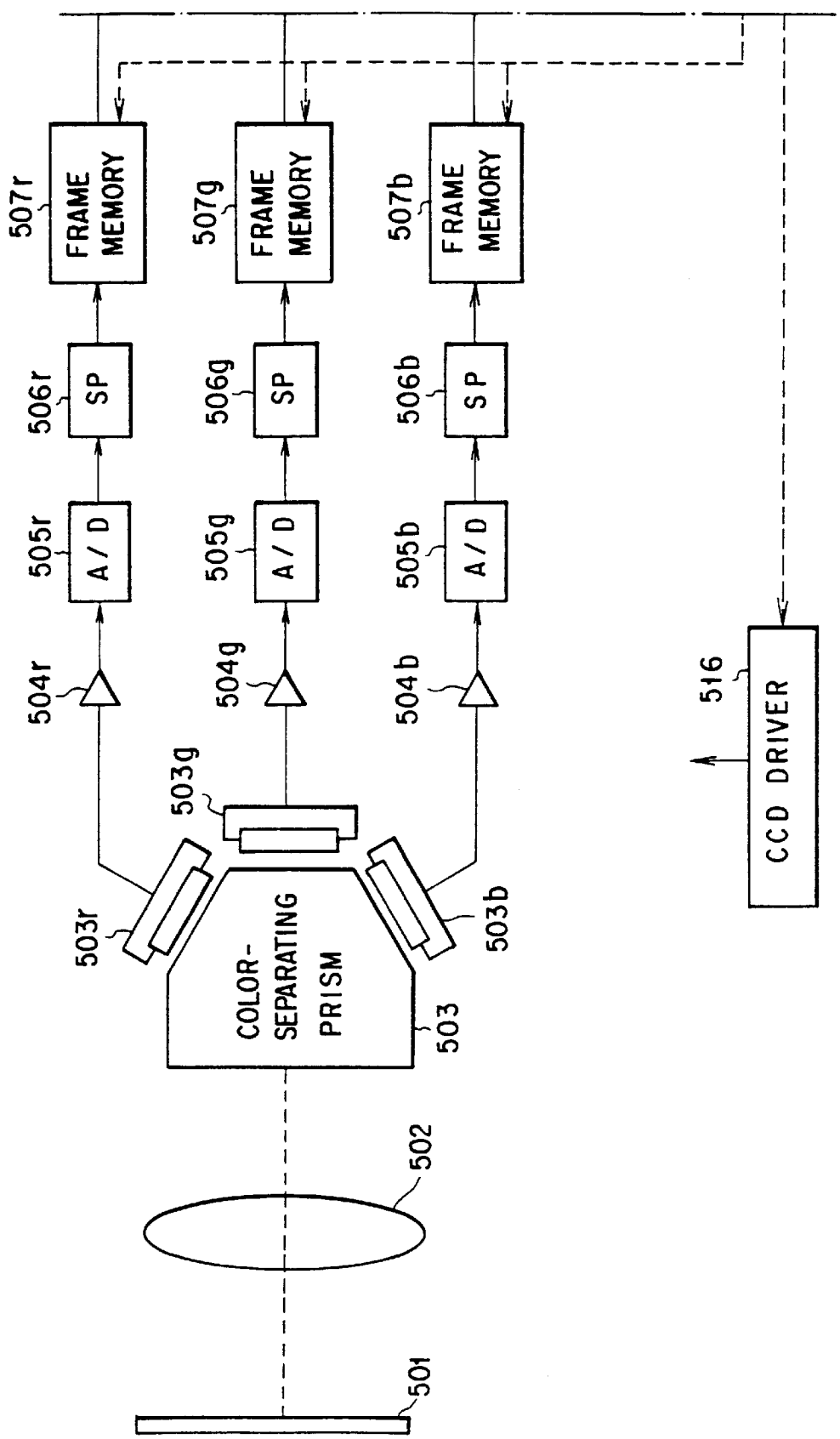
FIGS. 114A and 114B is a block diagram showing an image processing apparatus according to a thirty-seventh embodiment of the present invention.
Figure 114B:
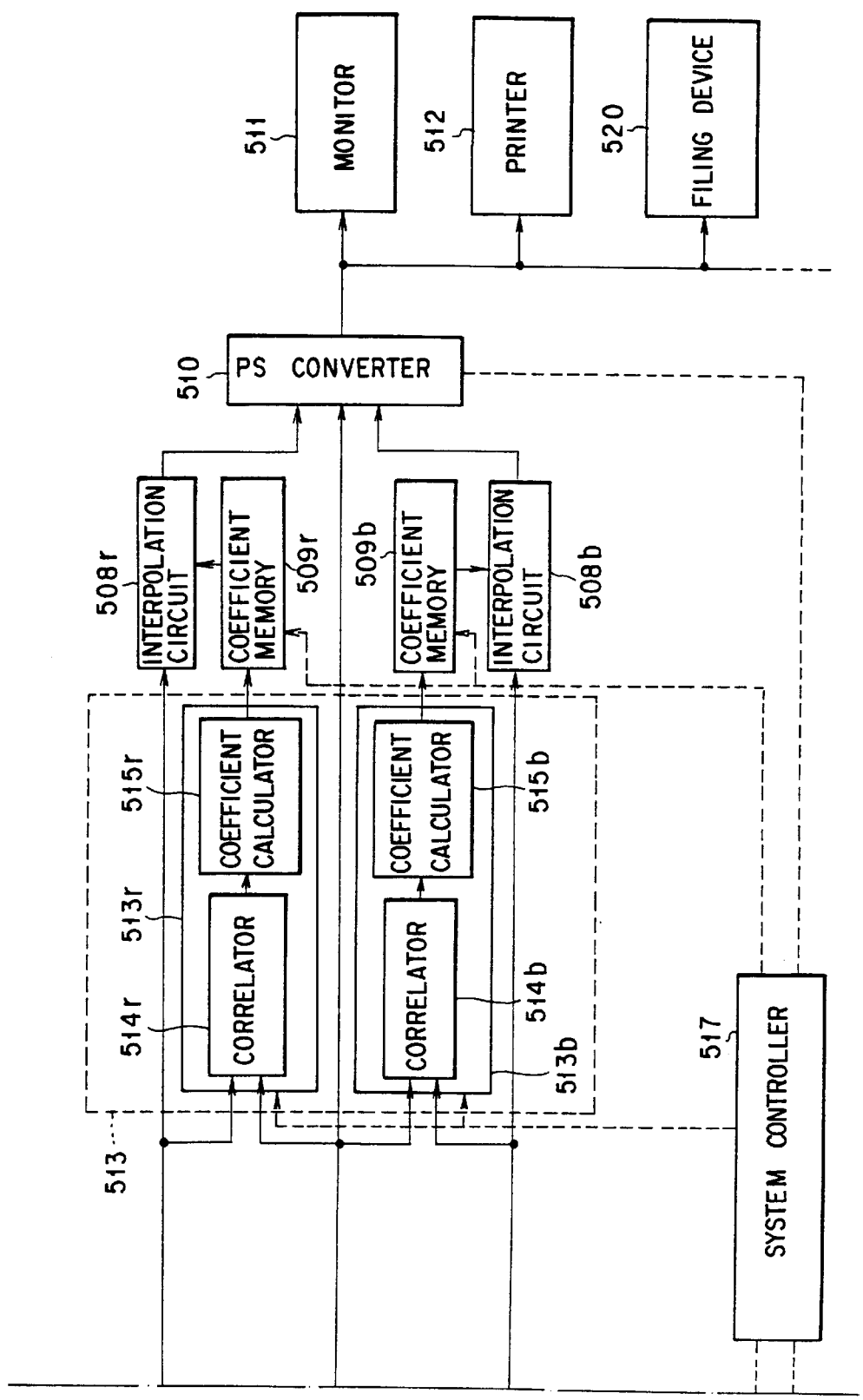

As shown in FIG. 114B, the apparatus comprises coefficient calculators 513r and 513b. The calculator 513r comprises a correlator 514r and a coefficient-calculating circuit 515r. Similarly, the calculator 513b comprises a correlator 514b and a coefficient-calculating circuit 515b. For the sake of simplicity, only the coefficient calculator 513r will be described.

In the coefficient calculator 513r, the correlator 514r detects a parallel vector s and a rotation vector r, which are input to the coefficient-calculating circuit 515r. The circuit 515r calculates coefficients $C_b$, $C_c$, $C_d$, and $C_e$ from the vectors r and s.

The displacement of an image of a color, with respect to an image of any other color, is detected in two factors, i.e., the parallel displacement and angle of rotation of a given pixel of the color image. To detect the displacement this way, reference areas $a_1$, $a_2$, $a_3$, and $a_4$ are set in the green image as is illustrated in FIG. 116A. These areas have centers $p_1$, $p_2$, $p_3$, and $p_4$, respectively. The reference areas are located symmetrically with respect to a point C, each spaced apart therefrom by a k-pixel distance. As shown in FIG. 116B, search areas $b_1$, $b_2$, $b_3$, and $b_4$ are set in the red image and the blue image. These areas $b_1$ to $b_4$ are searched for the positions corresponding to the reference areas $a_1$ to $a_4$. From these positions, displacement vectors V1, V2, V3, and V4 corresponding to the reference areas $a_1$ to $a_4$ are detected. Each of these displacement vectors is defined as follows and as shown in FIG. 117, by a rotation vector r and a parallel vector s measured at position p1 with respect to the point C:

$$V_1 = \text{vector } s + \text{vector } r \quad (14a)$$

$$V_2 = \text{vector } s + \text{vector } r{-}90 \quad (14b)$$

$$V_3 = \text{vector } s - \text{vector } r \quad (14c)$$

$$V_4 = \text{vector } s + \text{vector} + 90 \quad (14d)$$

where r−90 and r+90 are vectors obtained by rotating vectors r by −90° and +90°, respectively.

Vector r is given:

$$\text{Vector } r = k \tan(\theta) \quad (15)$$

where θ is the angle of rotation.

From the equation (13), the vectors s and r can be represented as follows:

$$\text{Vector } s = (V_1 + V_2 + V_3 + V_4)/4 \quad (16)$$

$$\text{Vector } r = (V_1 + V_2 - V_3 - V_4)/2 \quad (17)$$

Thus, the parallel displacement and the rotation angle can be detected. The rotation angle θ is given:

$$\theta = \tan^{-1} (\text{vector } r/k) \quad (18)$$

FIG. 118 shows a correlator 514 used in the thirty-seventh embodiment. In the correlator 514, a correlator 530 determines the correlation between the reference area $a_1$ and the search area $b_1$. Similarly, a correlator 531 detects the correlation between the reference area $a_2$ and the search area $b_2$; a correlator 532 the correlation between the reference area $a_3$ and the search area $b_3$; and a correlator 533 the correlation between the reference area $a_4$ and the search area $b_4$. The correlators 530, 531, 532, and 533 output displacement vectors $V_1$, $V_2$, $V_3$, and $V_4$.

Various methods of determining the correlation between two areas have been proposed. Utilized in this embodiment is the method in which the absolute sum of the values of the pixel defining the first area is compared with that of the values of the pixels defining the second area.

The displacement vectors $V_1$, $V_2$, $V_3$, and $V_4$ are supplied from the correlators 530 to 533 to an SR detector 534. The detector 543 performs the operation of the equations (16) and (17), detecting a parallel displacement s and a rotation vector r. The rotation vector r is input to a θ detector 535. The detector 535 performs the operations of the equations (15) and (18) on the rotation vector r, calculating a rotation angle θ.

The coefficient-calculating circuits 515r and 515b, which are identical and designed to calculate interpolation coefficients $C_b$, $C_c$, $C_d$, and $C_e$ from the vector r and the angle θ, will be described with reference to FIG. 119. Either coefficient-calculating circuit performs linear interpolation, obtaining the value of a pixel A from the known values of pixels B, C, D, and E. As is evident from FIG. 119, the line BC (broken line) passing the pixel A extends at right angles to the lines FG and DE, crossing the lines BC and DE shown in FIG. 119 at points F and G, respectively. Assume BF:FC= DG:GE=m:n, and FA:AG=p:q. Then, the value $V_f$ for the pixel F, and the value $V_g$ for the pixel G are:

$$V_f = (nV_b + mV_c)/(m+n) \quad (19)$$

$$V_g = (nV_d + mV_e)/(m+n) \quad (20)$$

Hence, $V_a$ is given:

$$V_a = (qV_f + pV_g)/(p+q) \quad (21)$$

Setting the inter-pixel distance at "1," then m+n=p+q=1. Therefore, Va is calculated as follows:

$$\begin{aligned} V_a &= q(nV_b + mV_c) + p(nV_d + mV_e) \quad (22) \\ &= (1-p)(1-m)V_b + (1-p)mV_c + \\ &\quad p(1-m)V_d + pmV_e \end{aligned}$$

Comparison of the equation (22) with the equation (13) will show that:

$$C_b = (1-p)(1-m),\ C_c = (1-p)m,$$

$$C_d = p(1-m),\ C_e = pm \quad (23)$$

The coordinates of the pixel A are $(C_x, C_y)$. Then, the coordinates for the pixels B, C, D, and E can be represented by:

Pixel B=$(IC_x, IC_y)$

Pixel C=$(IC_x+1, IC_y)$

Pixel D=$(IC_x, IC_y+1)$

Pixel E=$(IC_x+1, IC_y+1)$ (24)

where $IC_x$ is the integral part of $C_x$, and $IC_y$ is the integral part of $C_y$.

Position $X_r$ in the red image and position $X_b$ in the blue image, which correspond to position $X_g$ in the green image are identified as:

$$X_r = R(\theta_r)(X_g + S_r) \quad (25)$$

$$X_b = R(\theta_r)(X_g + S_b) \quad (26)$$

where $S_r$ is the parallel vector between the red and green images, $S_b$ is the parallel vector between the blue and the green images, $\theta_r$ is the rotation angle of the red image, $\theta_b$ is the rotation angle of the blue image, and $X_r$, $X_g$, $X_b$ are two-dimensional vectors whose elements are an x-coordinate and a y-coordinate. R(θ is given as follows:

Vector $V_1$=Vector r+Vector s

Vector $V_2$=-(Vector r)+Vector s

|Vector r|=L tan θ (27)

Figure 120:
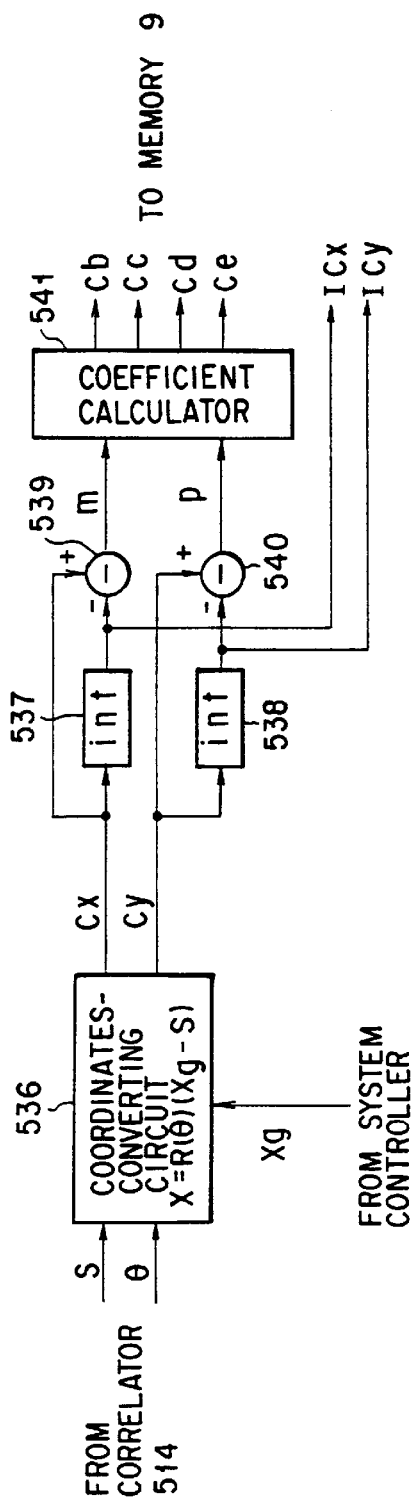

The coefficient-calculating circuits 515r and 515b, which are identical, have the structure illustrated in FIG. 120. As can be understood from FIG. 120, a coordinates-converting circuit 536 performs the operations of equations (25) and (26), outputting the coordinates $C_x$ and $C_y$ (real numbers) for the red and blue images. The coordinates $C_x$ and $C_y$ are input to integration circuits 537 and 538, respectively. The circuits 537 and 538 generate the integral part $IC_x$ of $C_x$ and the integral part $IC_y$ of $C_y$, respectively. These integral parts $IC_x$ and $IC_y$ are output from the coefficient-calculating circuit, and subtracters 539 and 540. The subtracter 539 subtracts $IC_x$ from $C_x$ supplied from the coordinates-converting circuit 536, generating a coefficient $m(=C_x-IC_x)$. The subtracter 540 subtracts $IC_y$ from $C_y$ supplied from the circuit 536, generating a coefficient $p(=C_y-IC_y)$. The values m and p are input to a coefficient calculator 541. The calculator 541 calculates interpolation coefficients $C_b$, $C_c$, $C_d$, and $C_e$ from the coefficients m and p, by performing the operation of equation (23).

The coefficient memory 509r will be described in detail, with reference to FIG. 121, and the other coefficient memory 509b will not be described in detail since it is identical to the memory 509r.

Figure 121:
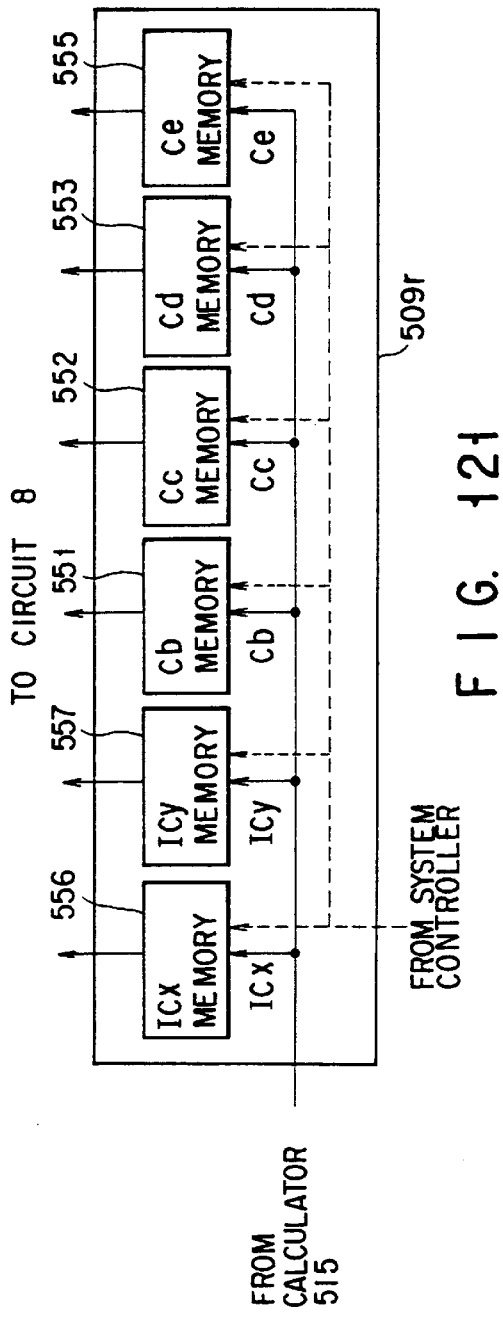

As FIG. 121 shows, the coefficient memory 509r comprises memories 551, 552, 553, and 555 for storing the interpolation coefficients $C_E$, $C_c$, $C_d$ supplied from the coefficient-calculating circuit 515r, and memories 556 and 557 for storing the coordinates $IC_x$ and $IC_y$ supplied from the circuit 515r.

The operation of the thirty-seventh embodiment will now be explained with reference to FIG. 122. The embodiment executes two major steps. The first major step is to detect coefficients by means of the coefficient calculating sections 513r and 513b and store the coefficients obtained by the sections 513r and 513b into the coefficient memories 509r and 509b. The second major step is to photograph an object to acquire image data. The sections 513r and 513b, which calculate coefficients and therefore are useful in the first major step, need not be used in the second major step.

The first major step will be described, with reference to FIG. 114. Assume that the object 501 is a test chart which is a black-and-white image. The red image, green image, and blue image obtained from the black-and-white image are greatly correlated. The displacement the image has with respect to the green image, and the displacement the blue image has with respect to the green image can, therefore, be calculated with high accuracy. It is desirable that the test chart have many spatial frequency components so that accurate correlation signals may be obtained at various positions.

The test chart 501 is photographed. To be more specific, the distance-measuring system (not shown) adjusts the focal distance of the optical system 502, and the photometer system (not shown) adjusts the exposure time of the CCDs 503r, 503g, 503b. The optical image of the test chart 501 is applied via the system 502 to the color-separating prism 503. The prism 503 separates the input image into a red beam, a green beam, and a blue beam. The CCDs 503r, 503g, and 503b convert these beams into image signals. The image signals are amplified by the preamplifiers 504r, 504g, and 504b such that the white balance is maintained. The A/D converters 505r, 505g, and 505b convert the amplified signals to digital signals. The signal processors 506r, 506g, and 506b perform y correction, edge-emphasis, or the like on the digital signals. The signals output by the signal processors 506r, 506g, and 506b are stored into the frame memories 507r, 507g, and 507b.

The image signals read from the frame memories 507r and 507g are input to the coefficient calculator 513r. In the calculator 513r, the correlator 514r detects the reference areas $a_1$, $a_2$, $a_3$, and $a_4$ of the green image, and the search areas $b_1$, $b_2$, $b_3$, and $b_4$ of the red image. The correlator 514r also detects the parallel vector $S_r$ between the red image and the green image, and a rotation angle $\theta_r$. The vector $S_r$ and the angle $\theta_r$ are supplied to the coefficient-calculating circuit 515r. The circuit 515r calculates the coordinates $IC_x$, $IC_y$ of the red image which corresponds to the two-dimensional vector $X_g$ of the green image, and also calculates interpolation coefficients $C_b$, $C_c$, $C_d$, and $C_e$. The values output by the circuit 515r are stored at the specified addresses of the coefficient memory 509r. These values define the imaging area of the green image, over which the red image, the green image, and the blue image overlap as is illustrated in FIG. 122. The imaging area (FIG. 122) is designated by the system controller 517 in accordance with the outputs of the correlators 514r and 514b. Instead, the imaging area may be set by a user.

Meanwhile, the image signals read from the frame memories 507g and 507b are input to the coefficient calculator 513b which is identical in structure to the coefficient calculator 513r. The calculator 513b calculates the displacement between the green image and the blue image, the coordinates ICx, ICy of the imaging area of the blue image, and interpolation coefficients Cb, Cc, Cd, and Ce. The values output by the coefficient-calculating circuit 515b are stored at the is specified addresses of the coefficient memory 509b.

Thus, the interpolation coefficients for the imaging area over which the red, green and blue images overlap are calculated and subsequently stored in the coefficient memories 509r and 509b, thereby completing the first major step of registering coefficients in the memories 509r and 509b.

The first major step is carried out during the manufacture of the image processing apparatus. The coefficients are already stored in the memories 509r and 509b when the apparatus is delivered to a user (i.e., a photographer). Therefore, the coefficient calculators 513r and 513b can be removed from the apparatus after the coefficients have been calculated and registered in the memories 509r and 509b.

The second major step, i.e., photographing an object, will be explained, with reference to FIG. 114, on the assumption that the coefficient calculators 513r and 513b have been removed from the apparatus.

First, a photographer gets the image of an object 501 with the imaging area defined above, and pushes the shutter-release button (not shown). As a result, the CCDs 503r, 503g, and 503b generate red-image data, green-image data, and blue-image data, respectively. These image data items are stored into the frame memories 507r, 507g, and 507b.

Then, the system controller 517 designates coordinates of a position of the green image, which is located in the imaging area. The coefficients related to the position designated, i.e., the coordinates $IC_x$ and $IC_y$ and the interpolation coefficients $C_b$, $C_c$, $C_d$, and $C_d$, are read from the coefficient memory 509r and supplied to the interpolation circuit 508r. The red-image data is read from the frame memory 507r in accordance with the coordinates $IC_x$ and $IC_y$ and input to the interpolation circuit 508r. The circuit 508r interpolates the value for the red pixel located at that position of the green image which the system controller 517 has designated.

In the meantime, the coefficients related to the position designated, i.e., the coordinates $IC_x$ and $IC_y$ and the interpolation coefficients $C_b$, $C_c$, $C_d$, and $C_d$, are read from the coefficient memory 509b and supplied to the interpolation circuit 508b. The blue-image data is read from the frame memory 507b in accordance with the coordinates $IC_x$ and $IC_y$ and input to the interpolation circuit 508b. The circuit 508b interpolates the value for the blue pixel located at that position of the green image which the system controller 517 has designated.

The value of a green pixel is supplied from the frame memory 507g to the PS converter 510, the value of the red pixel is input from the interpolation circuit 508r to the PS converter 510, and the value of the blue pixel is input from the interpolation circuit 508b to the PS converter 510. The converter 510 combines the three pixel values, forming a color image signal. The color image signal is output to the monitor 511, the printer 512, or the filing device 520.

As can be understood from the foregoing, the thirty-seventh embodiment can provide a three-section color camera which con form a high-resolution color image with no color distortion.

Since the interpolation circuits 508r and 508b compensate color distortion resulting form the mutual displacement of the CCDs 503r, 503g, and 503b, the positions of the CCDs need not be adjusted as in the conventional apparatus. That is, no registration of solid-state imaging devices is required. Since the image signals produced by the CCDs are corrected, the thirty-seventh embodiment can form a high-resolution color image even if the CCDs are not positioned with precision. Further, the mutual displacement of a red image, a green image, and a blue image can be accurately detected. This is because the red image and the blue image are compared with the green image which is greatly correlative to both the red image and the blue image.

In the thirty-seventh embodiment, four reference areas are utilized as shown in FIGS. 116A and 116B in order to detect the displacement of the red image and the blue image with respect to the green image. Instead, only two reference areas, either the areas $a_1$ and $a_3$ or the areas $a_2$ and $a_3$, may be used for that purpose. Alternatively, more than four reference areas may be set in the green image.

Moreover, the interpolation circuits 508r and 508b, which perform linear interpolation, may be replaced by circuits designed to effect spline interpolation or SINNG interpolation.

Further, the coefficient calculators 513r and 513b may be connected to the camera by means of connectors. In this case, the calculators 513r and 513b can be disconnected from the camera after the coefficients they have calculated are written into the coefficient memories 509r and 509b.

The two coefficient calculators 513r and 513b can be replaced by a single calculator of the same type, provided that this calculator can be connected alternatively to the correlators 514r and 514b by means of a changeover switch.

Figure 123A:
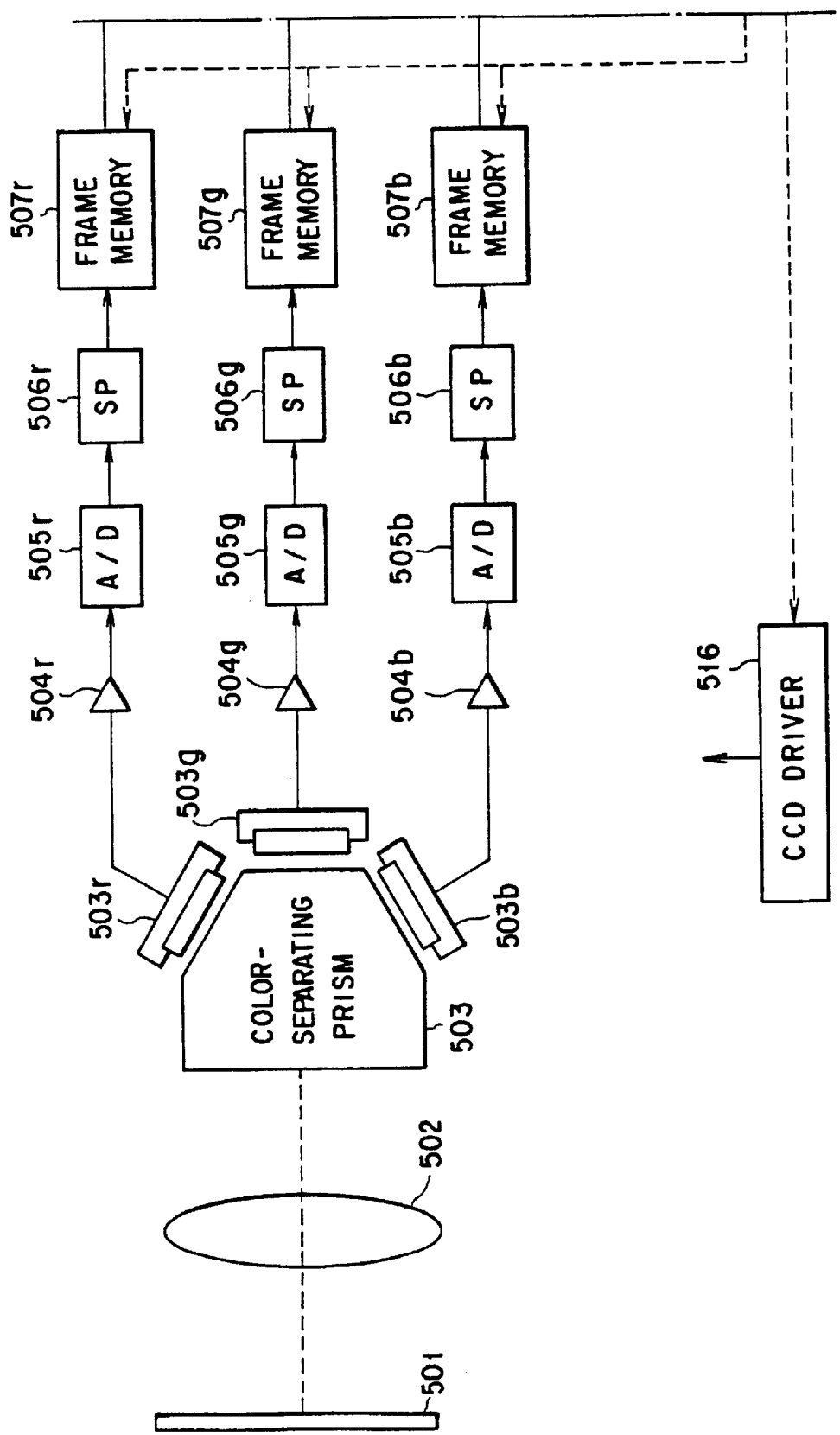
Figure 123B:
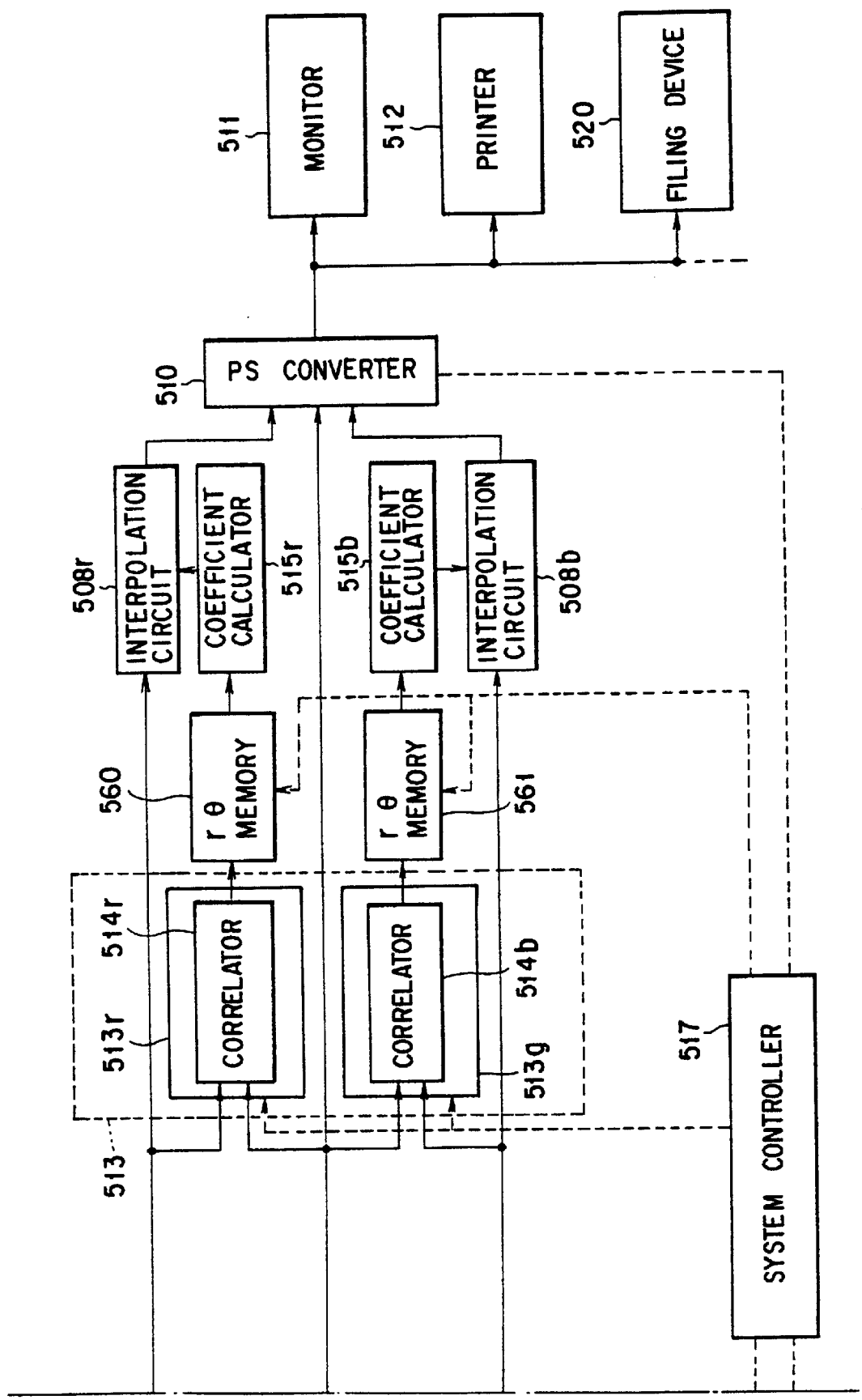

Another image processing apparatus, which is a thirty-eighth embodiment of the present invention, will be described with reference to FIG. 123. This embodiment is similar to the thirty-seventh embodiment shown in FIG. 114. The same components as those shown in FIG. 114 are denoted at the same reference numerals in FIG. 123, and will not be described in detail.

The thirty-eighth embodiment is characterized in that r$\theta$ memories 560 and 561 are used in place of the coefficient memories 509r and 509b. The memory 560 stores only the vector r and the angle $\theta$ output by the correlator 514r, and the memory 561 stores only the vector r and the angle $\theta$ output by the correlator 514b. The memories 560 and 561 suffice to have a storage capacity far less than that of the memories 509r and 509b which need to store a variety of coefficients calculated by the coefficient-calculating circuits 515r and 515b. In this case, however, it is necessary for the circuits 515r and 515b to calculate interpolation coefficients and coordinate data in the second major step of taking a picture of the test chart 501.

An image processing apparatus according to a thirty-ninth embodiment of the invention will be described, with reference to FIGS. 124, 125, and 126. This embodiment is identical to the thirty-seventh embodiment, except for the features shown in FIGS. 124 and 125.

The thirty-ninth embodiment is characterized in that less data is stored in each coefficient memory 509 than in the thirty-seventh embodiment and that the apparatus can yet operate at as high a speed as the thirty-seventh embodiment.

As described above, it is possible with the thirty-seventh embodiment to interpolate a position A ($C_x$, $C_y$) from sets of coordinates which are presented in real numbers. Since the coordinates of the position A, thus interpolated, are real numbers, there are countless interpolation coefficients $C_b$, $C_c$, $C_d$, and $C_e$. In the thirty-ninth embodiment, it is assumed that one image consists of L×L blocks having the same size, and the interpolation coefficient for the coordinates of the center of each block is used as interpolation coefficient for the image block. Therefore, $L_2$ interpolation coefficients are required in the thirty-ninth embodiment. Serial numbers, or block numbers, "1" to "$L_2$," are assigned to the $L_2$ image blocks, respectively. The block numbers and the $L_2$ interpolation coefficients are stored in a memory, in one-to-one association.

Figure 124:
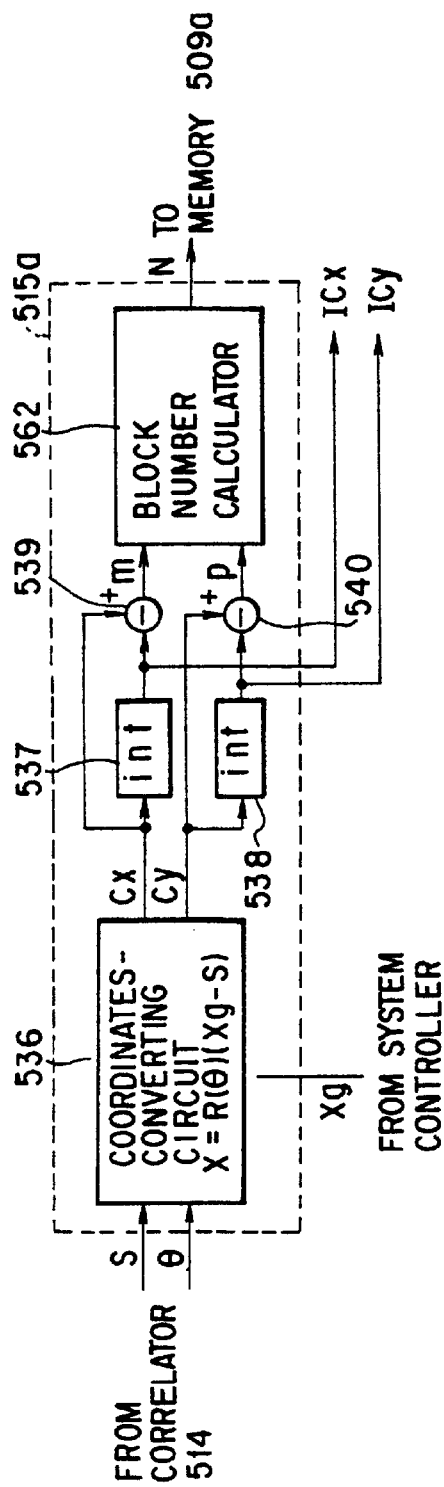
Figure 125:
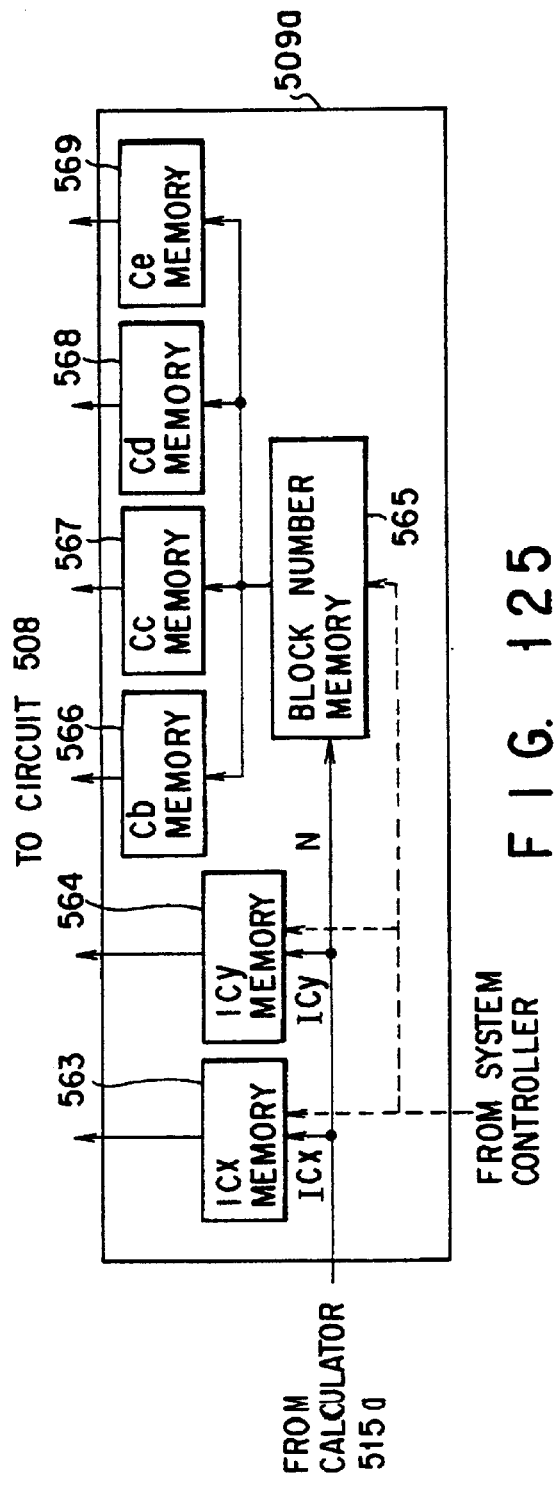

The thirty-ninth embodiment comprises a coefficient-calculating circuit 515a shown in FIG. 124 and a coefficient memory 509a shown in FIG. 125. As FIG. 124 shows, the coefficient-calculating circuit 515a has a block number calculator 562 which is used in place of the coefficient calculator 541 (FIG. 120). The block number calculator 562 calculates a block number N from values m and p, as follows:

$$N=m/(1/L)+\{q/(1+L)\}\times L+1 \qquad (28)$$

where $0 \leq m<1$, $0 \leq p<1$.

As FIG. 125 shows, the coefficient memory 509a comprises memories 563, 564, 565, 566, 567, 568, and 569. The memories 563, 564, and 565 are used to store the coordinate $IC_x$, the coordinate $IC_y$ and the coefficient N, respectively, which the coefficient calculator 541 has generated. The memories 566, 567, 568, and 569 are provided for storing interpolation coefficients $C_b$, $C_c$, $C_d$, and $C_e$, respectively, which are associated with the image blocks. The memories 566, 567, 568, and 569 have $L^2$ memory cells each, as compared to the memories used in the thirty-seventh embodiment which have as many memory cells as the pixels defining the imaging area. Obviously, the storage capacity of the memories 566, 567, 568, and 569 is far smaller than is required in the thirty-seventh embodiment. The storage capacity of each coefficient memory can be reduced since the interpolation coefficients for symmetrical pixels are identical.

In the thirty-ninth embodiment, the interpolation circuits process image signals, thereby compensating the mutual displacement of images formed the imaging devices. No mechanical registration of the imaging devices is therefore required. The thirty-ninth embodiment can be applied to a low-cost color image processing apparatus which can form a high-resolution color image, even if its imaging devices are not positioned with high precision.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus for combining a plurality of image areas which are obtained as image data by dividing an object image, comprising:
   imaging means for imaging an object within each of a plurality of image areas having at least one overlap area; and
   image area position detecting means for detecting a positional relationship relating to overlapping between the plurality of image areas within which the object is imaged by said imaging means by calculating correlation between the plurality of image areas:
   wherein said imaging means includes:
      optical image picking-up means for picking up an image of the object;
      light splitting means for splitting an object light received by said optical image picking-up means into a plurality of object lights;
      a plurality of groups of imaging elements for obtaining images from the plurality of object lights obtained by said light splitting means, and
   said image area position detecting means includes:
      displacement determining means for setting a reference area in the image obtained by one of the groups of imaging elements of said imaging means, setting a search area in a position corresponding to the reference area in the image obtained by another one of the groups of imaging elements, and then calculating a displacement between said one of the groups of imaging elements and said another one of the groups of imaging elements by performing a correlation arithmetic with respect to the reference area and the search area, to thereby determine a coefficient for use in interpolation;
      storing means for storing the coefficient determined by said displacement determining means;
      interpolation means for calculating an image signal associated with a position of said another one of the groups of imaging elements which corresponds to a position of said one of the groups of imaging elements, by using an interpolation arithmetic, in accordance with a value indicated by data stored in said storing means; and
      image data synthesizing means for combining a plurality of image data output from said imaging means and said interpolation means.

2. The image processing apparatus according to claim 1, which further comprises (i) first image storing means for storing an object obtained as image data by said imaging means, and (ii) second image storing means for storing a reference image as reference image data in advance, and wherein the image area position detecting means comprises (i) movement vector detecting means for calculating a correlation between the images read out as image data from said first and second storing means, and comparing the images, to thereby detect a movement vector, and (ii) third image storing means for storing the image as the image data which is moved from said first image storing means based on the movement vector detected by said movement vector detecting means.

3. The image processing apparatus according to claim 2, wherein the movement detecting means includes a correlation area selecting means for selecting an area having a high correlation.

4. The image processing apparatus according to claim 1, which further comprises a mirror rotatably provided between the object and said imaging means, and wherein when said imaging means images the object, object images are intermittently obtained as image data, and said mirror is rotated to shift an imaging range over the object, while obtaining the object images.

5. An image processing apparatus for combining a plurality of image areas which are obtained as image data by dividing an object image, comprising:

imaging means for imaging an object within each of a plurality of image areas having at least one overlap area;

image area position detecting means for detecting a positional relationship relating to overlapping between the plurality of image areas within which the object is imaged by said imaging means by calculating correlation between the plurality of image areas;

a finder for displaying in real time an image being obtained by said imaging means, along with that overlap area of an image previously obtained by said imaging means, which is to be made to overlap with the image being obtained by said imaging means when the image being obtained by said imaging means is connected to the image previously obtained by said imaging means, correlation arithmetic means for performing a correlation arithmetic with respect to an image signal associated with the overlap area of the previously obtained image and a present image signal representing a present image obtained subsequent to the previously obtained image to thereby determine a displacement between the previously obtained image and the present image, and indicating means for indicating a direction in which said imaging means is to be moved to obtain an image signal that coincides with the image signal associated with the overlap area of the previously obtained image based on the displacement determined by said correlation arithmetic means.

6. The image processing apparatus according to claim 5, wherein said indicating means displays an arrow indicator in the finder to indicate the direction in which the imaging means is to be moved.

7. The image processing apparatus according to claim 5, wherein said indicating means changes color of the arrow indicator displayed in the finder when the present image signal representing the present image obtained subsequent to the previously obtained image coincides with the image signal associated with the overlap area of the previously obtained image.

* * * * *